(12) United States Patent
An et al.

(10) Patent No.: US 9,866,908 B2
(45) Date of Patent: Jan. 9, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Seungjoo An, Seoul (KR); Seungryul Yang, Seoul (KR); Kyoungsoo Moon, Seoul (KR); Woosuk Ko, Seoul (KR); Jinwon Lee, Seoul (KR); Sejin Oh, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/102,140

(22) PCT Filed: Dec. 11, 2014

(86) PCT No.: PCT/KR2014/012201
§ 371 (c)(1),
(2) Date: Jun. 6, 2016

(87) PCT Pub. No.: WO2015/099331
PCT Pub. Date: Jul. 2, 2015

(65) Prior Publication Data
US 2016/0316270 A1    Oct. 27, 2016

Related U.S. Application Data

(60) Provisional application No. 61/920,485, filed on Dec. 24, 2013, provisional application No. 62/018,669, filed on Jun. 30, 2014.

(51) Int. Cl.
*G06F 3/00* (2006.01)
*G06F 13/00* (2006.01)
(Continued)

(52) U.S. Cl.
CPC ..... *H04N 21/4668* (2013.01); *H04N 21/4126* (2013.01); *H04N 21/454* (2013.01);
(Continued)

(58) Field of Classification Search
CPC .......... H04N 21/4668; H04N 21/4126; H04N 21/4532; H04N 21/4751; H04N 21/4755;
(Continued)

(56) References Cited

U.S. PATENT DOCUMENTS

2004/0073482 A1    4/2004  Wiggins et al.
2008/0155062 A1*   6/2008  Rabold ............ H04L 29/06027
                                                    709/219

(Continued)

FOREIGN PATENT DOCUMENTS

EP    2343881 A2    7/2011
EP    2 611 149 A1  7/2013
(Continued)

*Primary Examiner* — Yassin Alata
(74) *Attorney, Agent, or Firm* — Birch, Stewart, Kolasch & Birch, LLP

(57) ABSTRACT

The present invention provides a method of transmitting broadcast signals. The method includes, pairing with a companion device; receiving a PDI (Profiles, Demographics, Interests) table via broadcast signals, wherein the PDI table includes plural PDI questions related to personal interests for interactive contents, wherein the PDI table includes an ID identifying the PDI table; obtaining an answer for at least one of the PDI questions; storing the obtained answer in the PDI table; and delivering the PDI table having the obtained answer to the paired companion device.

16 Claims, 113 Drawing Sheets

(51) Int. Cl.
*H04N 5/445* (2011.01)
*H04N 21/466* (2011.01)
*H04N 21/41* (2011.01)
*H04N 21/45* (2011.01)
*H04N 21/475* (2011.01)
*H04N 21/454* (2011.01)
*H04N 21/472* (2011.01)

(52) U.S. Cl.
CPC ....... *H04N 21/4532* (2013.01); *H04N 21/472* (2013.01); *H04N 21/4751* (2013.01); *H04N 21/4755* (2013.01); *H04N 21/4758* (2013.01)

(58) Field of Classification Search
CPC . H04N 21/4758; H04N 21/454; H04N 21/472
See application file for complete search history.

(56) References Cited

U.S. PATENT DOCUMENTS

| | | | |
|---|---|---|---|
| 2012/0054267 A1* | 3/2012 | Yamagishi | H04N 21/4758 709/203 |
| 2012/0095796 A1* | 4/2012 | Gately | G06Q 10/06311 705/7.13 |
| 2012/0185888 A1 | 7/2012 | Eyer et al. | |
| 2012/0246677 A1* | 9/2012 | Fasting | H04N 7/14 725/34 |
| 2012/0271696 A1 | 10/2012 | Akbar et al. | |
| 2013/0205327 A1 | 8/2013 | Eyer | |

FOREIGN PATENT DOCUMENTS

| | | |
|---|---|---|
| EP | 2611149 A1 | 7/2013 |
| JP | 2010-187418 A | 8/2010 |
| JP | 2012-14722 A | 1/2012 |

\* cited by examiner

[Fig. 1]
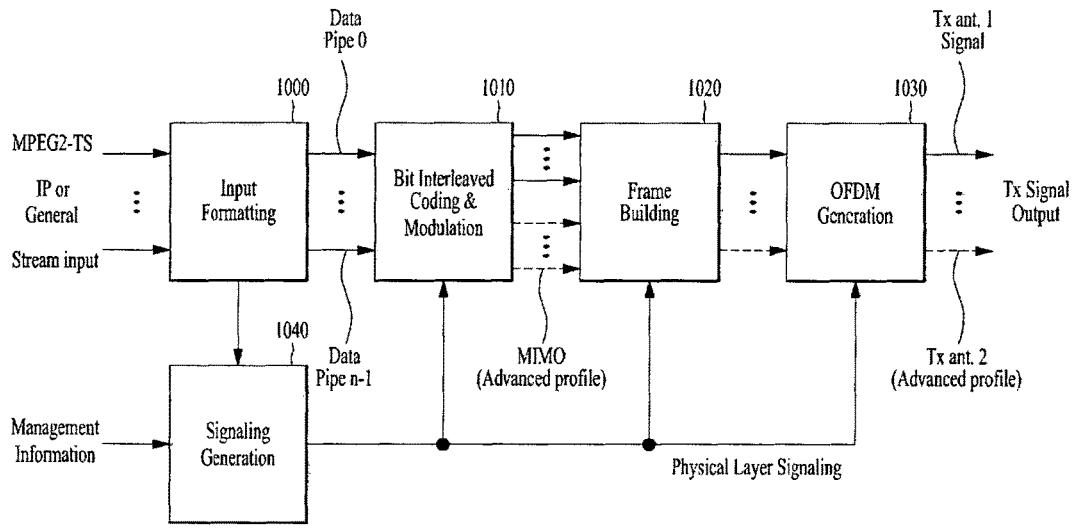
[Fig. 2]
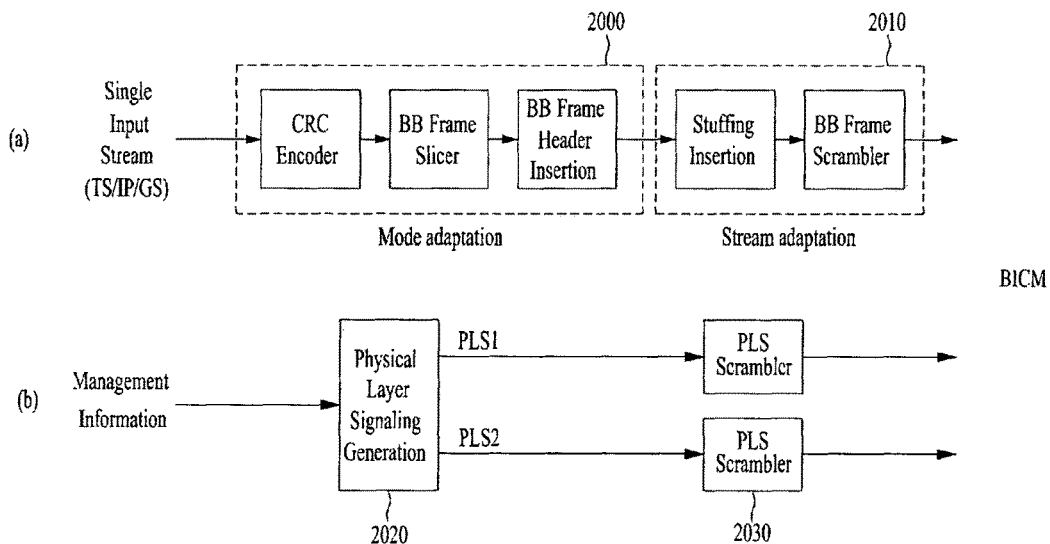

[Fig. 3]
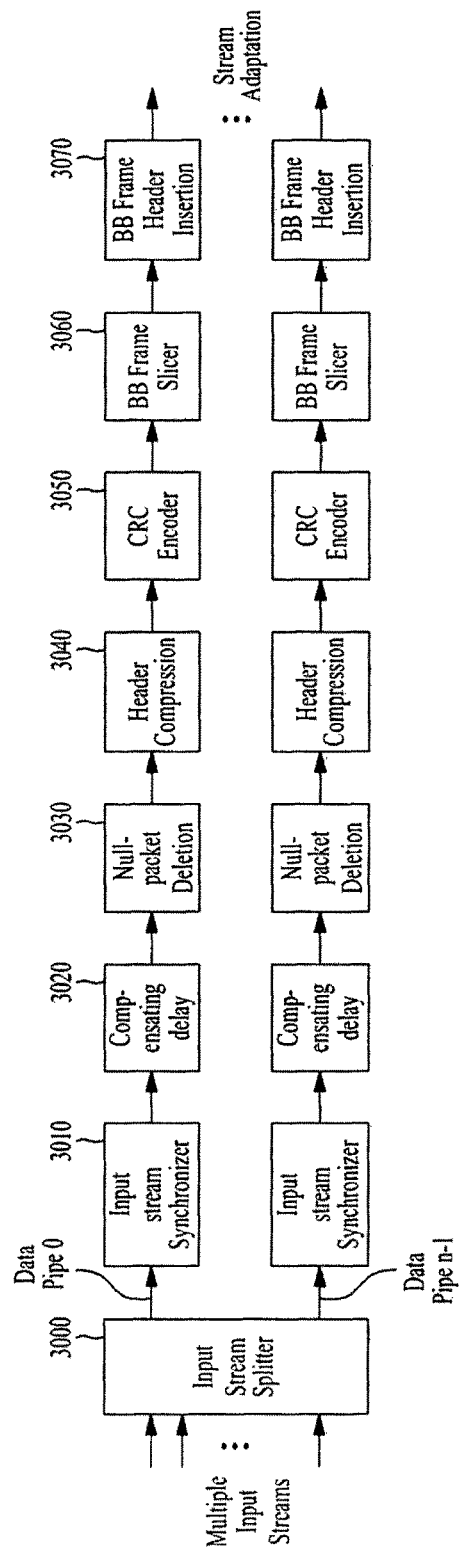

[Fig. 4]
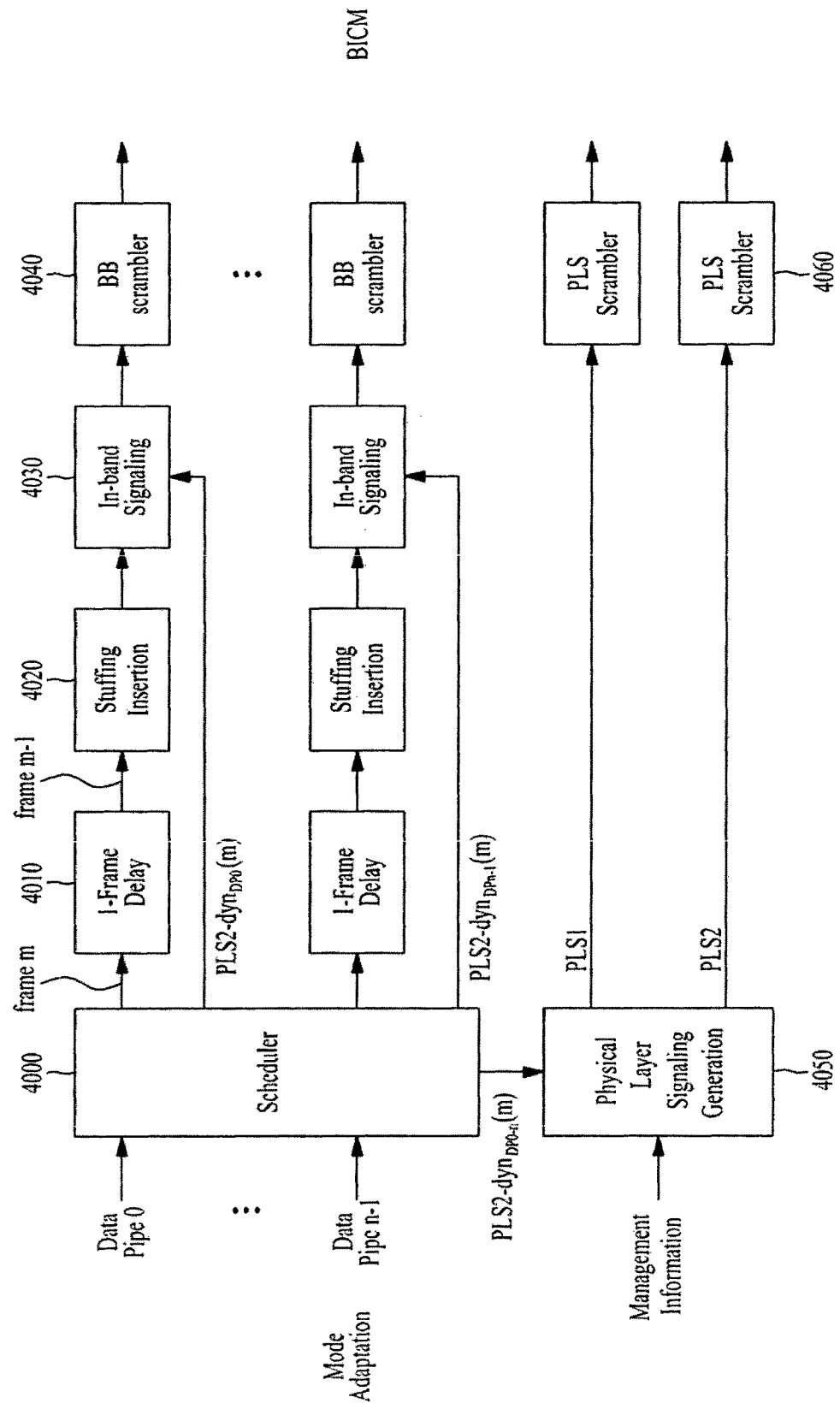

[Fig. 5]
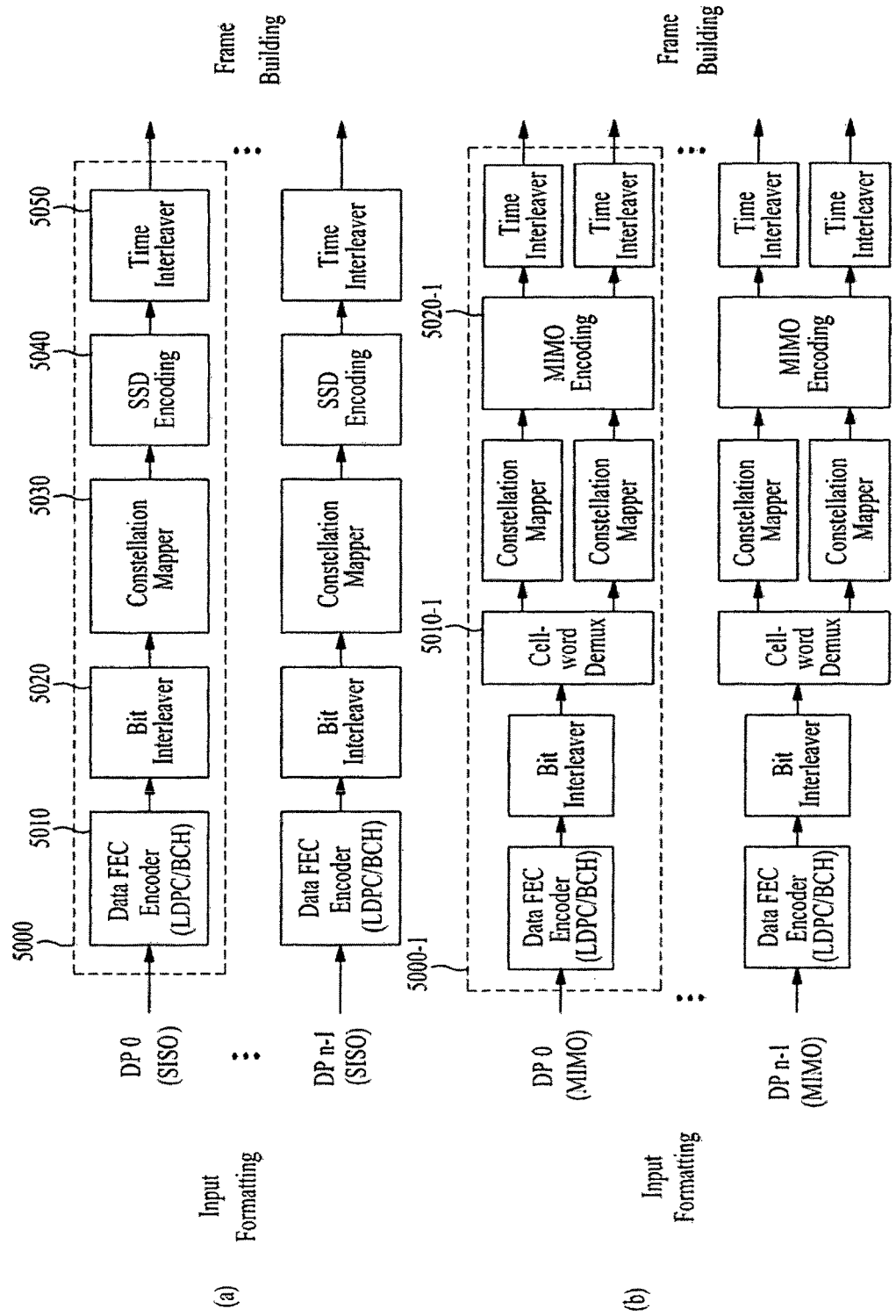

[Fig. 6]
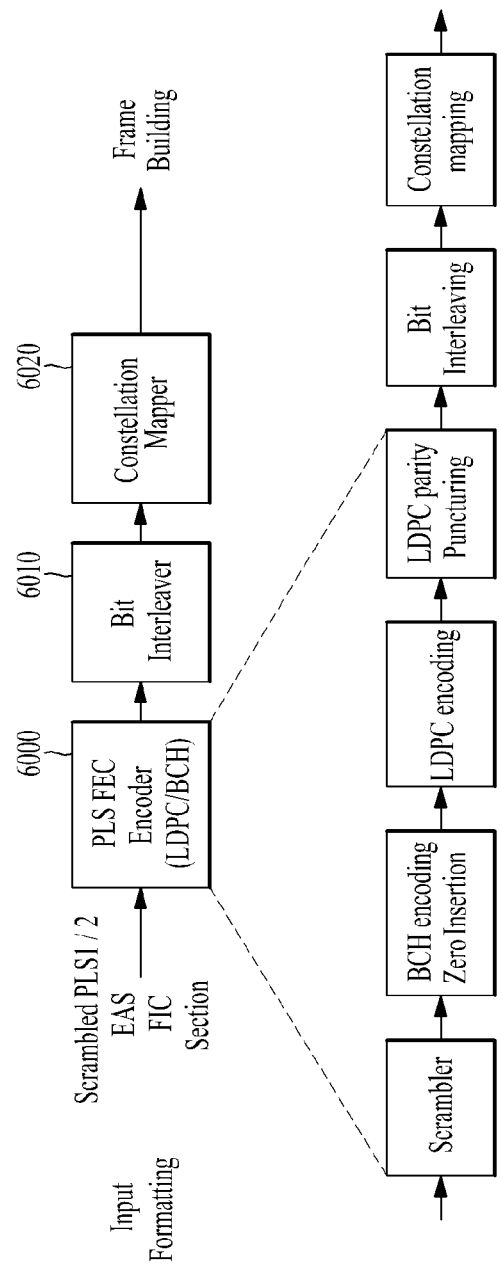

[Fig. 7]
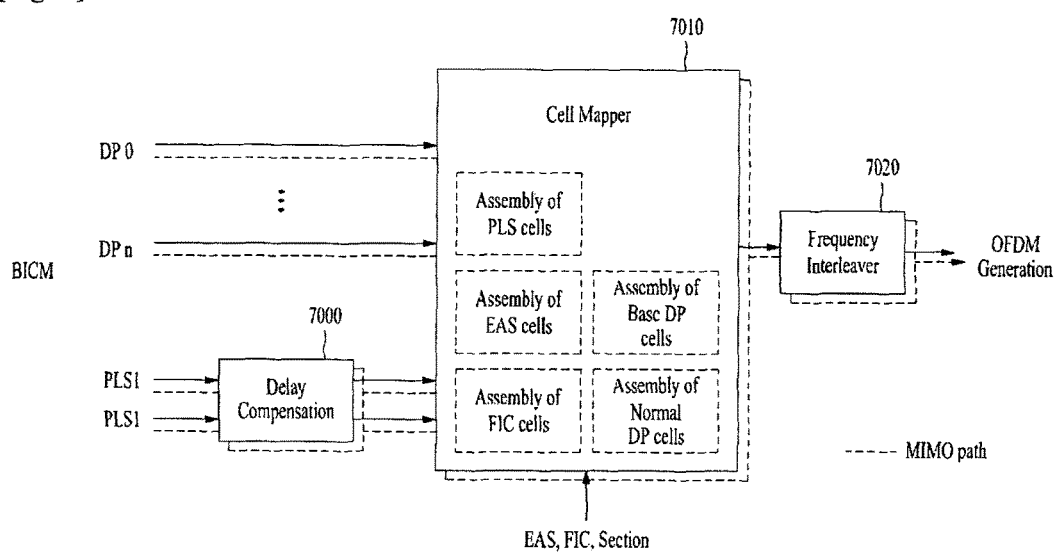

[Fig. 8]
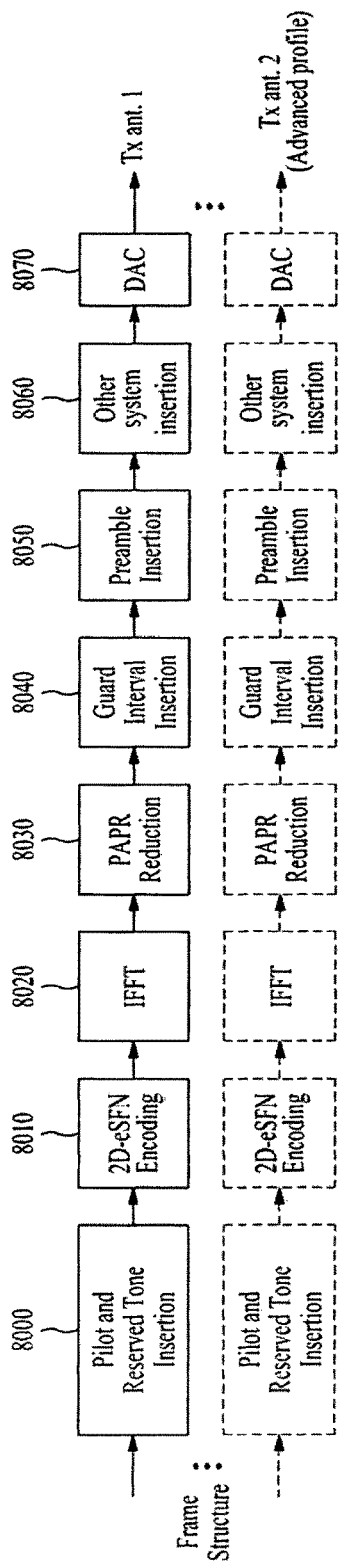

[Fig. 9]
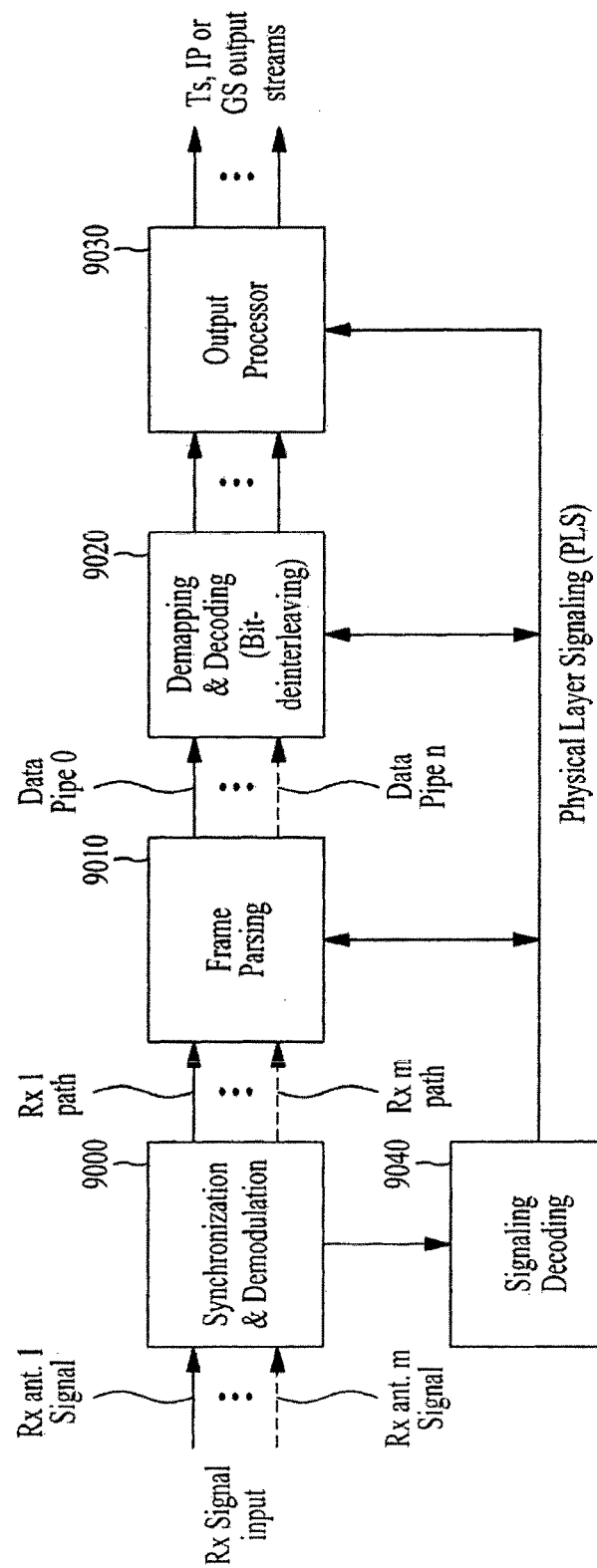

[Fig. 10]
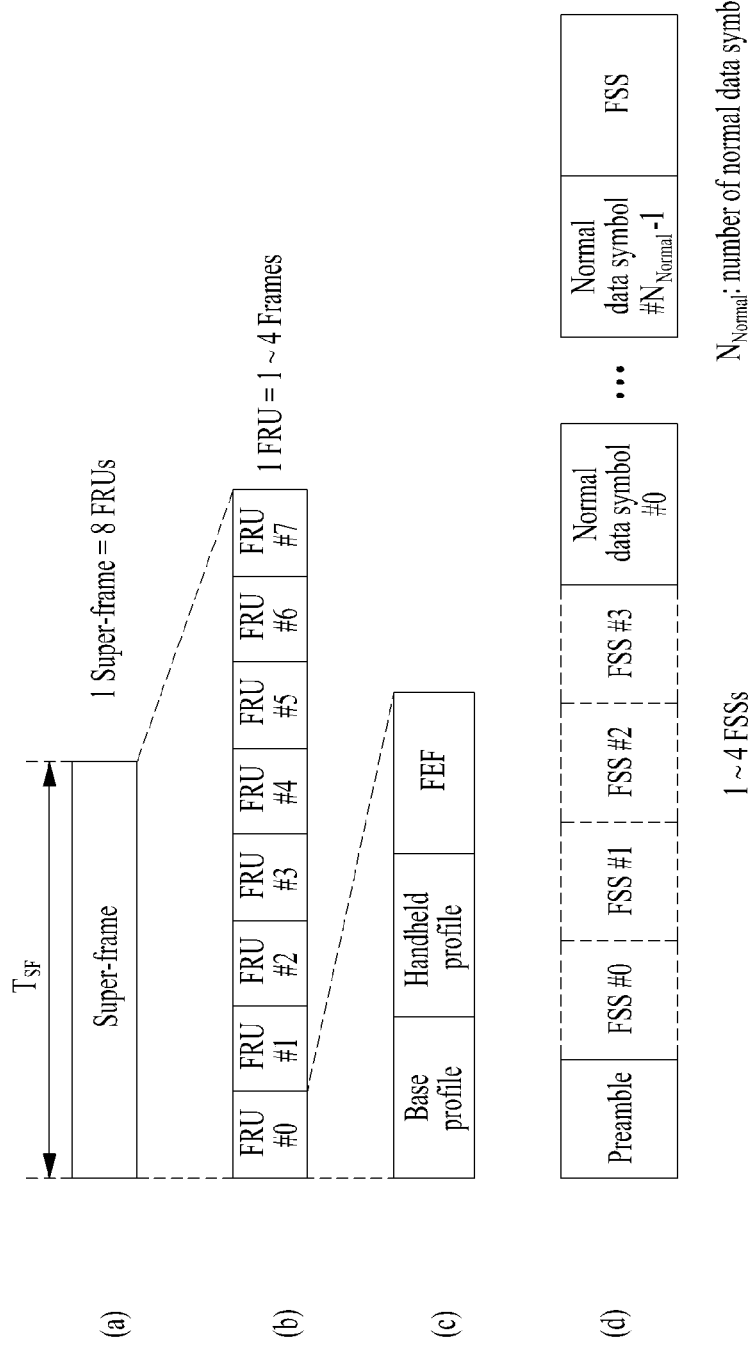

[Fig. 11]
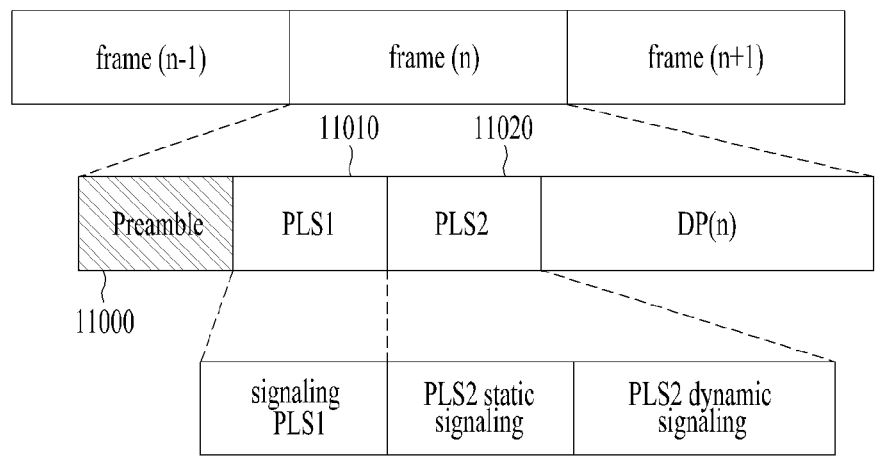
[Fig. 12]
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Fig. 13]

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

[Fig. 14]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|      | |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

[Fig. 15]
| Content | | | Bit |
|---|---|---|---|
| FRAME_INDEX | | | 5 |
| PLS_CHANGE_COUNTER | | | 4 |
| FIC_CHANGE_COUNTER | | | 4 |
| RESERVED | | | 16 |
| for i = 1: NUM_DP | | | |
| | | DP_ID | 6 |
| | | DP_START | 15 (or13) |
| | | DP_NUM_BLOCK | 10 |
| end | | RESERVED | 8 |
| EAC_FLAG | | | 1 |
| EAS_WAKE_UP_VERSION_NUM | | | 8 |
| if EAC_FLAG == 1 | | | |
| | | EAC_LENGTH_BYTE | 12 |
| else | | | |
| | | EAC_COUNTER | 12 |
| end | | | |
| for i=1:NUM_AUX | | | |
| | | AUX_PRIVATE_DYN | 48 |
| end | | | |
| CRC 32 | | | 32 |
[Fig. 16]
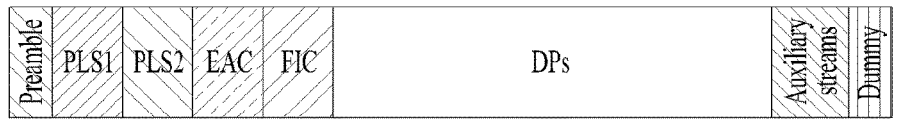

[Fig. 17]
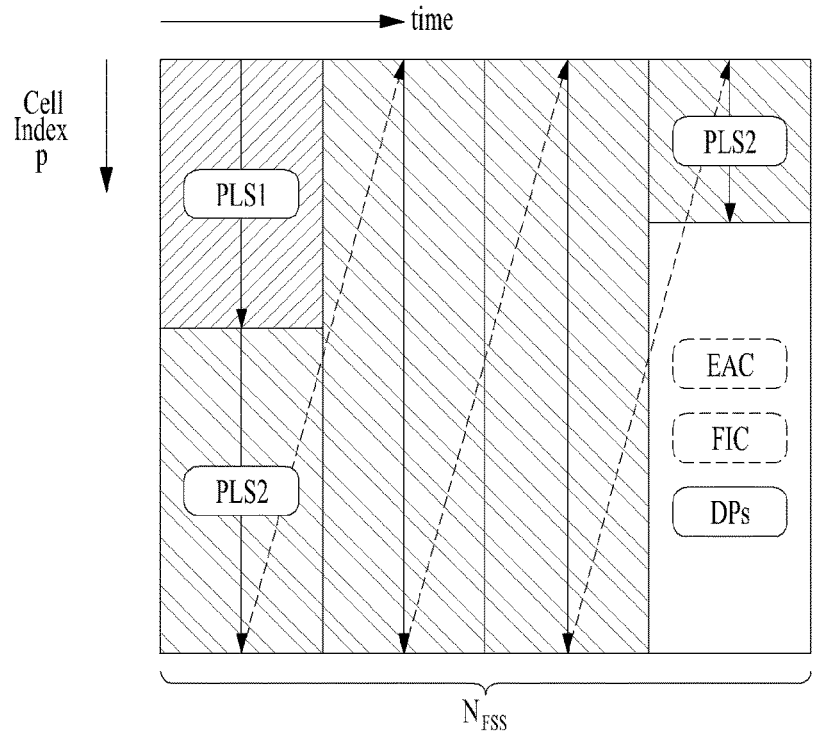
[Fig. 18]
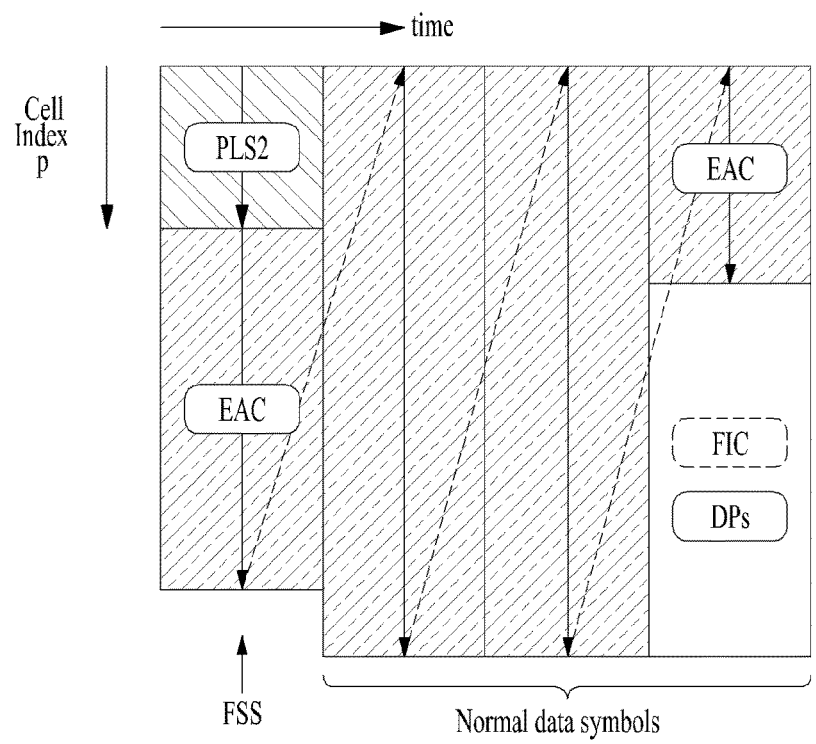

[Fig. 19]
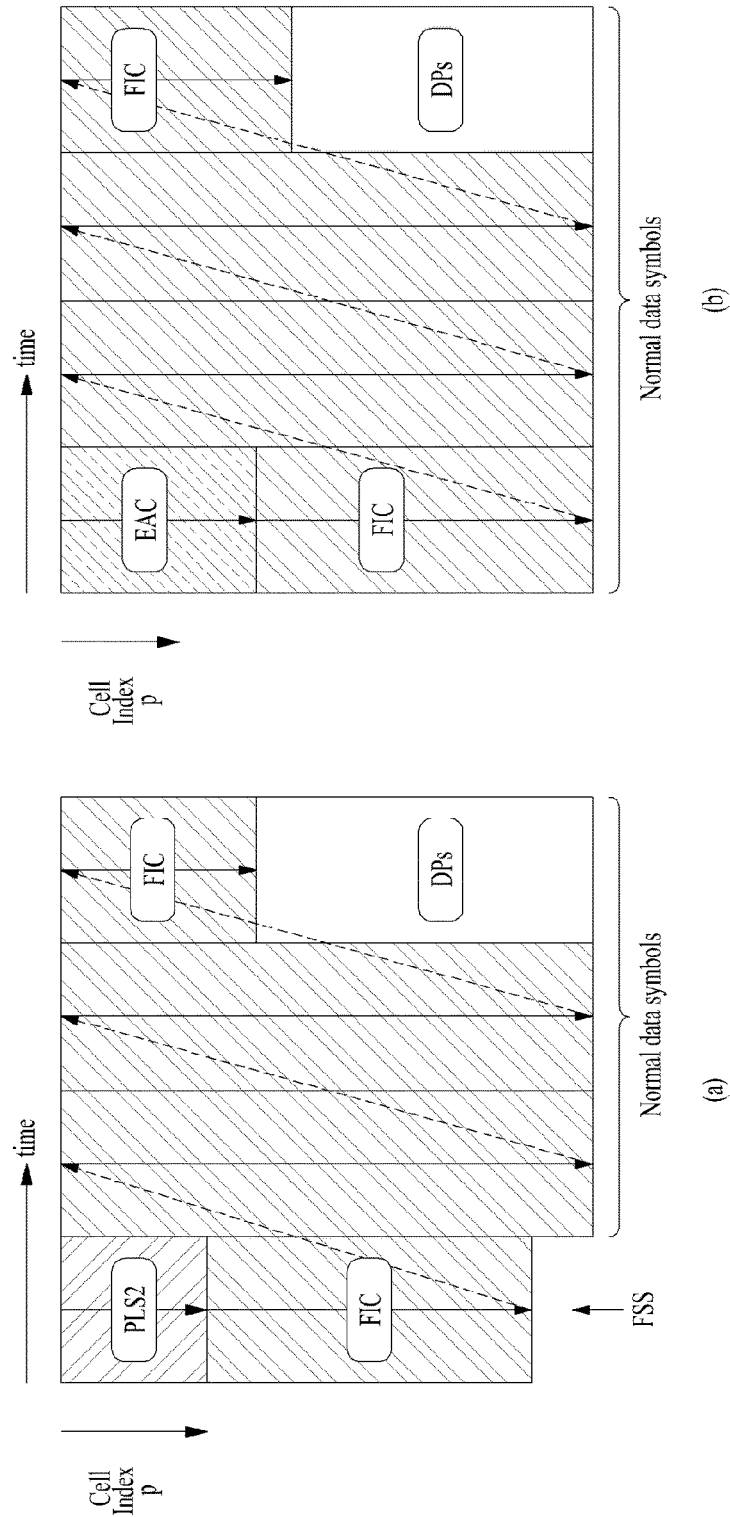

[Fig. 20]
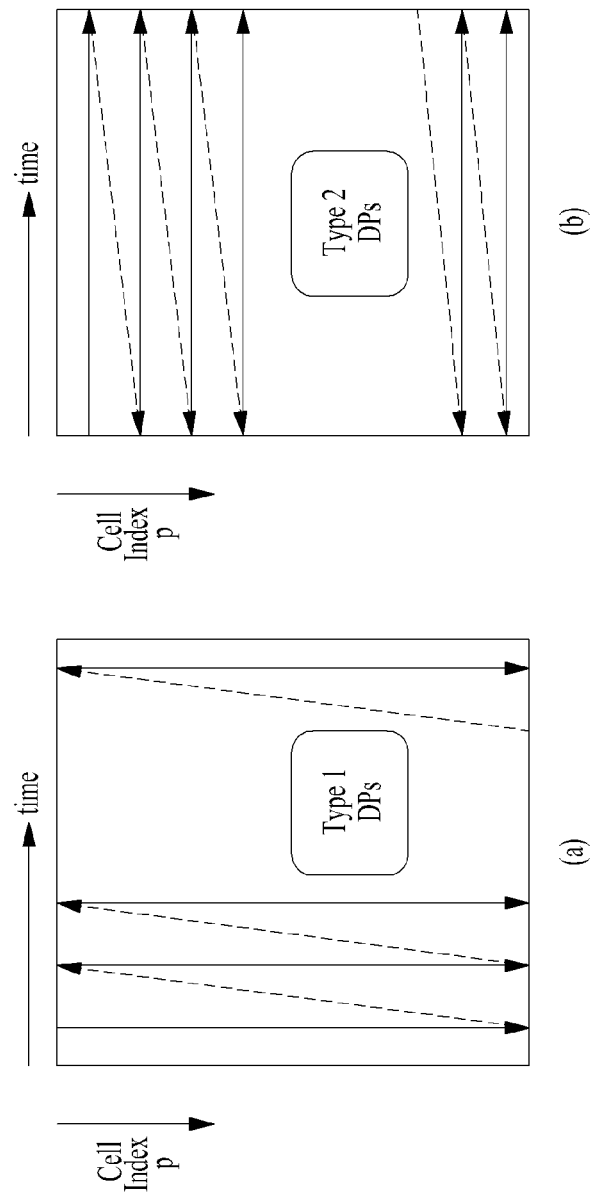

[Fig. 21]
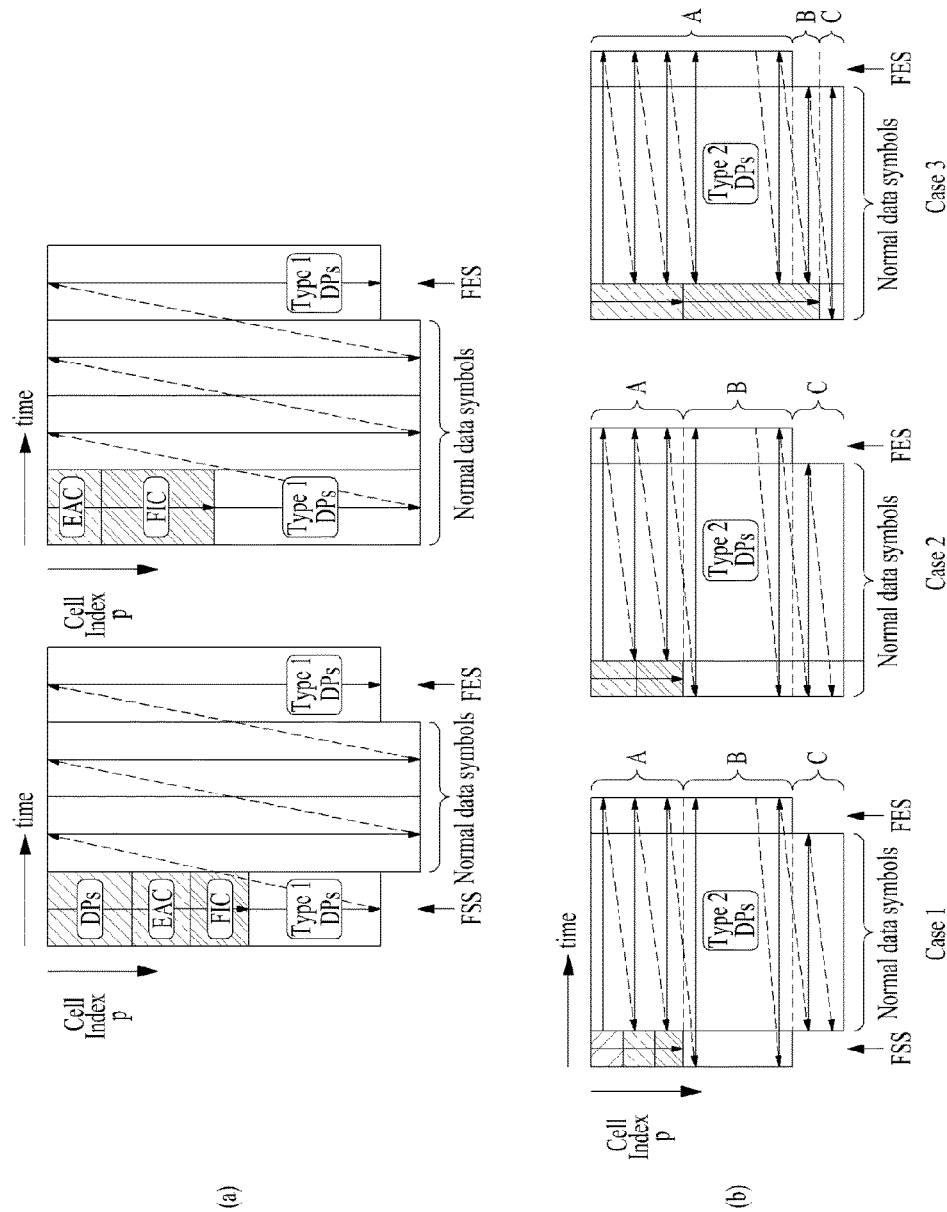
[Fig. 22]
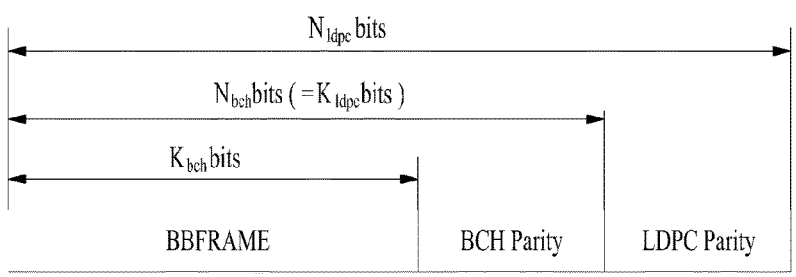

[Fig. 23]
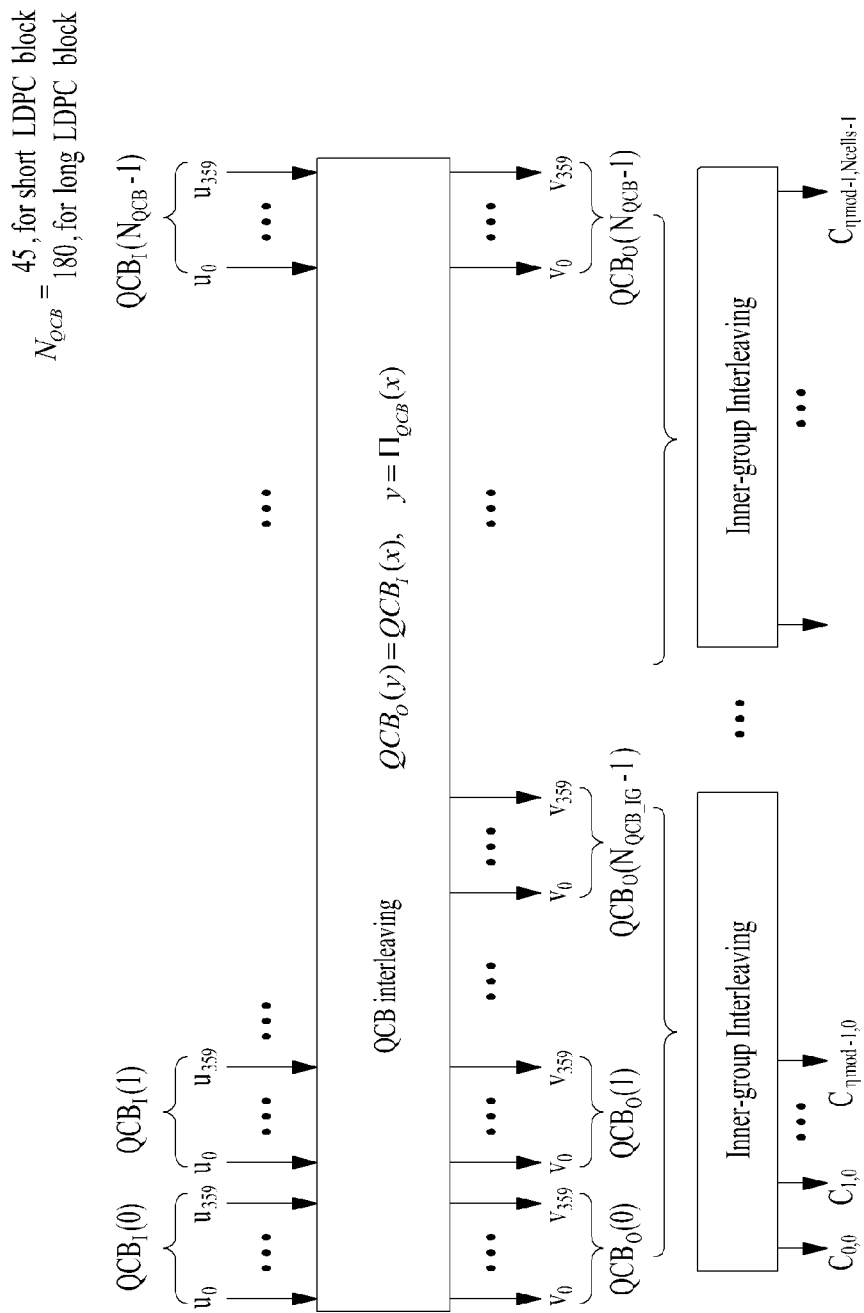

[Fig. 24]
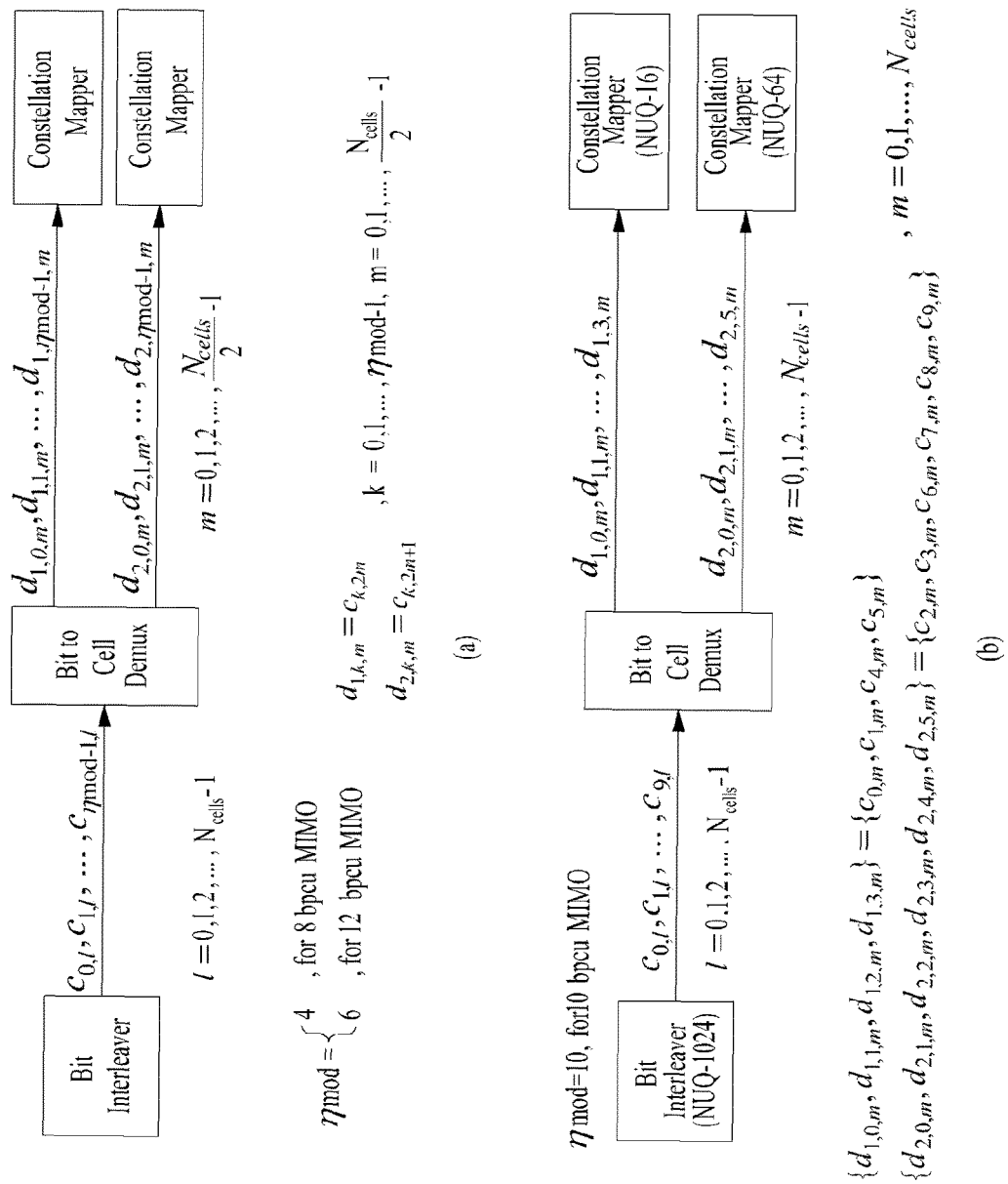

[Fig. 25]
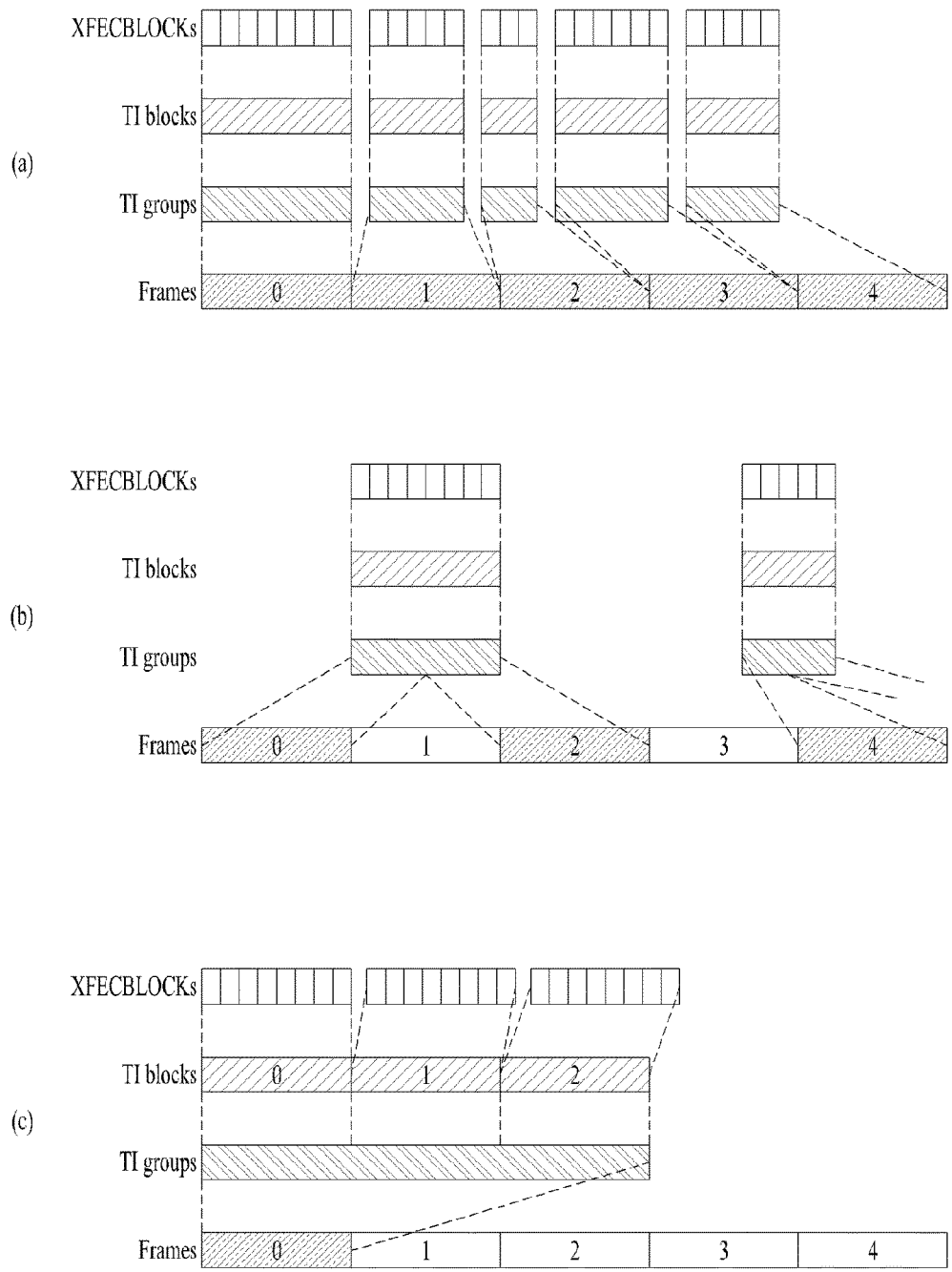

[Fig. 26]
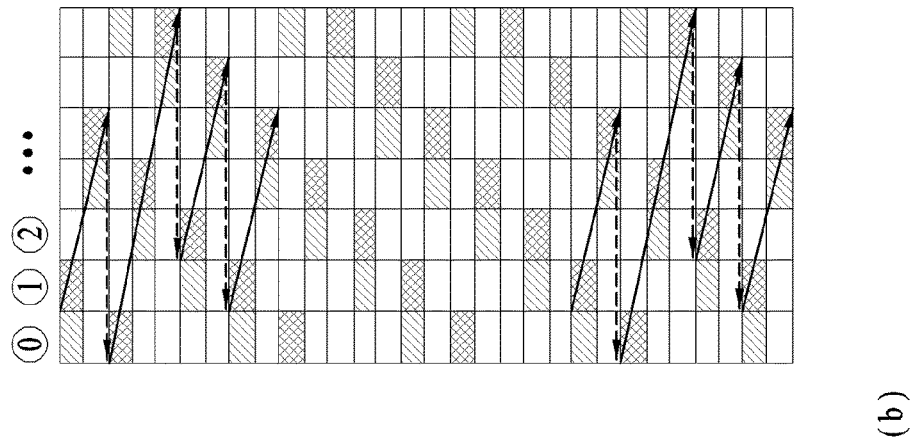
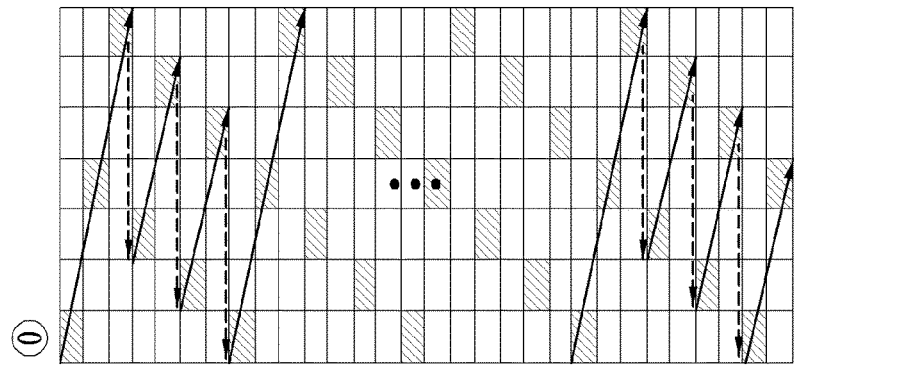
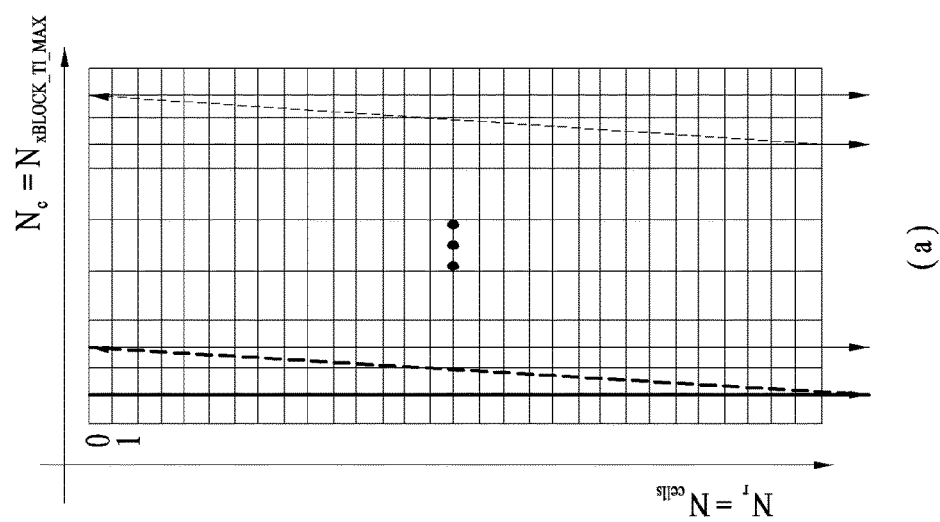

[Fig. 27]
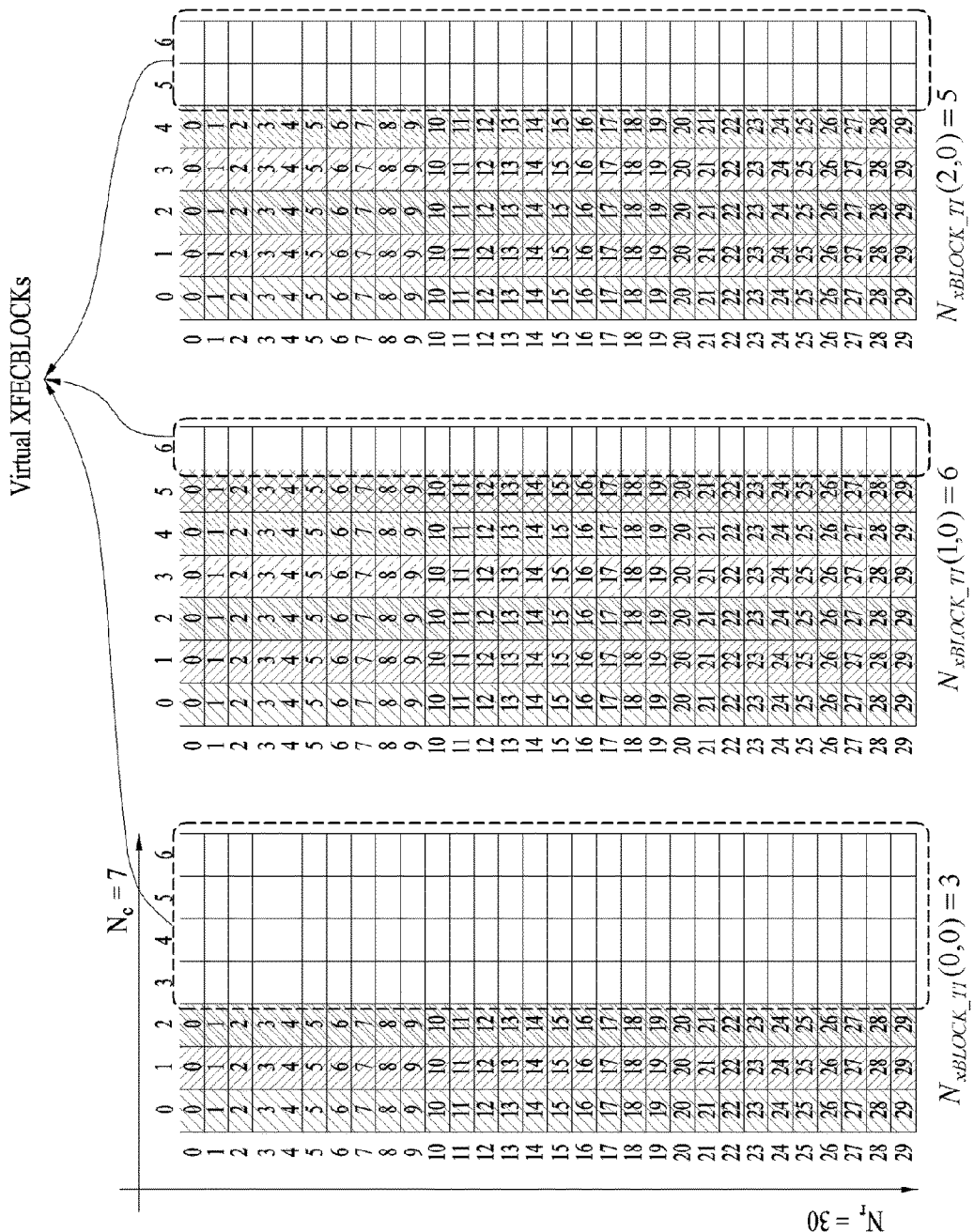

[Fig. 28]
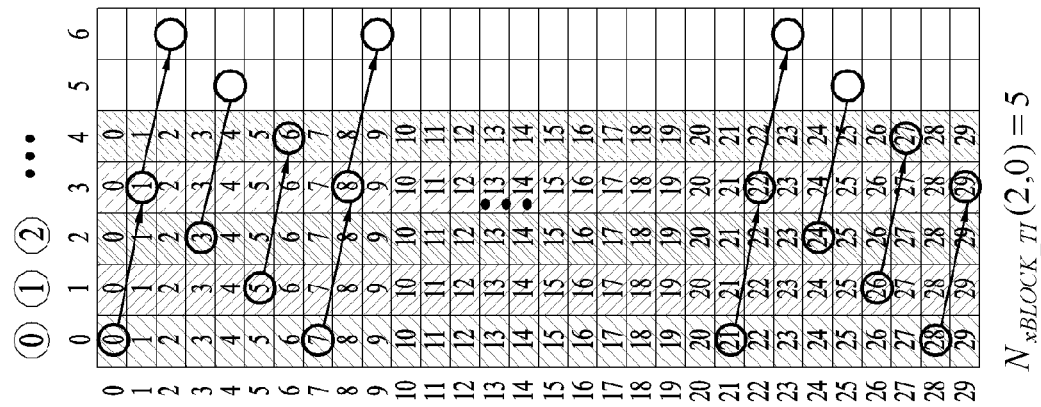
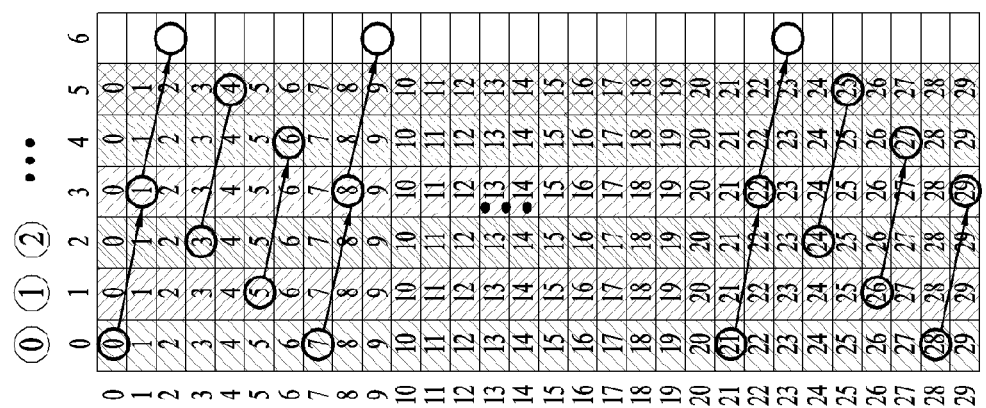
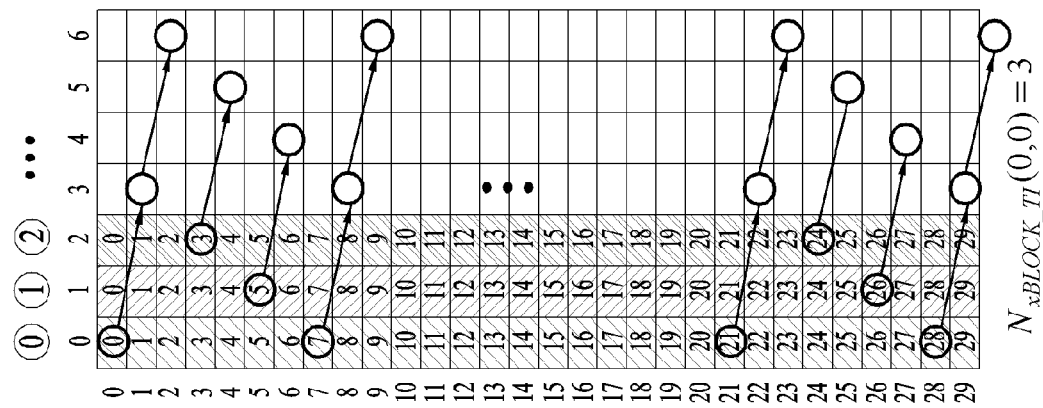

[Fig. 29]

[Fig. 30]
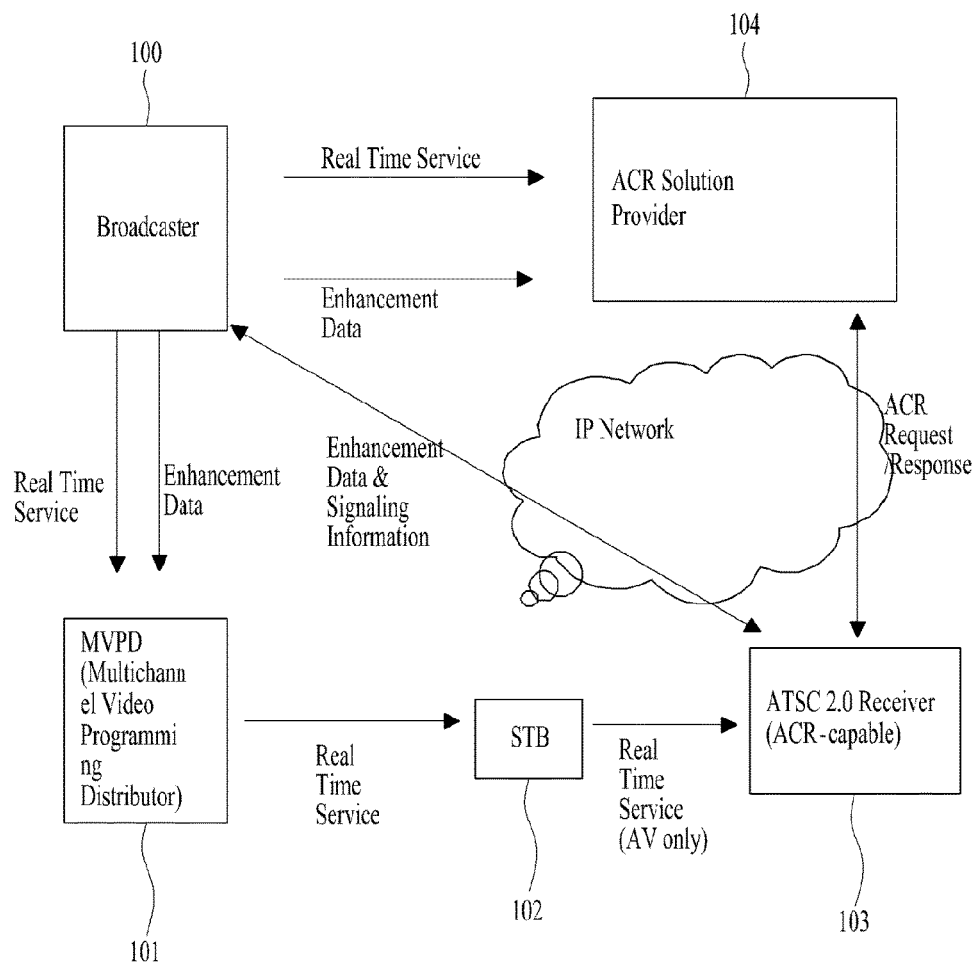
[Fig. 31]
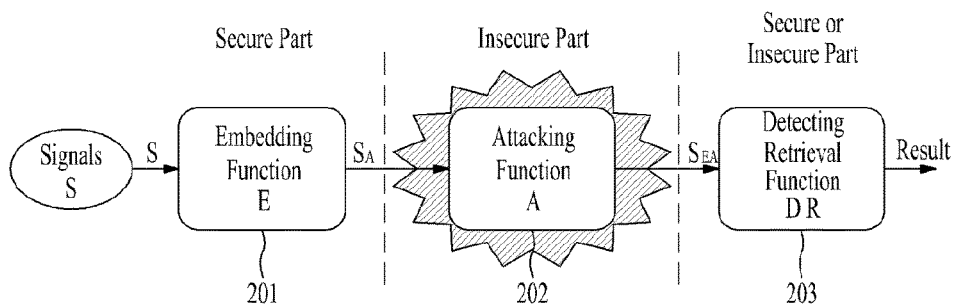

[Fig. 32]
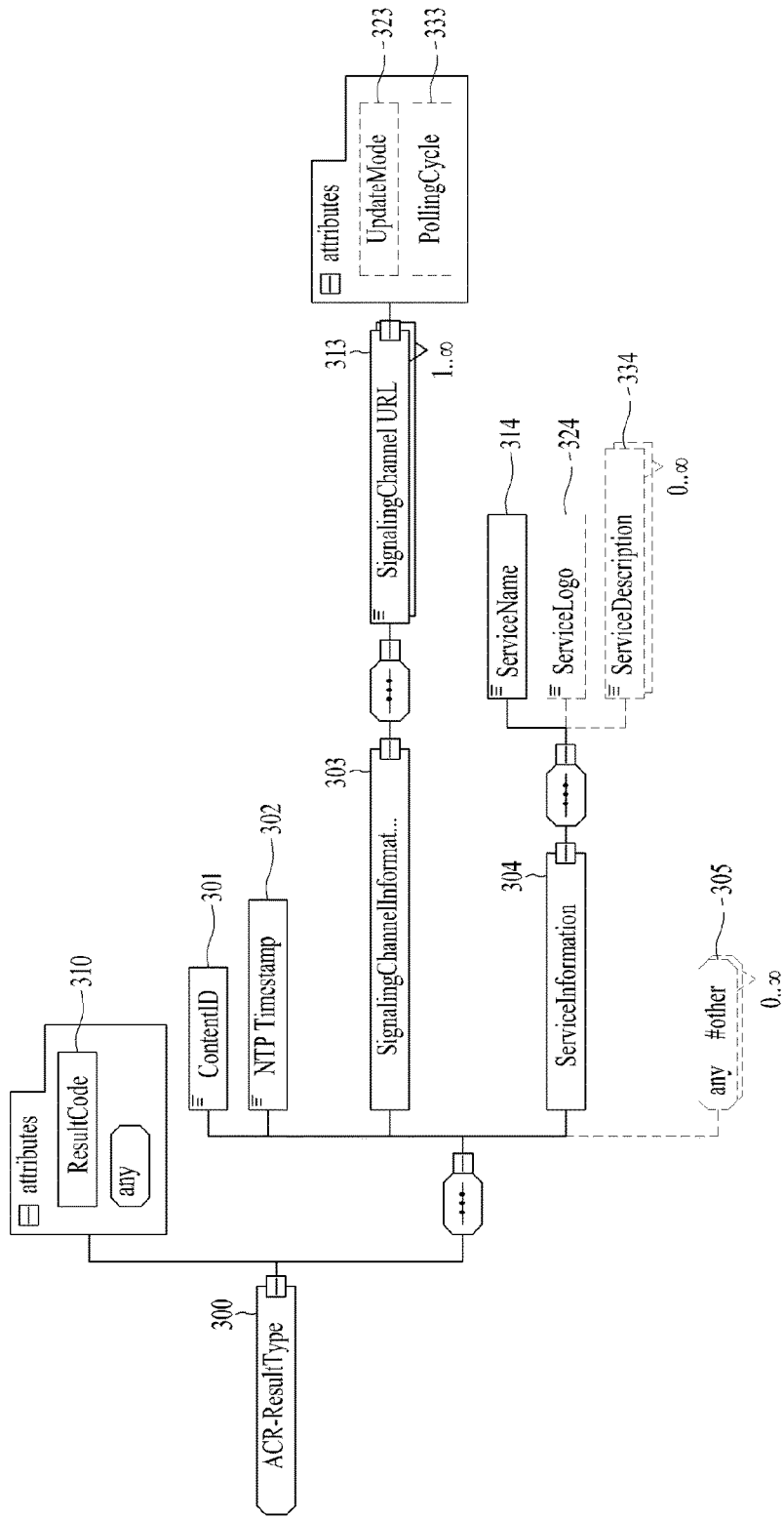

[Fig. 33]

| Syntax | No. of Bits | Format |
|---|---|---|
| ATSC_content_identifier() { | | |
|     TSID | 16 | uimsbf |
|     reserved | 2 | bslbf |
|     end_of_day | 5 | uimsbf |
|     unique_for | 9 | uimsbf |
|     content_id | var | |
| } | | |

[Fig. 34]
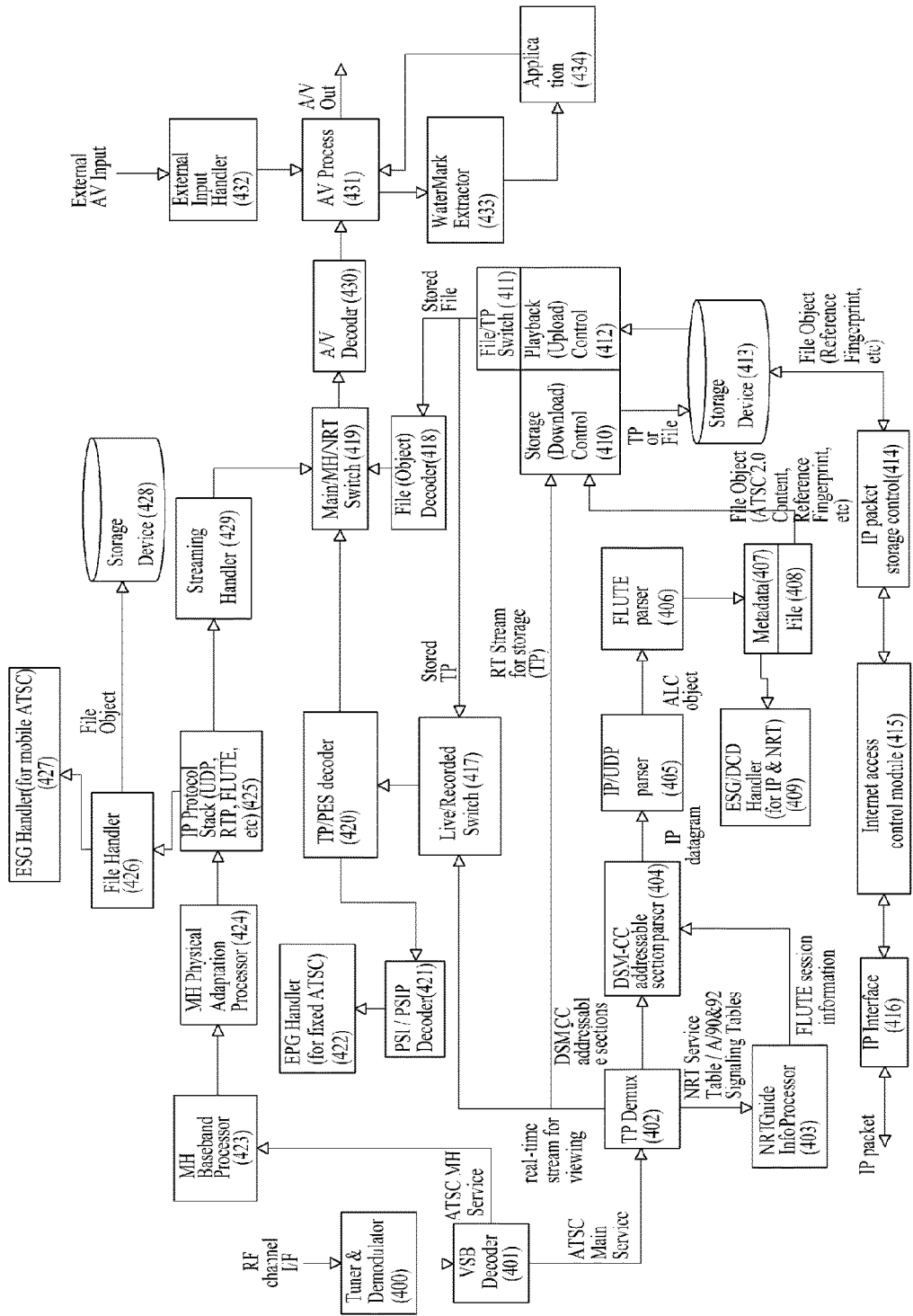

[Fig. 35]
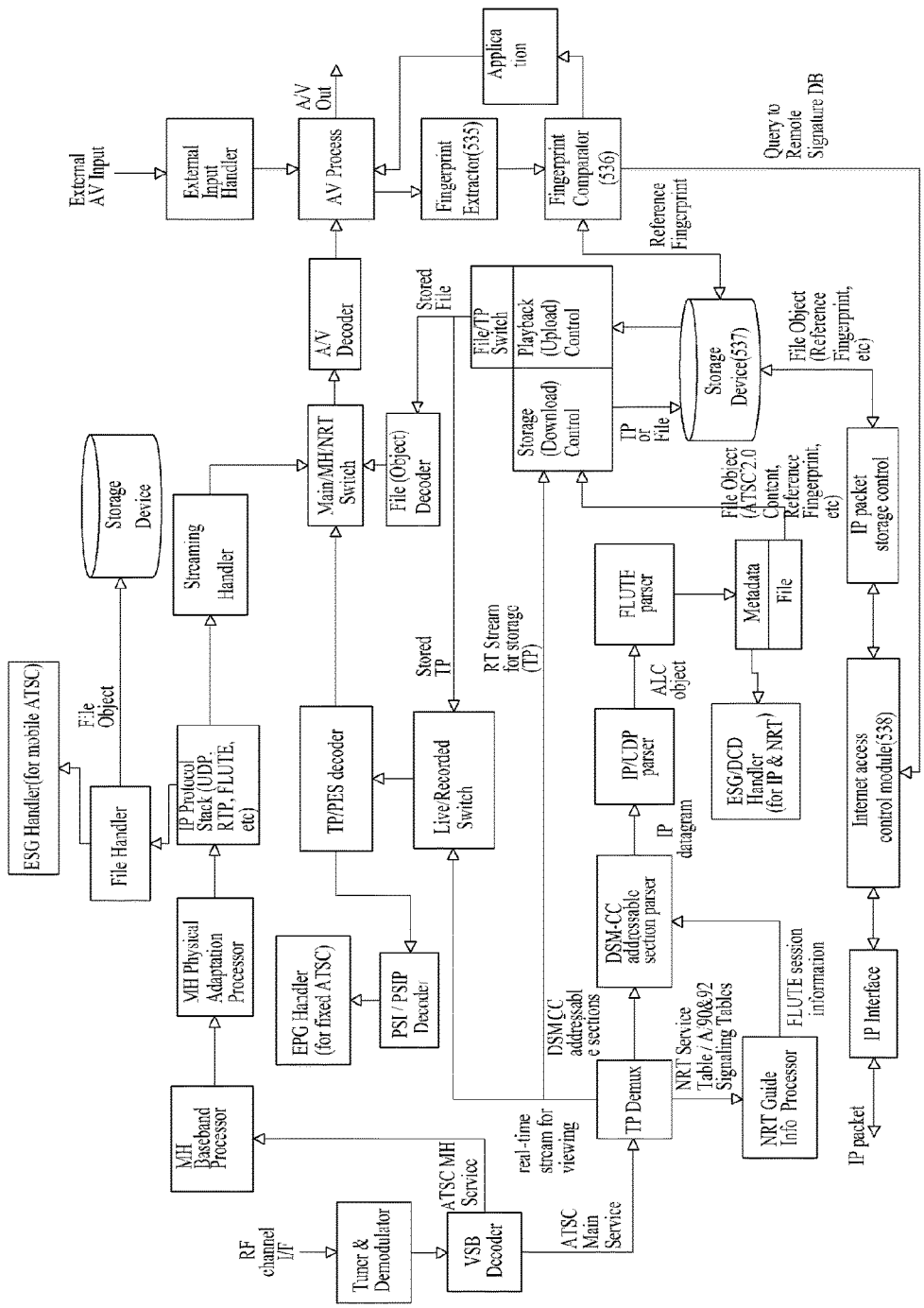

[Fig. 36]
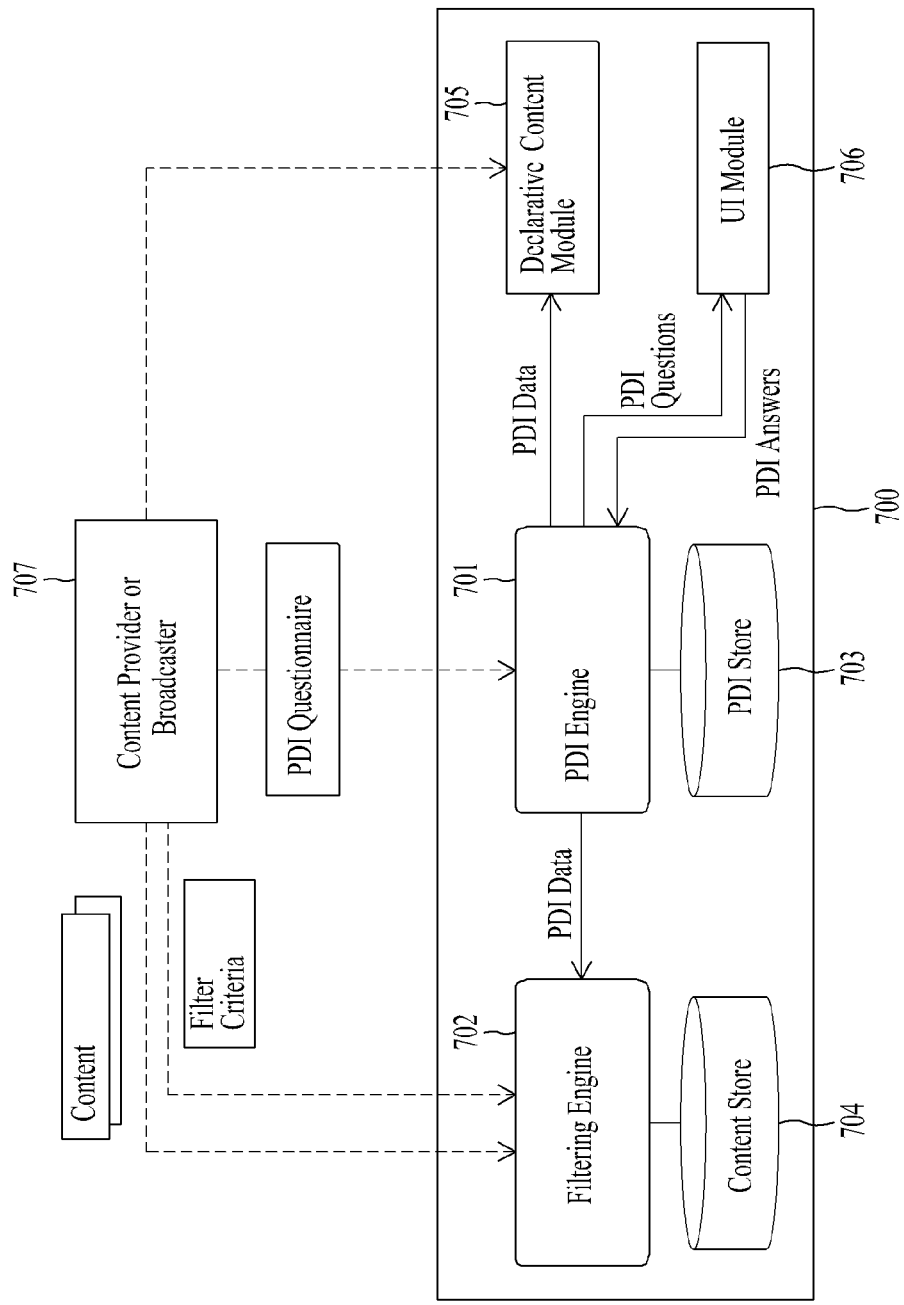

[Fig. 37]
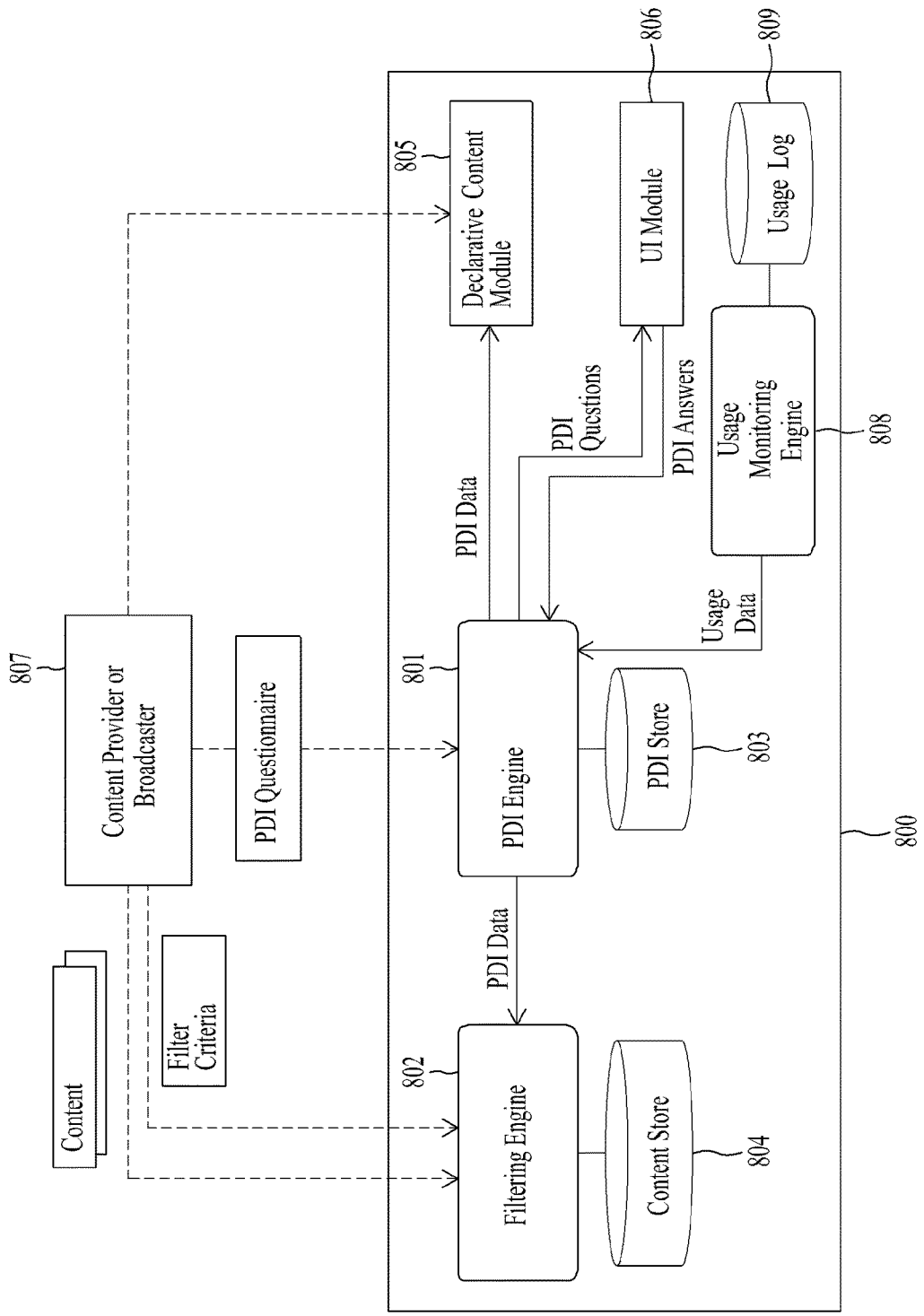

[Fig. 38]
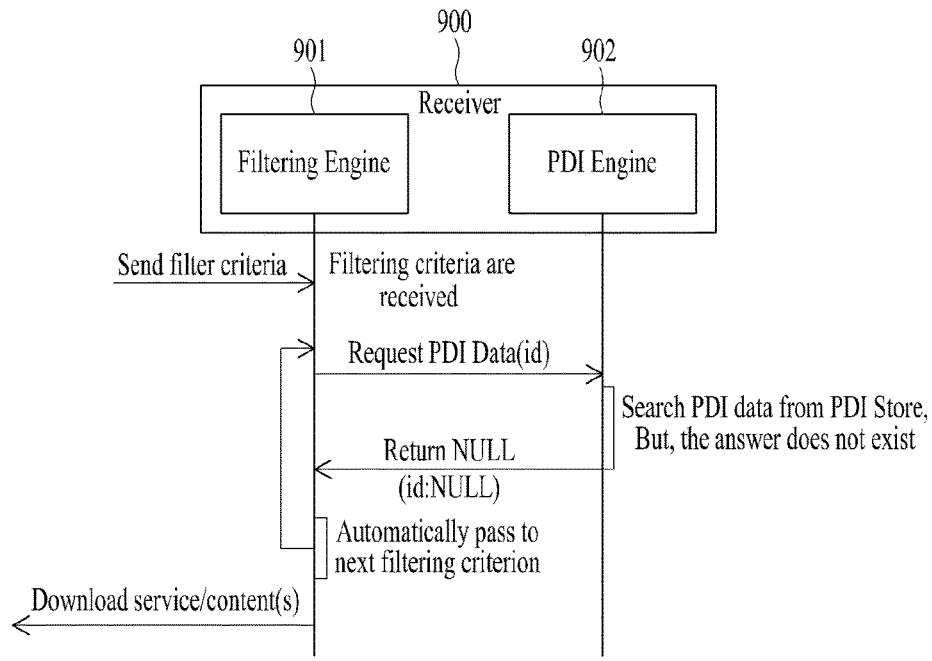
[Fig. 39]
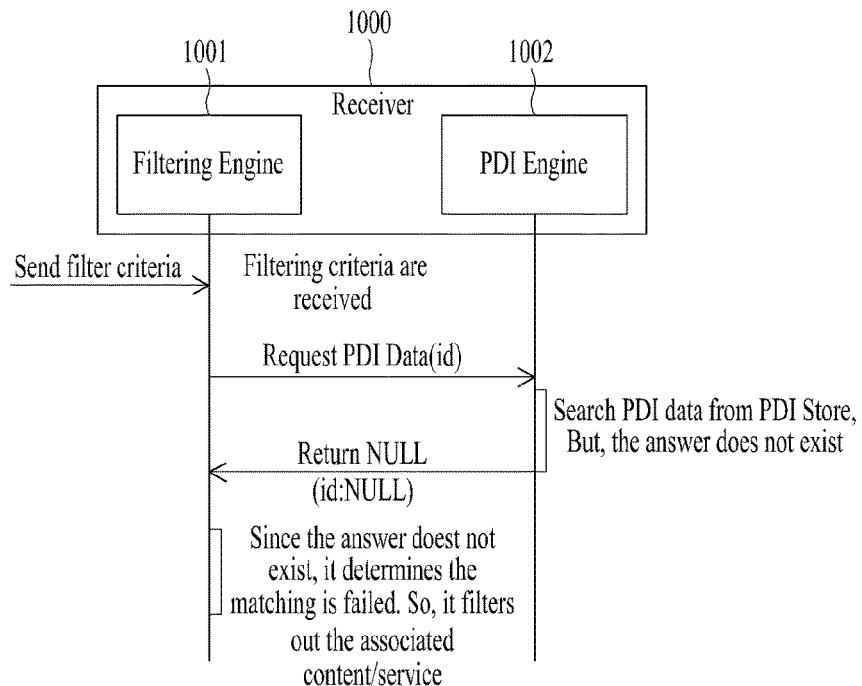

[Fig. 40]
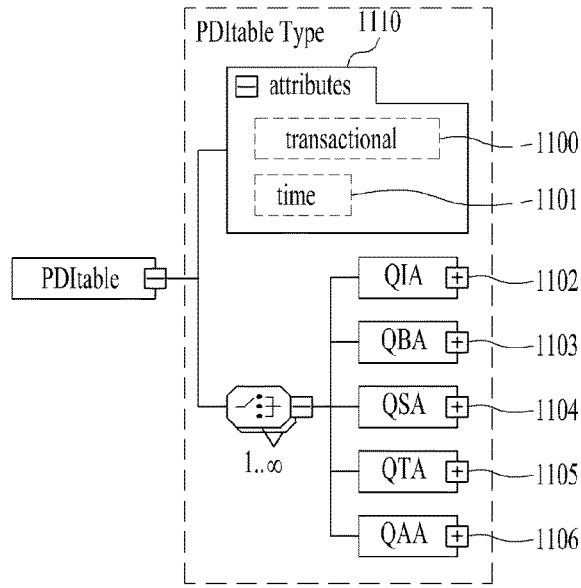
[Fig. 41]
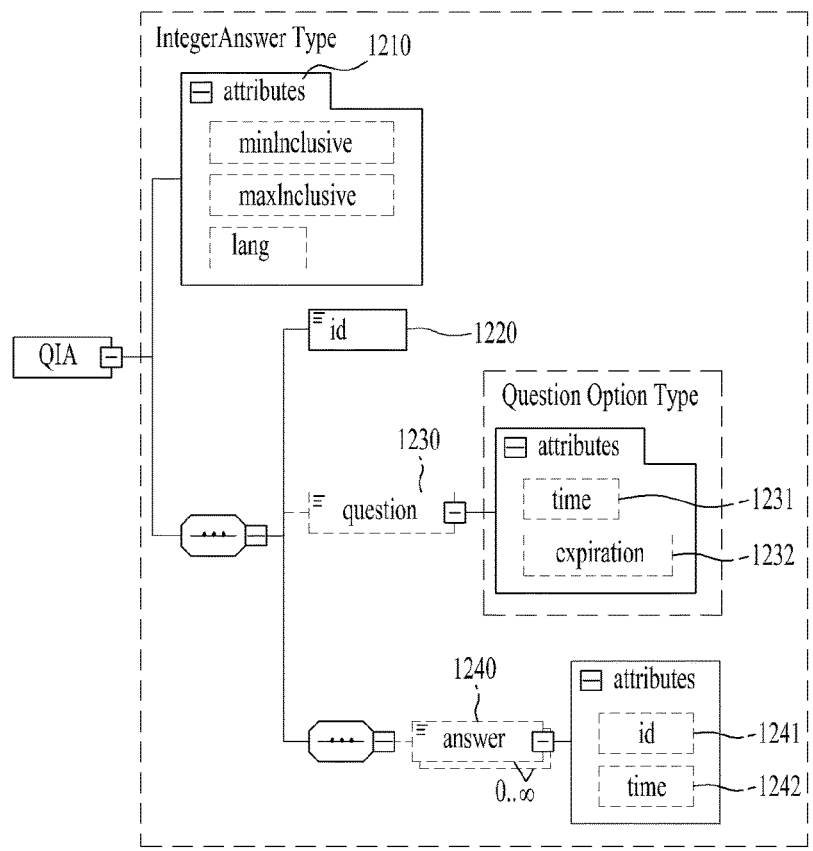

[Fig. 42]
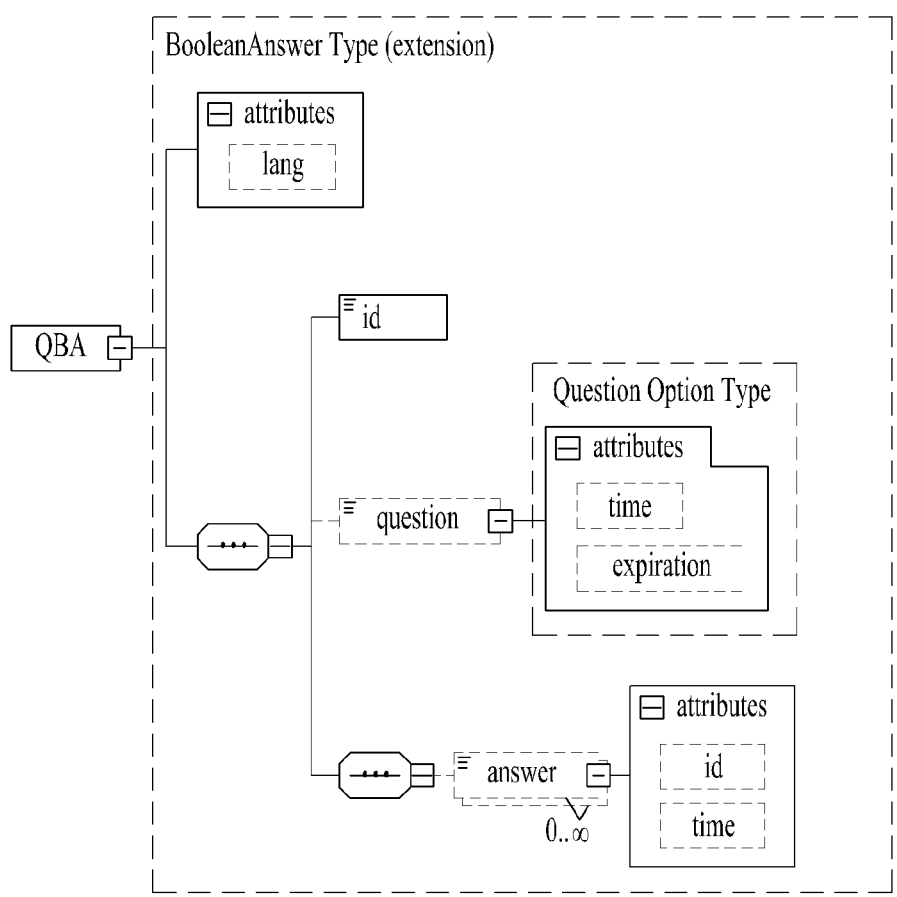

[Fig. 43]
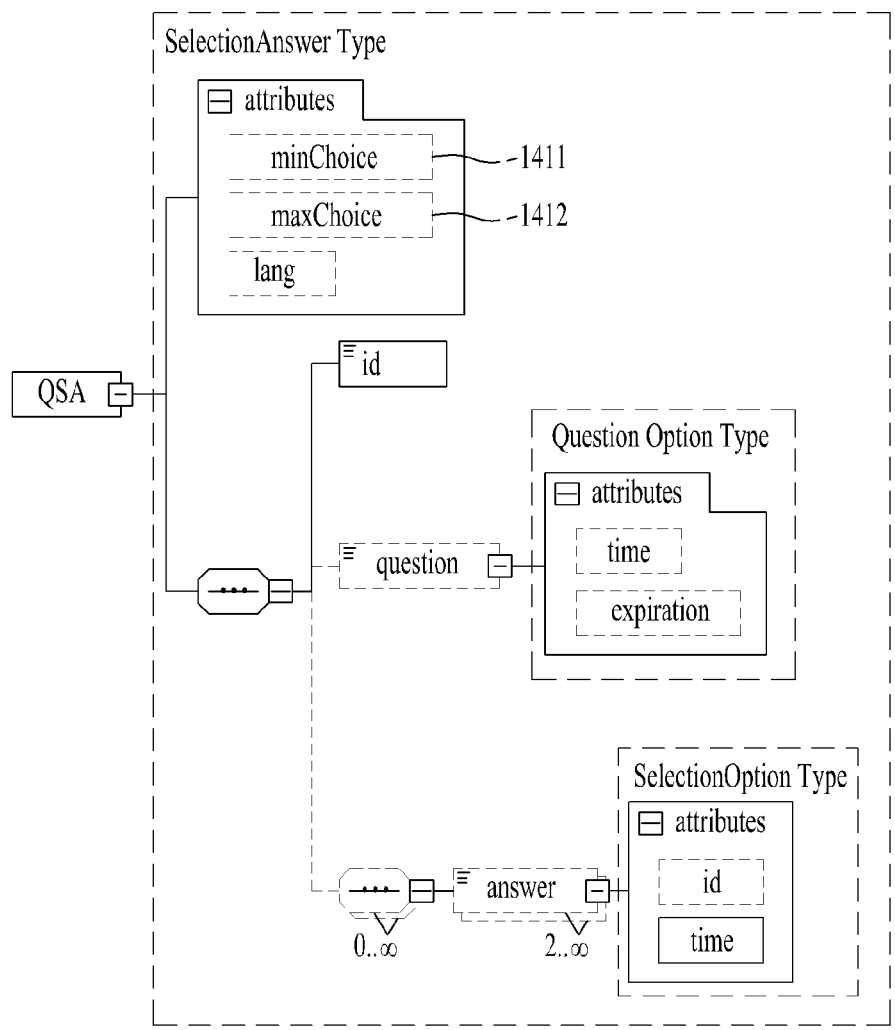

[Fig. 44]
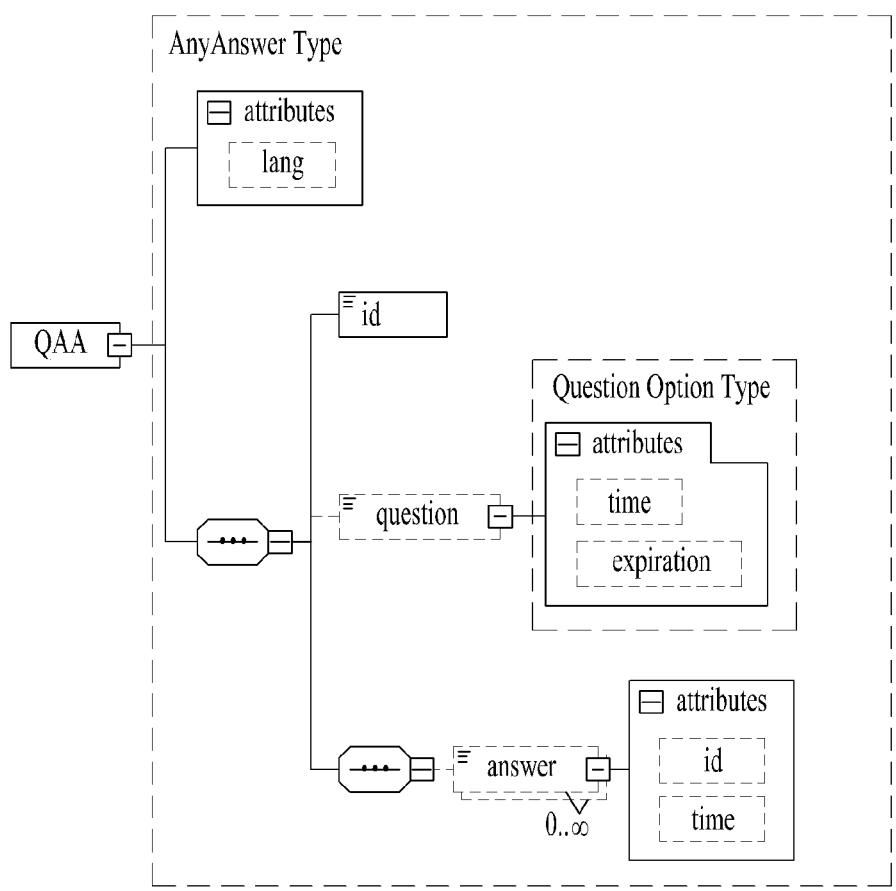

[Fig. 45]
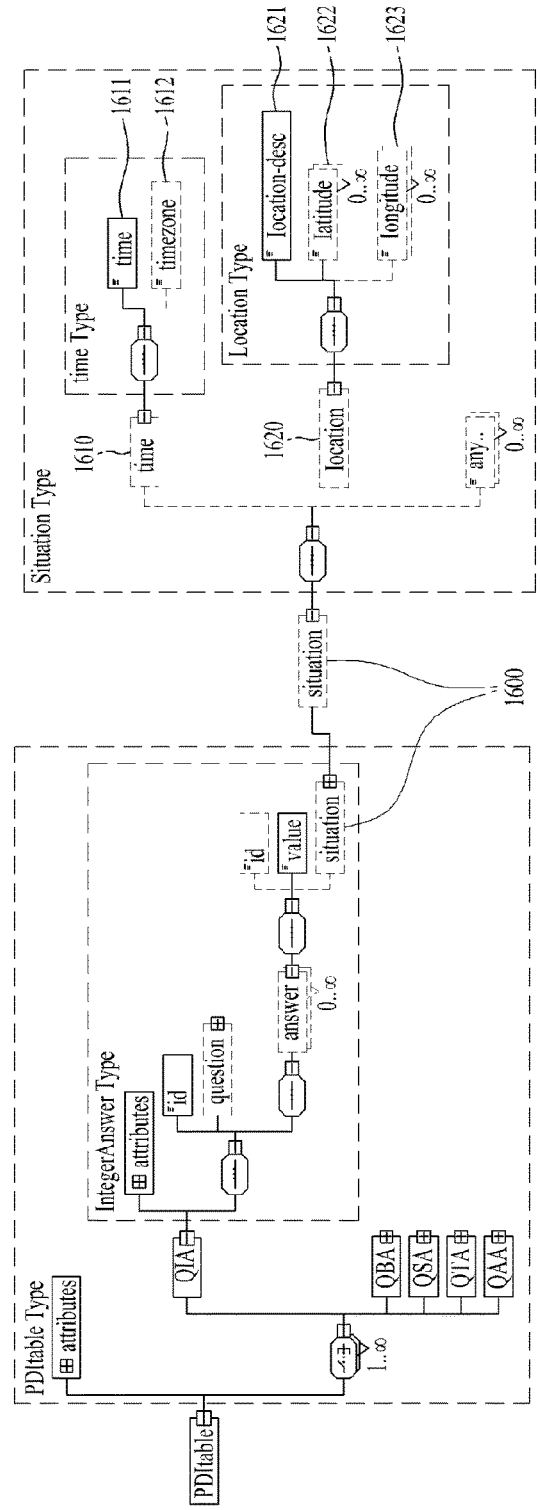

[Fig. 46]

| Element/Attribute | | | | | | Cardinality | XMLdatatype | Description |
|---|---|---|---|---|---|---|---|---|
| PDITable | | | | | | | | Table of PDI questions/answers |
| | @protocolVersion | | | | | 0..1 | hexBinary | Protocol version (major/minor) |
| | @pdiTableId | | | | | 1 | anyURI | Globally unique ID of PDITable |
| | @pdiTableVersion | | | | | 1 | unsignedByte | PDI Table version (data) |
| | @time | | | | | 1 | dateTime | Time table questions last updated |
| | <choice> | | | | | 1..N | | Choice among QIA, QBA, QSA, QTA, QAA |
| | | QIA | | | | 1 | | Question with integer answer |
| | | | @id | | | 1 | anyURI | Globally unique ID of question |
| | | | @loEnd | | | 0..1 | int | Lower bound for answers |
| | | | @hiEnd | | | 0..1 | int | Upper bound for answers |
| | | | @expire | | | 0..1 | dateTime | Expiration date/time for question |
| | | | Q | | | 0..N | string | Text of question |
| | | | | @lang | | 0..1 | xml:lang | Language of question text |
| | | | A | | | 0..N | int | Answer to question |
| | | | | @time | | 0..1 | dateTime | Date/time when answer provided |
| | | QBA | | | | 1 | | Question with Boolean answer |
| | | | @id | | | 1 | anyURI | Globally unique ID of question |
| | | | @expire | | | 0..1 | dateTime | Expiration date/time for question |
| | | | Q | | | 0..N | string | Text of question |
| | | | | @lang | | 0..1 | xml:lang | Language of question text |
| | | | A | | | 0..2 | boolean | Answer to question |
| | | | | @time | | 0..1 | dateTime | Date/time when answer provided |
| | | QSA | | | | 1 | | Question with selection answer |
| | | | @id | | | 1 | anyURI | Globally unique ID of question |
| | | | @minChoices | | | 0..1 | unsignedByte | Minimum allowed number of selections |
| | | | @maxChoices | | | 0..1 | unsignedByte | Maximum allowed number of selections |
| | | | @expire | | | 0..1 | dateTime | Expiration date/time for question |
| | | | Q | | | 0..N | string | Text of question |
| | | | | @lang | | 0..1 | xml:lang | Language of question/Selection elements |
| | | | | Selection | | 2..N | string | Possible selection |
| | | | | | @id | 1 | unsignedByte | Identifier of selection, scoped by question |
| | | | A | | | 0..N | unsignedByte | Identifier of selected answer |
| | | | | @time | | 0..1 | dateTime | Date/time when answer provided |
| | | QTA | | | | 1 | | Question with text answer |
| | | | @id | | | 1 | anyURI | Globally unique ID of question |
| | | | @expire | | | 0..1 | dateTime | Expiration date/time for question |
| | | | Q | | | 0..N | string | Text of question |
| | | | | @lang | | 0..1 | xml:lang | Language of question |
| | | | A | | | 0..N | String | Text of answer |
| | | | | @lang | | 0..1 | xml:lang | Language of answer |
| | | | | @time | | 0..1 | dateTime | Date/time when answer provided |
| | | QAA | | | | 1 | | "Answer" with no question |
| | | | @id | | | 1 | anyURI | Globally unique ID of question |
| | | | @expire | | | 0..1 | dateTime | Expiration date/time for question |
| | | | A | | | ??? | ??? | "Answer" |
| | | | | @time | | 0..1 | dateTime | Date/time when answer provided |

[Fig. 47]

| Element/Attribute | | | | Cardinality | XML datatype | Description |
|---|---|---|---|---|---|---|
| PDITable | | | | | | Table of PDI questions/answers |
| @protocolVersion | | | | 0..1 | hexBinary | Protocol version (major/minor) |
| @pdiTableId | | | | 1 | anyURI | Globally unique ID of PDITable |
| @pdiTableVersion | | | | 1 | unsignedByte | PDITable version (data) |
| @time | | | | 1 | dateTime | Time table questions last updated |
| <choice> | | | | 1..N | | Choice among QIA,QBA,QSA,QTA,QAA |
| | QIA | | | 1 | | Question with integer answer |
| | | @id | | 1 | anyURI | Globally unique ID of question |
| | | @loEnd | | 0..1 | int | Lower bound for answers |
| | | @hiEnd | | 0..1 | int | Upper bound for answers |
| | | @expire | | 0..1 | dateTime | Expiration date/time for question |
| | | @xactionSetId | | 0..1 | unsignedShort | ID for a transactional set of questions |
| | | Q | | 0..N | | |
| | | | @text | 1 | string | Text of question |
| | | | @lang | 0..1 | xml:lang | Language of question text |
| | | A | | 0..N | int | Answer to question |
| | | | @time | 0..1 | dateTime | Date/time when answer provided |
| | QBA | | | 1 | | Question with Boolean answer |
| | | @id | | 1 | anyURI | Globally unique ID of question |
| | | @expire | | 0..1 | dateTime | Expiration date/time for question |
| | | @xactionSetId | | 0..1 | unsignedShort | ID for a transactional set of questions |
| | | Q | | 0..N | | |
| | | | @text | 1 | string | Text of question |
| | | | @lang | 0..1 | xml:lang | Language of question text |
| | | A | | 0..2 | boolean | Answer to question |
| | | | @time | 0..1 | dateTime | Date/time when answer provided |
| | QSA | | | 1 | | Question with selection answer |
| | | @id | | 1 | anyURI | Globally unique ID of question |
| | | @minChoices | | 0..1 | unsignedByte | Minimum allowed number of selections |
| | | @maxChoices | | 0..1 | unsignedByte | Maximum allowed number of selections |
| | | @expire | | 0..1 | dateTime | Expiration date/time for question |
| | | @xactionSetId | | 0..1 | unsignedShort | ID for a transactional set of questions |
| | | Q | | 0..N | | |
| | | | @text | 1 | string | Text of question |
| | | | @lang | 0..1 | xml:lang | Language of question/Selection element |
| | | | Selection | 2..N | string | Possible selection |
| | | | @id | 1 | unsignedByte | Identifier of selection scoped by question |
| | | A | | 0..N | unsignedByte | Identifier of selected answer |
| | | | @time | 0..1 | dateTime | Date/time when answer provided |
| | QTA | | | 1 | | Question with text answer |
| | | @id | | 1 | anyURI | Globally unique ID of question |
| | | @expire | | 0..1 | dateTime | Expiration date/time for question |
| | | @xactionSetId | | 0..1 | unsignedShort | ID for a transactional set of questions |
| | | Q | | 0..N | | |
| | | | @text | 1 | string | Text of question |
| | | | @lang | 0..1 | xml:lang | Language of question |
| | | A | | 0..N | String | Text of answer |
| | | | @lang | 0..1 | xml:lang | Language of answer |
| | | | @time | 0..1 | dateTime | Date/time when answer provided |
| | QAA | | | 1 | | "Answer" with no question |
| | | @id | | 1 | anyURI | Globally unique ID of question |
| | | @expire | | 0..1 | dateTime | Expiration date/time for question |
| | | @xactionSetId | | 0..1 | unsignedShort | ID for a transactional set of questions |
| | | A | | ??? | ??? | "Answer" |
| | | | @time | 0..1 | dateTime | Date/time when answer provided |

[Fig. 48]
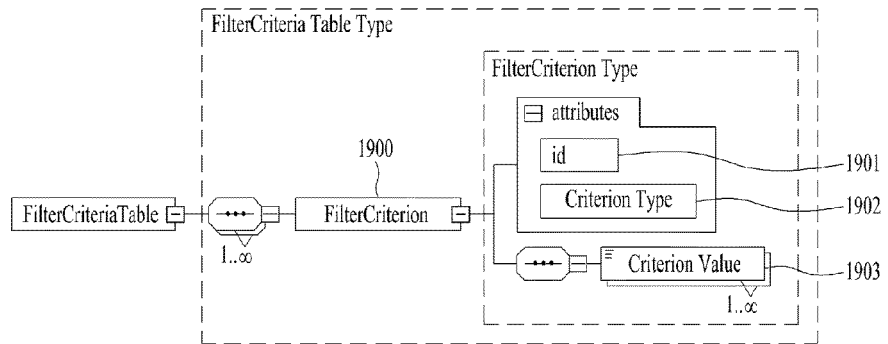
[Fig. 49]
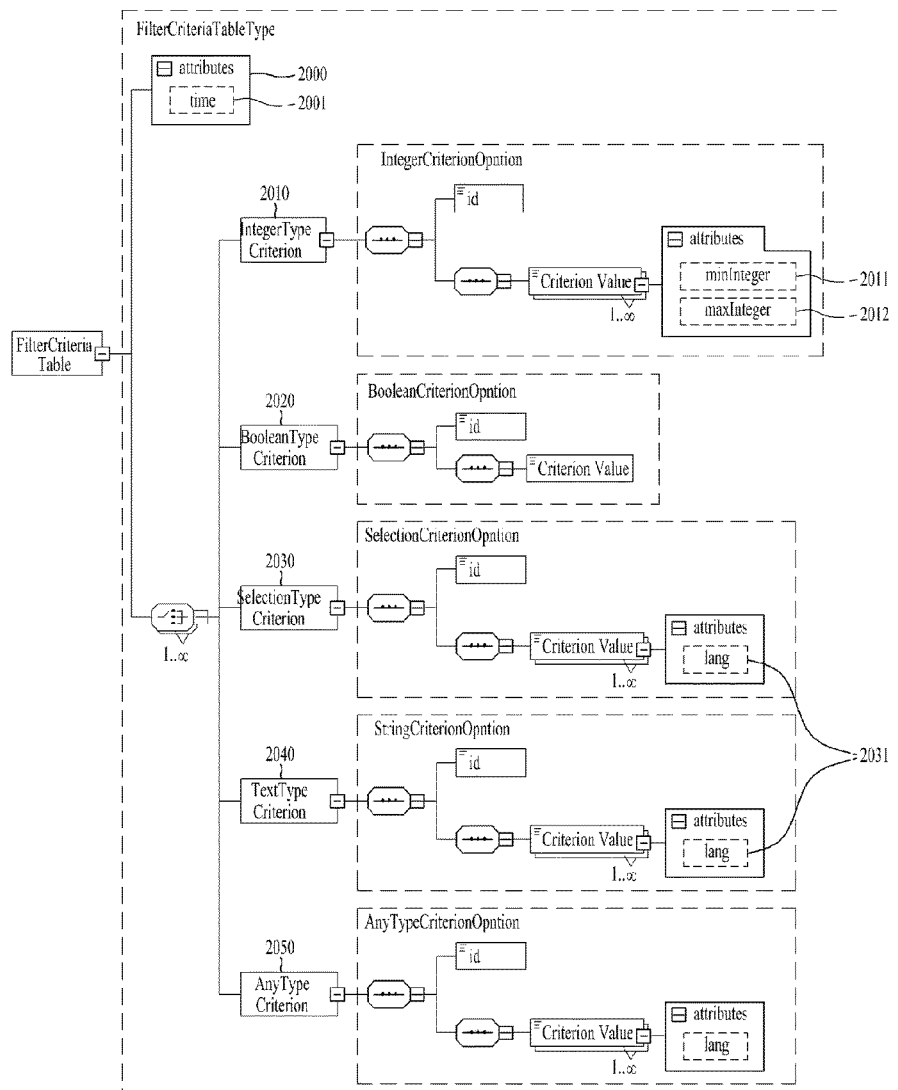

[Fig. 50]

| Element/Attribute | | | Cardinality | XML datatype | Description |
|---|---|---|---|---|---|
| FilteringCriteria | | | | | Table of Filtering Criteria |
| | <choice> | | 1..N | | Filter criteria including the set of filter criterion |
| | QIACriterion | | 1 | | Filter criterion with integer value |
| | | @id | 1 | anyURI | Globally unique ID of question for filtering |
| | | CriterionValue | 1..N | int | Integer value or lower end of range |
| | | @extent | 0..1 | positiveInt | Number of integers in range (if > 1) |
| | QBACriterion | | 1 | | Filter criterion with Boolean value |
| | | @id | 1 | anyURI | Globally unique ID of question for filtering |
| | | CriterionValue | 1 | boolean | Boolean value |
| | QSACriterion | | 1 | | Filter criterion with selection value |
| | | @id | 1 | anyURI | Globally unique ID of question for filtering |
| | | CriterionValue | 1..N | unsignedByte | Identifier of selection |
| | QTACriterion | | 1 | | Filter criterion with text valu |
| | | @id | 1 | anyURI | Globally unique ID of question for filtering |
| | | CriterionValue | 1..N | string | Text string |
| | | @lang | 0..1 | xml:lang | Language of this criterion element |
| | QAACriterion | | 1 | | Filter criterion for answer with no question |
| | | @id | 1 | anyURI | Globally unique ID of question for filtering |
| | | CriterionValue | 1..N | ??? | Value |

[Fig. 51]

| Element/Attribute(with @) | | | | Cardinality | XML datatype | Description |
|---|---|---|---|---|---|---|
| FilterCriteriaSet | | | | 1..N | | Filter criteria including the set of filter criterion |
| | IntegerTypeCriterion | | | 0..N | | Filter criterion with integer value |
| | | @id | | 1 | anyURI | Globally unique ID of question for filtering |
| | | Criterion | | 1..N | int | Value or lower end of range |
| | | | @maxInt | 0..1 | int | Lower bound for filter criterion |
| | | | @minInt | 0..1 | int | Upper bound for filter criterion |
| | BooleanTypeCriterion | | | 0..N | | Filter criterion with boolean value |
| | | @id | | 1 | anyURI | Globally unique ID of question for filtering |
| | | Criterion | | 1 | boolean | Value |
| | SelectionTypeCriterion | | | 0..N | | Filter criterion with selection value |
| | | @id | | 1 | anyURI | Globally unique ID of question for filtering |
| | | Criterion | | 1..N | unsignedByte | Identifier of selection criterion, scoped by question |
| | | | @lang | 0..1 | xml:lang | Language of this criterion element |
| | TextTypeCriterion | | | 0..N | | Filter criterion with text value |
| | | @id | | 1 | anyURI | Globally unique ID of question for filtering |
| | | Criterion | | 1..N | string | Value |
| | | | @lang | 0..1 | xml:lang | Language of this criterion element |
| | AnyTypeCriterion | | | 0..N | | Filter criterion with any type value, except integer, Boolean, selection, text type |
| | | @id | | 1 | anyURI | Globally unique ID of question for filtering |
| | | Criterion | | 1..N | base64Binary | Value |

[Fig. 52]
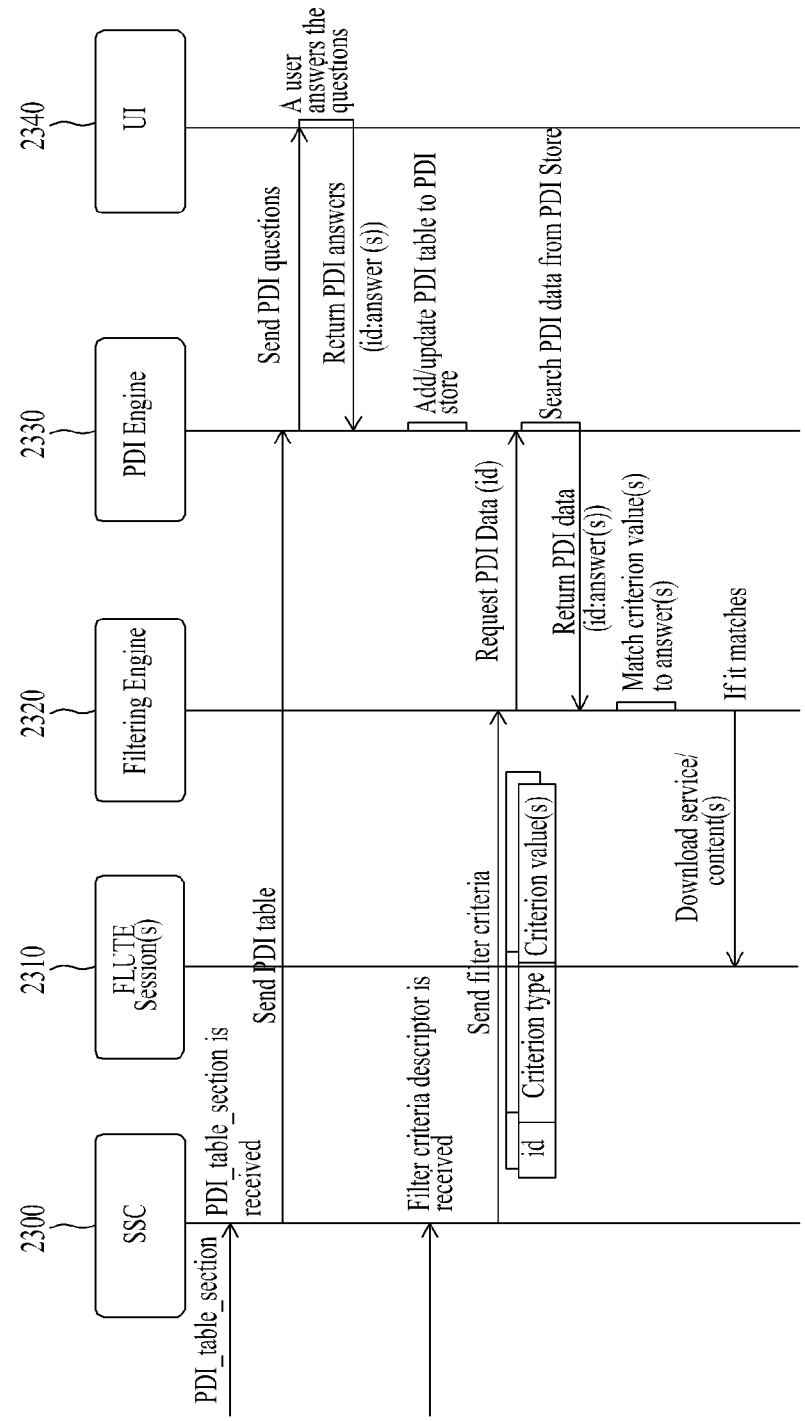

[Fig. 53]

| Syntax | No. Bits | Format |
|---|---|---|
| pdiq_section () { | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         sequence_number | 8 | uimsbf |
|     } | | |
|     reserved | 2 | '11' |
|     PDIQ_data_version | 5 | uimsbf |
|     current_next_indicator | 1 | '1' |
|     section_number | 8 | uimsbf |
|     last_section_number | 8 | uimsbf |
|     service_id | 16 | uimsbf |
|     pdiq_bytes() | var | bslbf |
| } | | |

[Fig. 54]

| Syntax | No. of Bits | Format |
|---|---|---|
| PDI_table_section () { | | |
|     table_id | 8 | 0xTBD |
|     section_syntax_indicator | 1 | '0' |
|     private_indicator | 1 | '1' |
|     reserved | 2 | '11' |
|     section_length | 8 | uimsbf |
|     table_id_extension { | | |
|         PDI_protocol_version | 8 | uimsbf |
|         reserved | 8 | '11111111' |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_questions | 8 | uimsbf |
|     for (i=0; i<num_questions; i++) { | | |
|         question_id_length | 8 | uimsbf |
|         question_id_value | var | |
|         question_text_length | 8 | uimsbf |
|         question_text | var | |
|         answer_type_code | 3 | uimsbf |
|         num_answers | 5 | uimsbf |
|         for (j=0; j<num_answers;j++) { | | |
|             answer_value_length | 8 | uimsbf |
|             answer_value | var | |
|         } | | |
|     } | | |
| } | | |

[Fig. 55]

| Syntax | No. of Bits | Format |
|---|---|---|
| PDI_table_section  () { | | |
|     table_id | 8 | 0xTBD |
|     section_syntax_indicator | 1 | '0' |
|     private_indicator | 1 | '1' |
|     reserved | 2 | '11' |
|     section_length | 8 | uimsbf |
|     table_id_extension { | | |
|         PDI_protocol_version | 8 | uimsbf |
|         answer_type_code | 3 | uimsbf |
|         reserved | 5 | '11111' |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_questions | 8 | uimsbf |
|     for (i=0; i<num_questions; i++) { | | |
|         question_id_length | 8 | uimsbf |
|         question_id_value | var | |
|         question_text_length | 8 | uimsbf |
|         question_text | var | |
|         num_answers | 8 | uimsbf |
|         for (j=0; j<num_answers;j++) { | | |
|             answer_value_length | 8 | uimsbf |
|             answer_value | var | |
|         } | | |
|     } | | |
| } | | |

[Fig. 56]

| Syntax | No. of Bits | Format |
|---|---|---|
| PDI_table_section () { | | |
|    table_id | 8 | 0xTBD |
|    section_syntax_indicator | 1 | '0' |
|    private_indicator | 1 | '1' |
|    reserved | 2 | '11' |
|    section_length | 8 | uimsbf |
|    table_id_extension { | | |
|      PDI_protocol_version | 8 | uimsbf |
|      sequence_number | 8 | uimsbf |
|    } | | |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    num_questions | 8 | uimsbf |
|    for (i=0; i<num_questions; i++) { | | |
|      question_id_length | 8 | uimsbf |
|      question_id_value | var | |
|      question_text_length | 8 | uimsbf |
|      question_text | var | |
|      answer_type_code | 3 | uimsbf |
|      num_answers | 5 | uimsbf |
|      for (j=0; j<num_answers;j++) { | | |
|        answer_value_length | 8 | uimsbf |
|        answer_value | var | |
|      } | | |
|    } | | |
| } | | |

[Fig. 57]

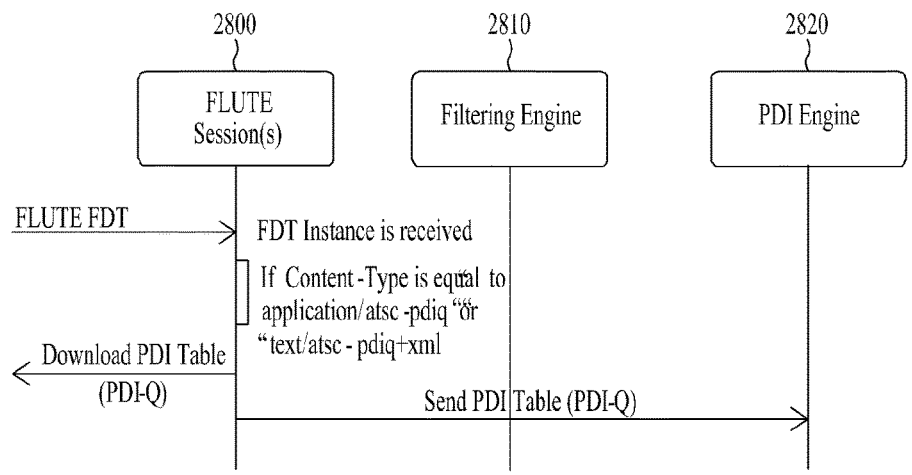

[Fig. 58]
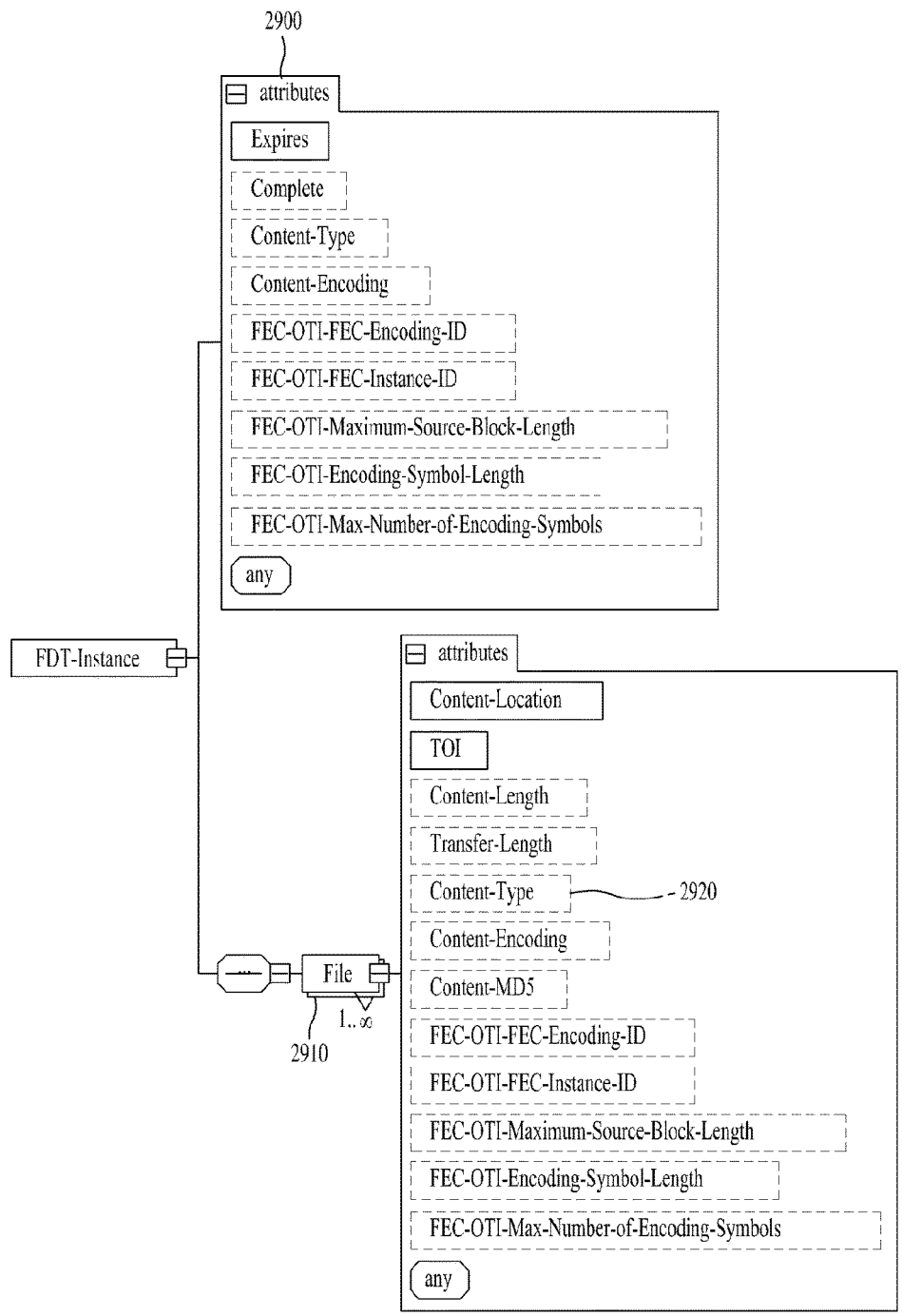

[Fig. 59]

| Syntax | No. Bits | Format |
|---|---|---|
| capabilities_descriptor () { | | |
|    descriptor_tag | 8 | 0xC5 |
|    descriptor_length | 8 | uimsbf |
|    Individual_capability_codes  (){ | | |
|      ... | | |
|    for (i=0; i< capability_code_count; i++) { | | |
|      ... | | |
|      capability_code | 7 | uimsbf |
|      ... | | |
|    } | | |
|    ... | | |
| } | | |

[Fig. 60]

| Consumption model | Meaning |
|---|---|
| ... | ... |
| 0x03 | Push – The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been preloaded is displayed. |
| 0x04 | PDI - The NRT service offers Personalization (including PDI-Q). Receivers are expected to download PDI Table associated with the service. For such services, the receiver automatically updates files as new versions are made available. |
| ... | ... |

[Fig. 61]

| Syntax | No. of Bits | Format |
|---|---|---|
| filter_criteria_descriptor () { | | |
|   descriptor_tag | 8 | 0xTBD |
|   descriptor_length | 8 | uimsbf |
|   num_filter_criteria | 8 | uimsbf |
|   for (i=0; i< num_filter_criteria; i++) { | | |
|     criterion_id_length | 8 | uimsbf |
|     criterion_id | var | var |
|     criterion_type_code | 3 | uimsbf |
|     num_criterion_values | 5 | uimsbf |
|     for (j=0; j< num_criterion_values; j++) { | | |
|       criterion_value_length | 8 | uimsbf |
|       criterion_value | var | |
|     } | | |
|   } | | |
| } | | |

[Fig. 62]

| Syntax | No. of Bits | Format |
|---|---|---|
| filter_criteria_descriptor (){ | | |
|   descriptor_tag | 8 | 0xTBD |
|   descriptor_length | 8 | uimsbf |
|   num_filter_criteria | 8 | uimsbf |
|   for (i=0; i<num_filter_criteria; i++) { | | |
|     criterion_type_code | 3 | uimsbf |
|     criterion_id_length | 8 | uimsbf |
|     criterion_id | var | var |
|     num_criterion_values | 5 | uimsbf |
|     for (j=0; i<num_filter_criteria; j++) { | | |
|       criterion_value_length | 8 | uimsbf |
|       criterion_value | var | var |
|     } | | |
|   } | | |
| } | | |

[Fig. 63]
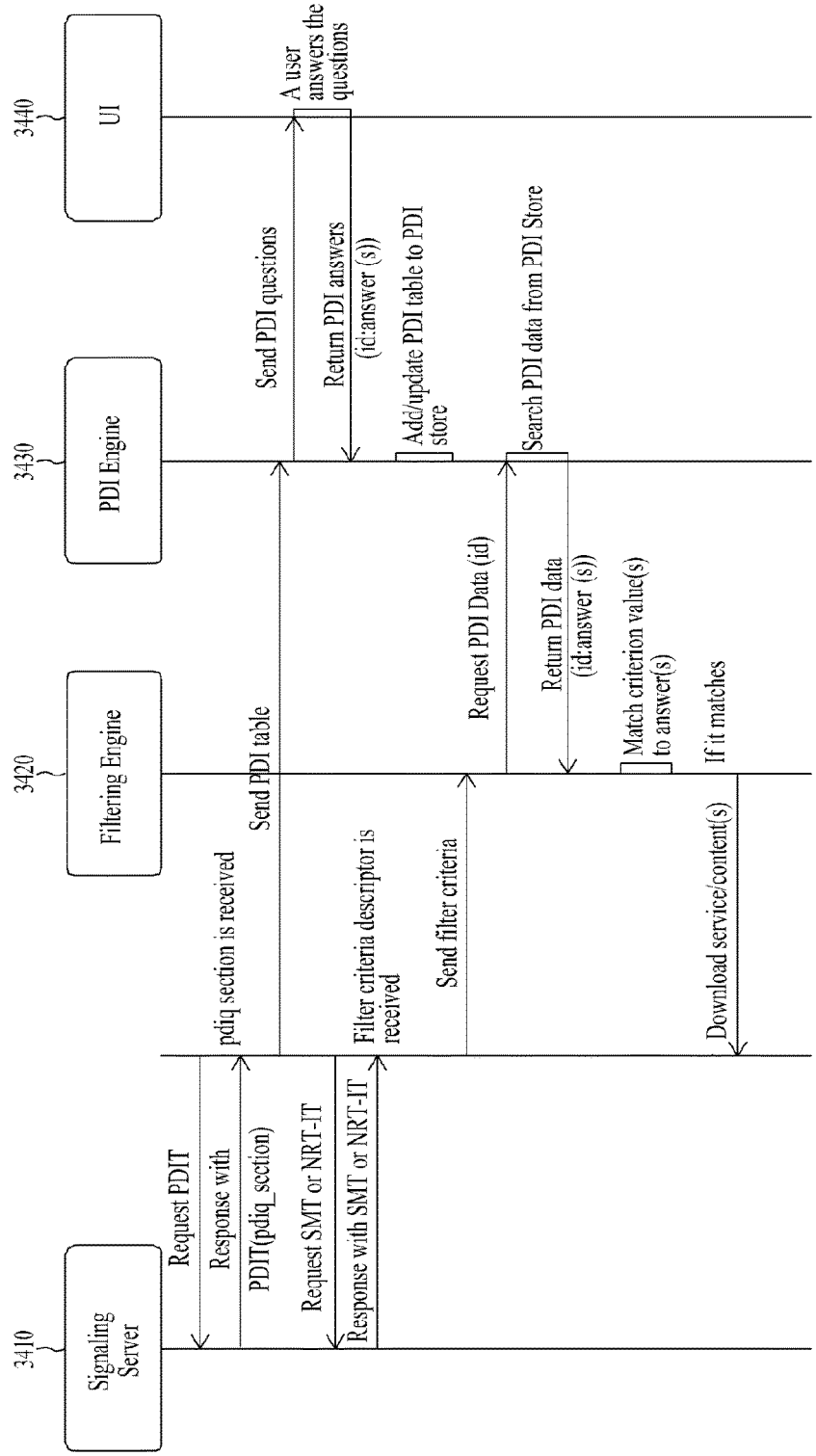

[Fig. 64]

| Table(s) Requested | Query Term |
|---|---|
| PSIP Set | ?table=PSIP |
| VCT | ?table=VCT |
| EIT | ?table=EIT[&chan=<chan_id>] |
| ETT | ?table=ETT[&chan=<chan_id>]&etmid=<ETM_id>] |
| Basic NRT Set | ?table=BASIC-SET[&chan=<chan_id>] |
| Extended NRT Set | ?table=EXT-SET[&chan=<chan_id>] |
| SMT | ?table=SMT[&chan=<chan_id>] |
| NRT-IT | ?table=NRT-IT[&chan=<chan_id>] [&svc=<svc_id>] |
| TFT | ?table=TFT[&chan=<chan_id>] [&svc=<svc_id>] |
| ILT | ?table=ILT[&chan=<chan_id>] |
| PIT and PTCT | ?table=PIT+PTCT[&chan=<chan_id>] |
| PDIT | ?table=PDIT[&chan=<chan_id>] |

[Fig. 65]
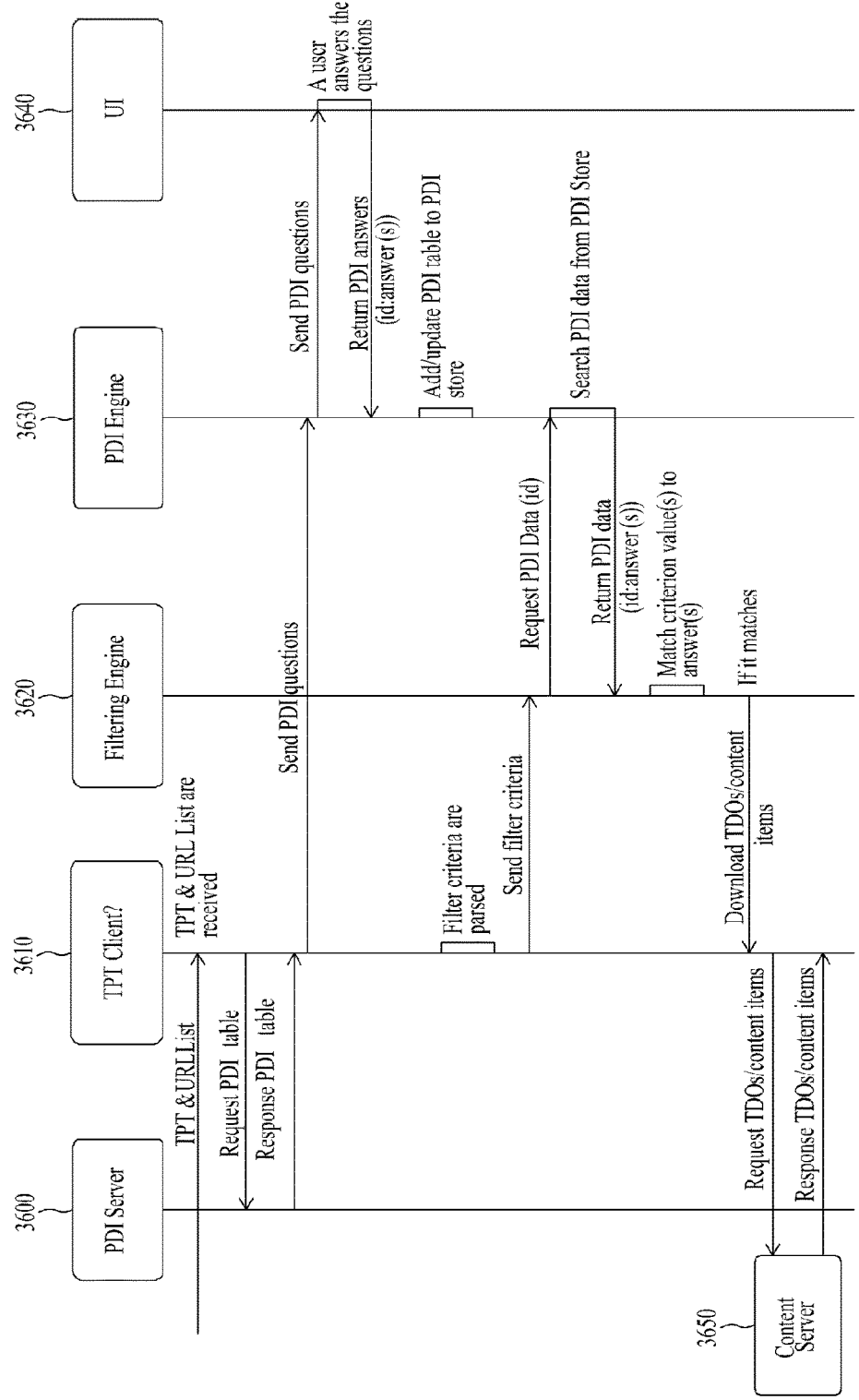

[Fig. 66]

| Element/Attribute (with @) | | No. allowed | Data Type | Description & Value |
|---|---|---|---|---|
| UrlList | | | | List of potentially useful URLs |
| | TptUrl | 0..N | anyURI | URL of TPT for future segment |
| | NrtSignalingUrl | 0..1 | anyURI | URL of NRT Signaling Server |
| | UrsUrl | 0..1 | anyURI | URL of Usage Reporting Server |
| | PDIUrl | 0..1 | anyURI | URL of PDI Server |

[Fig. 67]

| Element/Attribute (with @) | | | | | No. allowed | Data Type | Description & Value |
|---|---|---|---|---|---|---|---|
| TPT | | | | | | | |
| | ... | | | | ... | ... | ... |
| | TDO | | | | 1..N | | TDO for this segment |
| | | @appID | | | 1 | unsignedShort | Application ID, for reference by trigger |
| | | ... | | | ... | | ... |
| | | FilterCriterion | | | 0..N | | Filter criteria for this TDO |
| | | | @id | | 1 | anyURI | Identifier for this filter criterion |
| | | | @criterionType | | 1 | unsignedByte | Type of this filter criterion |
| | | | criterionValue | | 1..N | base64Binary | Filter criterion value represented by @criterionType |
| | | ContentItem | | | 0..N | | Content item used by this TDO |
| | | ... | | | ... | | ... |
| | | FilterCriterion | | | 0..N | | Filter criteria for this TDO |
| | | | @id | | 1 | anyURI | Identifier for this filter criterion |
| | | | @criterionType | | 1 | unsignedByte | Type of this filter criterion |
| | | | criterionValue | | 1..N | base64Binary | Filter criterion value represented by @criterionType |
| | | Event | | | 1..N | | Event targeted to this TDO |
| | | ... | | | ... | ... | ... |

[Fig. 68]
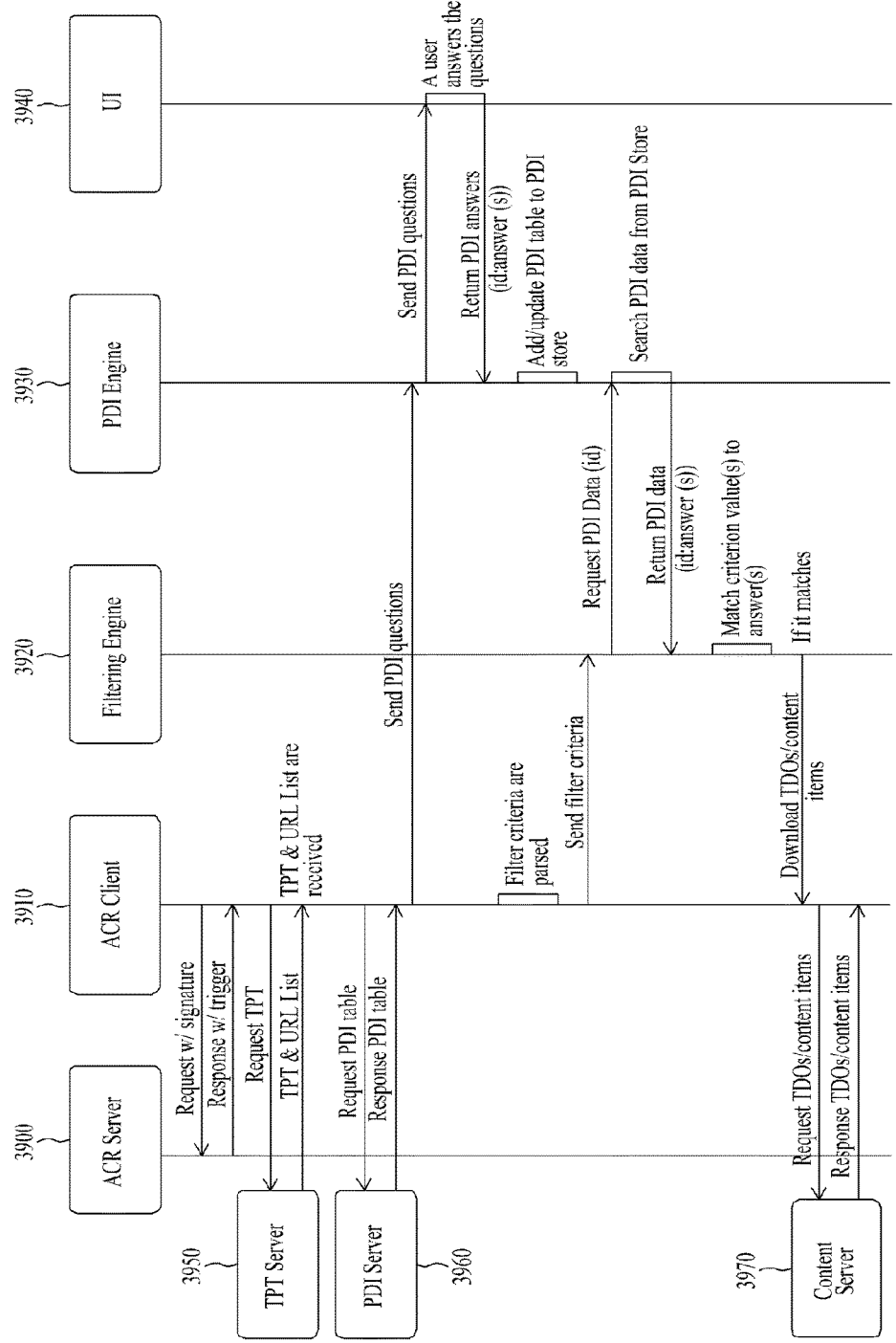

[Fig. 69]
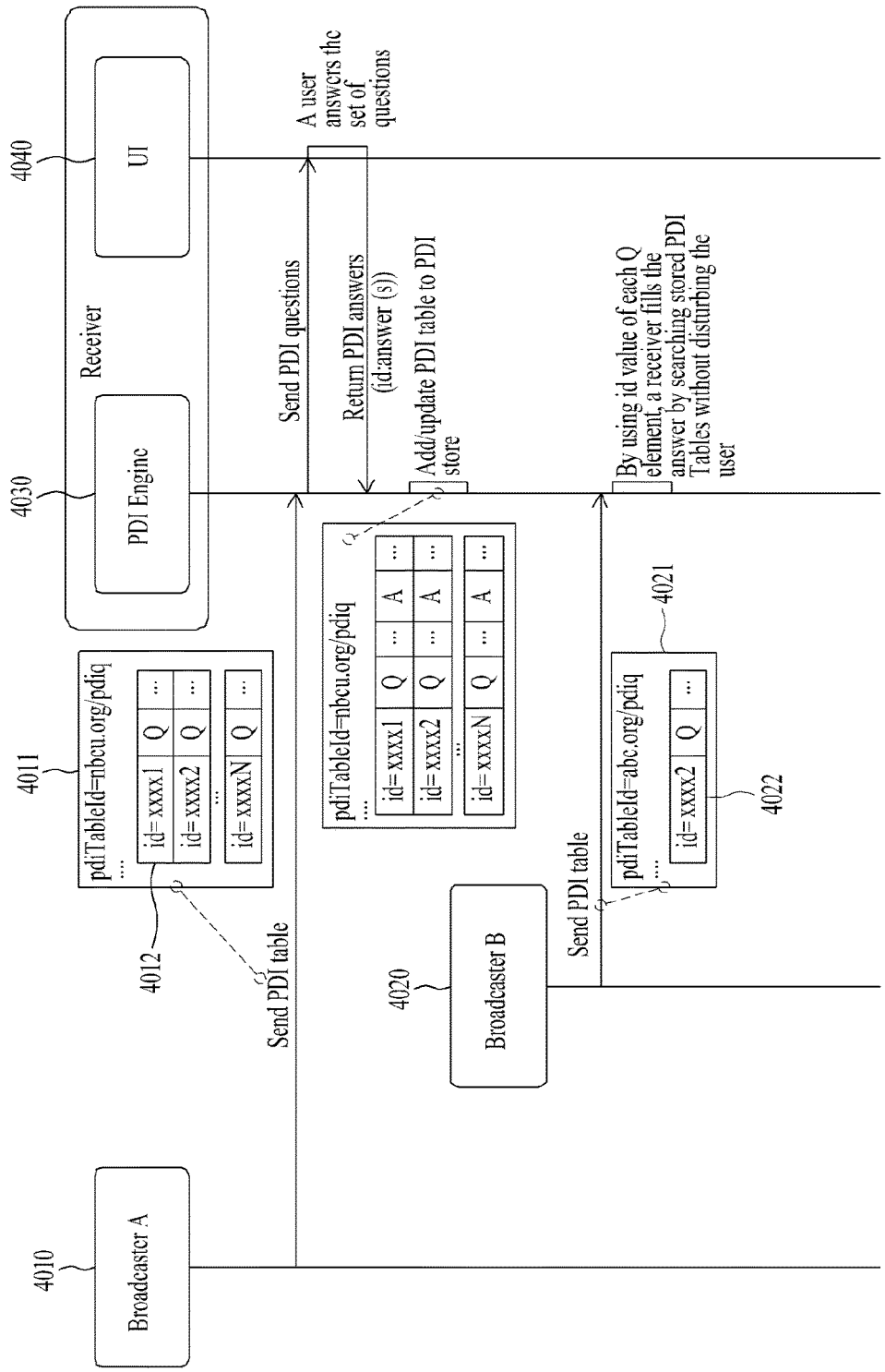

[Fig. 70]
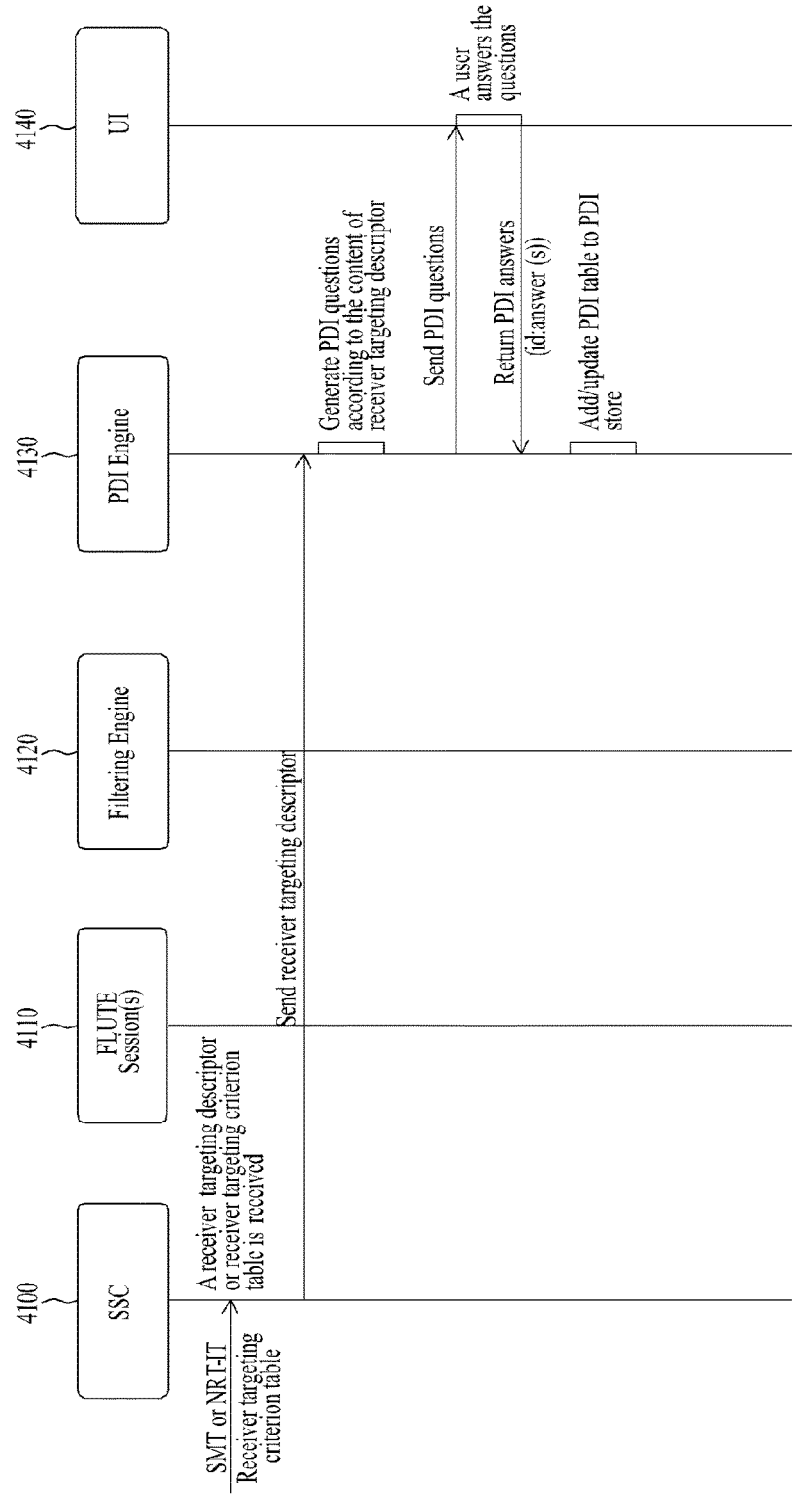

[Fig. 71]
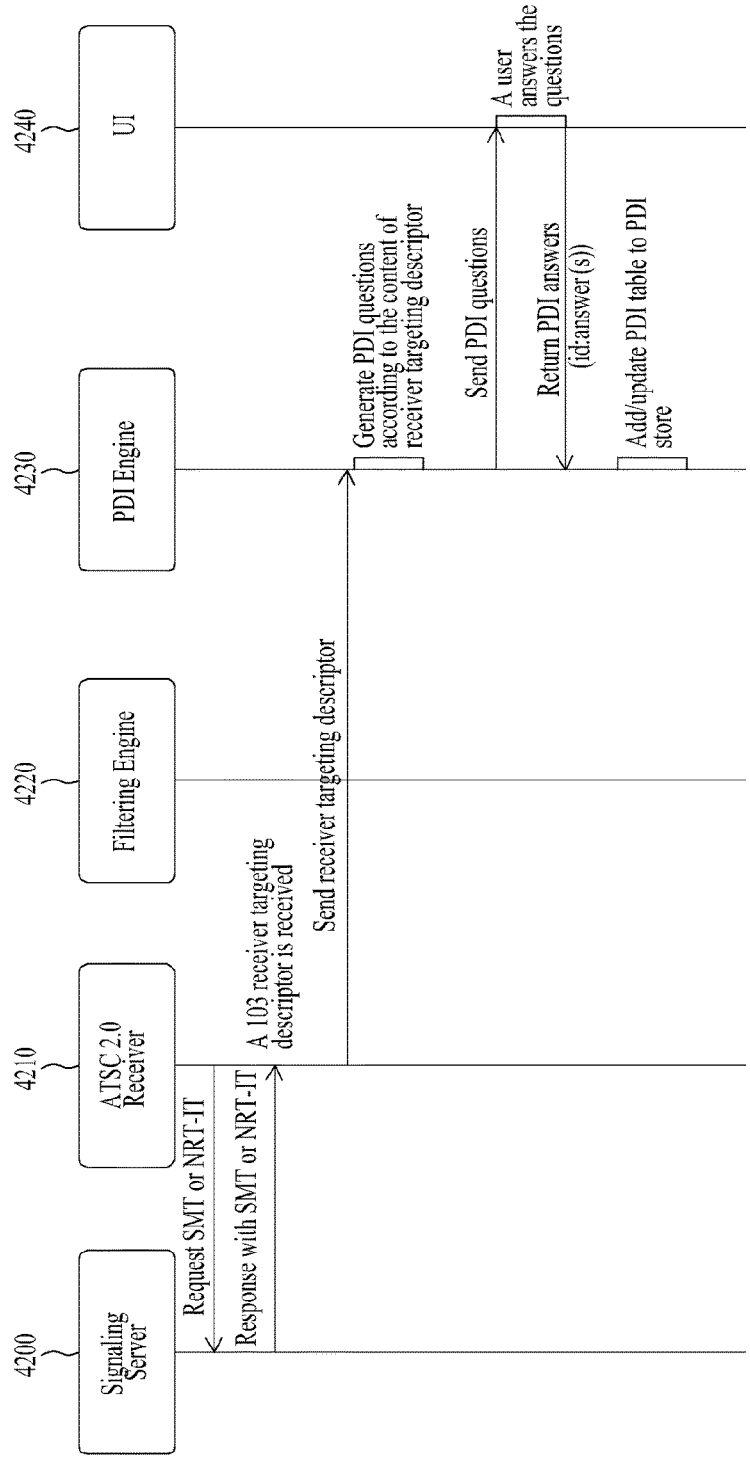

[Fig. 72]

| targeting_criterion_type_code | targeting_value_length | targeting_value |
|---|---|---|
| 0x00 | N/A | Reserved |
| 0x01 | 3 | Geographical location as defined in Table 6.21 of A/65, using only the low order 3 bytes. |
| 0x02 | var | Alphanumeric postal code as defined in section 6.7.2 of A/65, using the number of bytes appropriate to the region (up to 8) |
| 0x03 | 2 | Demographic category as defined in Table 6.18 of A/65, using only the low order 2 bytes. |
| 0x04  0x0F | N/A | Reserved for future ATSC use |
| 0x10  0x1F | N/A | Available for private use |

[Fig. 73]

```
Question ID: atsc.org/PDIQ/location-code
Question type: QTA
Question text: "What is your location code?"
Registration date: [TBD]
Organization: ATSC
Contact information: [TBD]
```

[Fig. 74]

```
Question ID: atsc.org/PDIQ/state
Question type: QTA
Question xactionSetId: 1
Question text: "What state are you located in?"
Registration date: [TBD]
Organization: ATSC
Contact information: [TBD]
```

[Fig. 75]

```
Question ID: atsc.org/PDIQ/county
Question type: QTA
Question xactionSetId: 1
Question text: "What county are you located in?"
Registration date: [TBD]
Organization: ATSC
Contact information: [TBD]
```

[Fig. 76]

```
Question ID: atsc.org/PDIQ/sector
Question type: QSA
Question xactionSetId: 1
Question text: "What part of your county are you
located in?"
Selections:
    NorthWest (1)
    North Central (2)
    NorthEast (3)
    West Central (4)
    Center (5)
    East Central (6)
    SouthWest (7)
    South Central (8)
    SouthEast (9)
Registration date: [TBD]
Organization: ATSC
Contact information: [TBD]
```

[Fig. 77]

```
Question ID: atsc.org/PDIQ/ZIPcode
Question type: QTA
Question text: "What is your 5-digit ZIP code?"
[QSA selections:]
Registration date: [TBD]
Organization: ATSC
Contact information: [TBD]
```

[Fig. 78]

```
Question ID: atsc.org/PDIQ/postalcode
Question type: QTA
Question text: "What is your postal code?"
Registration date: [TBD]
Organization: ATSC
Contact information: [TBD]
```

[Fig. 79]

```
Question ID: atsc.org/PDIQ/gender
Question type: QSA
Question text: "What is your gender?"
Selections (with Selection ID values):
    Male (1)
    Female (2)
Registration date: [TBD]
Organization: ATSC
Contact information: [TBD]
```

[Fig. 80]

```
Question ID: atsc.org/PDIQ/age-bracket
Question type: QSA
Question text: "What age bracket are you in?"
Selections:
    Ages 2-5 (1)
    Ages 6-11 (2)
    Ages 12-17 (3)
    Ages 18-34 (4)
    Ages 35-49 (5)
    Ages 50-54 (6)
    Ages 55-64 (7)
    Ages 65+ (8)
Registration date: [TBD]
Organization: ATSC
Contact information: [TBD]
```

[Fig. 81]

```
Question ID: atsc.org/PDIQ/working
Question type: QSA
Question text: "Are you working at a paying job?"
QSA selections:
    Yes (1)
    No (2)
Registration date: [TBD]
Organization: ATSC
Contact information: [TBD]
```

[Fig. 82]

Question ID: atsc.org/PDIQ/working
Question type: QBA
Question text: "Are you working at a paying job?"
Registration date: [TBD]
Organization: ATSC
Contact information: [TBD]

[Fig. 83]

| String getPDITableList() | | | | |
|---|---|---|---|---|
| Description | Return an XML structure with a list of the PDI tables, giving the pdiTableId for each one. The XML structure is as following XML schema. A pdiTableId element which has a single pdiTableId child element, with cardinality 0 to unbounded. (The case of 0 pdiTableId instances would indicate that the broadcaster has not provided a PDI Table.) | | | |
| | Element/Attribute | cardinality | XML datatype | Description |
| | PDITableList | | | Table of PDI questions/answers |
| |   pdiTableId | 0..N | anyURI | Globally unique ID of PDI Table |
| Arguments | pdiTableId | | | A globally unique identifier of the PDI Table, in the form of a URI |

[Fig. 84]

| String getPDITable(String pdiTableId) | | |
|---|---|---|
| Description | Return the PDI Table XML document for the receiver. Each pdiTable is associated with an identified by the globally unique pdiTableId identifier provided as input to the method. The returned value is a string that contains the serialized PDI Table XML instances, optionally containing PDI-Q or PDI-A XML instances. | |
| Arguments | pdiTableId | A globally unique identifier of the PDI Table, in the form of a URI |

[Fig. 85]

| String getPDIA(String pdiTableId) | |
|---|---|
| Description | Return the PDI-A XML document for the receiver. Each pdiTable is associated with an identified by the globally unique pdiTableId identifier provided as input to the method. The returned value is a string that contains the serialized PDI-A XML instances. |
| Arguments | pdiTableId | A globally unique identifier of the PDI Table, in the form of a URI |

[Fig. 86]
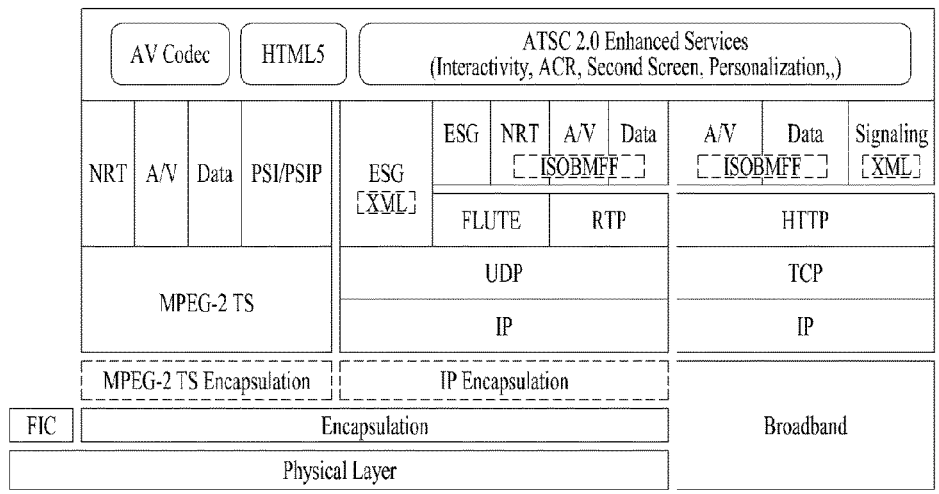
[Fig. 87]
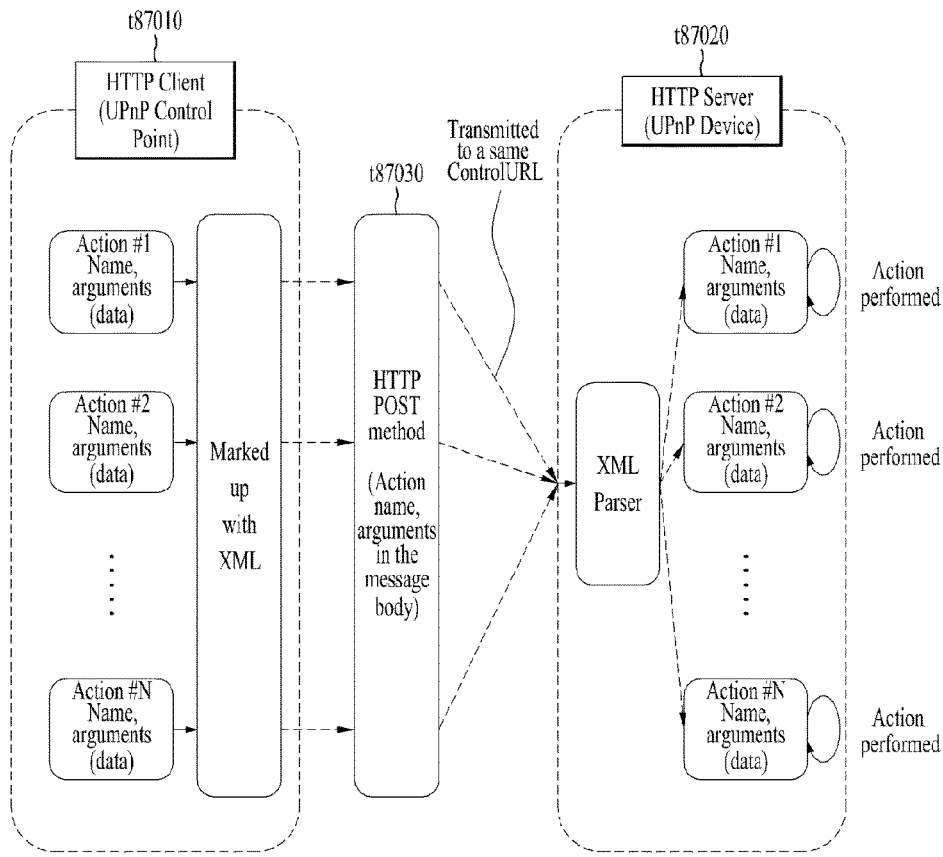

[Fig. 88]
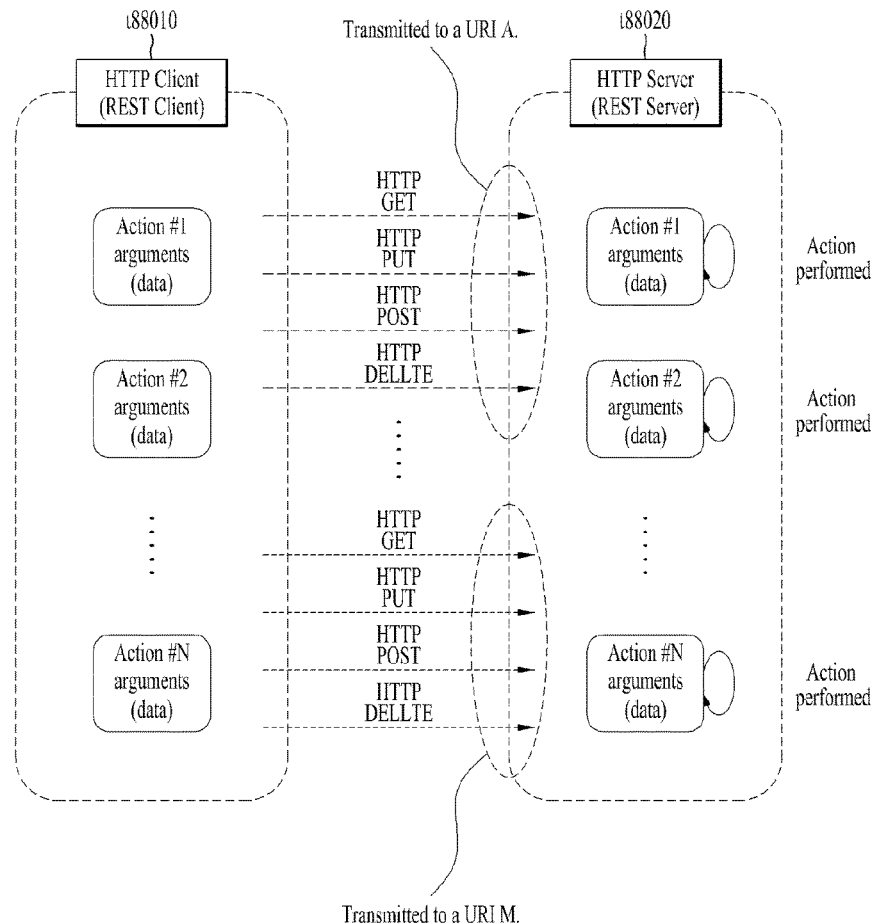
[Fig. 89]
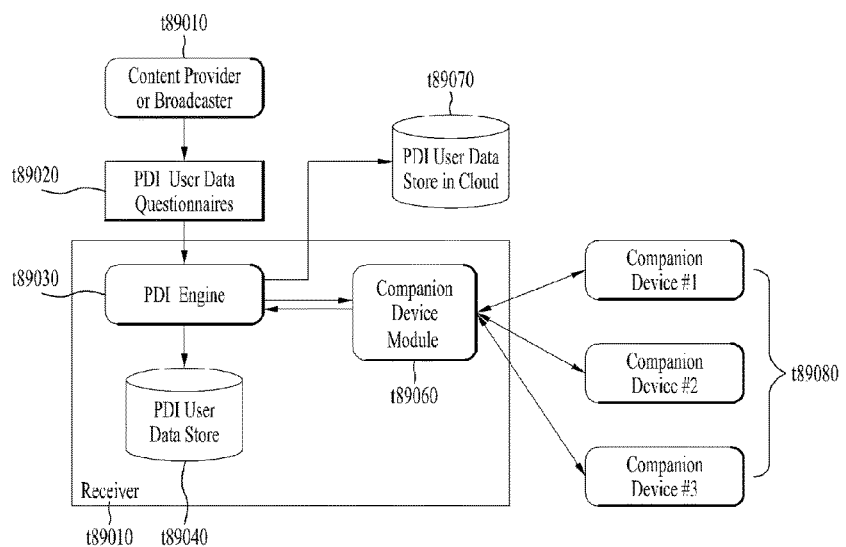

[Fig. 90]

| Type/Element/Attribute | | | | Cardinality | XML data type | Description |
|---|---|---|---|---|---|---|
| PDIUserData | | | | | | Table of PDI user data (questions/answers) |
| | @protocolVersion | | | 0..1 | hexBinary | Protocol version (major/minor) |
| | @userDataId | | | 1 | anyURI | Globally unique ID of PDI user data |
| | @userDataVersion | | | 1 | unsignedByte | PDI user data version |
| | @time | | | 1 | dateTime | Time table PDI user data last updated |
| | <choice> | | | 1..N | | Choice among QIA, QBA, QSA, QTA, QAA |
| | | QIA | | 1 | QIAType | Question with integer answer |
| | | QBA | | 1 | QBAType | Question with Boolean answer |
| | | QSA | | 1 | QSAType | Question with selection(s) answer |
| | | QTA | | 1 | QTAType | Question with text answer |
| | | QAA | | 1 | QAAType | Question with arbitrary answer |
| QIAType | | | | | | Type for question with integer answer |
| | @id | | | 1 | anyURI | Globally unique ID of Q&A |
| | @expire | | | 0..1 | dateTime | Expriation date/time for Q&A |
| | Q | | | 1 | | Question |
| | | @loEnd | | 0..1 | int | Lower bound for answers |
| | | @hiEnd | | 0..1 | int | Upper bound for answers |
| | | QText | | 1..N | string | Text of question |
| | | | @lang | 0..1 | xml:lang | Language of question text |
| | A | | | 0..1 | | Answer to question |
| | | @answer | | 1 | int | Answer value |
| | | @time | | 0..1 | dateTime | Date/time when answer provided |
| QBAType | | | | | | Type for question with Boolean answer |
| | @id | | | 1 | anyURI | Globally unique ID of Q&A |
| | @expire | | | 0..1 | dateTime | Expriation date/time for Q&A |
| | Q | | | 1 | | Question |
| | | QText | | 1..N | string | Text of question |
| | | | @lang | 0..1 | xml:lang | Language of question text |
| | A | | | 0..1 | | Answer to question |
| | | @answer | | 1 | boolean | Answer value |
| | | @time | | 0..1 | dateTime | Date/time when answer provided |

[Fig. 91]

| QSAType | | | | Type for question with selection answer |
|---|---|---|---|---|
| | @id | | 1 | anyURI | Globally unique ID of Q&A |
| | @expire | | 0..1 | dateTime | Expriation date/time for Q&A |
| | Q | | 1 | | Question |
| | | @minChoices | 0..1 | unsignedByte | Minimum allowed number of selections |
| | | @maxChoices | 0..1 | unsignedByte | Maximum allowed number of selections |
| | | QText | 1..N | string | Text of question |
| | | | @lang | 0..1 | xml:lang | Language of question text |
| | | Selection | 2..N | string | Possible selection |
| | | | @selectionId | 1 | unsignedByte | Identifier of selection, scoped by question |
| | A | | 0..N | | Identifier of selected answer |
| | | @answer | 1 | unsignedByte | Selection identifier value |
| | | @time | 0..1 | dateTime | Date/time when answer provided |
| QTAType | | | | | Type for question with text answer |
| | @id | | 1 | anyURI | Globally unique ID of Q&A |
| | @expire | | 0..1 | dateTime | Expriation date/time for Q&A |
| | Q | | 1 | | Question |
| | | QText | 1..N | string | Text of question |
| | | | @lang | 0..1 | xml:lang | Language of question text |
| | A | | 0..1 | | Answer to question |
| | | @answer | 1 | string | Text of answer |
| | | @lang | 0..1 | xml:lang | Language of answer |
| | | @time | 0..1 | dateTime | Date/time when answer provided |
| QAAType | | | | | Type for "answer" with no question |
| | @id | | 1 | anyURI | Globally unique ID of Q&A |
| | @expire | | 0..1 | dateTime | Expriation date/time for Q&A |
| | A | | 0..1 | | Answer |
| | | @answer | 1 | string | "Answer" |
| | | @time | 0..1 | dateTime | Date/time when answer provided |
| QIAD | | | | | |
| | @protocolVersion | | 0..1 | hexBinary | Protocol version(major/minor) |
| | QIA | | 1 | QIAType | Question with integer answer |
| QBAD | | | | | |
| | @protocolVersion | | 0..1 | hexBinary | Protocol version(major/minor) |
| | QBA | | 1 | QBAType | Question with Boolean answer |
| QSAD | | | | | |
| | @protocolVersion | | 0..1 | hexBinary | Protocol version(major/minor) |
| | QSA | | 1 | QSAType | Question with selection(s) answer |
| QTAD | | | | | |
| | @protocolVersion | | 0..1 | hexBinary | Protocol version(major/minor) |
| | QTA | | 1 | QTAType | Question with text answer |
| QAAD | | | | | |
| | @protocolVersion | | 0..1 | hexBinary | Protocol version(major/minor) |
| | QAA | | 1 | QTAType | Question with no question | t91010

| Service | Service Type | Service ID |
|---|---|---|
| UserData | atsc3.0userdata:1 | urn:atsc.org:serviceId:atsc3.0userdata1 | t92020

| Service | Service Type | Service ID |
|---|---|---|
| UserData | atsc3.0userdata:1 | urn:atsc.org:serviceId:atsc3.0userdata |

[Fig. 93]

| Variable Name | Req./Opt | DataType | Evented? | Moderated Event | Min Event Interval |
|---|---|---|---|---|---|
| PDIUserDataProtocolVersion | Req. | bin.hex | No | N/A | N/A |
| A_ARG_TYPE_UserDataIdsList | Req. | List (CSV,...) | No | N/A | N/A |
| UserDataList | Req. | String (XML, Json, etc.,) | No | N/A | N/A |
| A_ARG_TYPE_UserData | Req. | String (Fragment of UserData) | No | N/A | N/A |

[Fig. 94]

```
<?xml version="1.0" encoding="UTF-8"?>
<UserDataList
xmlns="urn:atsc.org:serviceId:atsc3.0userdata1"
xsi:schemaLocation="urn:atsc.org:serviceId:atsc3.0userdata1">
  <PDIUserData protocolVersion="00010010" userDataId="atsc.org/userdata1" userDataVersion="1" time="2014-05-30">
    <QIA id="question1" expire="2019-12-31">
      <Q>
        <QText> What is your age? </QText>
      </Q>
      <A answer="21" time="2014-06-02"></A>
    </QIA>
  </PDIUserData>
  <PDIUserData protocolVersion="00010010" userDataId="atsc.org/userdata2" userDataVersion="2" time="2014-05-30">
    ...
  </PDIUserData>
</UserDataList>
```
t94010

```
<?xml version="1.0" encoding="UTF-8"?>
<UserDataList
xmlns="urn:atsc.org:serviceId:atsc3.0userdata1"
xsi:schemaLocation="urn:atsc.org:serviceId:atsc3.0userdata1">
  <PDIUserData protocolVersion="00010010" userDataId=atsc.org/userdata1" userDataVersion="1" time="2014-05-30">
    <QIA id="question1" expire="2019-12-31">
      <Q>
        <Qtext> What is your age? </QText>
      </Q>
      ...
    </QIA>
  </PDIUserData>
  <PDIUserData protocolVersion="00010010" userDataId="atsc.org/userdata2" userDataVersion="2" time="2014-05-30">
  </PDIUserData>
  <PDIUserData protocolVersion="00010010" userDataId="atsc.org/userdata3" userDataVersion="1" time="2014-05-30">
    <QBA id="question3" expire="2019-12-31">
      <Q>
        <QText> What is your gender? Men : TRUE, Women : False </QText>
      </Q>
      ...
    </QBA>
  </PDIUserData>
</UserDataList>
```
t94020

[Fig. 95]

| Name | Required/Optional |
|---|---|
| GetPDIUserDataProtocolVersion | Optional |
| GetUserDataIdsList | Required |
| GetUserData | Required |
| SetUserData | Required |

[Fig. 96]

| Argument | Direction | Relate State Variable |
|---|---|---|
| PDIUserDataProtocolVersion | OUT | PDIUserDataProtocolVersion |

[Fig. 97]

| Argument | Direction | Relate State Variable |
|---|---|---|
| ProtocolVersion | IN | PDIUserDataProtocolVersion |
| UserDataIdsList | OUT | A_ARG_TYPEUserDataIdsList |

— t97010

| Argument | Direction | Relate State Variable |
|---|---|---|
| UserDataIdsList | IN | A_ARG_TYPEUserDataIdsList |
| UserData | OUT | A_ARG_TYPEUserData |

— t97020

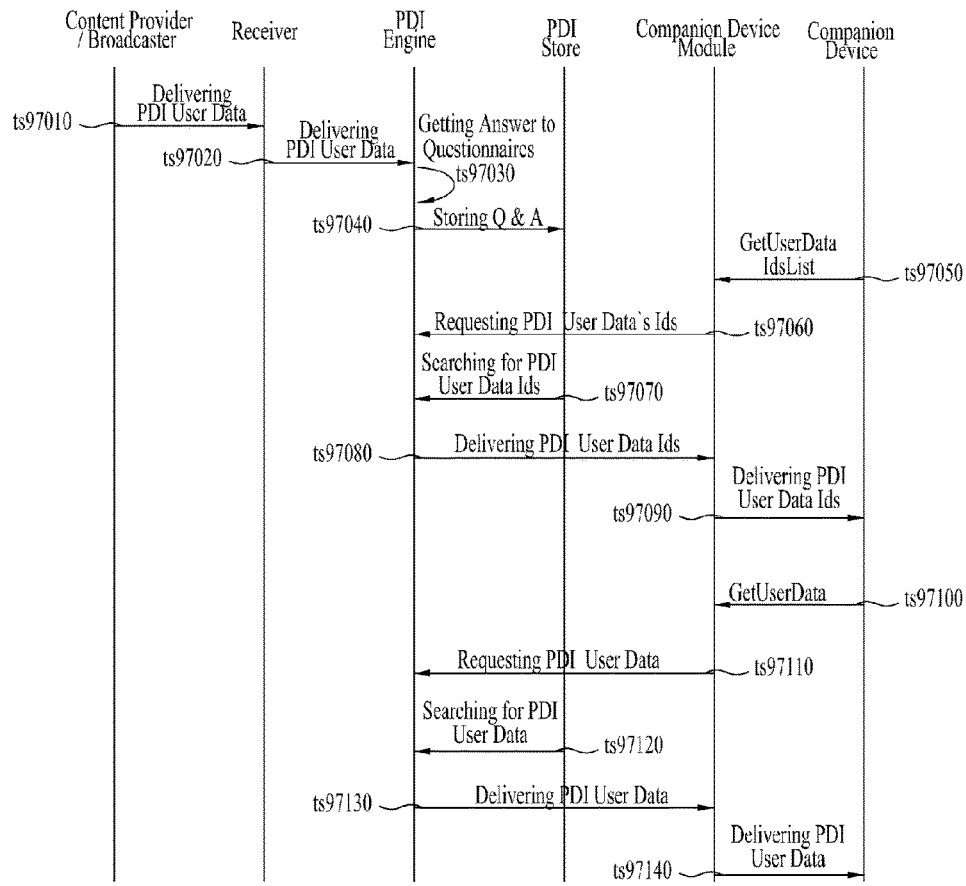

[Fig. 98]

| Variable Name | Req./Opt | DataType | Evented? | Moderated Event | Min Event Interval |
|---|---|---|---|---|---|
| A_ARG_TYPE_UserDataIdsList | Req. | List of String (userDataId, userDataVersion) | No | N/A | N/A |

[Fig. 99]
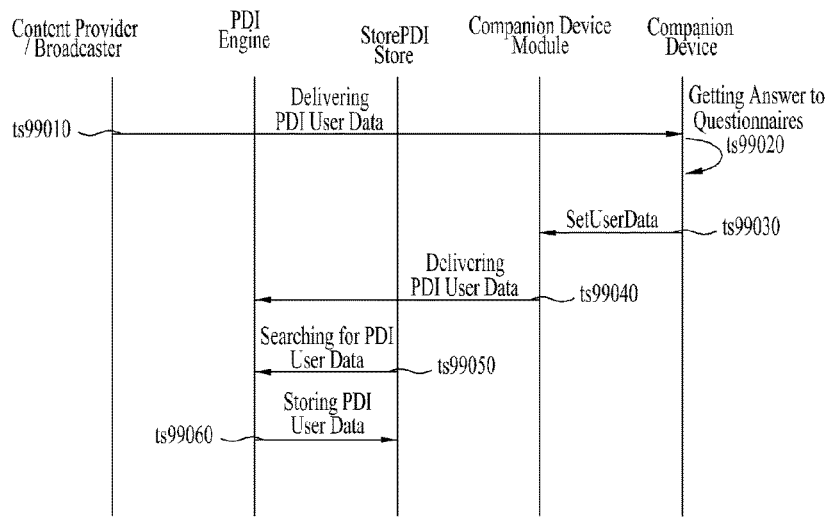
[Fig. 100]
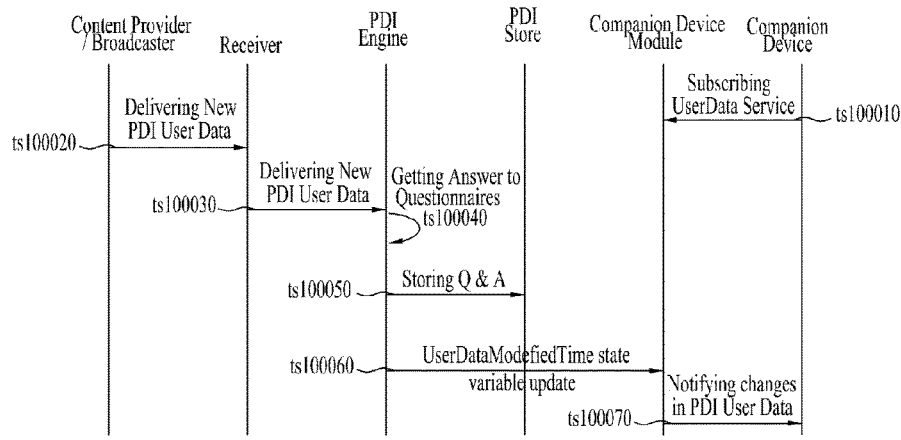

[Fig. 101]

| Variable Name | Req./Opt | DataType | Evented? | Moderated Event | Min Event Interval | |
|---|---|---|---|---|---|---|
| UserDataUpdatedList | Req. | string(CSV{string, ui4}) | Yes | No | N/A | — t101010 |

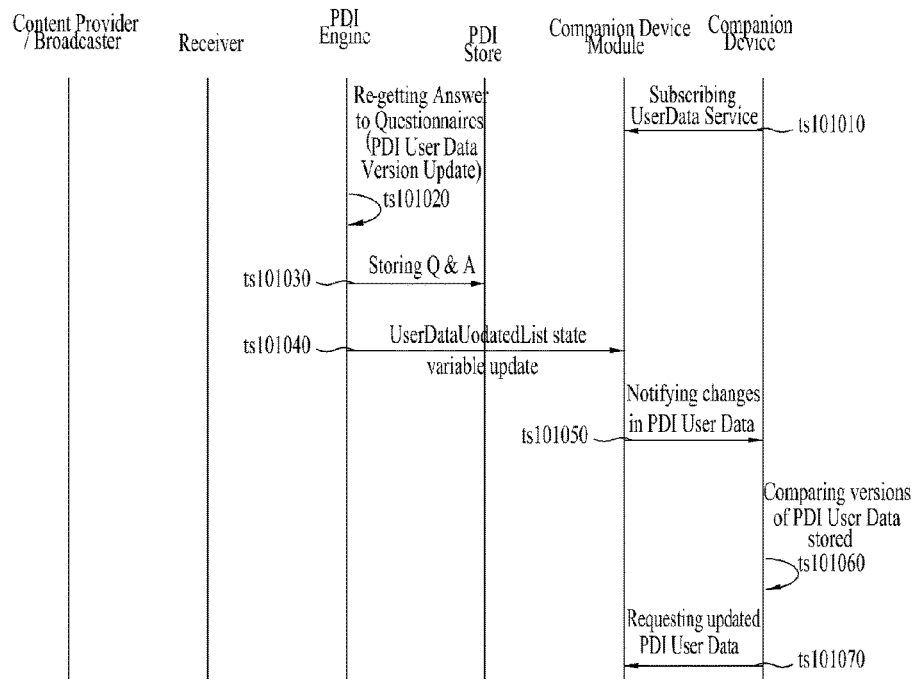

[Fig. 102]

| Variable Name | Req./Opt | DataType | Evented? | Moderated Event | Min Event Interval |
|---|---|---|---|---|---|
| A_ARG_TYPE_UserData QAIdsList | Req. | List | No | N/A | N/A |
| UserDataQAList | Req. | string | No | N/A | N/A |
| A_ARG_TYPE_UserData QA | Req. | String (Fragment of UserData) | No | N/A | N/A |

[Fig. 103]

t103010:
```xml
<?xml version="1.0" encoding="UTF-8"?>
<UserDataQAList
 xmlns="urn:atsc.org:serviceId:atsc3.0userdata1"
 xsi:schemaLocation="urn:atsc.org:serviceId:atsc3.0userdata1">
  <QIAD protocolVersion="00010010">
    <QIA id="question1" expire="2019-12-31">
      <Q>
        <QText> What is your age?</QText>
      </Q>
      ...
    </QIA>
  </QIAD>
  <QBAD protocolVersion="00010010">
    ...
  </QBAD>
</UserDataQAList>
``` t103020:
```xml
<?xml version="1.0" encoding="UTF-8"?>
<UserDataQAList
 xmlns="urn:atsc.org:serviceId:atsc3.0userdata1"
 xsi:schemaLocation="urn:atsc.org:serviceId:atsc3.0userdata1">
  <QIAD protocolVersion="00010010">
    <QIA id="question1" expire="2019-12-31">
      <Q>
        <Qtext> What is your age?</QText>
      </Q>
      ...
    </QIA>
  </QIAD>
  <QBAD protocolVersion="00010010">
    <QBA id="question2" expire="2019-12-31">
    ...
    </QBA>
  </QBAD>
  <QTAD protocolVersion="00010010">
    <QTA id="question3" expire="2019-12-31">
      <Q>
        <QText> Where do you live?</QText>
      </Q>
    </QTA>
  </QTAD>
</UserDataQAList>
```

[Fig. 104]

| Name | Required/Optional |
|---|---|
| GetUserDataQAIdsList | Required |
| GetUserDataQA | Required |
| SetUserDataQA | Required |

[Fig. 105]
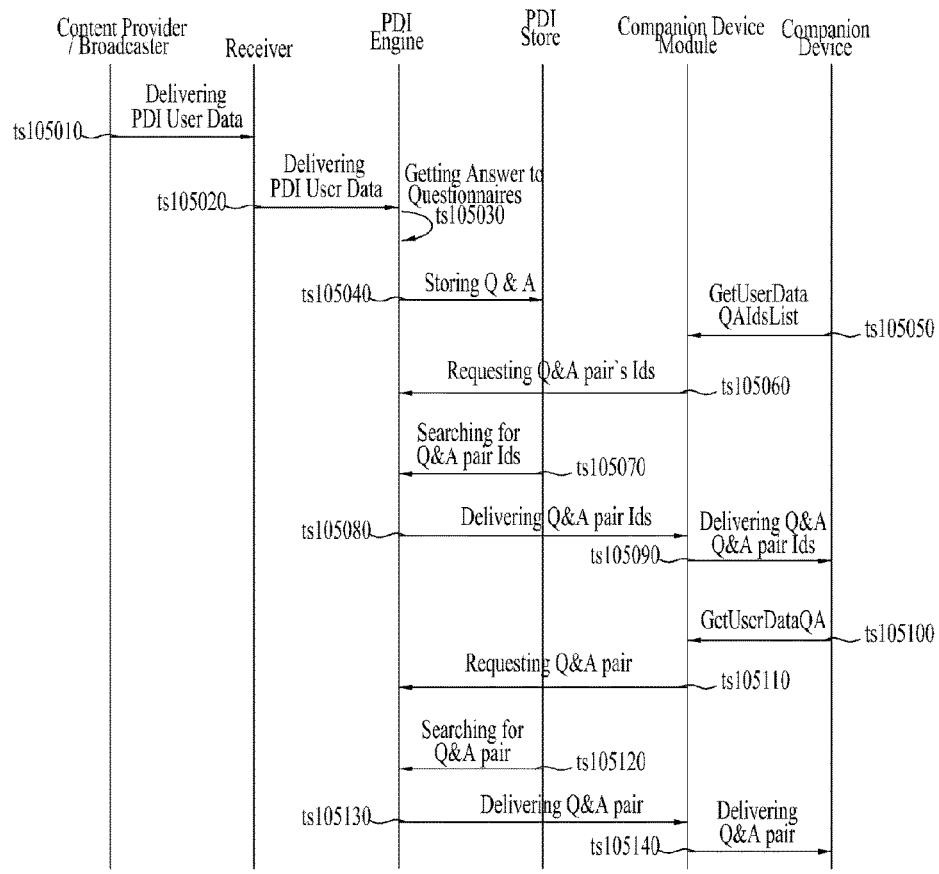

[Fig. 106]
| Argument | Direction | Relate State Variable |
|---|---|---|
| UserDataQAList | IN | UserDataQAList |
t106010
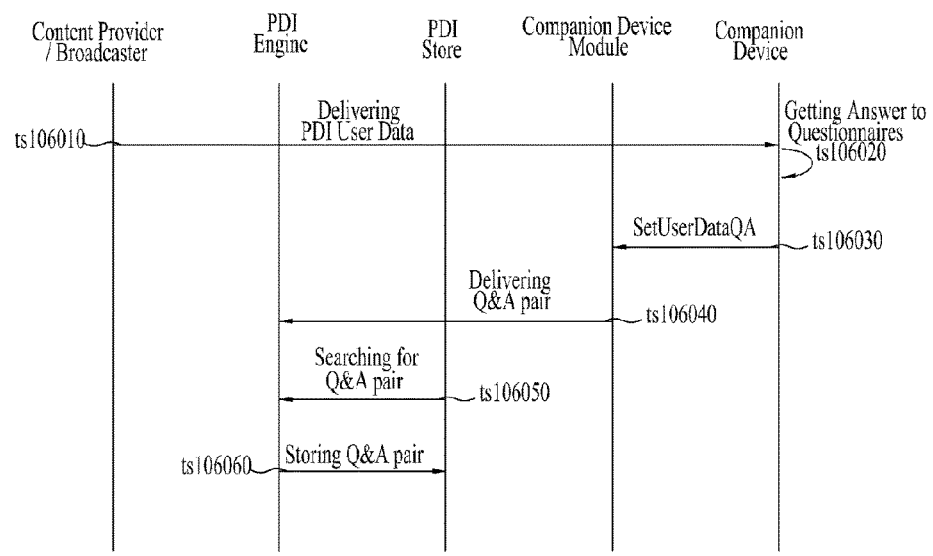

[Fig. 107]
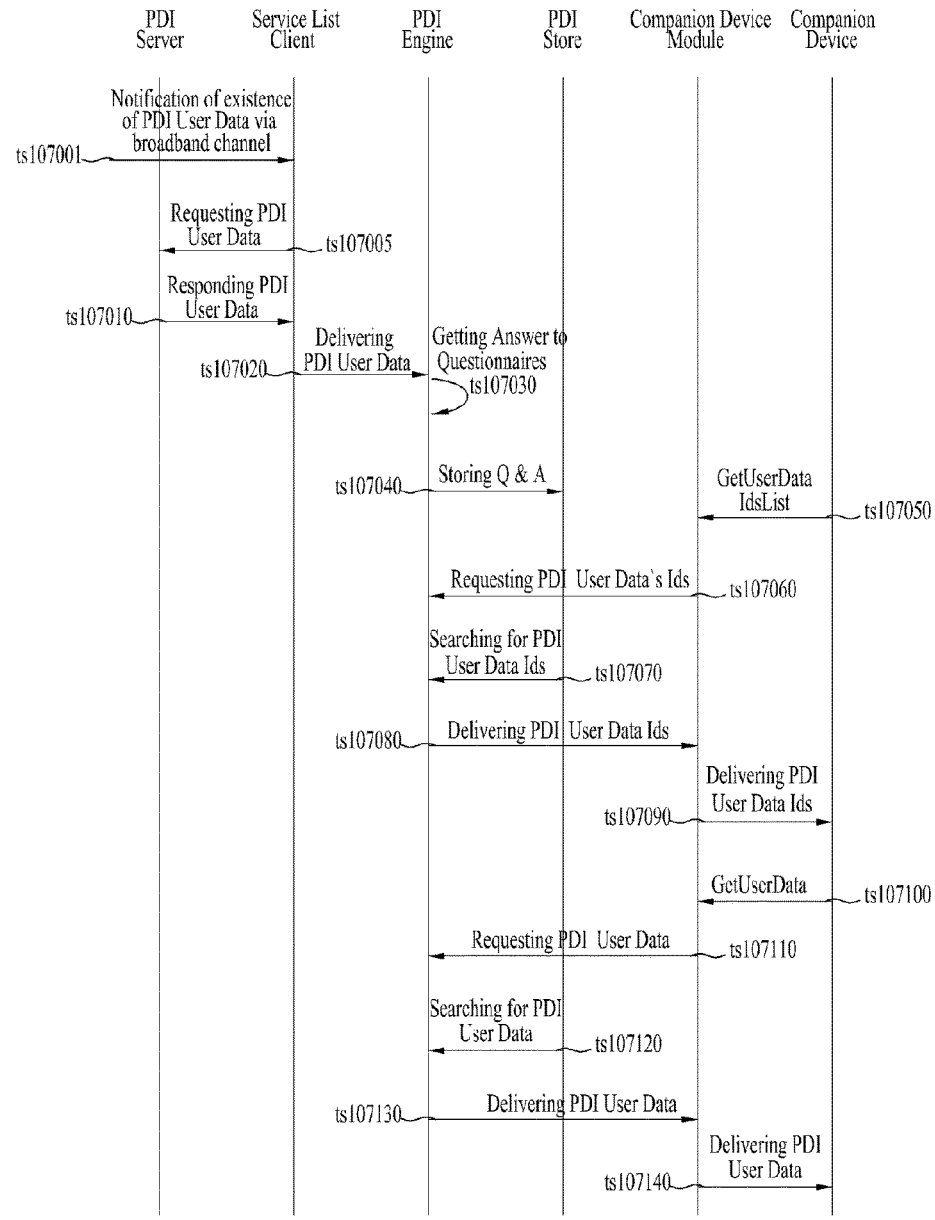
[Fig. 108]
| Variable Name | Req./Opt | DataType | Evented? | Moderated Event | Min Event Interval |
|---|---|---|---|---|---|
| PDIUserDataNotification | Req. | dateTime | Yes | N/A | N/A |
| PDIServerUrl | Req. | string or anyURI | No | N/A | N/A |

[Fig. 109]
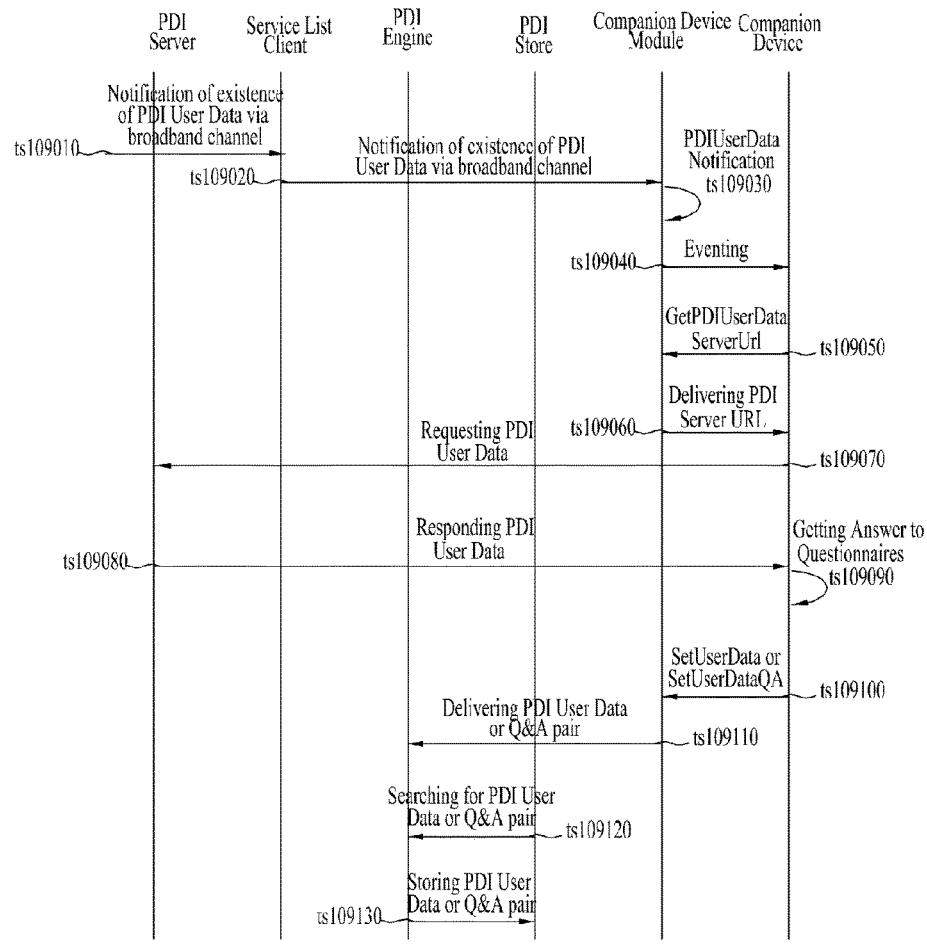
[Fig. 110]
| Variable Name | Req./Opt | DataType | Evented? | Moderated Event | Min Event Interval |
|---|---|---|---|---|---|
| PDIServerUrl | Req. | List of string, or List of anyURI | No | N/A | N/A |

[Fig. 111]

| Variable Name | Req./Opt | DataType | Evented? | Moderated Event | Min Event Interval |
|---|---|---|---|---|---|
| PDIServer Url | Req. | String or anyURI or List of Strings or List of anyURI | YES | N/A | N/A |

[Fig. 112]

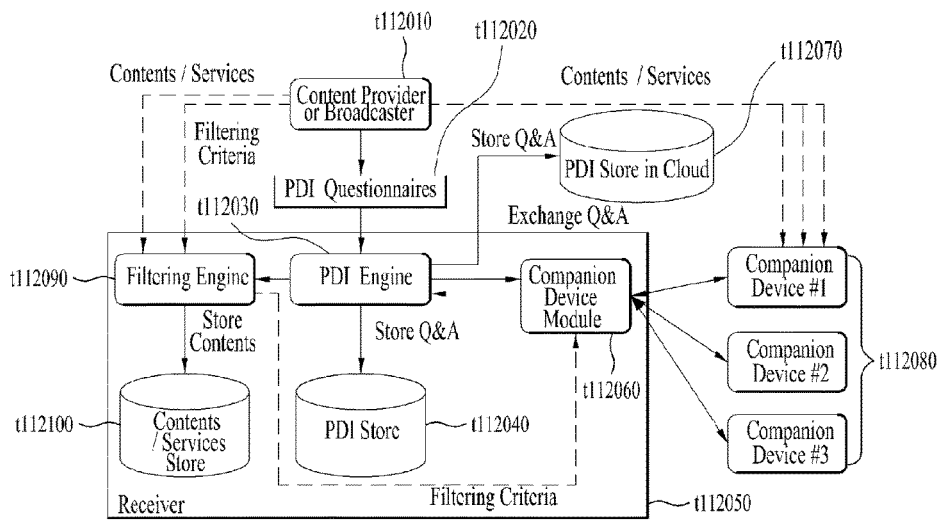

[Fig. 113]

| Service | Service Type | Service ID | |
|---|---|---|---|
| FilteringCriteria | atsc3.0filtering:1 | urn:atsc.org:serviceId:atsc3.0filtering1 | t113010 |

| Service | Service Type | Service ID | |
|---|---|---|---|
| FilteringCriteria | atsc3.0filtering:1 | urn:atsc.org:serviceId:atsc3.0filtering | t113020 |

[Fig. 114]

| Variable Name | Req./Opt | DataType | Evented? | Moderated Event | Min Event Interval |
|---|---|---|---|---|---|
| FilteringCriteria | Req. | String (XML, Jason etc.,) | No | N/A | N/A |

[Fig. 115]
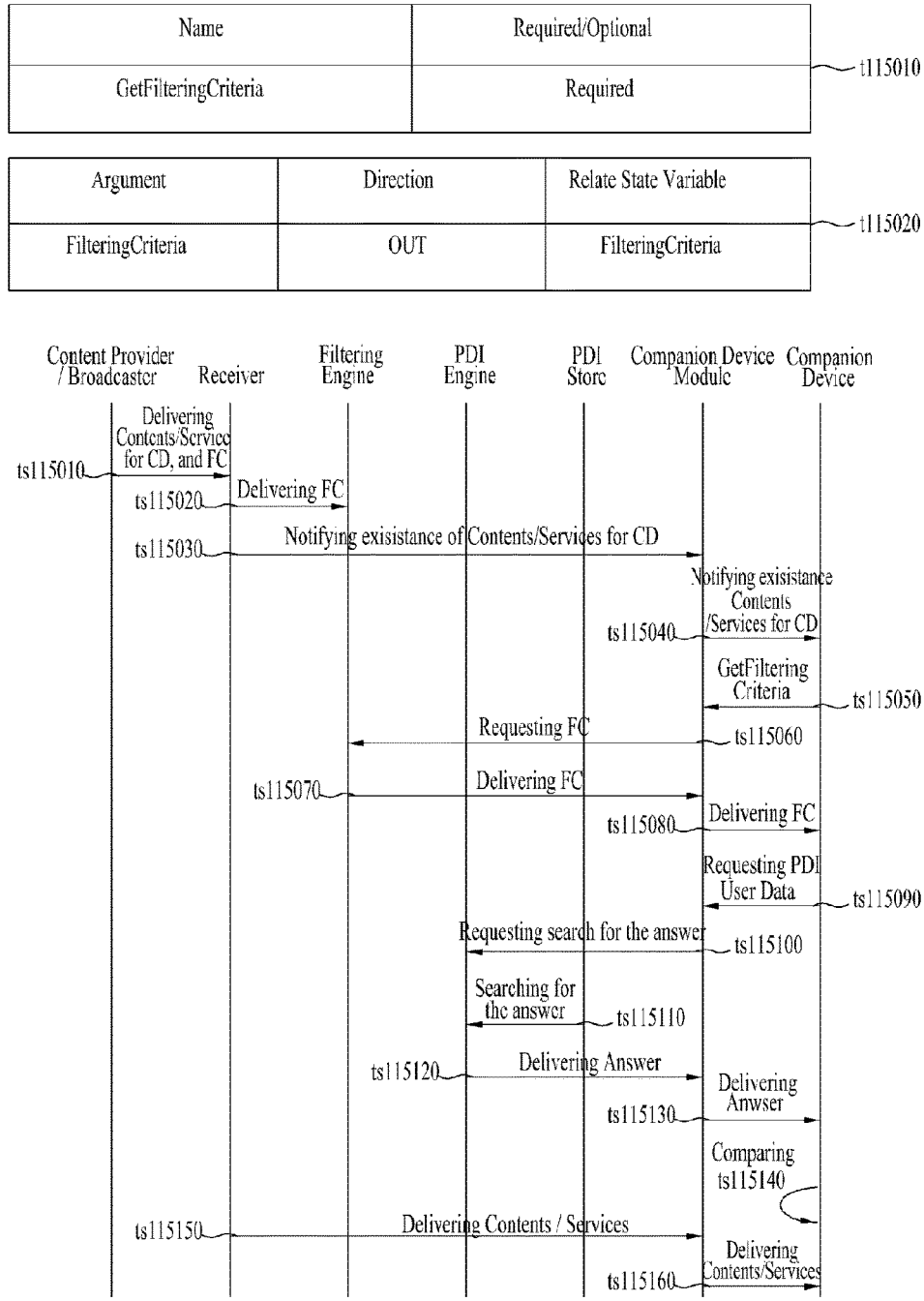

[Fig. 116]
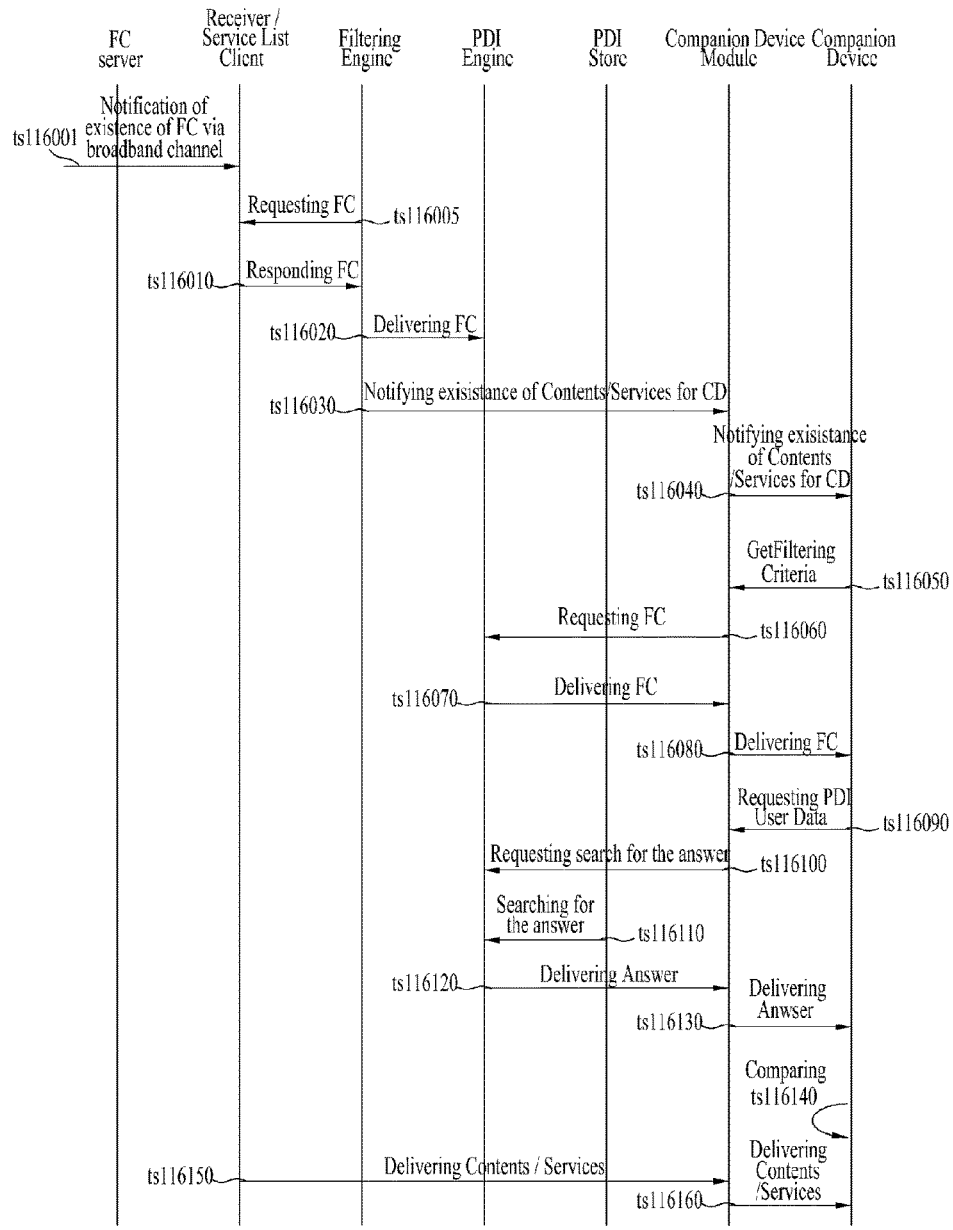
[Fig. 117]
| Variable Name | Req./Opt | DataType | Evented ? | Moderated Event | Min Event Interval |
|---|---|---|---|---|---|
| FilteringCriteriaNotification | Req. | dateTime | Yes | N/A | N/A |
| FCServerUrl | Req. | String or anyURI | No | N/A | N/A |

[Fig. 118]
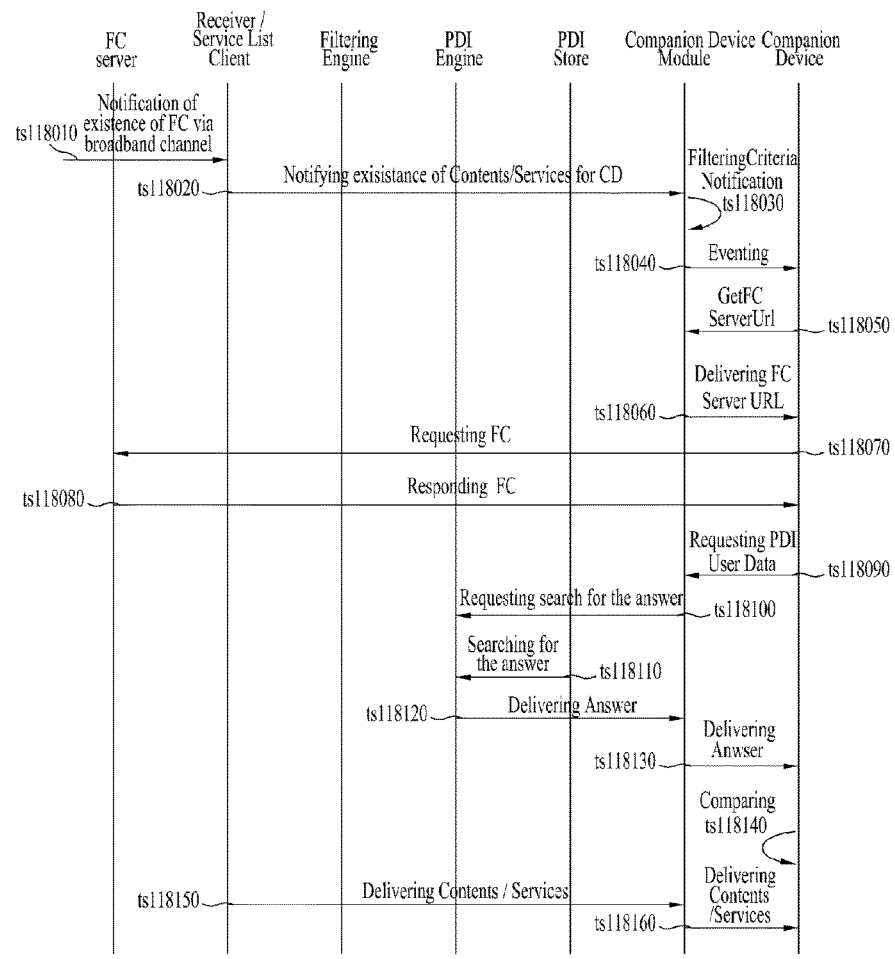
[Fig. 119]
| Variable Name | Req./Opt | DataType | Evented? | Moderated Event | Min Event Interval |
|---|---|---|---|---|---|
| FCServerUrl | Req. | List of string, or List of anyURI | No | N/A | N/A |
[Fig. 120]
| Variable Name | Req./Opt | DataType | Evented? | Moderated Event | Min Event Interval |
|---|---|---|---|---|---|
| FCServerUrl | Req. | String or List of Strings or List of aniURI | YES | N/A | N/A |

[Fig. 121]
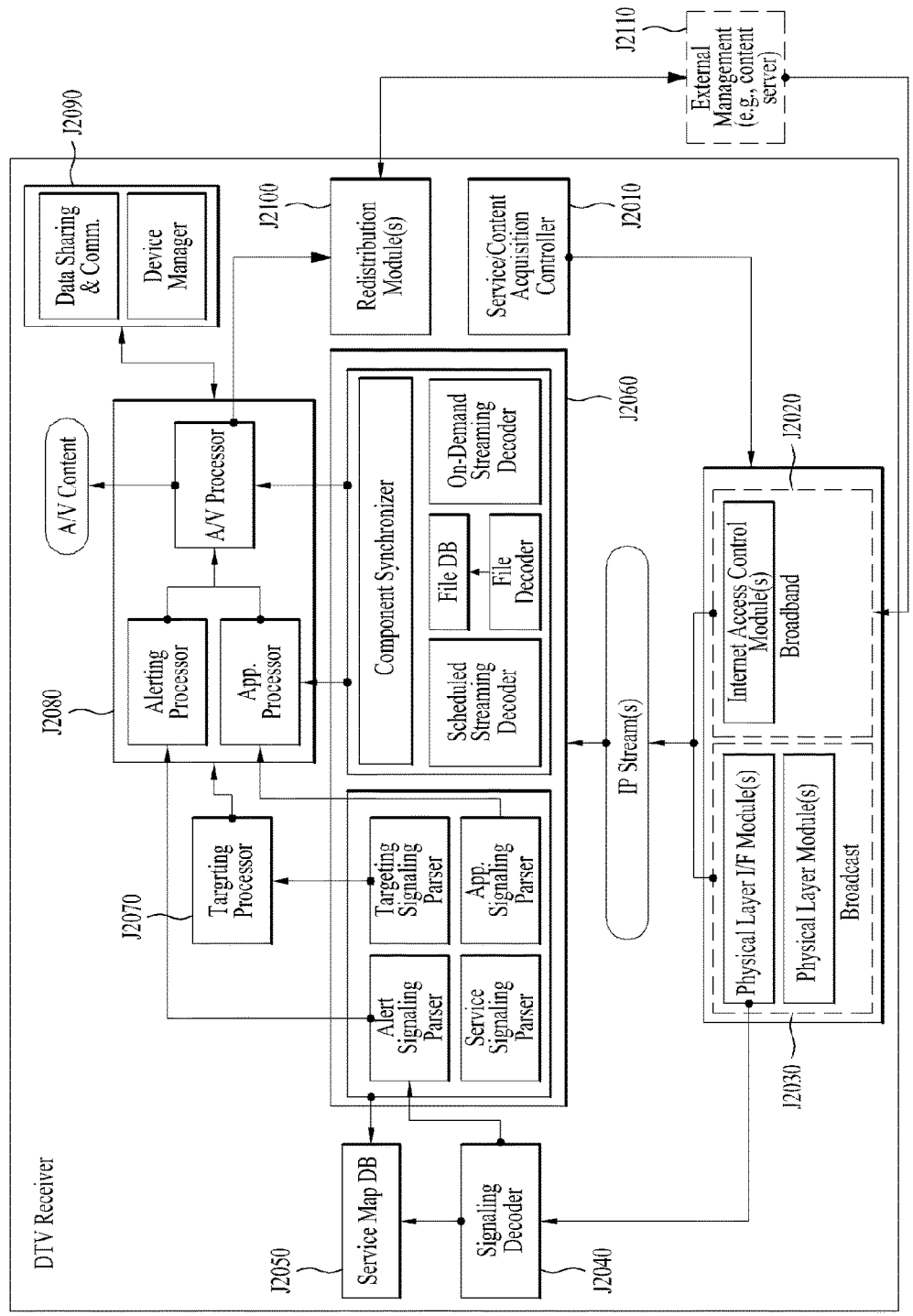

[Fig. 122]
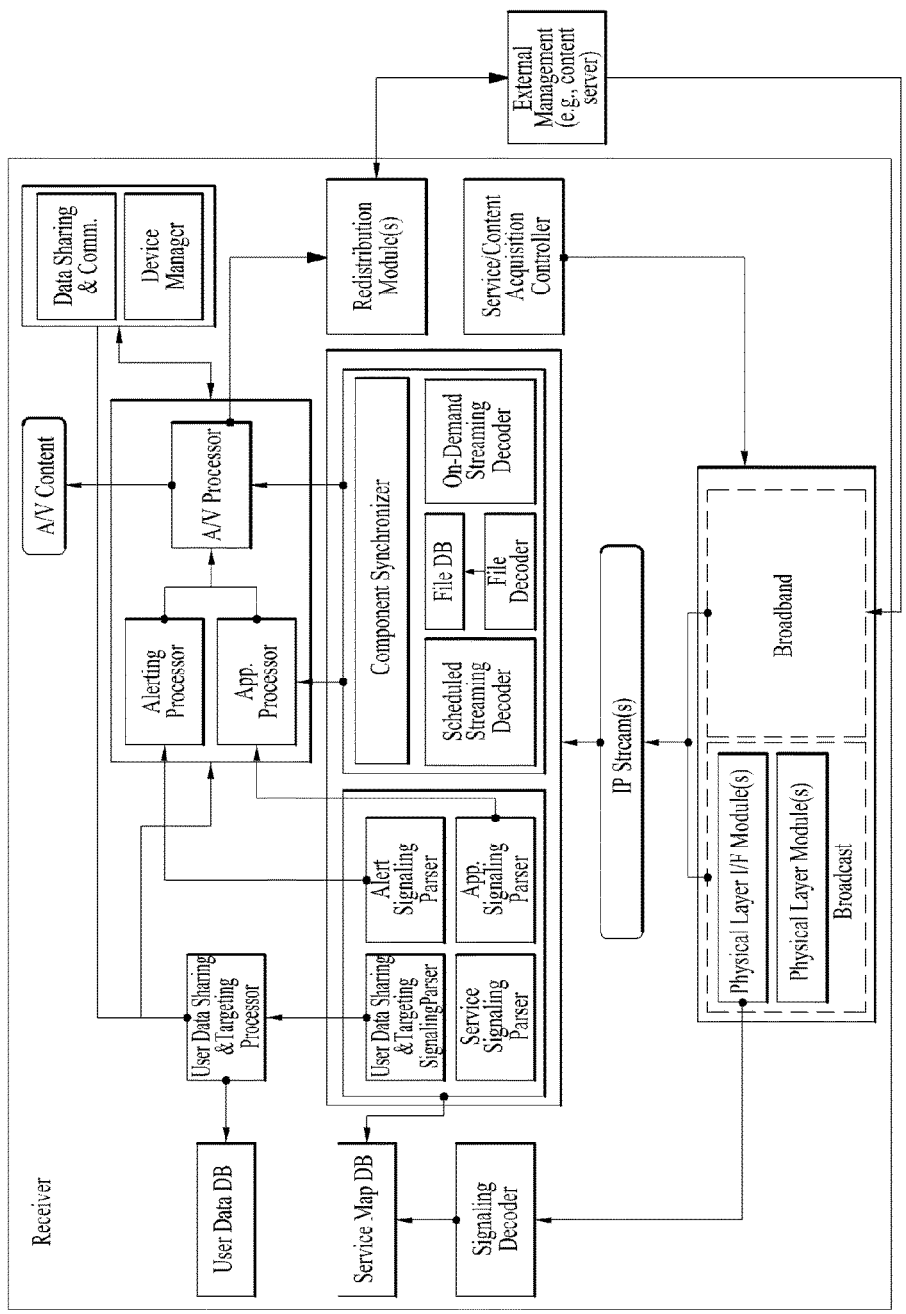

[Fig. 123]
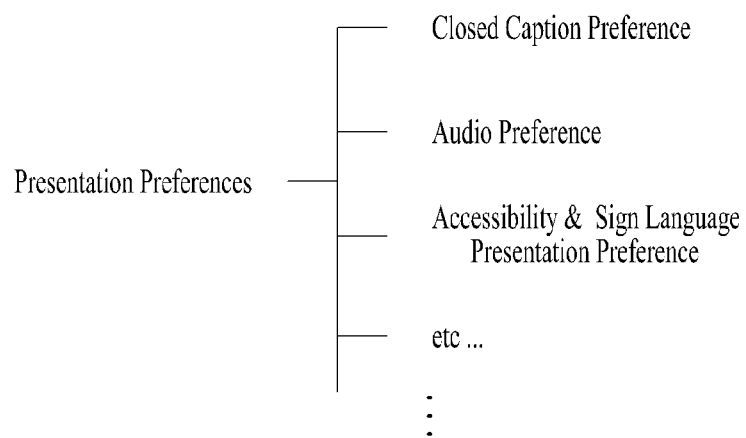

[Fig. 124]
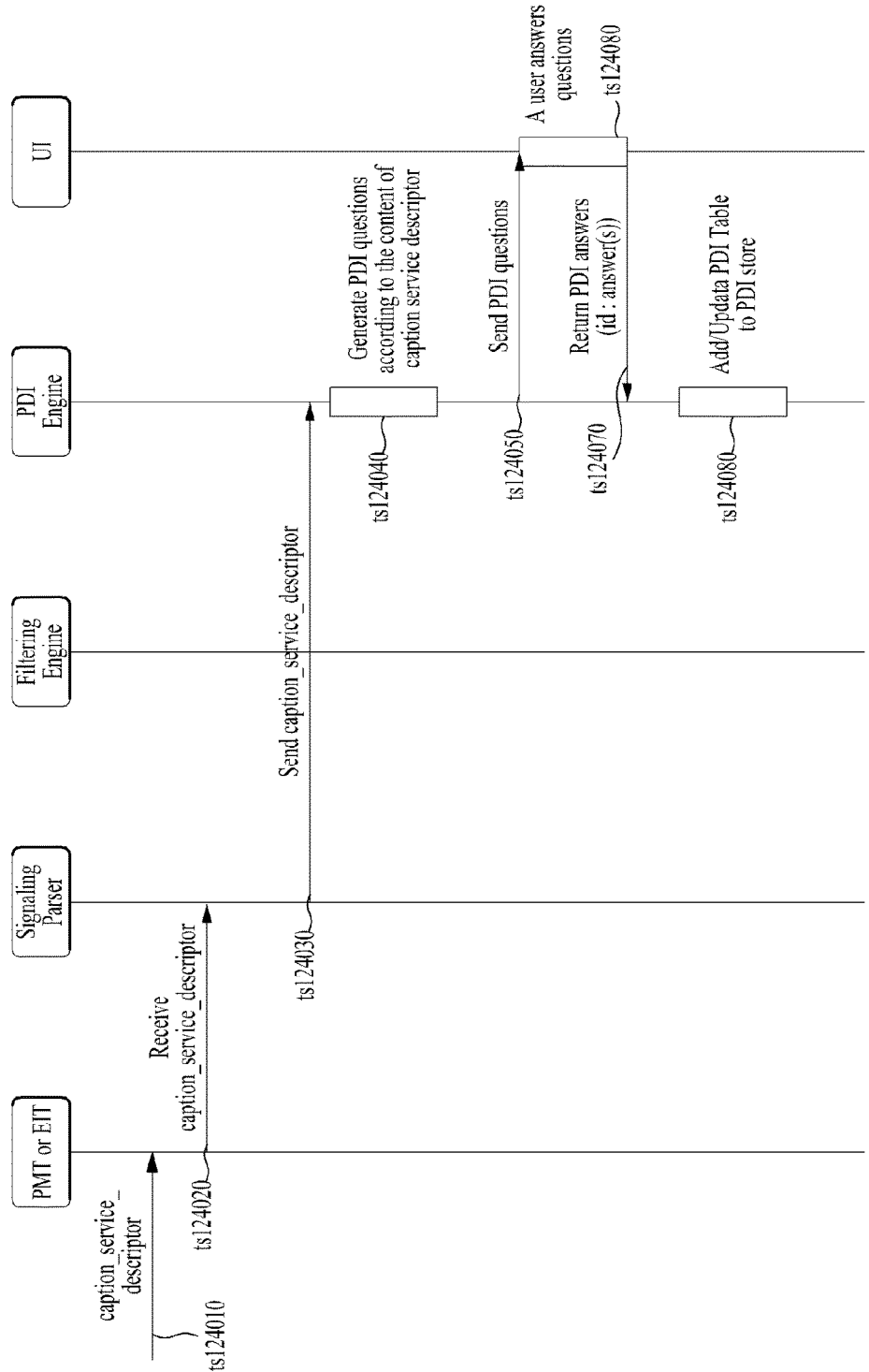

[Fig. 125]
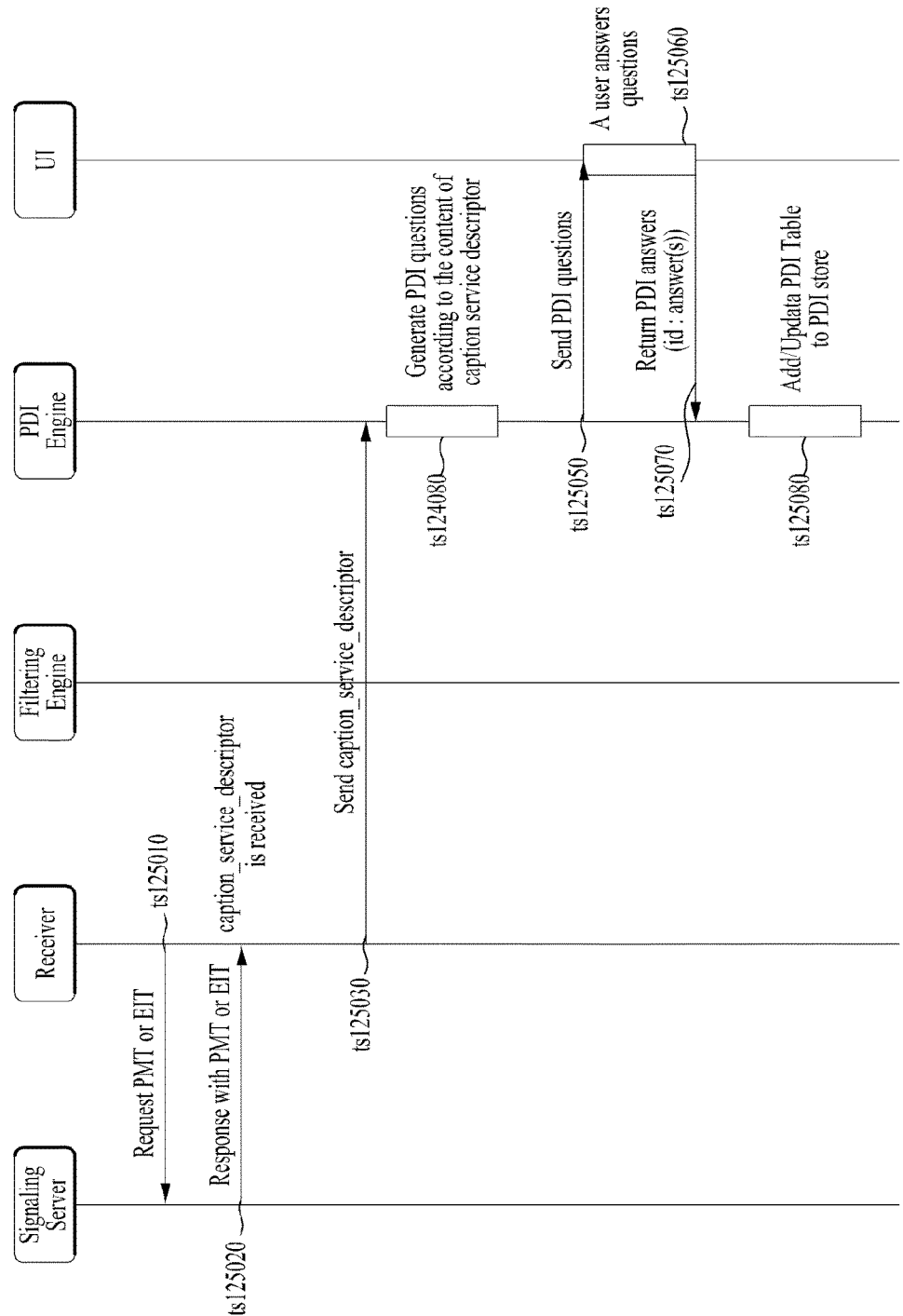

[Fig. 126]

| Field | No. of Bits | Format | Description |
|---|---|---|---|
| Font | 3 | uimsbf | Font style-Default(0), Monospaced with serifs(1), Proportionally spaced with serifs(2), Monospaced without serifs(3), Proportionally spaced without serifs(4), Casual font type(5), Cursive font type(6), Small capitals(7) |
| Font Size | 2 | uimsbf | Font size-Default(0), Standard(1), Small(2), Large(3) |
| Alignment | 3 | uimsbf | Alignment of characters-Default(0), Left(1), Right(2), Center(3), Full(4), Reserved(5~7) |
| Print Direction | 3 | uimsbf | Print Direction-Default(0), Left to Right(1), Right to Left(2), Top to Bottom (3), Bottom to Top (4), Reserved(5~7) |
| Scroll Direction | 3 | uimsbf | Scroll Direction-Default(0), Left to Right(1), Right to Left(2), Top to Bottom (3), Bottom to Top (4), Reserved(5~7) |

| Syntax | No. of Bits | Format |
|---|---|---|
| caption_service_descriptor(){ | 8 | 0x86 |
|   descriptor_tag | 8 | uimsbf |
|   descriptor_length | 3 | '111' |
|   reserved | 5 | uimsbf |
|   number_of_services | | |
|   for(i=0;i<number_of_services;i++){ | 8*3 | uimsbf |
|     language | 1 | bslbf |
|     digital_cc | 1 | '1' |
|     if(digital_cc== line21){ | | |
|       reserved | 5 | '11111' |
|       line21_field | 1 | bslbf |
|     } | | |
|     else | | |
|       caption_service_number | 6 | uimsbf |
|       easy_reader | 1 | bslbf |
|       wide_aspect_ratio | 1 | bslbf |
|       font | 3 | uimsbf |
|       font_size | 2 | uimsbf |
|       alignment | 3 | uimsbf |
|       print_direction | 3 | uimsbf |
|       scroll_direction | 3 | uimsbf |
|   } | | |
| } | | | t126010

[Fig. 127]

| | |
|---|---|
| Question ID: atsc.org/PDIQ/cc-status<br>Question type: QSA<br>Question text: "Are you using Closed Caption?"<br>Selections (with selection ID values):<br>  Yes (1)<br>  No (2)<br>Registration date: [TBD]<br>Organization: ATSC<br>Contact information: [TBD] | <a20:QSA id="atsc.org/PDIQ/cc-status minChoices ="1"><br>  <a20:Q xml:lang="en-us"><br>    <a20:Text>Are you using Closed Caption?</a20:Text><br>    <a20:Selection id="1">Yes</a20:Selection><br>    <a20:Selection id="2">No</a20:Selection><br>  </a20:Q ><br></a20:QSA> |

[Fig. 128]

| | |
|---|---|
| Question ID: atsc.org/PDIQ/cc-language<br>Question type: QSA<br>Question text: "Which Closed Caption language do you prefer?"<br>Selections:<br>  English (1)<br>  French (2)<br>  Italian (3)<br>  Etc (4)<br><br>Registration date: [TBD]<br>Organization: ATSC<br>Contact information: [TBD] | `<a20:QSA id="atsc.org/PDIQ/cc-language" minChoices="1">`<br>  `<a20:Q xml:lang="en-us">`<br>    `<a20:Text> Which language do you prefer?</a20:Text>`<br>    `<a20:Selection id="1">English</a20:Selection>`<br>    `<a20:Selection id="2">French</a20:Selection>`<br>    `<a20:Selection id="3">Italian</a20:Selection>`<br>    `<a20:Selection id="4">Etc</a20:Selection>`<br>  `</a20:Q>`<br>`</a20:QSA>` |

[Fig. 129]

| | |
|---|---|
| Question ID: atsc.org/PDIQ/cc-font<br>Question type: QSA<br>Question text: "Which font of Closed Caption do you prefer?"<br>QSA selections:<br>  Default (1)<br>  Monospaced with serifs (similar to Courier) (2)<br>  Proportionally spaced with serifs (similar to Times New Roman) (3)<br>  Monospaced without serifs (similar to Helvetica Monospaced ) (4)<br>  Proportionally spaced without serifs (similar to Arial and Swiss) (5)<br>  Casual font type (similar to Dom and Impress) (6)<br>  Cursive font type (similar to Coronet and Marigold) (7)<br>  Small capitals (similar to Engravers Gothic) (8)<br>Registration date: [TBD]<br>Organization: ATSC<br>Contact information: [TBD] | <a20:QSA id="atsc.org/PDIQ/cc -font" minChoices ="1"><br> <a20:Q xml:lang ="en-us"><br>  <a20:Text >Which font of Closed Caption do you prefer?<br>  </a20:Text ><br>  <a20:Selection id="1">Default</ a20:Selection ><br>  <a20:Selection id="2"> Monospace with serifs </ a20:Selection ><br>  <a20:Selection id="3">Proportionally spaced with serifs </ a20:Selection ><br>  <a20:Selection id="4"> Monospaced without serifs</ a20:Selection ><br>  <a20:Selection id="5">Proportionally spaced without serifs</ a20:Selection ><br>  <a20:Selection id="6">Casual font type </ a20:Selection ><br>  <a20:Selection id="7">Cursive font type</ a20:Selection ><br>  <a20:Selection id="8">Small capitals</ a20:Selection ><br> </a20:Q ><br></a20:QSA > |

[Fig. 130]

| | |
|---|---|
| Question ID: atsc.org/PDIQ/cc-fontsize<br>Question type: QSA<br>Question text: "Which font size of Closed Caption do you prefer?"<br>QSA selections:<br>   Default (1)<br>   Small (2)<br>   Normal (3)<br>   Big (4)<br>Registration date: [TBD]<br>Organization: ATSC<br>Contact information: [TBD] | <a20:QSA id="atsc.org/PDIQ/cc-fontsize minChoices="1"><br>  <a20:Q xml:lang="en-us"><br>    <a20:Text >Which font size of Closed Caption do you prefer?<br>    </a20:Text><br>    <a20:Selection id="1">Default</a20:Selection><br>    <a20:Selection id="2">Small</a20:Selection><br>    <a20:Selection id="3">Normal</a20:Selection><br>    <a20:Selection id="4">Big</a20:Selection><br>  </a20:Q><br></a20:QSA> |

[Fig. 131]

| | |
|---|---|
| Question ID: atsc.org/PDIQ/cc-alignment<br>Question type: QSA<br>Question text: "Which alignment of Closed Caption do you prefer?"<br>QSA selections:<br>   Default (1)<br>   Left (2)<br>   Right (3)<br>   Center (4)<br>   Full (5)<br>Registration date: [TBD]<br>Organization: ATSC<br>Contact information: [TBD] | <a20:QSA id="atsc.org/PDIQ/cc-alignment" minChoices="1"><br>  <a20:Q xml:lang="en-us"><br>    <a20:Text >Which alignment of Closed Caption do you prefer?<br>    </a20:Text><br>    <a20:Selection id="1">Default</a20:Selection><br>    <a20:Selection id="2">Left</a20:Selection><br>    <a20:Selection id="3">Right</a20:Selection><br>    <a20:Selection id="4">Center</a20:Selection><br>    <a20:Selection id="5">Full</a20:Selection><br>  </a20:Q><br></a20:QSA> |

[Fig. 132]

Question ID: atsc.org/PDIQ/cc-printdirection
Question type: QSA
Question text: Which print direction of Closed Caption do you prefer?
Selections:
  Default (1)
  Left to Right (2)
  Right to Left (3)
  Top to Bottom (4)
  Bottom to Top (5)
Registration date: [TBD]
Organization: ATSC
Contact information: [TBD]

```
<a20:QSA id=" atsc.org/PDIQ/cc printdirection " minChoices ="1">
  <a20:Q xml:lang =" en -us">
    <a20:Text > Which print direction of Closed Caption do you prefer? </ a20:Text >
    <a20:Selection id="1">Default</ a20:Selection >
    <a20:Selection id="2">Left to Right</ a20:Selection >
    <a20:Selection id="3">Right to Left</ a20:Selection >
    <a20:Selection id="4">Top to Bottom</ a20:Selection >
    <a20:Selection id="4">Bottom to Top</ a20:Selection >
  </ a20:Q >
</ a20:QSA >
```

[Fig. 133]

| | |
|---|---|
| Question ID: atsc.org/PDIQ/cc-scrolldirection<br>Question type: QSA<br>Question text: "Which scroll direction of Closed Caption do you prefer?"<br>Selections:<br>  Default (1)<br>  Left to Right (2)<br>  Right to Left (3)<br>  Top to Bottom (4)<br>  Bottom to Top (5)<br>Registration date: [TBD]<br>Organization: ATSC<br>Contact information: [TBD] | `<a20:QSA id="atsc.org/PDIQ/cc-scrolldirection" minChoices ="1">`<br>  `<a20:Q xml:lang="en-us">`<br>  `<a20:Text>`Which scroll direction of Closed Caption do you prefer?`</a20:Text>`<br>    `<a20:Selection id="1">`Default`</a20:Selection>`<br>    `<a20:Selection id="2">`Left to Right`</a20:Selection>`<br>    `<a20:Selection id="3">`Right to Left`</a20:Selection>`<br>    `<a20:Selection id="4">`Top to Bottom`</a20:Selection>`<br>    `<a20:Selection id="4">`Bottom to Top`</a20:Selection>`<br>  `</a20:Q>`<br>`</a20:QSA>` |

[Fig. 134]

| Question ID: atsc.org/PDIQ/cc-easyreader<br>Question type: QSA<br>Question text: "Are you using Easy Reader Mode?"<br>Selections (with selection ID values):<br>    Yes (1)<br>    No (2)<br>Registration date: [TBD]<br>Organization: ATSC<br>Contact information: [TBD] | `<a20:QSA id=" atsc.org/PDIQ/cc-easyreader minChoices ="1">`<br>  `<a20:Q xml:lang ="en-us">`<br>    `<a20:Text >Are you using Easy Reader Mode ?</ a20:Text >`<br>    `<a20:Selection id="1">Yes</a20:Selection >`<br>    `<a20:Selection id="2">No</ a20:Selection >`<br>  `</ a20:Q >`<br>`</ a20:QSA >` |

[Fig. 135]
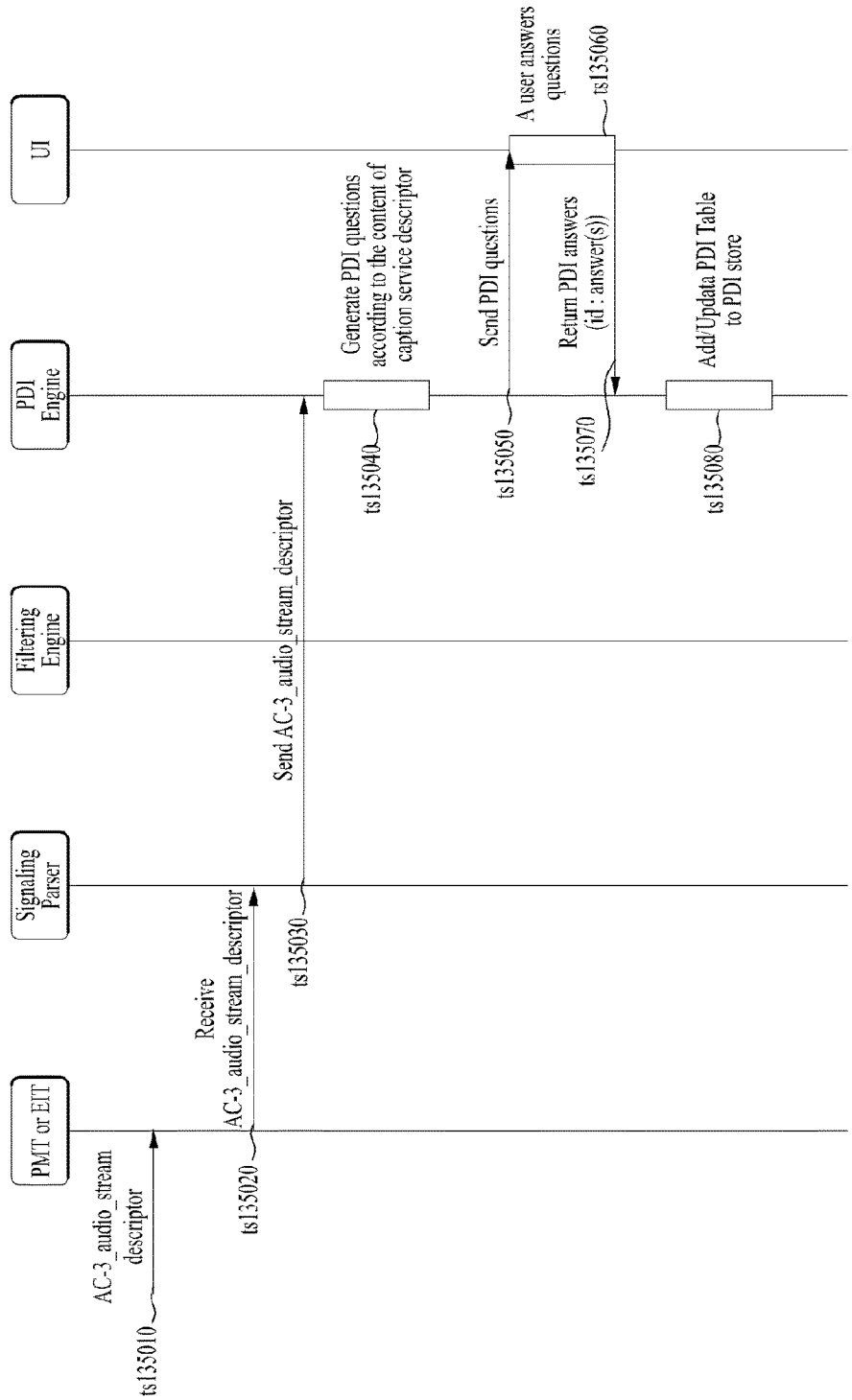

[Fig. 136]
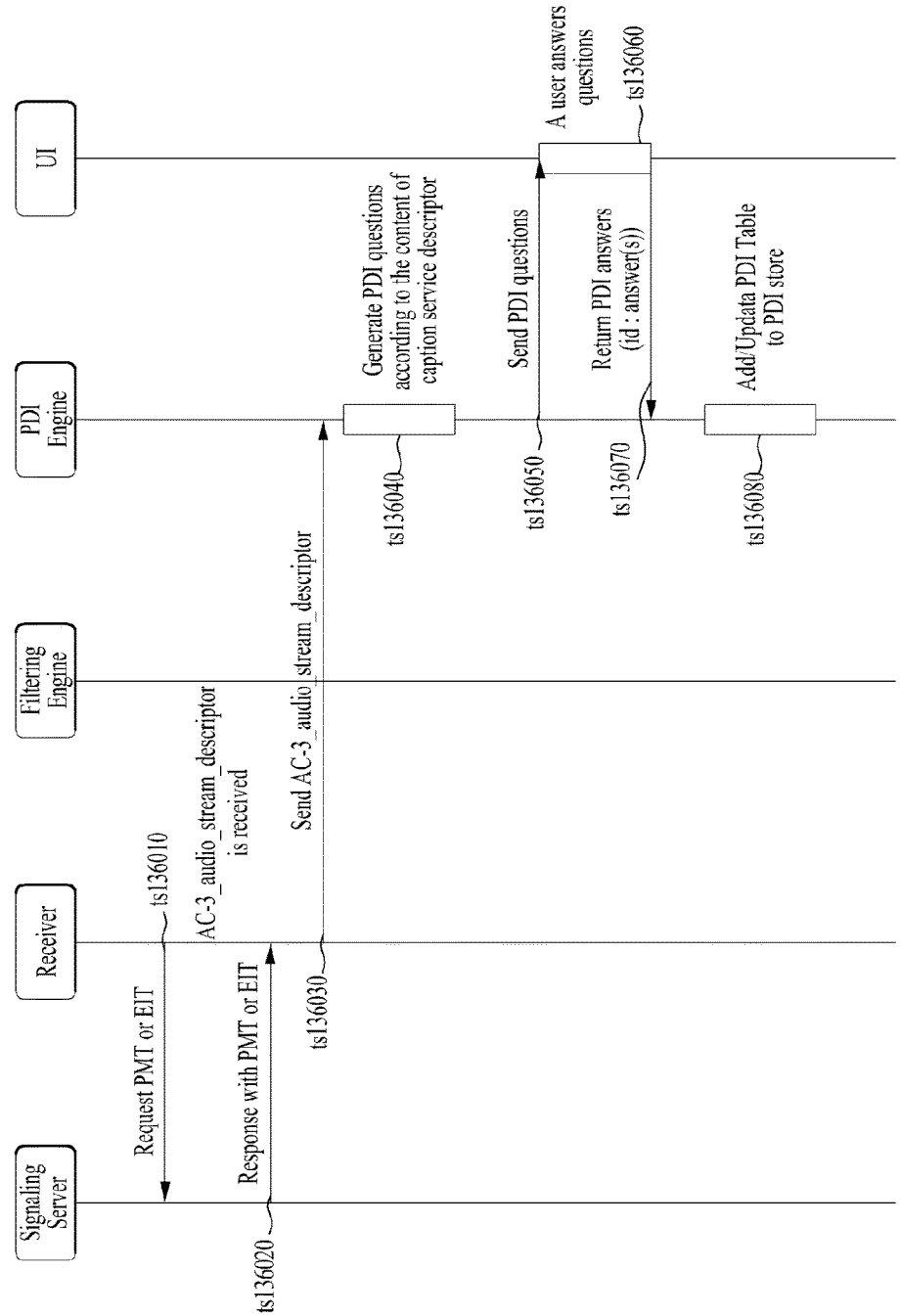

[Fig. 137]

| Field | No. of Bits | Format | Description |
|---|---|---|---|
| langcod | 8 | bslbf | Audio language code |
| bsmod | 3 | bslbf | '000' - main audio service : complete main<br>'001' - main audio service : music and effects<br>'010'- associated service : visually impaired<br>'011'- associated service : hearing impaired<br>'100'- associated service : dialogue<br>'101'- associated service : commentary<br>'110'- associated service : emergency |

[Fig. 138]

| Question ID: atsc.org/PDIQ/audio-language <br> Question type: QSA <br> Question text: "Which audio language do you prefer?" <br> Selections: <br>    English (1) <br>    French (2) <br>    Italian (3) <br>    Etc (4) <br><br> Registration date: [TBD] <br> Organization: ATSC <br> Contact information: [TBD] | `<a20:QSA id=" atsc.org/PDIQ/audio-language" minChoices="1">`<br>`<a20:Q xml:lang ="en-us">`<br>`<a20:Text > Which audio language do you prefer? </ a20:Text >`<br>`<a20:Selection id="1">English</ a20:Selection >`<br>`<a20:Selection id="2">French</ a20:Selection >`<br>`<a20:Selection id="3">Italian</ a20:Selection >`<br>`<a20:Selection id="4">Etc</a20:Selection >`<br>`</ a20:Q >`<br>`</ a20:QSA >` |

[Fig. 139]

| | |
|---|---|
| Question ID: atsc.org/PDIQ/audio-hearingimpaired<br>Question type: QSA<br>Question text: "Are you using audio hearing impaired mode?"<br>QSA selections:<br>   Yes(1)<br>   No (2)<br>Registration date: [TBD]<br>Organization: ATSC<br>Contact information: [TBD] | `<a20:QSA id="atsc.org/PDIQ/caudio-hearingimpaired" minChoices="1">`<br>  `<a20:Q xml:lang="en-us">`<br>    `<a20:Text>`Are you using audio hearing impaired mode?<br>    `</a20:Text>`<br>    `<a20:Selection id="1">`Yes`</a20:Selection>`<br>    `<a20:Selection id="2">`No`</a20:Selection>`<br>  `</a20:Q>`<br>`</a20:QSA>` |

[Fig. 140]

| Question ID: atsc.org/PDIQ/audio -visuallyimpaired<br>Question type: QSA<br>Question text: "Are you using audio visually impaired mode?"<br>Selections (with selection ID values):<br>   Yes (1)<br>   No (2)<br>Registration date: [TBD]<br>Organization: ATSC<br>Contact information: [TBD] | `<a20:QSA id=" atsc.org/PDIQ/audio visuallyimpaired minChoices ="1">`<br>  `<a20:Q xml:lang =" en -us ">`<br>    `<a20:Text >Are you using audio visually impaired mode ?</ a20:Text >`<br>    `<a20:Selection id=" 1 ">Yes</ a20:Selection >`<br>    `<a20:Selection id=" 2 ">No</ a20:Selection >`<br>  `</ a20:Q >`<br>`</ a20:QSA >` |

[Fig. 141]
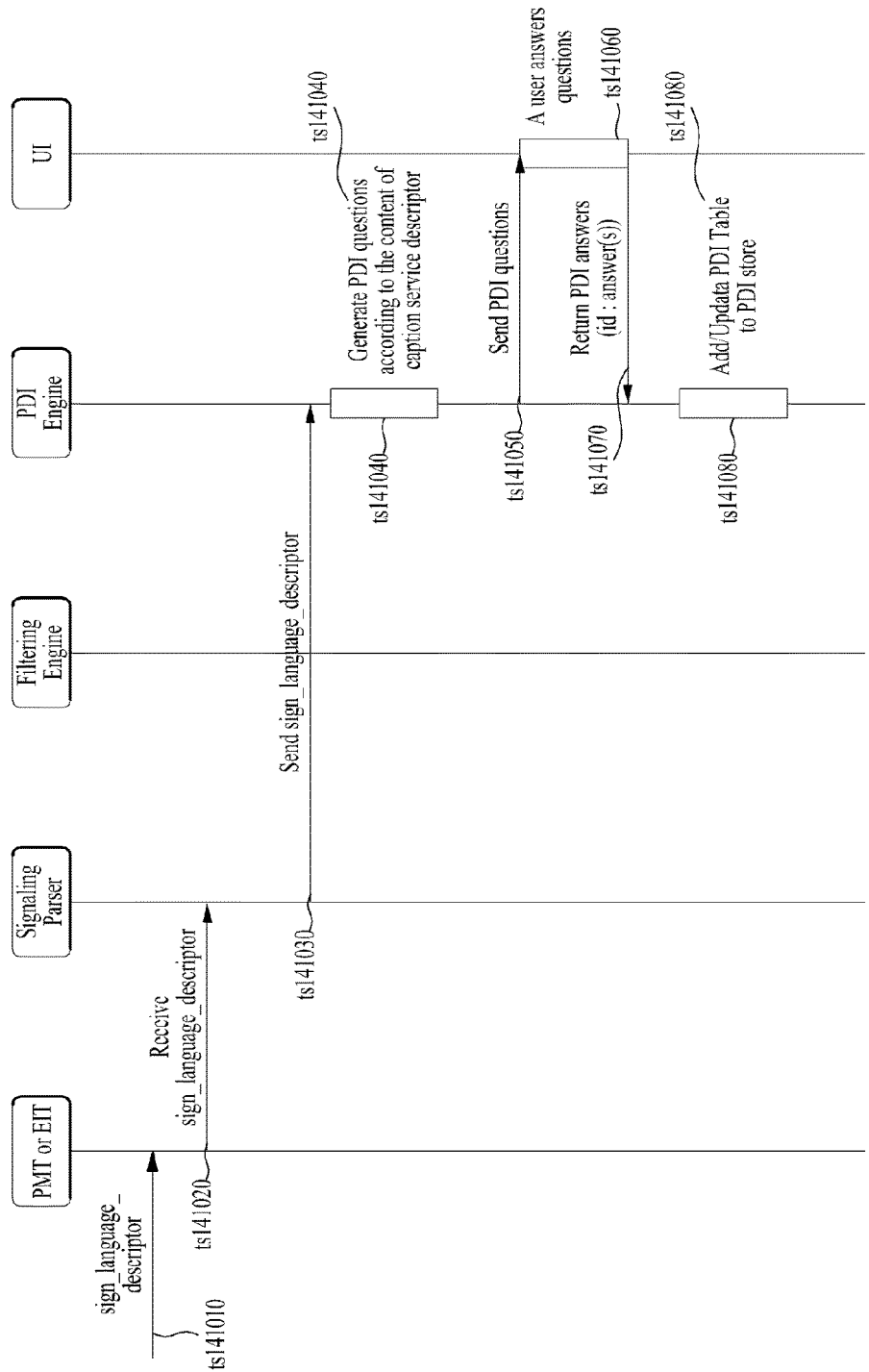

[Fig. 142]
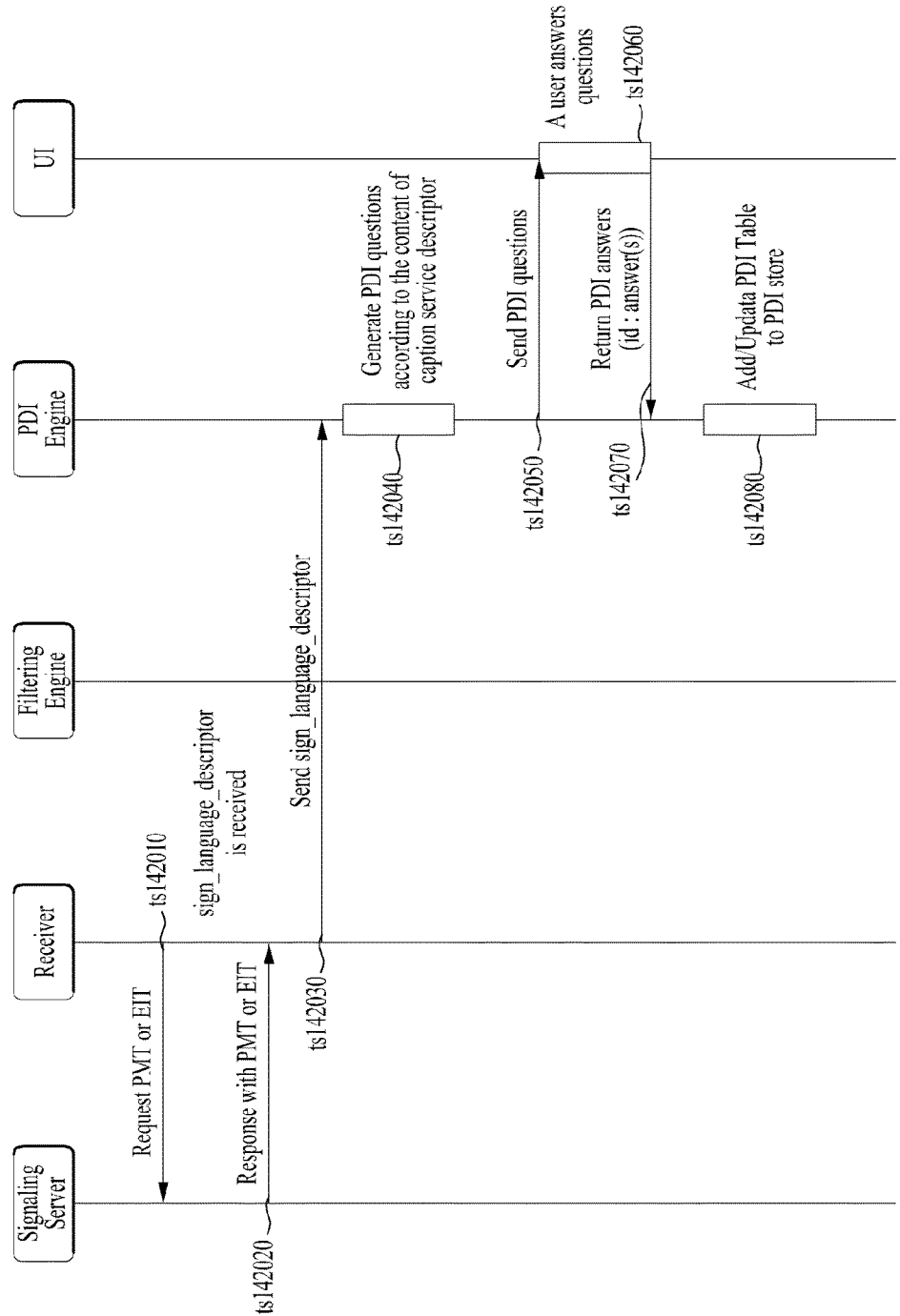

[Fig. 143]

| Syntax | No. of Bits | Format |
|---|---|---|
| sign_languagecaption_descriptor (){ | | |
|    descriptor_tag | 8 | TBD |
|    descriptor_length | 8 | uimsbf |
|    reserved | 3 | '111' |
|    number_of_services | 5 | uimsbf |
|    for( i=0; i<number_of_services ; i++){ | | |
|       language | 8*3 | uimsbf |
|       resolution | 3 | uimsbf |
|       codec | 3 | uimsbf |
|       location | 3 | uimsbf |
|    } | | |
| } | | |

[Fig. 144]

Question ID: atsc.org/PDIQ/ signlanguage -status
Question type: QSA
Question text: "Are you using sign language mode?"
Selections:
  Yes (1)
  No (2)
Registration date: [TBD]
Organization: ATSC
Contact information: [TBD]

```
<a20:QSA id ="atsc.org/PDIQ/ signlanguage -status" minChoices ="1">
  <a20:Q xml:lang =" en -us ">
    <a20:Text > Are you using sign language mode?</a20:Text >
    <a20:Selection id="1">Yes</a20:Selection >
    <a20:Selection id="2">No</a20:Selection >
  </a20:Q >
</a20:QSA >
```

[Fig. 145]

Question ID: atsc.org/PDIQ/signlanguage-language
Question type: QSA
Question text: "Which sign language are you using?"
QSA selections
  ASL (American Sign Language) (1)
  LSF (French Sign Language) (2)
  LSM (Mexican Sign Language) (3)
  KSL (Korean Sign Language) (4)
  Etc (5)
Registration date: [TBD]
Organization: ATSC
Contact information: [TBD]

```
<a20:QSA id="atsc.org/PDIQ/signlanguage" minChoices="1">
  <a20:Q xml:lang="en-us">
    <a20:Text>Which sign language are you using?</a20:Text>
    <a20:Selection id="1">ASL</a20:Selection>
    <a20:Selection id="2">LSF</a20:Selection>
    <a20:Selection id="1">LSM</a20:Selection>
    <a20:Selection id="1">KSL</a20:Selection>
    <a20:Selection id="1">etc</a20:Selection>
  </a20:Q>
</a20:QSA>
```

[Fig. 146]

Question ID: atsc.org/PDIQ/signlanguage-location
Question type: QSA
Question text: "Which location of sign language do you prefer to present?"
QSA selections:
 Lower-Left (1)
 Lower-Right (2)
 Upper-Left (3)
 Upper-Right (4)
 Auto-Selection (5)
Registration date: [TBD]
Organization: ATSC
Contact information: [TBD]

```
<a20:QSA id="atsc.org/PDIQ/signlanguage-location" minChoices="1">
    <a20:Q xml:lang="en-us">
        <a20:Text>Which location of sign language do you prefer to present
        </a20:Text>
        <a20:Selection id="1">Lower-Left</a20:Selection>
        <a20:Selection id="2">Lower-Right</a20:Selection>
        <a20:Selection id="1">Upper-Left</a20:Selection>
        <a20:Selection id="1">Upper-Right</a20:Selection>
        <a20:Selection id="1">Auto-Selection</a20:Selection>
    </a20:Q>
</a20:QSA>
```

[Fig. 147]
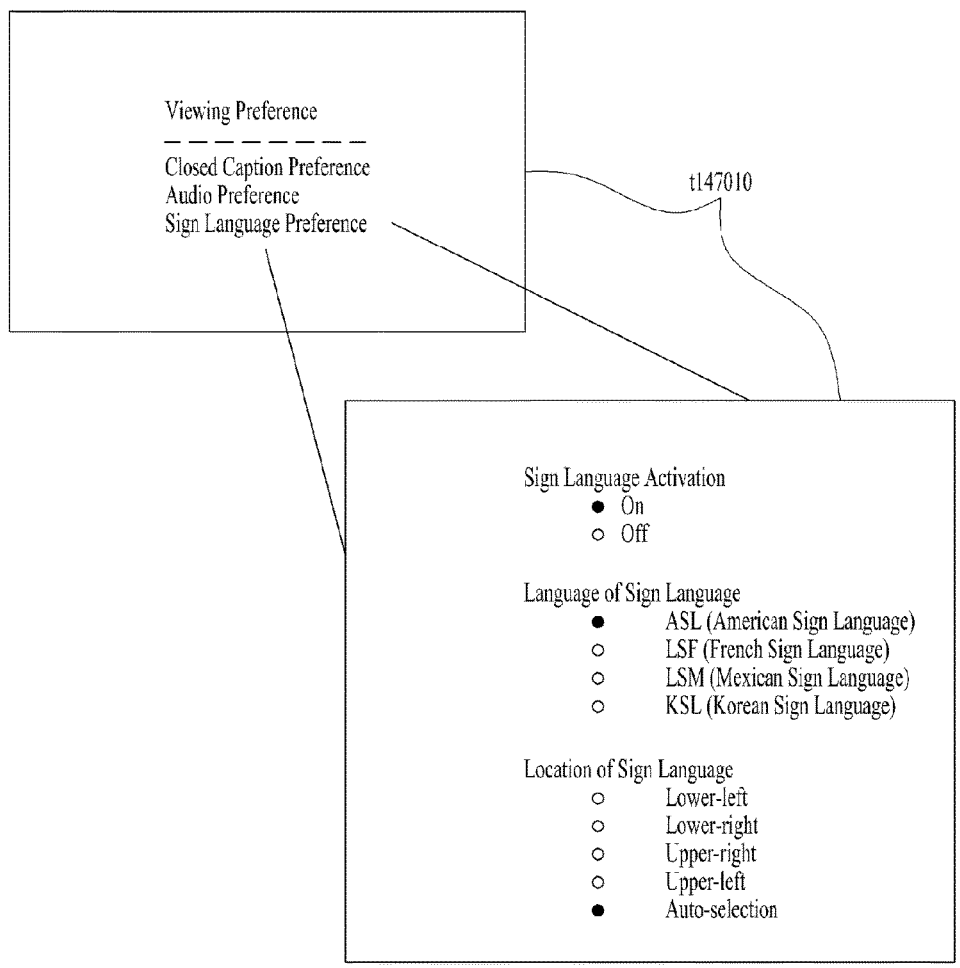

[Fig. 148]
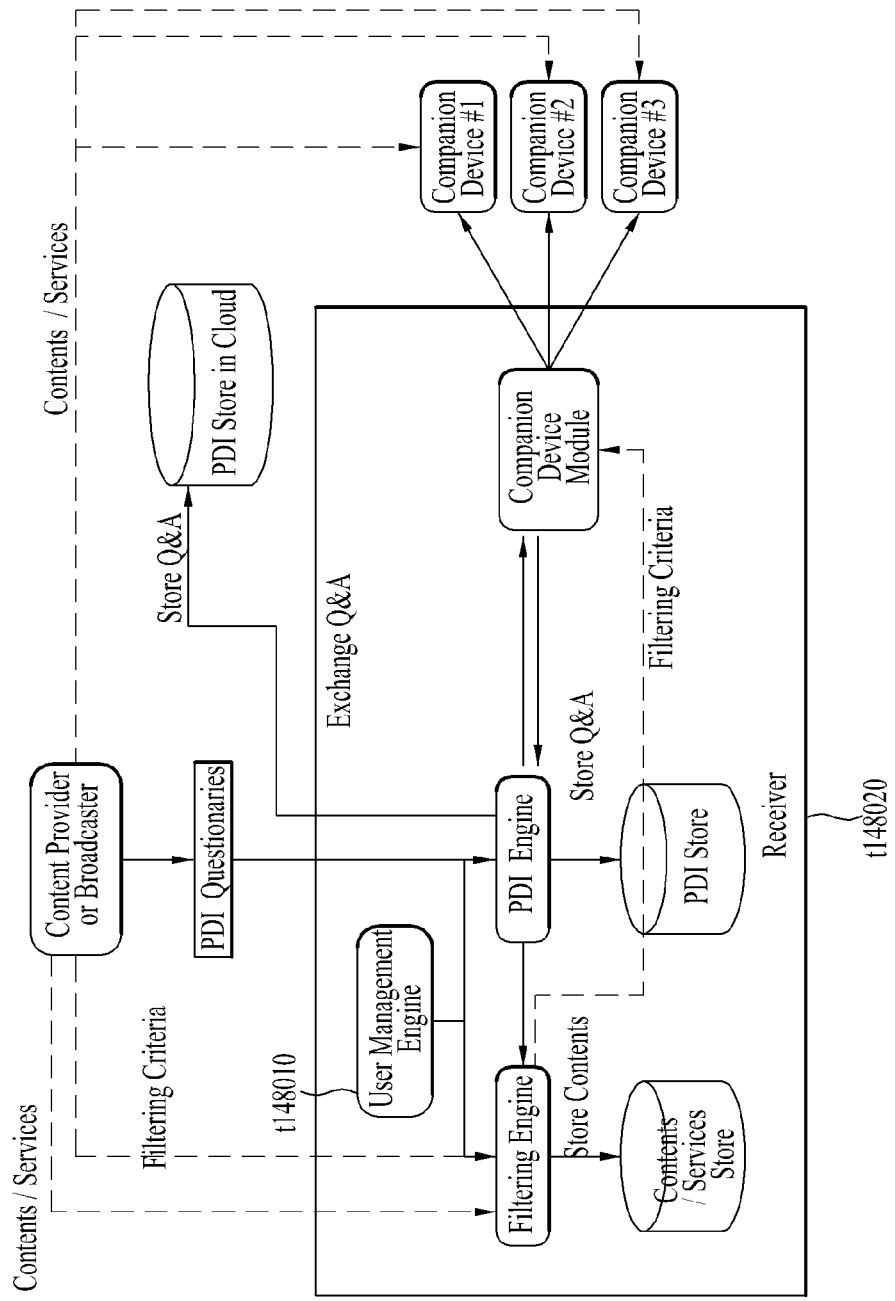

| Tape/Element/Attribute | | Cardinality | XML data type | Description |
|---|---|---|---|---|
| PDIUserData | | | | Table of PDI user data (questions/answers) |
| | @protocolVersion | 0..1 | hexBonary | Protocol version (major/minor) |
| | @userDataId | 1 | anyURI | Globally unique ID of PDI user data |
| | @userDataVersion | 1 | unsignedByte | PDI user data version |
| | @time | 1 | dateTime | Time table PDI user data last updated |
| | @user_id | 1 | string | Userid |
| | <choice> | 1..N | | Choice among QIA QBA QSA QTA QAA |
| | QIA | 1 | QIAType | Question with integer answer |

⋮ t149020

| Tape/Element/Attribute | | Cardinality | XML data type | Description |
|---|---|---|---|---|
| QIAType | | | | Type for question with integer answer |
| | @id | 1 | anyURI | Globally unique ID of Q&A |
| | @expire | 0..1 | dataTime | Expriation data/time for Q&A |
| | @user_id | 1 | string | User ID |

⋮

[Fig. 150]
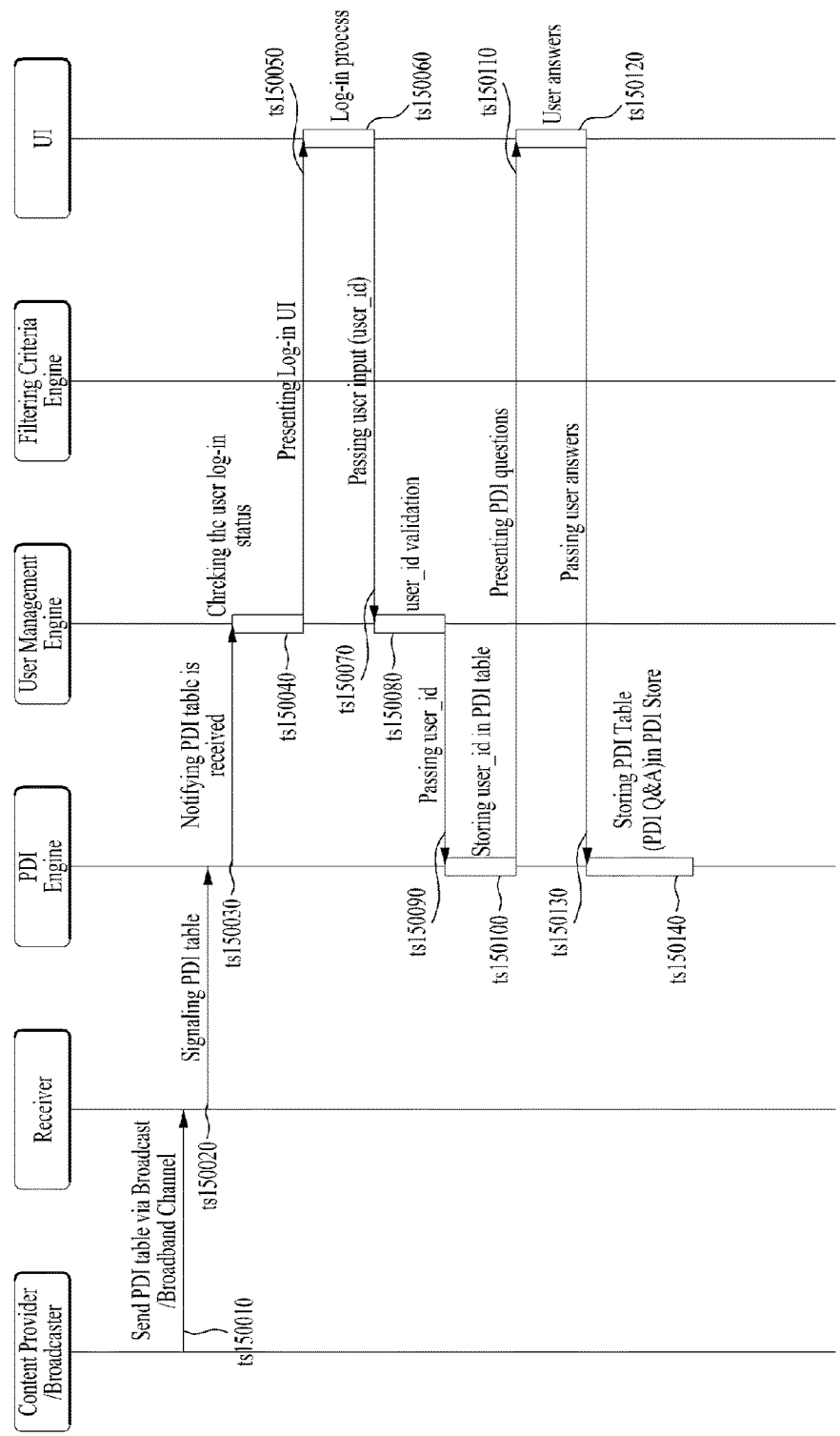

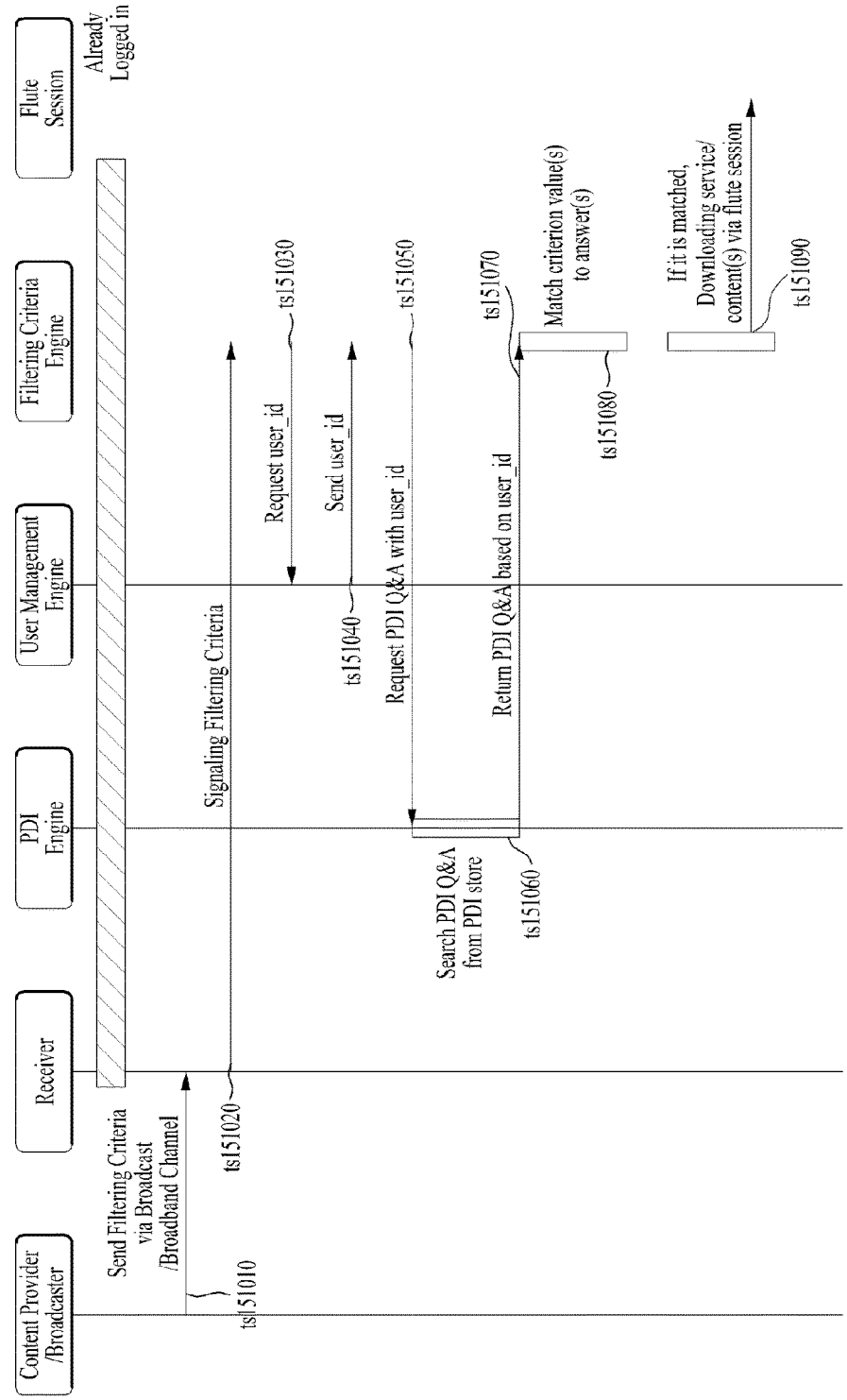
[Fig. 151]

[Fig. 152]
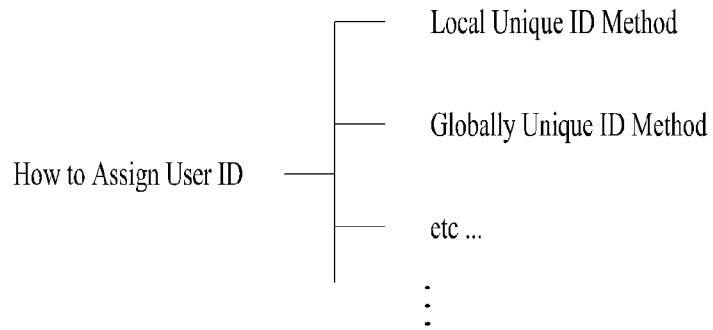
[Fig. 153]
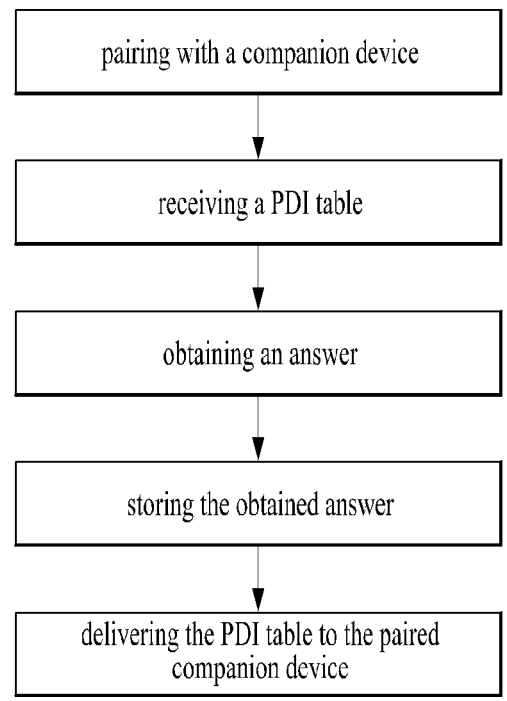

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS REFERENCE TO RELATED APPLICATIONS

This application is the National Phase of PCT International Application No. PCT/KR2014/012201, filed on Dec. 11, 2014, which claims priority under 35 U.S.C. 119(e) to U.S. Provisional Application No. 61/920,485, filed on Dec. 24, 2013 and 62/018,669, filed on Jun. 30, 2014, all of which are hereby expressly incorporated by reference into the present application.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

DISCLOSURE OF INVENTION

Technical Problem

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Solution to Problem

To achieve the object and other advantages and in accordance with the purpose of the invention, as embodied and broadly described herein, the present invention provides a method of providing interactive contents based on personal interests. The method of providing interactive contents based on personal interests includes pairing with a companion device; receiving a PDI (Profiles, Demographics, Interests) table via broadcast signals, wherein the PDI table includes plural PDI questions related to personal interests for interactive contents, wherein the PDI table includes an ID identifying the PDI table; obtaining an answer for at least one of the PDI questions; storing the obtained answer in the PDI table; and delivering the PDI table having the obtained answer to the paired companion device.

Preferably, the delivering the PDI table further includes: receiving a first request for list of IDs of PDI tables, from the companion device; delivering the requested list of IDs of PDI tables to the companion device; receiving a second request for the PDI table having a certain ID in the list of IDs, from the companion device; and delivering the requested PDI table to the companion device.

Preferably, the delivering the PDI table is conducted by using UserData service, wherein the UserData service is an UPnP service for delivering the PDI table, wherein the first request is based on a first UPnP action of the UserData service, wherein the first UPnP action is for obtaining the list of IDs of PDI tables, wherein the first UPnP action has a protocol version information of the UserData service as an input argument, and the list of IDs of PDI tables as an output argument, wherein the second request is based on a second UPnP action of the UserData service, wherein the second UPnP action is for obtaining the PDI table having a certain ID in the list of IDs, and wherein the second UPnP action has the list of IDs of PDI tables as an input argument, and the PDI table as an output argument.

Preferably, the method further includes: receiving a subscription for UserData service from the companion device, wherein the UserData service is an UPnP service for delivering the PDI table;

wherein the delivering the PDI table further includes: sending a notification to the companion device when either the answer in the PDI table is updated or new PDI table is received; and delivering the PDI table having the updated answer or the new PDI table to the companion device.

Preferably, the method further includes receiving an interactive content and a filtering criteria associated with the interactive content, wherein the filtering criteria includes information about nature of the associated interactive content; delivering the filtering criteria to the companion device, wherein the filtering criteria is compared with the PDI table in the companion device; and delivering the interactive content if the filtering criteria is matched with answers in the PDI table.

Preferably, the delivering the filtering criteria further includes: notifying the companion device that the interactive content for the companion device is received; receiving a third request for the filtering criteria associated with the interactive content, from the companion device; and delivering the filtering criteria to the companion device.

Preferably, the delivering the filtering criteria is conducted by using FilteringCriteria service, wherein the FilteringCriteria service is an UPnP service for delivering the filtering criteria, wherein the third request is based on a third UPnP action of the FilteringCriteria service, wherein the third UPnP action is for obtaining the filtering criteria, and wherein the third UPnP action has the filtering criteria as an output argument.

Preferably, the method further includes: delivering the received PDI table to the companion device, wherein the answer for the at least one PDI question is stored in the delivered PDI table; and receiving the PDI table having the answer, from the companion device.

Preferably, the method further includes: updating the stored answer by replacing with the answer in the PDI table from the companion device.

Preferably, each of the PDI questions in the PDI table include a question ID, wherein the delivering the PDI table further includes: receiving a fourth request for list of question IDs of PDI questions, from the companion device; delivering the requested list of question IDs of PDI questions, to the companion device; receiving a fifth request for the PDI question having a certain question ID in the list of question IDs, from the companion device; and delivering the requested PDI question and the answer to the requested PDI question, to the companion device.

In another aspect, the present invention provides an apparatus for of providing interactive contents based on personal interests. The apparatus for of providing interactive contents based on personal interests includes a paring module that pairs with a companion device; a receiving module that receives a PDI (Profiles, Demographics, Interests) table via broadcast signals, wherein the PDI table includes plural PDI questions related to personal interests for interactive contents, wherein the PDI table includes an ID identifying the PDI table; an answer obtaining module that obtains an answer for at least one of the PDI questions; a PDI storing module that stores the obtained answer in the PDI table; and a companion device module that delivers the PDI table having the obtained answer to the paired companion device.

Preferably, the companion device module further conduct: receiving a first request for list of IDs of PDI tables, from the companion device; delivering the requested list of IDs of PDI tables to the companion device; receiving a second request for the PDI table having a certain ID in the list of IDs, from the companion device; and delivering the requested PDI table to the companion device.

Preferably, the delivering the PDI table is conducted by using UserData service, wherein the UserData service is an UPnP service for delivering the PDI table, wherein the first request is based on a first UPnP action of the UserData service, wherein the first UPnP action is for obtaining the list of IDs of PDI tables, wherein the first UPnP action has a protocol version information of the UserData service as an input argument, and the list of IDs of PDI tables as an output argument, wherein the second request is based on a second UPnP action of the UserData service, wherein the second UPnP action is for obtaining the PDI table having a certain ID in the list of IDs, and wherein the second UPnP action has the list of IDs of PDI tables as an input argument, and the PDI table as an output argument.

Preferably, the companion device module further conduct: receiving a subscription for UserData service from the companion device, wherein the UserData service is an UPnP service for delivering the PDI table; sending a notification to the companion device when either the answer in the PDI table is updated or new PDI table is received; and delivering the PDI table having the updated answer or the new PDI table to the companion device.

Preferably, the receiving module further conduct: receiving an interactive content and a filtering criteria associated with the interactive content, wherein the filtering criteria includes information about nature of the associated interactive content; wherein the companion device module further conduct: delivering the filtering criteria to the companion device, wherein the filtering criteria is compared with the PDI table in the companion device; and delivering the interactive content if the filtering criteria is matched with answers in the PDI table.

Preferably, the delivering the filtering criteria further includes: notifying the companion device that the interactive content for the companion device is received; receiving a third request for the filtering criteria associated with the interactive content, from the companion device; and delivering the filtering criteria to the companion device.

Preferably, the delivering the filtering criteria is conducted by using FilteringCriteria service, wherein the FilteringCriteria service is an UPnP service for delivering the filtering criteria, wherein the third request is based on a third UPnP action of the FilteringCriteria service, wherein the third UPnP action is for obtaining the filtering criteria, and wherein the third UPnP action has the filtering criteria as an output argument.

Preferably, the companion device module further conduct: delivering the received PDI table to the companion device, wherein the answer for the at least one PDI question is stored in the delivered PDI table; and receiving the PDI table having the answer, from the companion device.

Preferably, the answer obtaining module further conduct: updating the stored answer by replacing with the answer in the PDI table from the companion device.

Preferably, each of the PDI questions in the PDI table include a question ID, wherein the companion device module further conduct: receiving a fourth request for list of question IDs of PDI questions, from the companion device; delivering the requested list of question IDs of PDI questions, to the companion device; receiving a fifth request for the PDI question having a certain question ID in the list of question IDs, from the companion device; and delivering the requested PDI question and the answer to the requested PDI question, to the companion device.

Advantageous Effects of Invention

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interleaved XFECBLOCKs from each interleaving array according to an embodiment of the present invention.

FIG. 30 is a diagram showing an automatic content recognition (ACR) based enhanced television (ETV) service system.

FIG. 31 is a diagram showing the flow of digital watermarking technology according to an embodiment of the present invention.

FIG. 32 is a diagram showing an ACR query result format according to an embodiment of the present invention.

FIG. 33 is a diagram showing the syntax of a content identifier (ID) according to an embodiment of the present invention.

FIG. 34 is a diagram showing the structure of a receiver according to the embodiment of the present invention.

FIG. 35 is a diagram showing the structure of a receiver according to another embodiment of the present invention.

FIG. 36 is a diagram illustrating a digital broadcast system according to an embodiment of the present invention.

FIG. 37 is a diagram illustrating a digital broadcast system according to an embodiment of the present invention.

FIG. 38 is a flowchart of a digital broadcast system according to another embodiment of the present invention.

FIG. 39 is a flowchart of a digital broadcast system according to another embodiment of the present invention.

FIG. 40 is a diagram illustrating a PDI Table according to an embodiment of the present invention.

FIG. 41 is a diagram illustrating a PDI Table according to another embodiment of the present invention.

FIG. 42 is a diagram illustrating a PDI table according to another embodiment of the present invention.

FIG. 43 is a diagram illustrating a PDI table according to another embodiment of the present invention.

FIG. 44 is a diagram illustrating a PDI table according to another embodiment of the present invention.

FIG. 45 is a diagram illustrating a PDI table according to another embodiment of the present invention.

FIG. 46 illustrate a PDI table according to another embodiment of the present invention.

FIG. 47 illustrates a PDI table according to another embodiment of the present invention.

FIG. 48 is a diagram illustrating a filtering criteria table according to an embodiment of the present invention.

FIG. 49 is a diagram illustrating a filtering criteria table according to another embodiment of the present invention.

FIG. 50 is a diagram illustrating a filtering criteria table according to another embodiment of the present invention.

FIG. 51 is a diagram illustrating a filtering criteria table according to another embodiment of the present invention.

FIG. 52 is a flowchart of a digital broadcast system according to another embodiment of the present invention.

FIG. 53 is a diagram illustrating a PDI table section according to an embodiment of the present invention.

FIG. 54 is a diagram illustrating a PDI table section according to another embodiment of the present invention.

FIG. 55 is a diagram illustrating a PDI table section according to another embodiment of the present invention.

FIG. 56 is a diagram illustrating a PDI table section according to another embodiment of the present invention.

FIG. 57 is a flowchart of a digital broadcast system according to another embodiment of the present invention.

FIG. 58 is a diagram illustrating XML schema of an FDT instance according to another embodiment of the present invention.

FIG. 59 is a diagram illustrating capabilities descriptor syntax according to an embodiment of the present invention.

FIG. 60 is a diagram illustration a consumption model according to an embodiment of the present invention.

FIG. 61 is a diagram illustrating filtering criteria descriptor syntax according to an embodiment of the present invention.

FIG. 62 is a diagram illustrating filtering criteria descriptor syntax according to another embodiment of the present invention.

FIG. 63 is a flowchart of a digital broadcast system according to another embodiment of the present invention.

FIG. 64 is a diagram illustrating an HTTP request table according to an embodiment of the present invention.

FIG. 65 is a flowchart illustrating a digital broadcast system according to another embodiment of the present invention.

FIG. 66 is a diagram illustrating a URL list table according to an embodiment of the present invention.

FIG. 67 is a diagram illustrating a TPT according to an embodiment of the present invention.

FIG. 68 is a flowchart of a digital broadcast system according to another embodiment of the present invention.

FIG. 69 is a flowchart of a digital broadcast system according to another embodiment of the present invention.

FIG. 70 is a flowchart of a digital broadcast system according to another embodiment of the present invention.

FIG. 71 is a flowchart of a digital broadcast system according to another embodiment of the present invention.

FIG. 72 is a diagram illustrating a receiver targeting criteria table according to an embodiment of the present invention.

FIG. 73 is a table showing a pre-registered PDI question regarding a location code when the targeting criterion type code is 0x01.

FIG. 74 is a table showing a pre-registered PDI question of federal information processing standards publication state (FIPS) when the targeting criterion type code is 0x01.

FIG. 75 is a table showing a pre-registered PDI question regarding an FIPS country when the targeting criterion type code is 0x01.

FIG. 76 is a table showing a pre-registered PDI question regarding county subdivision when the targeting criterion type code is 0x01.

FIG. 77 is a table showing a pre-registered PDI question regarding a 5-digit zip code when the targeting criterion type code is 0x02.

FIG. 78 is a table showing a pre-registered PDI question regarding a numeric postal code when the targeting criterion type code is 0x02.

FIG. 79 is a table showing a pre-registered PDI question regarding a gender of a user when the targeting criterion type code is 0x03.

FIG. 80 is a table showing a pre-registered PDI question regarding an age bracket of a user when the targeting criterion type code is 0x03.

FIG. 81 is a table illustrating a pre-registered PDI question regarding whether a user is working when the targeting criterion type code is 0x03.

FIG. 82 is a table showing a pre-registered PDI question regarding a gender of a user when the targeting criterion type code is 0x03.

FIG. 83 is a diagram illustrating an application programming interface (PDI API) according to an embodiment of the present invention.

FIG. 84 is a diagram showing PDI API according to another embodiment of the present invention.

FIG. 85 is a diagram showing PDI API according to another embodiment of the present invention.

FIG. 86 is a view showing a Protocol Stack for a next generation broadcasting system according to an embodiment of the present invention.

FIG. 87 is a view showing an UPnP type Action mechanism according to an embodiment of the present invention.

FIG. 88 is a view showing a REST mechanism according to an embodiment of the present invention.

FIG. 89 is a structural view showing exchange of user data between a receiver and a companion device according to an embodiment of the present invention.

FIG. 90 is a view showing a portion of PDI user data according to an embodiment of the present invention.

FIG. 91 is a view showing another portion of PDI user data according to an embodiment of the present invention.

FIG. 92 is a view showing service type and service ID of a service according to an embodiment of the present invention.

FIG. 93 is a view showing state variables of a UserData service according to an embodiment of the present invention.

FIG. 94 is a view showing an XML structure of UserDataList according to an embodiment of the present invention.

FIG. 95 is a view showing actions of a UserData service according to an embodiment of the present invention.

FIG. 96 is a view showing GetPDIUserDataProtocolVersion, one action of a UserData service, according to an embodiment of the present invention.

FIG. 97 is a view showing GetUserDataIdsList and GetUserData, actions of a UserData service, according to an embodiment of the present invention.

FIG. 98 is a view showing an extended state variable of a UserData service according to an embodiment of the present invention.

FIG. 99 is a view showing SetUserData, one action of a UserData service, according to an embodiment of the present invention.

FIG. 100 is a view showing an added state variable of a UserData service according to an embodiment of the present invention.

FIG. 101 is a view showing another added state variable of a UserData service according to an embodiment of the present invention.

FIG. 102 is a view showing state variables of a UserData service for transmission on a per pair basis of questions and answers according to an embodiment of the present invention.

FIG. 103 is a view showing an XML structure of UserDataQAList according to an embodiment of the present invention.

FIG. 104 is a view showing actions of a UserData service for transmission on a per pair basis of questions and answers according to an embodiment of the present invention.

FIG. 105 is a view showing GetUserDataQAIdsList and GetUserDataQA, actions of a UserData service for transmission on a per pair basis of questions and answers, according to an embodiment of the present invention.

FIG. 106 is a view showing SetUserDataQA, an action of a UserData service for transmission on a per pair basis of questions and answers, according to an embodiment of the present invention.

FIG. 107 is a sequence diagram of transmitting PDI user data through a broadband channel according to an embodiment of the present invention.

FIG. 108 is a view showing state variables of a UserData service in a situation in which PDI user data are transmitted through a broadband channel according to an embodiment of the present invention.

FIG. 109 is a view showing an action of a UserData service in a situation in which PDI user data are transmitted through a broadband channel according to an embodiment of the present invention.

FIG. 110 is a view showing an extended state variable of a UserData service in a situation in which PDI user data are transmitted through a broadband channel according to an embodiment of the present invention.

FIG. 111 is a view showing an extended state variable of a UserData service in a situation in which PDI user data are transmitted through a broadband channel according to another embodiment of the present invention.

FIG. 112 is a structural view showing exchange of user data between a receiver and companion devices according to another embodiment of the present invention.

FIG. 113 is a view showing service type and service ID of a service according to another embodiment of the present invention.

FIG. 114 is a view showing a state variable of a FilteringCriteria service according to an embodiment of the present invention.

FIG. 115 is a view showing an action of a FilteringCriteria service according to an embodiment of the present invention.

FIG. 116 is a sequence diagram for transmitting FC through a broadband channel according to an embodiment of the present invention.

FIG. 117 is a view showing state variables of a FilteringCriteria service in a situation in which FC are transmitted through a broadband channel according to an embodiment of the present invention.

FIG. 118 is a view showing an action of a FilteringCriteria service in a situation in which FC are transmitted through a broadband channel according to an embodiment of the present invention.

FIG. 119 is a view showing an extended state variable of a FilteringCriteria service in a situation in which FC are transmitted through a broadband channel according to an embodiment of the present invention.

FIG. 120 is a view showing an extended state variable of a FilteringCriteria service in a situation in which FC are transmitted through a broadband channel according to another embodiment of the present invention.

FIG. 121 is a view showing a broadcast receiver according to an embodiment of the present invention.

FIG. 122 is a view showing a broadcast receiver according to another embodiment of the present invention.

FIG. 123 is a view showing presentation preference according to an embodiment of the present invention.

FIG. 124 is a sequence diagram of closed caption preference according to an embodiment of the present invention.

FIG. 125 is a sequence diagram of closed caption preference according to another embodiment of the present invention.

FIG. 126 is a view showing extended fields of caption_service_descriptor in closed caption preference according to an embodiment of the present invention.

FIG. 127 is a view showing pre-registered PDI Question for use of closed caption in closed caption preference according to an embodiment of the present invention.

FIG. 128 is a view showing pre-registered PDI Question for a language of closed caption in closed caption preference according to an embodiment of the present invention.

FIG. 129 is a view showing pre-registered PDI Question for a font of closed caption in closed caption preference according to an embodiment of the present invention.

FIG. 130 is a view showing pre-registered PDI Question for a font size of closed caption in closed caption preference according to an embodiment of the present invention.

FIG. 131 is a view showing pre-registered PDI Question for alignment of closed caption in closed caption preference according to an embodiment of the present invention.

FIG. 132 is a view showing pre-registered PDI Question for a print direction of closed caption in closed caption preference according to an embodiment of the present invention.

FIG. 133 is a view showing pre-registered PDI Question for a scroll direction of closed caption in closed caption preference according to an embodiment of the present invention.

FIG. 134 is a view showing pre-registered PDI Question for an easy reader mode of closed caption in closed caption preference according to an embodiment of the present invention.

FIG. 135 is a sequence diagram of audio preference according to an embodiment of the present invention.

FIG. 136 is a sequence diagram of audio preference according to another embodiment of the present invention.

FIG. 137 is a view showing extended fields of AC-3_audio_stream_descriptor in audio preference according to an embodiment of the present invention.

FIG. 138 is a view showing pre-registered PDI Question for a language of audio in audio preference according to an embodiment of the present invention.

FIG. 139 is a view showing pre-registered PDI Question for whether to use a mode for an aurally handicapped person of audio in audio preference according to an embodiment of the present invention.

FIG. 140 is a view showing pre-registered PDI Question for whether to use a mode of audio for a visually handicapped person in audio preference according to an embodiment of the present invention.

FIG. 141 is a sequence diagram of accessibility & sign language presentation according to an embodiment of the present invention.

FIG. 142 is a sequence diagram of accessibility & sign language presentation according to another embodiment of the present invention.

FIG. 143 is a view showing sign_language_descriptor in accessibility & sign language presentation according to an embodiment of the present invention.

FIG. 144 is a view showing pre-registered PDI Question for use of accessibility & sign language presentation in accessibility & sign language presentation preference according to an embodiment of the present invention.

FIG. 145 is a view showing pre-registered PDI Question for preference of a sign language in accessibility & sign language presentation preference according to an embodiment of the present invention.

FIG. 146 is a view showing pre-registered PDI Question for preference of location of a sign language in accessibility & sign language presentation preference according to an embodiment of the present invention.

FIG. 147 is a view showing a menu screen for updating an answer in presentation preference according to an embodiment of the present invention.

FIG. 148 is a structural view showing exchange of user data between a receiver and companion devices according to a further embodiment of the present invention.

FIG. 149 is a view showing PDIUserData further including a user ID field according to an embodiment of the present invention.

FIG. 150 is sequence diagram for obtaining an answer to PDI Question using user ID according to an embodiment of the present invention.

FIG. 151 is a sequence diagram for applying filtering criteria using user ID according to an embodiment of the present invention.

FIG. 152 is a view showing a method of assigning user ID according to an embodiment of the present invention.

FIG. 153 illustrates A method of providing interactive contents based on personal interests according to an embodiment of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles), each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data.

The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_f$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS ½ data, EAC and FIC section.

The scrambler can scramble PLS1 data and PLS2 data before BCH encoding and shortened and punctured LDPC encoding.

The BCH encoding/zero insertion block can perform outer encoding on the scrambled PLS ½ data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

MathFigure 1

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math.1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | Code Rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Future-cast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
| --- | --- |
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a nonbackward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_1$, the number of the frames to which each TI group is mapped, and there is one TI-block per TI group ($N_{TI}=1$). The allowed $P_1$ values with 2-bit field are defined in the below table 18.

If the DP_TI_TYPE is set to the value '0', this field indicates the number of TI-blocks $N_{TI}$ per TI group, and there is one TI group per frame ($P_1=1$). The allowed $P_1$ values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |

TABLE 24-continued

| Value | ISSY mode |
|---|---|
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame.

This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS 1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

MathFigure 2

$$D_{DP1} + D_{DP2} \leq D_{DP} \quad \text{[Math.2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, . . . , DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

MathFigure 3

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math.3]

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits,

MathFigure 4

$$p_0=p_1=p_2=\ldots=p_{N_{ldpc}-K_{ldpc}-1}=0$$ [Math.4]

2) Accumulate the first information bit $-i_0$, at parity bit addresses specified in the first row of an addresses of parity check matrix. The details of addresses of parity check matrix will be described later. For example, for rate 13/15:

MathFigure 5

$$p_{983}=p_{983}\oplus i_0\, p_{2815}=p_{2815}\oplus i_0$$

$$p_{4837}=p_{4837}\oplus i_0\, p_{4989}=p_{4989}\oplus i_0$$

$$p_{6138}=p_{6138}\oplus i_0\, p_{6458}=p_{6458}\oplus i_0$$

$$p_{6921}=p_{6921}\oplus i_0\, p_{6974}=p_{6974}\oplus i_0$$

$$p_{7572}=p_{7572}\oplus i_0\, p_{8260}=p_{8260}\oplus i_0$$

$$p_{8496}=p_{8406}\oplus i_0$$ [Math.5]

3) For the next 359 information bits, $i_s$, s=1, 2, ..., 359 accumulate $i_s$ at parity bit addresses using following Math figure.

MathFigure 6

$$\{x+(s \bmod 360)\times Q_{ldpc}\} \bmod(N_{ldpc}-K_{ldpc})$$ [Math.6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

MathFigure 7

$$p_{1007}=p_{1007}\oplus i_1\, p_{2839}=p_{2839}\oplus i_1$$

$$p_{4861}=p_{4861}\oplus i_1\, p_{5013}=p_{5013}\oplus i_1$$

$$p_{6162}=p_{6162}\oplus i_1\, p_{6482}=p_{6482}\oplus i_1$$

$$p_{6945}=p_{6945}\oplus i_1\, p_{6998}=p_{6998}\oplus i_1$$

$$p_{7596}=p_{7596}\oplus i_1\, p_{8284}=p_{8284}\oplus i_1$$

$$p_{8520}=p_{8520}\oplus i_1$$ [Math.7]

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, ..., 719 are obtained using the Math FIG. 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

MathFigure 8

$$p_i=p_i\oplus p_{i-1}, i=1,2,\ldots,N_{ldpc}-K_{ldpc}-1$$ [Math.8]

where final content of $p_i$, i=0, 1, ..., $N_{ldpc}-K_{ldpc}-1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}=64800/■_{mod}$ or $16200/■_{mod}$ according to the FECBLOCK length. The QCB interleaving pattern is unique to each combination of modulation type and LDPC code rate.

After QCB interleaving, inner-group interleaving is performed according to modulation type and order ($\blacksquare_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word ($c_{0,1}, c_{1,1}, \ldots, c_{\blacksquare\ mod-1,1}$) of the bit interleaving output is demultiplexed into ($d_{1,0,m}, d_{1,1,m} \ldots, d_{1,\blacksquare\ mod-1,m}$) and ($d_{2,0,m}, d_{2,1,m} \ldots, d_{2,\blacksquare\ mod-1,m}$) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word ($c_{0,1}, c_{1,1}, \ldots, c_{9,1}$) of the Bit Interleaver output is demultiplexed into ($d_{1,0,m}, d_{1,1,m} \ldots, d_{1,3,m}$) and ($d_{2,0,m}, d_{2,1,m} \ldots, d_{2,5,m}$), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLocK\_Group}(n)$ and is signaled as DP_NUM_BLOCK in the PLS2-DYN data. Note that $N_{xBLocK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as ($d_{n,s,0,0}, d_{n,s,0,1}, \ldots, d_{n,s,0,N_{cells}-1}, d_{n,s,1,0}, \ldots,$
$d_{n,s,1,N_{cells}-1}, \ldots, d_{n,s,N_{xBLOCK\_TI}(n,s)-1,0}, \ldots,$
$d_{n,s,N_{xBLOCK\_TI}(n,s)-1,N_{cells}-1}$), where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & \text{the output of SSD ... encoding} \\ g_{n,s,r,q}, & \text{the output of MIMO encoding} \end{cases}.$$

In addition, assume that output XFECBLOCKs from the time interleaver are defined as $(h_{n,s,0}, h_{n,s,1}, \ldots, h_{n,s,i}, \ldots, h_{n,s,N_{xBLOCK\_TI}(n,s) \times N_{cells}-1})$, where $h_{n,s,i}$ is the ith output cell (for $i=0, \ldots, N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, N, cells are read out as shown in (b). In detail, assuming $z_{n,s,i}(i=0, \ldots, N_rN_c)$ as the TI memory cell position to be read sequentially, the reading process in such an interleaving array is performed by calculating the row index $R_{n,s,i}$, the column index $C_{n,s,i}$, and the associated twisting parameter $T_{n,s,i}$, as follows expression.

MathFigure 9

[Math. 9]

$$\text{GENERATE } (R_{n,s,i}, C_{n,s,i}) = \{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

MathFigure 10

[Math. 10]

$$\begin{cases} N'_{xBLOCK\_TI\_MAX} = \\ N_{xBLOCK\_TI\_MAX} + 1 \end{cases}, \text{if } N_{xBLOCK\_TI\_MAX} \bmod 2 = 0$$
$$\begin{cases} N'_{xBLOCK\_TI\_MAX} = \\ N_{xBLOCK\_TI\_MAX} \end{cases}, \text{if } N_{xBLOCK\_TI\_MAX} \bmod 2 = 1$$

$$S_{shift} = \frac{N'_{xBLOCK\_TI\_MAX} - 1}{2}$$

As a result, the cell positions to be read are calculated by a coordinate as $z_{n,s,i}=N_r C_{n,s,i}+R_{n,s,i}$.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(0,0)=6$, $N_{xBLOCK\_TI}(2,0)=5$.

The variable number $N'_{xBLOCK\_TI}(n,s)=N_r$ will be less than or equal to $N_{xBLOCK\_TI\_MAX}$.

Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

MathFigure 11

[Math. 11]

```
p = 0;
for i = 0; i < N_cells N'_xBLOCK_TI_MAX; i = i + 1
  {GENERATE (R_{n,s,i}, C_{n,s,i});
  V_i = N_r C_{n,s,j} + R_{n,s,j}
    if V_i < N_cells N_xBLOCK_TI(n,s)
    {
      Z_{n,s,p} = V_i; p = p + 1;
    }
  }
```

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{Jump}=1$, and $P_1=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI} \rfloor = N_{xBLOCK\_TI\_MAX}=6$.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and $S_{shift}=(7-1)/2=3$. Note that in the reading process shown as pseudocode above, if $V_i \geq N_{cells} N_{xBLOCK\_TI}(n,s)$, the value of V, is skipped and the next calculated value of V, is used.

Figure 29:
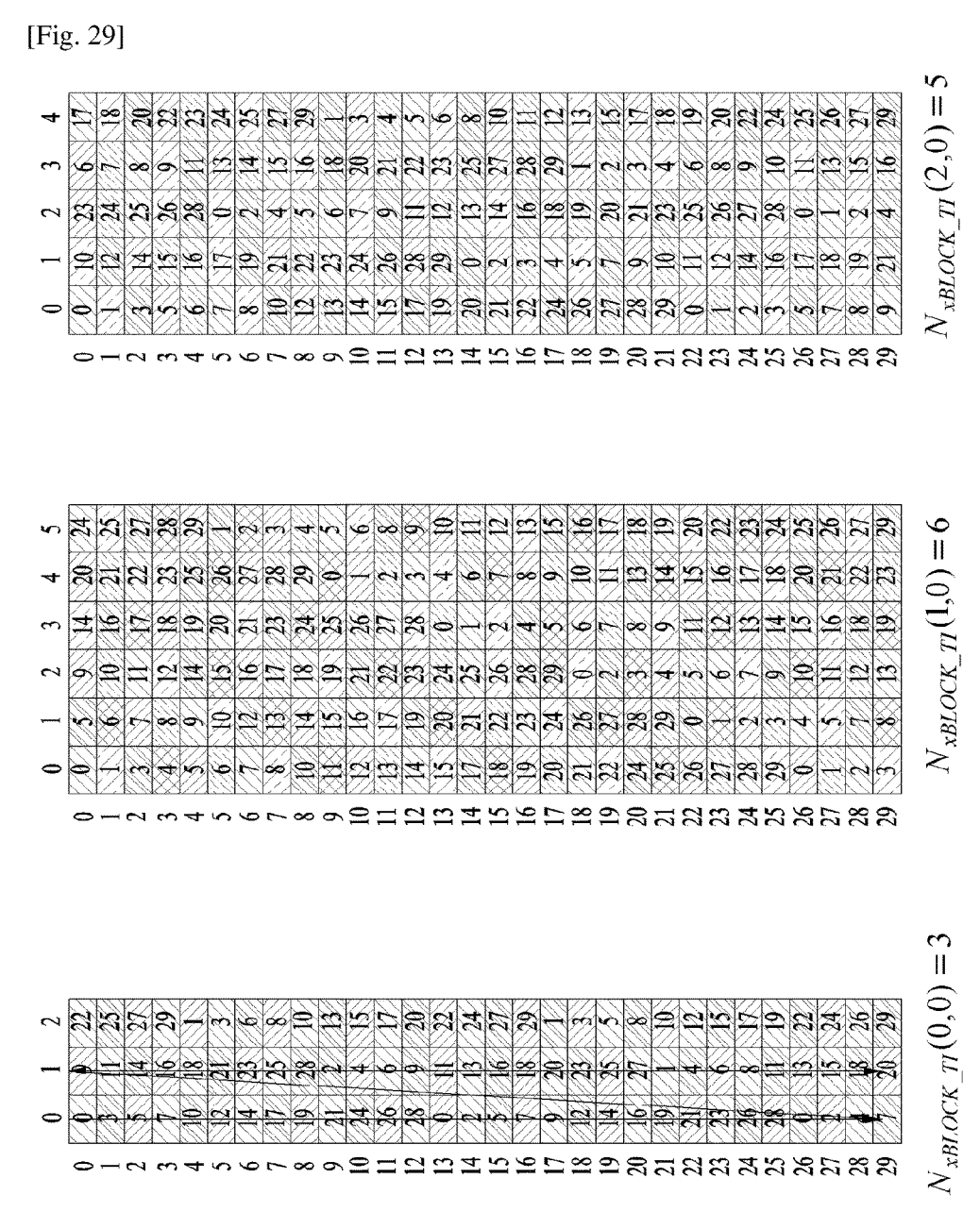

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}=7$ and $S_{shift}=3$.

FIG. 30 is a diagram showing an automatic content recognition (ACR) based enhanced television (ETV) service system.

The ACR based ETV service system shown in FIG. 30 may include a broadcaster or content provider 100, a multichannel video programming distributor (MVPD) 101, a set-top box (STB) 102, a receiver 103 such as a digital TV receiver, and an ACR server (or an ACR Solution Provider) 104. The receiver 103 may operate according to definition of the advanced television system committee (ATSC) and may support an ACR function. A real-time broadcast service 110 may include A/V content.

A digital broadcast service may be largely divided into a terrestrial broadcast service provided by the broadcaster 100 and a multi-channel broadcast service, such as a cable broadcast or a satellite broadcast, provided by the MVPD 101. The broadcaster 100 may transmit a real-time broadcast service 110 and enhancement data (or additional data) 120 together. In this case, as shown in FIG. 30, the receiver 103 may receive only the real-time broadcast service 110 and may not receive the enhancement data 120 through the MVPD 101 and the STB 102.

Accordingly, in order to receive the enhancement data 120, the receiver 103 analyzes and processes A/V content output as the real-time broadcast service 110 and identifies broadcast program information and/or broadcast program related metadata. Using the identified broadcast program information and/or broadcast program related metadata, the receiver 103 may receive the enhancement data from the broadcaster 100 or the ACR server 104 (140). In this case, the enhancement data may be transmitted via an Internet protocol (IP) network 150.

If the enhancement data is received from a separate ACR server 104 (140), in a mechanism between the ACR server 104 and the receiver 103, a request/response model among triggered declarative object (TDO) models defined in the ATSC 2.0 standard may be applied to the ACR server 104. Hereinafter, the TDO and request/response model will be described.

TDO indicates additional information included in broadcast content. TDO serves to timely triggers additional information within broadcast content. For example, if an audition program is broadcast, a current ranking of an audition participant preferred by a viewer may be displayed along with the broadcast content. At this time, additional information of the current rating of the audition participant may be a TDO. Such a TDO may be changed through interaction with viewers or provided according to viewer's intention.

In the request/response ACR model of the standard ATSC 2.0, the digital broadcast receiver 103 is expected to generate signatures of the content periodically (e.g. every 5 seconds) and send requests containing the signatures to the ACR server 104. When the ACR server 104 gets a request from the digital broadcast receiver 103, it returns a response. The communications session is not kept open between request/response instances. In this model, it is not feasible for the ACR server 104 to initiate messages to the client.

As digital satellite broadcasting has been introduced, digital data broadcasting has appeared as a new supplementary service. An interactive data broadcast, which is a representative interactive service, may transmit not only a data signal but also an existing broadcast signal to a subscriber so as to provide various supplementary services.

A digital data broadcast may be largely divided into an independent service using a virtual channel and a broadcast-associated service via an enhanced TV (ETV). The independent service includes only text and graphics without a broadcast image signal and is provided in a format similar to an existing Internet web page. Representative examples of the independent service include a weather and stock information provision service, a TV banking service, a commercial transaction service, etc. The broadcast-associated service transmits not only a broadcast image signal but also additional text and graphic information. A viewer may obtain information regarding a viewed broadcast program via a broadcast-associated service. For example, there is a service for enabling a viewer to view a previous story or a filming location while viewing a drama.

In a broadcast-associated service of a digital data broadcast, an ETV service may be provided based on ACR technology. ACR means technology for automatically recognizing content via information hidden in the content when a device plays audio/video (A/V content) back.

In implementation of ACR technology, a watermarking or fingerprinting scheme may be used to acquire information regarding content. Watermarking refers to technology for inserting information indicating a digital content provider into digital content. Fingerprinting is equal to watermarking in that specific information is inserted into digital content and is different therefrom in that information regarding a content purchaser is inserted instead of information regarding a content provider.

FIG. 31 is a diagram showing the flow of digital watermarking technology according to an embodiment of the present invention.

As digital satellite broadcasting has been introduced, digital data broadcasting has appeared as a new supplementary service. An interactive data broadcast, which is a representative interactive service, may transmit not only a data signal but also an existing broadcast signal to a subscriber so as to provide various supplementary services.

A digital data broadcast may be largely divided into an independent service using a virtual channel and a broadcast-associated service via an enhanced TV (ETV). The independent service includes only text and graphics without a broadcast image signal and is provided in a format similar to an existing Internet web page. Representative examples of the independent service include a weather and stock information provision service, a TV banking service, a commercial transaction service, etc. The broadcast-associated service transmits not only a broadcast image signal but also additional text and graphic information. A viewer may obtain information regarding a viewed broadcast program via a broadcast-associated service. For example, there is a service for enabling a viewer to view a previous story or a filming location while viewing a drama.

In a broadcast-associated service of a digital data broadcast, an ETV service may be provided based on ACR technology. ACR means technology for automatically recognizing content via information hidden in the content when a device plays audio/video (A/V content) back.

In implementation of ACR technology, a watermarking or fingerprinting scheme may be used to acquire information regarding content. Watermarking refers to technology for inserting information indicating a digital content provider into digital content. Fingerprinting is equal to watermarking in that specific information is inserted into digital content and is different therefrom in that information regarding a content purchaser is inserted instead of information regarding a content provider.

Hereinafter, watermarking technology will be described with reference to FIG. 31 in detail.

Digital watermarking is the process of embedding information into a digital signal in a way that is difficult to remove. The signal may be audio, pictures or video, for example. If the signal is copied, then the information is also carried in the copy. A signal may carry several different watermarks at the same time.

In visible watermarking, the information is visible in the picture or video. Typically, the information is text or a logo which identifies the owner of the media. When a television broadcaster adds its logo to the corner of transmitted video, this is also a visible watermark.

In invisible watermarking, information is added as digital data to audio, picture or video, but it cannot be perceived as such, although it may be possible to detect that some amount of information is hidden. The watermark may be intended for widespread use and is thus made easy to retrieve or it may be a form of steganography, where a party communicates a secret message embedded in the digital signal. In either case, as in visible watermarking, the objective is to attach ownership or other descriptive information to the signal in a way that is difficult to remove. It is also possible to use hidden embedded information as a means of covert communication between individuals.

One application of watermarking is in copyright protection systems, which are intended to prevent or deter unauthorized copying of digital media. In this use a copy device retrieves the watermark from the signal before making a copy; the device makes a decision to copy or not depending on the contents of the watermark. Another application is in source tracing.

A watermark is embedded into a digital signal at each point of distribution. If a copy of the work is found later, then the watermark can be retrieved from the copy and the source of the distribution is known. This technique has been reportedly used to detect the source of illegally copied movies.

Annotation of digital photographs with descriptive information is another application of invisible watermarking.

While some file formats for digital media can contain additional information called metadata, digital watermarking is distinct in that the data is carried in the signal itself.

The information to be embedded is called a digital watermark, although in some contexts the phrase digital watermark means the difference between the watermarked signal and the cover signal. The signal where the watermark is to be embedded is called the host signal.

A watermarking system is usually divided into three distinct steps, embedding (201), attack (202) and detection (or extraction; 203).

In embedding (201), an algorithm accepts the host and the data to be embedded and produces a watermarked signal.

The watermarked signal is then transmitted or stored, usually transmitted to another person. If this person makes a modification, this is called an attack (202). While the modification may not be malicious, the term attack arises from copyright protection application, where pirates attempt to remove the digital watermark through modification. There are many possible modifications, for example, lossy compression of the data, cropping an image or video, or intentionally adding noise.

Detection (203) is an algorithm which is applied to the attacked signal to attempt to extract the watermark from it. If the signal was unmodified during transmission, then the watermark is still present and it can be extracted. In robust watermarking applications, the extraction algorithm should be able to correctly produce the watermark, even if the modifications were strong. In fragile watermarking, the extraction algorithm should fail if any change is made to the signal.

A digital watermark is called robust with respect to transformations if the embedded information can reliably be detected from the marked signal even if degraded by any number of transformations. Typical image degradations are JPEG compression, rotation, cropping, additive noise and quantization. For video content temporal modifications and MPEG compression are often added to this list. A watermark is called imperceptible if the watermarked content is perceptually equivalent to the original, unwatermarked content. In general it is easy to create robust watermarks or imperceptible watermarks, but the creation of robust and imperceptible watermarks has proven to be quite challenging. Robust imperceptible watermarks have been proposed as tool for the protection of digital content, for example as an embedded 'no-copy-allowed' flag in professional video content.

Digital watermarking techniques can be classified in several ways.

First, a watermark is called fragile if it fails to be detected after the slightest modification (Robustness). Fragile watermarks are commonly used for tamper detection (integrity proof). Modifications to an original work that are clearly noticeable are commonly not referred to as watermarks, but as generalized barcodes. A watermark is called semi-fragile if it resists benign transformations but fails detection after malignant transformations. Semi-fragile watermarks are commonly used to detect malignant transformations. A watermark is called robust if it resists a designated class of transformations. Robust watermarks may be used in copy protection applications to carry copy and access control information.

Second, a watermark is called imperceptible if the original cover signal and the marked signal are (close to) perceptually indistinguishable (Perceptibility). A watermark is called perceptible if its presence in the marked signal is noticeable, but non-intrusive.

Third, about a capacity, the length of the embedded message determines two different main classes of watermarking schemes:

The message is conceptually zero-bit long and the system is designed in order to detect the presence or the absence of the watermark in the marked object. This kind of watermarking schemes is usually referred to as Italic zero-bit or Italic presence watermarking schemes. Sometimes, this type of watermarking scheme is called 1-bit watermark, because a 1 denotes the presence (and a 0 the absence) of a watermark.

The message is a n-bit-long stream (with $n=|m|$) or $M=\{0,1\}n$ and is modulated in the watermark. These kinds of schemes are usually referred to as multiple bit watermarking or non zero-bit watermarking schemes.

Forth, there are several ways for the embedding step. A watermarking method is referred to as spread-spectrum if the marked signal is obtained by an additive modification. Spread-spectrum watermarks are known to be modestly robust, but also to have a low information capacity due to host interference. A watermarking method is said to be of quantization type if the marked signal is obtained by quantization. Quantization watermarks suffer from low robustness, but have a high information capacity due to rejection of host interference. A watermarking method is referred to as amplitude modulation if the marked signal is embedded by additive modification which is similar to spread spectrum method but is particularly embedded in the spatial domain.

FIG. 32 is a diagram showing an ACR query result format according to an embodiment of the present invention.

According to the existing ACR service processing system, if a broadcaster transmits content for a real-time service and enhancement data for an ETV service together and a TV receiver receives the content and the ETV service, the content for the real-time service may be received but the enhancement data may not be received.

In this case, according to the embodiment of the present invention, it is possible to solve problems of the existing ACR processing system through an independent IP signaling channel using an IP network. That is, a TV receiver may receive content for a real-time service via an MVPD and receive enhancement data via an independent IP signaling channel.

In this case, according to the embodiment of the present invention, an IP signaling channel may be configured such that a PSIP stream is delivered and processed in the form of a binary stream. At this time, the IP signaling channel may be configured to use a pull method or a push method.

The IP signaling channel of the pull method may be configured according to an HTTP request/response method. According to the HTTP request/response method, a PSIP binary stream may be included in an HTTP response signal for an HTTP request signal and transmitted through SignalingChannelURL. In this case, a polling cycle may be periodically requested according to Polling_cycle in metadata delivered as an ACR query result. In addition, information about a time and/or a cycle to be updated may be included in a signaling channel and transmitted. In this case, the receiver may request signaling information from a server based on update time and/or cycle information received from the IP signaling channel.

The IP signaling channel of the push method may be configured using an XMLHTTPRequest application programming interface (API). If the XMLHTTPRequest API is used, it is possible to asynchronously receive updates from the server. This is a method of, at a receiver, asynchronously requesting signaling information from a server through an XMLHTTPRequest object and, at the server, providing signaling information via this channel in response thereto if signaling information has been changed. If there is a limitation in standby time of a session, a session timeout response may be generated and the receiver may recognize the session timeout response, request signaling information again and maintain a signaling channel between the receiver and the server.

In order to receive enhancement data through an IP signaling channel, the receiver may operate using watermarking and fingerprinting. Fingerprinting refers to technology for inserting information about a content purchaser into content instead of a content provider. If fingerprinting is used, the receiver may search a reference database to identify content. A result of identifying the content is called an ACR query result. The ACR query result may include a query provided to a TV viewer and answer information of the query in order to implement an ACR function. The receiver may provide an ETV service based on the ACR query result.

Information about the ACR query result may be inserted/embedded into/in A/V content on a watermark based ACR system and may be transmitted. The receiver may extract and acquire ACR query result information through a watermark extractor and then provide an ETV service. In this case, an ETV service may be provided without a separate ACR server and a query through an IP network may be omitted.

FIG. 32 is a diagram of an XML scheme indicating an ACR query result according to an embodiment of the present invention. As shown in FIG. 32, the XML format of the ACR query result may include a result code element 310 and the ACR query result type 300 may include a content ID element 301, a network time protocol (NTP) timestamp element 302, a signaling channel information element 303, a service information element 304 and an other-identifier element 305. The signaling channel information element 303 may include a signaling channel URL element 313, an update mode element 323 and a polling cycle element 333, and the service information element 304 may include a service name element 314, a service logo element 324 and a service description element 334.

Hereinafter, the diagram of the XML schema of the ACR query result shown in FIG. 32 will be described in detail and an example of the XML schema will be described.

The result code element 310 may indicate a result value of an ACR query. This may indicate query success or failure and a failure reason if a query fails in the form of a code value. For example, if the value of the result code element 310 is 200, this may indicate that a query succeeds and content information corresponding thereto is returned and, if the value of the result code element 310 is 404, this may indicate that content is not found.

The content ID element 301 may indicate an identifier for globally and uniquely identifying content and may include a global service identifier element, which is an identifier for identifying a service.

The NTP timestamp element 302 may indicate that a time of a specific point of a sample frame interval used for an ACR query is provided in the form of an NTP timestamp. Here, the specific point may be a start point or end point of the sample frame. NTP means a protocol for synchronizing a time of a computer with a reference clock through the Internet and may be used for time synchronization between a time server and client distributed on a computer network. Since NTP uses a universal time coordinated (UTC) time and ensures accuracy of 10 ms, the receiver may accurately process a frame synchronization operation.

The signaling channel information element 303 may indicate access information of an independent signaling channel on an IP network for an ETV service.

More specifically, the signaling channel URL element 313, which is a sub element of the signaling channel information element 303, may indicate URL information of a signaling channel. The signaling channel URL element 313 may include an update mode element 323 and a polling cycle element 333 as sub elements. The update mode element 323 may indicate a method of acquiring information via an IP signaling channel. For example, in a pull mode, the receiver may periodically perform polling according to a pull method to acquire information and, in a push mode, the server may transmit information to the receiver according to a push method. The polling cycle element 333 may indicate a basic polling cycle value of the receiver according to a pull method if the update mode element 323 is a pull mode. Then, the receiver may specify a basic polling cycle value and transmit a request signal to the server at a random time interval, thereby preventing requests from overloading in the server.

The service information element 304 may indicate information about a broadcast channel. The content id element 301 may indicate an identifier of a service which is currently being viewed by a viewer and the service information element 304 may indicate detailed information about the broadcast channel. For example, the detailed information indicated by the service information element 304 may be a channel name, a logo, or a text description.

More specifically, the service name element 314 which is a sub element of the service information element 304 may indicate a channel name, the service logo element 324 may indicate a channel logo, and the service description element 334 may indicate a channel text description.

The following shows the XML schema of elements of the ACR query result shown in

FIG. 32 according to the embodiment of the present invention.

The syntax of the content ID illustrated in FIG. 33 is the syntax of a content ID element of the ACR query result format described with reference to FIG. 32.

The ATSC Content Identifier is a syntax that is composed of a TSID (Transmitting Subscriber Identification) and a "house number" with a period of uniqueness. A "house number" is any number that the holder of the TSID wishes as constrained herein. Numbers are unique for each value of TSID. The syntax of the ATSC Content Identifier structure shall be as defined in FIG. 40.

'TSID', a 16 bit unsigned integer field, shall contain a value of transport_stream_id.

The assigning authority for these values for the United States is the FC Ranges for Mexico, Canada, and the United States have been established by formal agreement among these countries. Values in other regions are established by appropriate authorities.

'end_of_day' field, this 5-bit unsigned integer shall be set to the hour of the day in UTC in which the broadcast day ends and the instant after which the content_id values may be re-used according to unique_for. The value of this field

```
<xs:complexType name="ACR-ResultType">
<xs:sequence>
<xs:element name="ContentID" type="xs:anyURI"/>
<xs:element name="NTPTimestamp" type="xs:unsignedLong"/>
<xs:element name="SignalingChannelInformation">
<xs:complexType>
<xs:sequence>
<xs:element name="SignalingChannelURL" maxOccurs="unbounded">
<xs:complexType>
<xs:simpleContent>
<xs:extension base="xs:anyURI>
<xs:attribute name="UpdateMode">
<xs:simpleType>
<xs:restriction base="xs:string">
<xs:enumeration value="Pull"/>
<xs:enumeration value="Push"/>
</xs:restriction>
</xs:simpleType>
</xs:attribute>
<xs:attribute name="PollingCycle" type="xs:unsignedInt"/>
</xs:extension>
</xs:simpleContent>
</xs:complexType>
</xs:element>
</xs:sequence>
</xs:complexType>
</xs:element>
<xs:element name="ServiceInformation">
<xs:complexType>
<xs:sequence>
<xs:element name="ServiceName" type="xs:string"/>
<xs:element name="ServiceLogo" type="xs:anyURI" minOccurs="0"/>
<xs:element name="ServiceDescription" type="xs:string" minOccurs="0" maxOccurs="unbounded"/>
</xs:sequence>
</xs:complexType>
</xs:element>
<xs:any namespace="##other" processContents="skip" minOccurs="0" maxOccurs="unbounded"/>
</xs:sequence>
<xs:attribute name="ResultCode" type="xs:string" use="required"/>
<xs:anyAttribute processContents="skip"/>
</xs:complexType>
```

FIG. 33 is a diagram showing the syntax of a content identifier (ID) according to an embodiment of the present invention.

FIG. 33 shows the syntax of the content ID according to the ATSC standard according to the embodiment of the present invention. The ATSC content ID may be used as an identifier for identifying content received by the receiver.

shall be in the range of 0-23. The values 24-31 are reserved. Note that the value of this field is expected to be static per broadcaster.

'unique_for' field, this 9-bit unsigned integer shall be set to the number of days, rounded up, measure relative to the hour indicated by end_of_day, during which the content_id value is not reassign to different content. The value shall be in the range 1 to 511. The value zero shall be forbidden. The value 511 shall have the special meaning of "indefinitely". Note that the value of this field is expected to be essentially static per broadcaster, only changing when the method of house numbering is changed. Note also that decoders can treat stored content values as unique until the unique_for fields expire, which can be implemented by decrementing all stored unique_for fields by one every day at the end_of_day until they reach zero.

'content_id' field, this variable length field shall be set to the value of the identifier according to the house number system or systems for the value of TSID. Each such value shall not be assigned to different content within the period of uniqueness set by the values in the end_of_day an unique_ for fields. The identifier may be any combination of human readable and/or binary values and need not exactly match the form of a house number, not to exceed 242 bytes 1.

When a receiver according to the embodiment of the present invention cannot globally uniquely identify a service via the syntax of the content ID illustrated in FIG. 33, the receiver according to the present embodiment may identify the service using a global service identifier. The global service identifier according to the present embodiment may be included in the content ID element of the ACR query result format described with reference to FIG. 3.

[Example 1] below represents a global service identifier of a URI format according to an embodiment of the present invention. A global service identifier of [Example 1] may be used for an ATSC-M/H service.

[Example 1] urn:oma:bcastiauth:atsc:service:<region>: <xsid>:<serviceid>

<region> is a two-letter international country code as specified by ISO 639-2.

<xsid> is defined as for local services, the decimal encoding of the TSID, as defined in that region. <xsid> is also defined as for regional services (major >69), "0".

<serviceid> is defined as <major>.<minor>, where <major> can indicate Major Channel number and <minor> can indicate Minor Channel Number.

The aforementioned global service identifier may be presented in the following URI format.

[Example 2] urn:oma:bcast:iauth:atsc:service:us:1234:5.1
[Example 3] urn:oma:bcast:iauth:atsc:service:us:0: 100.200

A receiver according to the embodiment of the present invention may identify content using a global content identifier based on the aforementioned global service identifier.

[Example 4] below represents a global content identifier of a URI format according to an embodiment of the present invention. A global service identifier of [Example 4] may be used for an ATSC service. In detail, [Example 4] represents a case in which an ATSC content identifier is used as a global content identifier according to an embodiment of the present invention.

[Example 4] urn:oma:bcast:iauth:atsc:content<region>: <xsidz>:<contentid>:<unique_for>:<end_of_day>

<region> is a two-letter international country code as specified by ISO 639-2 [4].

<xsidz> is defined as for local services, the decimal encoding of the TSID, as defined in that region, followed by "."<serviceid> unless the emitting broadcaster can ensure the uniqueness of the global content_id without use of <serviceid>. <xsidz> is also defined as for regional services (major >69), <serviceid>.

In both cases, <serviceid> is as defined in Section A1 for the service carrying the content. <content_id> is the base64 [5] encoding of the content_id field defined in FIG. 33, considering the content_id field as a binary string. <unique_for> is the decimal encoding of the unique_for field defined in FIG. 33. <end_of_day> is the decimal encoding of the end_of_day field defined in FIG. 33.

The ATSC content identifier having the format defined in the aforementioned Examples may be used to identify content on an ACR processing system.

Hereinafter, a receiver designed to embody watermarking and fingerprinting technologies will be described with regard to an embodiment of the present invention with reference to FIGS. 34 and 35. Receivers illustrated in FIGS. 34 and 35 may be conFIG.d in different manners according to a designer's intention.

FIG. 34 is a diagram showing the structure of a receiver according to the embodiment of the present invention.

More specifically, FIG. 34 shows an embodiment of the configuration of a receiver supporting an ACR based ETV service using watermarking.

As shown in FIG. 34, the receiver supporting the ACR based ETV service according to the embodiment of the present invention may include an input data processor, an ATSC main service processor, an ATSC mobile/handheld (MH) service processor and/or an ACR service processor. The input data processor may include a tuner/demodulator 400 and/or a vestigial side band (VSB) decoder 401. The ATSC main service processor may include a transport protocol (TP) demux 402, a Non Real Time (NRT) guide information processor 403, a digital storage media command and Control (DSM-CC) addressable section parser 404, an Information Provider (IP)/User Datagram Protocol (UDP) parser 405, a FLUTE parser 406, a metadata module 407, a file module 408, an electronic service guide (ESG)/data carrier detect (DCD) handler 409, a storage control module 410, a file/TP switch 411, a playback control module 412, a first 1 storage device 413, an IP packet storage control module 414, an Internet access control module 415, an IP interface 416, a live/recorded switch 417, a file (object) decoder 418, a TP/Packetized Elementary Stream (PES) decoder 420, a Program Specific Information (PSI)/program and system information protocol (PSIP) decoder 421 and/or an Electronic Program Guide (EPG) handler 422. The ATSC MH service processor may include a main/MH/NRT switch 419, a MH baseband processor 423, an MH physical adaptation processor 424, an IP protocol stack 425, a file handler 426, an ESG handler 427, a second storage device 428 and/or a streaming handler 429. The ACR service processor may include a main/MH/NRT switch 419, an A/V decoder 430, an A/V process module 431, an external input handler 432, a watermark extractor 433 and/or an application 434.

Hereinafter, operation of each module of each processor will be described.

In the input data processor, the tuner/demodulator 400 may tune and demodulate a broadcast signal received from an antenna. Through this process, a VSB symbol may be extracted. The VSB decoder 401 may decode the VSB symbol extracted by the tuner/demodulator 400.

The VSB decoder 401 may output ATSC main service data and MH service data according to decoding. The ATSC main service data may be delivered to and processed by the ATSC main service processor and the MH service data may be delivered to and processed by the ATSC MH service processor.

The ATSC main service processor may process a main service signal in order to deliver main service data excluding an MH signal to the ACR service processor. The TP demux 402 may demultiplex transport packets of ATSC main service data transmitted via the VSB signal and deliver the demultiplexed transport packets to other processing modules. That is, the TP demux 402 may demultiplex a variety of information included in the transport packets and deliver information such that elements of the broadcast signal are respectively processed by modules of the broadcast receiver. The demultiplexed data may include real-time streams, DSM-CC addressable sections and/or an NRT service table/A/90&92 signaling table. More specifically, as shown in FIG. 34, the TP demux 402 may output the real-time streams to the live/recorded switch 417, output the DSM-CC addressable sections to the DSM-CC addressable section parser 404 and output the NRT service table/A/90&92 signaling table to the NRT guide information processor 403.

The NRT guide information processor 403 may receive the NRT service table/A/90&92 signaling table from the TP demux 402 and extract and deliver FLUT session information to the DSM-CC addressable section parser 404. The DSM-CC addressable section parser 404 may receive the DSM-CC addressable sections from the TP demux 402, receive the FLUT session information from the NRT guide information processor 403 and process the DSM-CC addressable sections. The IP/UDP parser 405 may receive the data output from the DSM-CC addressable section parser 404 and parse IP datagrams transmitted according to the IP/UDP. The FLUTE parser 406 may receive data output from the IP/UDP parser 405 and process FLUTE data for transmitting a data service transmitted in the form of an asynchronous layered coding (ALC) object. The metadata module 407 and the file module 408 may receive the data output from the FLUTE parser 406 and process metadata and a restored file. The ESG/DCD handler 409 may receive data output from the metadata module 407 and process an electronic service guide and/or downlink channel descriptor related to a broadcast program. The restored file may be delivered to the storage control module 410 in the form of a file object such as ATSC 2.0 content and reference fingerprint. The file object may be processed by the storage control module 410 and divided into a normal file and a TP file to be stored in the first storage device 413. The playback control module 412 may update the stored file object and deliver the file object to the file/TP switch 411 in order to decode the normal file and the TP file. The file/TP switch 411 may deliver the normal file to the file decoder 418 and deliver the TP file to the live/recorded switch 417 such that the normal file and the TP file are decoded through different paths.

The file decoder 418 may decode the normal file and deliver the decoded file to the ACR service processor. The decoded normal file may be delivered to the main/MH/NRT switch 419 of the ACR service processor. The TP file may be delivered to the TP/PES decoder 420 under the control of the live/recorded switch 417. The TP/PES decoder 420 decodes the TP file and the PSI/PSIP decoder 421 decodes the decoded TP file again. The EPG handler 422 may process the decoded TP file and process an EPG service according to ATSC.

The ATSC MH service processor may process the MH signal in order to transmit ATSC MH service data to the ACR service processor. More specifically, the MH baseband processor 423 may convert the ATSC MH service data signal into a pulse waveform suitable for transmission. The MH physical adaptation processor 424 may process the ATSC MH service data in a form suitable for an MH physical layer.

The IP protocol stack module 425 may receive the data output from the MH physical adaption processor 424 and process data according to a communication protocol for Internet transmission/reception. The file handler 426 may receive the data output from the IP protocol stack module 425 and process a file of an application layer. The ESG handler 427 may receive the data output from the file handler 426 and process a mobile ESG. In addition, the second storage device 428 may receive the data output from the file handler 426 and store a file object. In addition, some of the data output from the IP protocol stack module 425 may become data for an ACR service of the receiver instead of a mobile ESG service according to ATSC. In this case, the streaming handler 429 may process real streaming received via a real-time transport protocol (RTP) and deliver the real streaming to the ACR service processor.

The main/MH/NRT switch 419 of the ACR service processor may receive the signal output from the ATSC main service processor and/or the ATSC MH service processor. The A/V decoder 430 may decode compression A/V data received from the main/MH/NRT switch 419. The decoded A/V data may be delivered to the A/V process module 431.

The external input handler 432 may process the A/V content received through external input and transmit the A/V content to the A/V process module 431.

The A/V process module 431 may process the A/V data received from the A/V decoder 430 and/or the external input handler 432 to be displayed on a screen. In this case, the watermark extractor 433 may extract data inserted in the form of a watermark from the A/V data. The extracted watermark data may be delivered to the application 434. The application 434 may provide an enhancement service based on an ACR function, identify broadcast content and provide enhancement data associated therewith. If the application 434 delivers the enhancement data to the A/V process module 431, the A/V process module 431 may process the received A/V data to be displayed on a screen.

In detail, the watermark extractor 433 illustrated in FIG. 34 may extract data (or watermark) inserted in the form of a watermark from the A/V data received through external input. The watermark extractor 433 may extract a watermark from the audio data, extract a watermark from the video data, and extract a watermark from audio and video data. The watermark extractor 433 may acquire channel information and/or content information from the extracted watermark.

The receiver according to the present embodiment may tune an ATSC mobile handheld (MH) channel and receive corresponding content and/or metadata using the channel information and/or the content information that are acquired by the watermark extractor 433. In addition, the receiver according to the present embodiment may receive corresponding content and/or metadata via the Internet. Then, the receiver may display the receive content and/or the metadata using trigger, etc.

FIG. 35 is a diagram showing the structure of a receiver according to another embodiment of the present invention.

More specifically, FIG. 35 shows an embodiment of the configuration of a receiver supporting an ACR based ETV service using fingerprinting.

The basic structure of the receiver illustrated in FIG. 35 is basically the same as that of the receiver illustrated in FIG. 35. However, the receiver illustrated in FIG. 35 is different from the receiver illustrated in FIG. 34 in that the receiver of FIG. 35 further includes a fingerprint extractor 535 and/or a fingerprint comparator 536 according to an embodiment of the present invention. In addition, the receiver of FIG. 35 may not include the watermark extractor 433 among the elements illustrated in FIG. 34.

The basic structure of the receiver of FIG. 35 is basically the same as the structure of the receiver illustrated in FIG.

34, and thus, a detailed description thereof will be omitted. Hereinafter, an operation of the receiver will be described in terms of the fingerprint extractor 535 and/or the fingerprint comparator 536.

The fingerprint extractor 535 may extract data (or signature) inserted into A/V content received through external input. The fingerprint extractor 535 according to the present embodiment may extract signature from audio content, extract signature from video content, or extract signature from audio content and video content.

The fingerprint comparator 536 may acquire channel information and/or content information using the signature extracted from the A/V content. The fingerprint comparator 536 according to the present embodiment may acquire the channel information and/or the content information through a local search and/or a remote search.

In detail, as illustrated in FIG. 35, a route for an operation of the fingerprint comparator 536 that accesses a storage device 537 is referred to as a local search. In addition, as illustrated in FIG. 35, a route for an operation of the fingerprint comparator 536 that accesses an internet access control module 538 is referred to as a remote search. The local search and the remote search will be described below.

In the local search according to the present embodiment, the fingerprint comparator 536 may compare the extracted signature with a reference fingerprint stored in the storage device 537. The reference fingerprint is data that the fingerprint comparator 536 further receives in order to process the extracted signature.

In detail, the fingerprint comparator 536 may match and compare the extracted signal and the reference fingerprint in order to determine whether the extracted signal and the reference fingerprint are identical to acquire channel information and/or content information.

As the comparison result, when the extracted signal is identical to the reference fingerprint, the fingerprint comparator 536 may transmit the comparison result to application. The application may transmit content information and/or channel information related to the extracted signature using the comparison result to the receiver.

As the comparison result, when the extracted signature is not matched with the reference fingerprint or the number of reference fingerprints is not sufficient, the fingerprint comparator 536 may receive a new reference fingerprint through an ATSC MH channel. Then, the fingerprint comparator 536 may re-compare the extracted signature and the reference fingerprint.

In the remote search according to the present embodiment, the fingerprint comparator 536 may receive channel information and/or content information from a signature database server on the Internet.

In detail, the fingerprint comparator 536 may access the Internet via the internet access control module 538 to access the signature database server. Then, the fingerprint comparator 536 may transmit the extracted signature as a query parameter to the signature database server.

When all broadcasters use one integrated signature database server, the fingerprint comparator 536 may transmit the query parameter to a corresponding signature database server. When broadcasters separately manage respective signature database servers, the fingerprint comparator 536 may transmit query parameters to respective signature databases. In addition, the fingerprint comparator 536 may simultaneously transmit the query parameter to two or more signature database servers.

The receiver according to the present embodiment may tune an ATSC MH channel using the channel information and/or the content information that are acquired by the fingerprint comparator 536 and receive corresponding content and/or metadata. Then, the receiver may display the received content and/or metadata using trigger, etc.

FIG. 36 is a diagram illustrating a digital broadcast system according to an embodiment of the present invention.

In detail, FIG. 36 illustrates a personalization broadcast system including a digital broadcast receiver (or a receiver) for a personalization service. The personalization service according to the present embodiment is a service for selecting and supplying content appropriate for a user based on user information. In addition, the personalization broadcast system according to the present embodiment may provide a next generation broadcast service for providing an ATSC 2.0 service or a personalization service.

According to an embodiment of the present invention, as an example of the user information, user's profiles, and demographics and interests information (or PDI data) are defined. Hereinafter, elements of the personalization broadcast system will be described.

The answers to the questionnaires, taken together, represent the user's Profile, Demographics, and Interests (PDI). The data structure that encapsulates the questionnaire and the answers given by a particular user is called a PDI Questionnaire or a PDI Table. A PDI Table, as provided by a network, broadcaster or content provider, includes no answer data, although the data structure accommodates the answers once they are available. The question portion of an entry in a PDI Table is informally called a "PDI Question" or "PDI-Q." The answer to a given PDI question is referred to informally as a "PDI-A." A set of filter criteria is informally called a "PDI-FC."

The client device such as an ATSC 2.0-capable receiver includes a function allowing the creation of answers to the questions in the questionnaire (PDI-A instances). This PDI-generation function uses PDI-Q instances as input and produces PDI-A instances as output. Both PDI-Q and PDI-A instances are saved in non-volatile storage in the receiver. The client also provides a filtering function in which it compares PDI-A instances against PDI-FC instances to determine which content items will be suitable for downloading and use.

On the service provider side as shown, a function is implemented to maintain and distribute the PDI Table. Along with content, content metadata are created. Among the metadata are PDI-FC instances, which are based on the questions in the PDI Table.

As illustrated in FIG. 36, the personalization broadcast system may include a content provider (or broadcaster) 707 and/or a receiver 700. The receiver 700 according to the present embodiment may include a PDI engine 701, a filtering engine 702, a PDI store 703, a content store 704, a declarative content module 705, and/or a user interface (UI) module 706. As illustrated in FIG. 36, the receiver 700 according to the present embodiment may receive content, etc. from the content provider 707. The structure of the aforementioned personalization broadcast system may be changed according to a designer's intention.

The content provider 707 according to the present embodiment may transmit content, PDI questionnaire, and/or filtering criteria to the receiver 700. The data structure that encapsulates the questionnaire and the answers given by a particular user is called a PDI questionnaire. According to an embodiment of the present invention, the PDI questionnaire may include questions (or PDI questions) related to profiles, demographics and interests, etc. of a user.

The receiver 700 may process the content, the PDI questionnaire, and/or the filtering criteria, which are received from the content provider 707. Hereinafter, the digital broadcast system will be described in terms of operations of modules included in the receiver 700 illustrated in FIG. 36.

The PDI engine 701 according to the present embodiment may receive the PDI questionnaire provided by the content provider 707. The PDI engine 701 may transmit PDI questions contained in the received in the PDI questionnaire to the UI module 706. When a user's input corresponding to a corresponding PDI question is present, the PDI engine 701 may receive a user's answer and other information (hereafter, referred to as a PDI answer) related to the corresponding PDI question from the UI module 706. Then, the PDI engine 701 may process PDI questions and PDI answers in order to supply the personalization service to generate PDI data. That is, according to an embodiment of the present invention, the PDI data may contain the aforementioned PDI questions and/or PDI answers. Therefore, the PDI answers to the PDI questionnaires, taken together, represent the user's profile, demographics, and interests (or PDI).

In addition, the PDI engine 701 according to the present embodiment may update the PDI data using the received PDI answers. In detail, the PDI engine 701 may delete, add, and/or correct the PDI data using an ID of a PDI answer. The ID of the PDI answer will be described below in detail with regard to an embodiment of the present invention. In addition, when another module requests the PDI engine 701 to transmit PDI data, the PDI engine 701 may transmit PDI data appropriate for the corresponding request to the corresponding module.

The filtering engine 702 according to the present embodiment may filter content according to the PDI data and the filtering criteria. The filtering criteria refers to a set filtering criterions for filtering only contents appropriate for a user using the PDI data. In detail, the filtering engine 702 may receive the PDI data from the PDI engine 701 and receive the content and/or the filtering criteria from the content provider 707. In addition, when the convent provider 707 transmits a parameter related to declarative content, the convent provider 707 may transmit a filtering criteria table related to the declarative content together. Then, the filtering engine 702 may match and compare the filtering criteria and the PDI data and filter and download the content using the comparison result. The downloaded content may be stored in the content store 704. A filtering method and the filtering criteria will be described in detail with reference to FIGS. 38 and 39.

According to an embodiment of the present invention, the UI module 706 may display the PDI received from the PDI engine 701 and receive the PDI answer to the corresponding PDI question from the user. The user may transmit the PDI answer to the displayed PDI question to the receiver 700 using a remote controller. The UI module 706 may transmit the received PDI answer to the PDI engine 701.

The declarative content module 705 according to the present embodiment may access the PDI engine 701 to acquire PDI data. In addition, as illustrated in FIG. 36, the declarative content module 705 may receive declarative content provided by the content provider 707. According to an embodiment of the present invention, the declarative content may be content related to application executed by the receiver 700 and may include a declarative object (DO) such as a triggered declarative object (TDO).

Although no illustrated in FIG. 36, the declarative content module 705 according to the present embodiment may access the PDI store 703 to acquire the PDI question and/or the PDI answer. In this case, the declarative content module 705 may use an application programming interface (API). In detail, the declarative content module 705 may retrieve the PDI store 703 using the API to acquire at least one PDI question. Then, the declarative content module 705 may transmit the PDI question, receive the PDI answer, and transmit the received PDI answer to the PDI store 703 through the UI module 706.

The PDI store 703 according to the present embodiment may store the PDI question and/or the PDI answer.

The content store 704 according to the present embodiment may store the filtered content.

As described above, the PDI engine 701 illustrated in FIG. 36 may receive the PDI questionnaire from the content provider 707. The receiver 700 may display PDI questions of the PDI questionnaire received through the UI module 706 and receive the PDI answer to the corresponding PDI question from the user. The PDI engine 701 may transmit PDI data containing the PDI question and/or the PDI answer to the filtering engine 702. The filtering engine 702 may filter content through the PDI data and the filtering criteria. Thus, the receiver 700 may provide the filtered content to the user to embody the personalization service.

FIG. 37 is a diagram illustrating a digital broadcast system according to an embodiment of the present invention.

In detail, FIG. 37 illustrates the structure of a personalization broadcast system including a receiver for a personalization service. The personalization broadcast system according to the present embodiment may provide an ATSC 2.0 service. Hereinafter, elements of the personalization broadcast system will be described.

As illustrated in FIG. 37, the personalization broadcast system may include a content provider (or broadcaster 807) and/or a receiver 800. The receiver 800 according to the present embodiment may include a PDI engine 801, a filtering engine 802, a PDI store 803, a content store 804, a declarative content module 805, a UI module 806, a usage monitoring engine 808, and/or a usage log module 809. As illustrated in FIG. 36, the receiver 800 according to the present embodiment may receive content, etc. from the content provider 807. Basic modules of FIG. 37 are the same as the modules of FIG. 36, except that the broadcast system of FIG. 37 may further include the usage monitoring engine 808 and/or the usage log module 809 unlike the broadcast system of FIG. 36. The structure of the aforementioned personalization broadcast system may be changed according to a designer's intention. Hereinafter, the digital broadcast system will be described in terms of the usage monitoring engine 808 and the usage log module 809.

The usage log module 809 according to the present embodiment may store information (or history information) regarding a broadcast service usage history of a user. The history information may include two or more usage data. The usage data according to an embodiment of the present invention refers to information regarding a broadcast service used by a user for a predetermined period of time. In detail, the usage data may include information indicating that news is watched for 40 minutes at 9 pm, information indicating a horror movie is downloaded at 11 pm, etc.

The usage monitoring engine 808 according to the present embodiment may continuously monitor a usage situation of a broadcast service of the user. Then, the usage monitoring engine 808 may delete, add, and/or correct the usage data stored in the usage log module 809 using the monitoring result. In addition, the usage monitoring engine 808 according to the present embodiment may transmit the usage data to the PDI engine 801 and the PDI engine 801 may update the PDI data using the transmitted usage data.

FIG. 38 is a flowchart of a digital broadcast system according to another embodiment of the present invention.

In detail, FIG. 38 is a flowchart of operations of a filtering engine and a PDI engine of the personalization broadcast system described with reference to FIGS. 36 and 37.

As illustrated in FIG. 38, a receiver 900 according to the present embodiment may include a filtering engine 901 and/or a PDI engine 902. Hereinafter, operations of the filtering engine 901 and the PDI engine 902 according to the present embodiment will be described. The structure of the aforementioned receiver may be changed according to a designer's intention.

As described with reference to FIG. 36, in order to filter content, the receiver 900 according to the present embodiment may match and compare filtering criteria and PDI data.

In detail, the filtering engine 901 according to the present embodiment may receive filtering criteria from a content provider and transmit a signal (or a PDI data request signal) for requesting PDI data to the PDI engine 902. The PDI engine 902 according to the present embodiment may search for PDI data corresponding to the corresponding PDI data request signal according to the transmitted PDI data request signal.

The filtering engine 901 illustrated in FIG. 38 may transmit the PDI data request signal including a criterion ID (identifier) to the PDI engine 902. As described above, the filtering criteria may be a set of filtering criterions, each of which may include a criterion ID for identifying the filtering criterions. In addition, according to an embodiment of the present invention, a criterion ID may be used to identify a PDI question and/or a PDI answer.

The PDI engine 902 that has received the PDI data request signal may access a PDI store to search for the PDI data. According to an embodiment of the present invention, the PDI data may include a PDI data ID for identifying a PDI question and/or a PDI answer. The PDI engine 902 illustrated in FIG. 38 may match and compare whether the criterion ID and PDI data ID in order to determine whether the criterion ID and the PDI data ID are identical to each other.

As the matching result, when the criterion ID and the PDI data ID are identical to each other and values thereof are identical to each other, the receiver 900 may download corresponding content. In detail, the filtering engine 901 according to the present embodiment may transmit a download request signal for downloading content to the content provider.

As the matching result, when the criterion ID and the PDI data ID are not identical to each other, the PDI engine 902 may transmit a null ID (identifier) to the filtering engine 901, as illustrated in FIG. 38. The filtering engine 901 that has received the null ID may transmit a new PDI data request signal to the PDI engine 902. In this case, the new PDI data request signal may include a new criterion ID.

The receiver 900 according to the present embodiment may match all filtering criterions contained in the filtering criteria with the PDI data using the aforementioned method. As the matching result, when the all filtering criterions are matched with the PDI data, the filtering engine 901 may transmit the download request signal for downloading contents to the content provider.

FIG. 39 is a flowchart of a digital broadcast system according to another embodiment of the present invention.

In detail, FIG. 39 is a flowchart of operations of a filtering engine and a PDI engine of the personalization broadcast system described with reference to FIGS. 36 and 37.

As illustrated in FIG. 39, a receiver 1000 according to the present embodiment may include a filtering engine 1001 and/or a PDI engine 1002. The structure of the aforementioned receiver may be changed according to a designer's intention. Basic operations of the filtering engine 1001 and the PDI engine 1002 illustrated in FIG. 39 are the same as the operations described with reference to FIG. 38.

However, as the matching result of the filtering criterion and the PDI data, when the criterion ID is not identical to the PDI data ID, the receiver 1000 illustrated in FIG. 39 may not download corresponding content, according to an embodiment of the present invention.

In detail, when the filtering engine 1001 according to the present embodiment receives a null ID, a new PDI data request signal may not be transmitted to the PDI engine 1002, according to an embodiment of the present invention. In addition, when all the filtering criterions contained in the filtering criteria are not matched with the PDI data, the filtering engine 1001 according to the present embodiment may not transmit the download request signal to the content provider, according to an embodiment of the present invention.

FIG. 40 is a diagram illustrating a PDI Table according to an embodiment of the present invention.

The personalization broadcast system described with reference to FIG. 36 may use PDI data in order to provide a personalization service and process the PDI data in the form of PDI Table. The data structure that encapsulates the questionnaire and the answers given by a particular user is called a PDI questionnaire or a PDI Table. A PDI Table, as provided by a network, broadcaster or content provider, includes no answer data, although the data structure accommodates the answers once they are available. The question portion of an entry in a PDI Table is informally called a "PDI question" or "PDI-Q." The answer to a given PDI question is referred to informally as a "PDI-A." A set of filtering criteria is informally called a "PDI-FC". According to an embodiment of the present invention, the PDI table may be represented in XML schema. A format of the PDI table according to the present embodiment may be changed according to a designer's intention.

As illustrated in FIG. 40, the PDI table according to the present embodiment may include attributes 1110 and/or PDI type elements. The attributes 1110 according to the present embodiment may include a transactional attribute 1100 and a time attribute 1101. The PDI type elements according to the present embodiment may include question with integer answer (QIA) elements 1102, question with Boolean answer (QBA) elements 1102, question with selection answer (QSA) elements 1104, question with text answer (QTA) elements 1105, and/or question with any-format answer (QAA) elements 1106. Hereinafter, elements of the PDI table illustrated in FIG. 40 will be described.

In detail, the attributes 1110 illustrated in FIG. 40 may indicate information of attributes of the PDI table according to the present embodiment. Thus, even if the PDI type elements included in the PDI table are changed, the attributes 1110 may not be changed in the PDI table according to the present embodiment. For example, the transactional attribute 1100 according to the present embodiment may indicate information regarding an objective of a PDI question. The time attribute 1101 according to the present embodiment may indicate information regarding time when the PDI table is generated or updated. In this case, even if PDI type elements are changed, PDI tables including different PDI type elements may include the transactional attribute 1100 and/or the time attribute 1101.

The PDI table according to the present embodiment may include one or two or more PDI type elements 1102 as root elements. In this case, the PDI type elements 1102 may be represented in a list form.

The PDI type elements according to the present embodiment may be classified according to a type of PDI answer. For example, the PDI type elements according to the present embodiment may be referred to as "QxA" elements. In this case, "x" may be determined according to a type of PDI answer. The type of the PDI answer according to an embodiment of the present invention may include an integer type, a Boolean type, a selection type, a text type, and any type of answers other than the aforementioned four types.

QIA elements 1103 according to an embodiment of the present invention may include an integer type of PDI answer to one PDI question and/or corresponding PDI question.

QBA elements 1104 according to an embodiment of the present invention may include a Boolean type of PDI answer to one PDI question and/or corresponding PDI question.

QSA elements 1105 according to an embodiment of the present invention may include a multiple selection type of PDI answer to one PDI question and/or corresponding PDI question.

QTA elements 1106 according to an embodiment of the present invention may include a text type of PDI answer to one PDI question and/or corresponding PDI question.

QAA elements 1107 according to an embodiment of the present invention may include a predetermined type of PDI answer, other than integer, Boolean, multiple-selection, and text types, to one PDI question and/or corresponding PDI question.

FIG. 41 is a diagram illustrating a PDI Table according to another embodiment of the present invention.

In detail, FIG. 41 illustrates XML schema of QIA elements among the PDI type elements described with reference to FIG. 40.

As illustrated in FIG. 41, the QIA elements may include attributes 1210 indicating information regarding attributes related to a PDI question type, identifier attribute 1220, a question element 1230, and/or an answer element 1240.

In detail, the attributes 1210 according to the present embodiment may include language attribute indicating a language of a PDI question. In addition, the attributes 1210 of the QIA elements according to the present embodiment may include a mininclusive attribute 1230 indicating a minimum integer of a PDI question and/or a maxinclusive attribute 1240 indicating a maximum integer of the PDI question.

The identifier attribute 1220 according to the present embodiment may be used to identify the PDI question and/or the PDI answer.

The question element 1230 according to the present embodiment may include the PDI question. As illustrated in FIG. 41, the question element 1230 may include attributes indicating information regarding the PDI question. For example, the question element 1230 may include time attribute 1231 indicating time when the PDI question is generated or transmitted and/or expiration time of the PDI question.

In addition, the answer element 1240 according to the present embodiment may include the PDI answer. As illustrated in FIG. 41, the answer element 1240 may include attributes indicating information regarding the PDI answer. For example, as illustrated in FIG. 41, the answer element 1240 may include identifier attribute 1241 used to recognize each PDI answer and/or time attribute 1242 indicating time when each PDI answer is generated or corrected.

FIG. 42 is a diagram illustrating a PDI table according to another embodiment of the present invention.

In detail, FIG. 42 illustrates XML schema of QBA elements among the PDI type elements described with reference to FIG. 40.

As illustrated in FIG. 42, basic elements of the XML schema of the QBA elements are the same as the elements described with reference to FIG. 41, and thus, a detailed description thereof is omitted.

FIG. 43 is a diagram illustrating a PDI table according to another embodiment of the present invention.

In detail, FIG. 43 illustrates XML schema of the QSA elements among the PDI type elements described with reference to FIG. 40.

Basic elements of the XML schema of the QSA elements illustrated in FIG. 43 are the same as the elements described with reference to FIG. 43, and thus, a detailed description thereof is omitted.

However, according to the attribute of multiple selection question, the attribute of the QSA elements according to the present embodiment may further include minchoice attribute 1411 and/or maxchoice attribute 1412. The minchoice attribute 1411 according to the present embodiment may indicate a minimum number of PDI answers that can be selected by the user. The maxchoice attribute 1412 according to the present embodiment may indicate a maximum number of PDI answers that can be selected by the user.

FIG. 44 is a diagram illustrating a PDI table according to another embodiment of the present invention.

In detail, FIG. 44 illustrates XML schema of the QAA elements among the PDI type elements described with reference to FIG. 40.

As illustrated in FIG. 44, basic elements of the XML schema of the QAA elements are the same as the elements described with reference to FIG. 41, and thus, a detailed description thereof is omitted.

FIG. 45 is a diagram illustrating a PDI table according to another embodiment of the present invention.

In detail, FIG. 45 illustrates an extended format of a PDI table in XML schema as the PDI table described with reference to FIGS. 40 through 44.

As described above, according to an embodiment of the present invention, the PDI table is used to provide a personalization service. However, despite of the same user, preferred content may be changed according to a situation to which the user belongs.

Thus, in order to overcome this problem, according to an embodiment of the present invention, the PDI table may further include an element indicating information regarding the situation of the user.

The PDI table illustrated in FIG. 45 may further include situation element 1600 as the element indicating the information regarding the situation of the user. The basic XML schema of the PDI table illustrated in FIG. 45 is the same as the XML schema described with reference to FIGS. 40 through 44, and thus, a detailed description thereof is omitted. Hereinafter, the situation element 1600 will be described.

The situation element 1600 according to the present embodiment may indicate information regarding a timezone and/or location as the information of situation of the user. As illustrated in FIG. 45, the situation element 1600 may further include a time element 1610, a location element 1620, and/or other elements indicating the information of situation of the user. Hereinafter, each element will be described.

The time element 1610 according to the present embodiment may include information regarding time of an area to which the user belongs. For example, the time element 1610 may include time attribute 1611 indicating time information in the form of "yyyy-mm-dd" and/or timezone attribute 1612 indicating a time zone of the area to which the user belongs.

The location element 1620 according to the present embodiment may include information of a location to which the user belongs. For example, as illustrated in FIG. 45, the location element 1620 may include location-desc attribute 1621 indicating information of a corresponding location, latitude attribute 1622 indicating information of latitude of the corresponding location, and/or longitude attribute 1623 indicating information of longitude of the corresponding location.

FIG. 46 illustrate a PDI table according to another embodiment of the present invention.

In detail, FIG. 46 illustrates the PDI table in the XML schema described with reference to FIGS. 40 through 45 with regard to an embodiment of the present invention.

FIG. 46 depicts the XML schema definition for a root element called PDI Table, which defines the structure of PDI table instance documents. According to an embodiment of the present invention, the PDI table instance document refers to an actual document obtained by realizing the PDI table in the XML schema.

FIG. 46 also depicts the XML schema definitions for root elements QIA, QBA, QSA, QTA, or QAA, which represent individual questions that can be passed back and forth between DOs and the underlying receiver, using the PDI application programming interface (API). The PDI API according to the present embodiment will be described in detail. The elements shown in FIG. 46 may conform to the definitions in the XML schema with namespace "http://www.atsc.org/XMLSchemas/iss/pdi/1".

Differences between PDI question (or PDI-Q) and PDI answer (or PDI-A) are specified in the usage rules rather than the schema itself. The question portion of an entry in a PDI Table is informally called a "PDI Question" or "PDI-Q". The answer to a given PDI question is referred to informally as a "PDI-A". For example, while the schema indicates minOccurs="0" for the "q" element of the various types of questions, when the schema is used for PDI-Q, use of the "q" elements in that case are mandatory. When the schema is used for PDI-A, inclusion of the "q" elements is optional.

PDI-Q instance documents can conform to the "PDI Table" XML schema that is part of ATSC 2.0 Standard, with its namespace, and that definition can take precedence over the description provided here in the event of any difference. According to an embodiment of the present invention, the PDI-Q instance document refers to an actual document obtained by realizing the PDI table including PDI-Q in the XML schema.

A PDI-Q instance document consists of one or more elements of type QIA (integer-answer type question), QBA (Boolean-answer type question), QSA (selection-type question), and/or QTA (textual-answer type question).

No "A" (answer) child elements of these top-level elements can be present in a PDIQ instance.

The identifier attribute ("id") in each of these elements can serve as a reference or linkage to corresponding elements in a PDI-A instance document. According to an embodiment of the present invention, the PDI-A instance document refers to an actual document obtained by realizing the PDI table including PDI-A in the XML schema.

PDI-A instance documents can conform to the "PDI Table" XML schema that is part of ATSC 2.0 Standard, with its namespace, and that definition can take precedence over the description provided here in the event of any difference.

A PDI-A instance document consists of one or more elements of type QIA (integer-answer type question), QBA (Boolean-answer type question), QSA (selection-type answer question), QTA (textual-answer type question), and/or QAA (any-format answer type question).

Each of these elements has at least one "A" (answer) child element. They may or may not include any "Q" (question string) child elements.

The identifier attribute ("id") in each of these elements can serve as a reference or linkage to corresponding elements in a PDI-Q instance document.

Hereinafter, semantics of the elements and attributes included in the PDI table illustrated in FIG. 46 will be described.

As illustrated in FIG. 46, in the PDI table according to the present embodiment, "@" may be indicated at the front of a name of attribute so as to distinguish between the attributes and the elements.

The PDI table according to the present embodiment may include PDI type elements. In detail, the PDI type elements may include QIA elements, QBA elements, QSA elements, QTA elements, and/or QAA elements, as described with reference to FIG. 40.

As illustrated in FIG. 46, the PDI table according to the present embodiment may include protocolversion attribute, pditableid attribute, pditableversion attribute, and/or time attribute regardless of the question type elements.

The id attributes of the QIA, QBA, QSA, QTA and QAA elements all have the same semantics, as do the expire attributes of each of these elements. Similarly the lang attributes of each of the Q elements each have the same semantics, as do the time attributes of each of the A elements. In addition, the id attributes may refer to the PDI data identifier that has been described with reference to FIG. 38.

A PDITable element contains the list of one or more question elements. Each one is in the format of QIA, QBA, QSA, QTA, or QAA. The use of the <choice> construct with cardinality 0 . . . N means that any number of QIA, QBA, QSA, QTA and QAA elements can appear in any order.

A protocolVersion attribute of the PDITable element consists of 2 hex digits. The high order 4 bits indicates the major version number of the table definition. The low order 4 bits indicates the minor version number of the table definition. The major version number for this version of this standard is set to 1. Receivers are expected to discard instances of the PDI indicating major version values they are not equipped to support. The minor version number for this version of the standard is set to 0. Receivers are expected to not discard instances of the PDI indicating minor version values they are not equipped to support. In this case they are expected to ignore any individual elements or attributes they do not support.

A pdiTableId attribute of the PDITable element can be a globally unique identifier of this PDI Table element.

A pdiTableVersion attribute with 8-bit of the PDITable element indicates the version of this PDI Table element. The initial value can be 0. The value can be incremented by 1 each time this PDI Table element changes, with rollover to 0 after 255.

A time attribute of the PDITable element indicates the date and time of the most recent change to any question in this PDI Table.

A QIA element represents an integer-answer type of question. It includes optional limits specifying the maximum and minimum allowed values of the answer.

A QIA.loEnd attribute of QIA indicates the minimum possible value of an "A" child element of this QIA element. I.e., the value of an "A" element is no less than loEnd. If the loEnd attribute is not present, that indicates that there is no minimum.

A QIA.hiEnd attribute of QIA indicates the maximum possible value of an "A" child element of this QIA element. I.e., the value of an answer is no greater than hiEnd. If the hiEnd attribute is not present, that indicates that there is no maximum.

A QIA.Q element is a child element of the QIA element. The value of the QIA.Q element can represent the question string to be presented to users. The question must be formulated to have an integer-type answer. There may be multiple instances of this element, in different languages.

A QIA.A element as a child element of the QIA element can have a integer-value. The QIA.A element can represent an answer to the question in QIA.Q.

A QBA element represents a Boolean-answer type of question.

A QBA.Q element is a child element of the QBA element. The value of the QBA.Q element can represent the question string to be presented to users. The question must be formulated to have a yes/no or true/false type of answer. There may be multiple instances of this element in different languages.

A QBA.A element as a child element of the QBA element can have a Boolean-value. A QBA.A element can represent an answer to the question in QBA.Q.

A QSA element represents a selection-answer type of question.

A QSA.minChoices attribute of the QSA element can specify the minimum number of selections that can be made by a user.

A QSA.maxChoices attribute of the QSA element can specify the maximum number of selections that can be made by a user.

A QSA.Q element is a child element of the QSA element. The value of the QSA.Q element represents the question string to be presented to users. The question must be formulated to have an answer that corresponds to one or more of the provided selection choices.

A QSA.Q.Selection element is a child element of the QSA.Q element. The value of the QSA.Q.Selection element can represent a possible selection to be presented to the user. If there are multiple QSA.Q child elements of the same QSA element (in different languages), each of them has the same number of Selection child elements, with the same meanings.

A QSA.Q.Selection.id attribute of QSA.Q.Selection can be an identifier for the Selection element, unique within the scope of QSA.Q. If there are multiple QSA.Q child elements of the same QSA element (in different languages), there can be a one-to-one correspondence between the id attributes of their Selection elements, with corresponding Selection elements having the same meaning.

A QSA.A is a child element of the QSA element. Each instance of this child element of the QSA element can specify one allowed answer to this selection-type question, in the form of the id value of one of the Selection elements.

A QTA element represents a textual-answer (free-form entry) type of question.

A QTA.Q element is a child element of the QTA element. The value of the QTA.Q element can represent the question string to be presented to users. The question must be formulated to have a free-form text answer.

A QTA.A element is a child element of the QTA element. The value of the QTA.A element can represent an answer to the question in QTA,Q.

A QAA element may be used to hold various types of information, like an entry in a database.

A QAA.A element is a child element of the QAA element. The value of the QAA.A element contains some type of information.

An id attribute of the QIA, QBA, QSA, QTA, and QAA elements can be a URI which is a globally unique identifier for the element in which it appears.

An expire element of the QIA, QBA, QSA, QTA, and QAA elements can indicate a date and time after which the element in which it appears is no longer relevant and is to be deleted from the table.

A lang attribute of the QIA.Q, QBA.Q, QSA.Q, QTA.Q, and QTA.A elements can indicate the language of the question or answer string. In the case of QSA.Q, the lang attribute can also indicate the language of the Selection child elements of QSA.Q. If the lang attribute is not present, that can indicate that the language is English.

A time attribute of the QIA.A, QBA.A, QSA.A, QTA.A, and QAA.A elements can indicate the date and time the answer was entered into the table.

Although not illustrated in FIG. 46, the PDI table according to the present embodiment may further include QIAD element, QBAD element, QSAD element, QTAD element, and/or QAAD element. The aforementioned elements will be collectively called the QxAD elements. Hereinafter, the QxAD elements will be described.

A QIAD element as a root element shall contain an integer-answer type of question in the QIA child element. QIA includes optional limits specifying the maximum and minimum allowed values of the answer.

A QBAD element as a root element shall represent a Boolean-answer type of question.

A QSAD element as a root element shall represent a selection-answer type of question.

A QTAD element as a root element shall represent a textual-answer (free-form entry) type of question.

A QAAD element as a root element shall be used to hold various types of information, like an entry in a database.

Although not illustrated in FIG. 46, each PDI type element may further include a QText element and/or time attribute.

A QIA.Q.QText element is a child element of the QIA.Q element. The value of the QIA.Q.QText element shall represent the question string to be presented to users. The question must be formulated to have an integer-type answer.

A QIA.A.answer attribute is an integer-valued attribute of the QIA.A element. The QIA.A.answer attribute shall represent an answer to the question in QIA.Q.QText element.

A QBA.Q.Qtext element is a child element of the QBA.Q element. The value of the QBA.Q.Qtext element shall represent the question string to be presented to users. The question must be formulated to have a yes/no or true/false type of answer. There may be multiple instances of this element in different languages.

A QBA.A.answer attribute is a Boolean-valued attribute of the QBA.A element. The QBA.A@answer attribute shall represent an answer to the question in QBA.Q.QText element.

A QSA.Q.QText element is a child element of the QSA.Q element. The QSA.Q.QText element shall represent the question string to be presented to users. The question must be formulated to have an answer that corresponds to one or more of the provided selection choices. There may be multiple instances of this element in different languages.

A QSA.A.answer attribute of the QSA.A child element shall specify one allowed answer to this selection-type question, in the form of the id value of one of the Selection elements.

A QTA.Q.QText element is a child element of the QTA element. The value of the QTA.Q.QText element shall represent the question string to be presented to users. The question must be formulated to have a free-form text answer.

A QTA.A.answer attribute is a child element of the QTA element. The value of the QTA.A.answer element represents an answer to the question in QTA.Q.QText element.

FIG. 47 illustrates a PDI table according to another embodiment of the present invention.

In detail, FIG. 47 illustrates the structure of the PDI table in the XML schema described with reference to FIGS. 40 through 45

The basic structure of the PDI table illustrated in FIG. 47 and semantics of the basic elements and attributes are the same as those in FIG. 46. However, unlike the PDI table illustrated in FIG. 46, the PDI table illustrated in FIG. 47 may further include a xactionSetid attribute and/or a text attribute. Hereinafter, the PDI table will be described in terms of the xactionSetid attribute and/or the text attribute.

A xactionSetid attribute of the QxA elements indicates that the question belongs to a transactional set of questions, where a transactional set of questions is a set that is to be treated as a unit for the purpose of answering the questions. It also provides an identifier for the transactional set to which the question belongs. Thus, the set of all questions in a PDI Table that have the same value of the xactionSetid attribute is answered on an "all or nothing" basis.

A text attribute of the QxA elements is a child element of QxA.Q elements. The value of the text attribute can represents the question string to be presented to users.

FIG. 48 is a diagram illustrating a filtering criteria table according to an embodiment of the present invention. The aforementioned personalization broadcast system of FIG. 36 may use filtering criteria in order to provide a personalization service. The filtering criteria described with reference to FIGS. 36, 38, and 39 may be processed in the form of filtering criteria table. According to an embodiment of the present invention, the filtering criteria table may be represented in the form of XML Schema.

According to an embodiment of the present invention, the filtering criteria table may have a similar format to a format of the PDI table in order to effectively compare the PDI data and the filtering criteria. The format of the filtering criteria table according to the present embodiment may be changed according to a designer's intention.

As illustrated in FIG. 48, the filtering criteria table according to the present embodiment may include a filtering criterion element 1900. The filtering criterion element 1900 may include identifier attribute 1901, criterion type attribute 1902, and/or a criterion value element 1903. The filtering criterion according to the present embodiment may be interpreted as corresponding to the aforementioned PDI question. Hereinafter, elements of the filtering criteria table illustrated in FIG. 48 will be described.

The filtering criterion element 1900 according to the present embodiment may indicate filtering criterion corresponding to the PDI question.

The identifier attribute 1901 according to the present embodiment may identify a PDI question corresponding to the filtering criterion.

The criterion type attribute 1902 according to the present embodiment may indicate a type of the filtering criterion. The type of the filtering criterion will be described in detail.

The criterion value element 1903 according to the present embodiment may indicate a value of the filtering criterion. Each criterion value is a possible answer to the PDI question.

In detail, the type of the filtering criterion according to the present invention may be one of an integer type, a Boolean type, a selection type, a text type, and/or any type.

The filtering criterion of the integer type (or integer type criterion) refers to filtering criterion corresponding to a PDI answer of the integer type.

The filtering criterion of the Boolean type (or Boolean type criterion) refers to filtering criterion corresponding to a PDI answer of the Boolean type.

The filtering criterion of the selection type (or selection type criterion) refers to filtering criterion corresponding to a PDI answer of the selection type.

The filtering criterion of the text type (or text type criterion) refers to filtering criterion corresponding to a PDI answer of the text type.

The filtering criterion of any type (or any type criterion) refers to filtering criterion corresponding to a PDI answer of any type.

[Example 5] below shows XML schema of the filtering criteria table illustrated in FIG. 48 according to an embodiment of the present invention.

[Example 5]

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:element name="FilterCriteriaTable" type="FilterCriteriaTableType"/>
    <xs:complexType name="FilterCriteriaTableType">
        <xs:sequence maxOccurs="unbounded">
            <xs:element name="FilterCriterion" type="FilterCriterionType"/>
        </xs:sequence>
    </xs:complexType>
```

```
<xs:complexType name="FilterCriterionType">
<xs:sequence>
<xs:element name="CriterionValue" type="xs:base64Binary"
maxOccurs="unbounded"/>
</xs:sequence>
<xs:attribute name="id" type="xs:anyURI" use="required"/>
<xs:attribute name="CriterionType" type="xs:unsignedByte" use="required"/>
</xs:complexType>
</xs:schema>
```

FIG. 49 is a diagram illustrating a filtering criteria table according to another embodiment of the present invention.

In detail, FIG. 49 illustrates an extended format of a filtering criteria table in XML schema as the filtering criteria table described with reference to FIG. 48. When the filtering criteria table is configured in the XML schema of the filtering criteria illustrated in FIG. 48, a type of filtering criterion according to an embodiment of the present invention. and detailed attribute for each type thereof cannot be set. Thus, FIG. 49 illustrates a type of filtering criterion and proposes XML schema for setting attribute for each type. A personalization broadcast system according to an embodiment of the present invention may more precisely filter content using a filtering criteria table configured in the XML schema of FIG. 49.

As illustrated in FIG. 49, the filtering criteria table may include attributes 2000 and/or filtering criterion type elements. The attributes 2000 according to the present embodiment may include time attribute 2001. The filtering criterion type elements according to the present embodiment may include an integer type criterion element (or QIA criterion element) 2010, a Boolean type criterion element (or QBA criterion element) 2020, a selection type criterion element (or QSA criterion element) 2030, a text type criterion element (or QTA criterion element) 2040, and/or any type criterion element (or QAA criterion element) 2050. Hereinafter, elements of the filtering criteria table illustrated in FIG. 49 will be described.

In detail, the attributes 2000 illustrated in FIG. 40 may indicate information of attributes of the filtering criteria table according to the present embodiment. Thus, even if filtering criteria type elements included in the filtering criteria table are changed, the attributes 2000 may not be changed. For example, the time attribute 2001 according to the present embodiment may indicate time when the filtering criteria are generated or updated. In this case, filtering criteria tables including different filtering criteria type elements may include the time attribute 2001 even if the filtering criteria type elements are changed.

The filtering criteria table according to the present embodiment may include one or more or more filtering criteria type elements. The filtering criteria type elements according to the present embodiment may indicate a type of filtering criterion. The type of filtering criterion has been described with reference to FIG. 48. In this case, the filtering criteria type elements may be represented in a list form.

The filtering criteria type elements according to the present embodiment may also be referred to as "QxA" criterion. In this case, "x" may be determined according to a type of filtering criterion.

As illustrated in FIG. 49, each of the filtering criteria type elements may include an identifier attribute and/or a criterion value element. An identifier attribute and a criterion value element illustrated in FIG. 49 are the same as those described with reference to FIG. 48.

However, as illustrated in FIG. 49, an integer type criterion element 2010 may further include a min integer attribute 2011 and/or a max integer attribute 2012. The min integer attribute 2011 according to the present embodiment may indicate a minimum value of the filtering criterion represented as an integer type answer. The max integer attribute 2012 according to the present embodiment may indicate a maximum value of the filtering criterion represented as an integer type answer.

As illustrated in FIG. 49, a selection type criterion element 2030 and/or a text type criterion element 2040 may include lang attribute 2031. The lang attribute 2031 according to the present embodiment may indicate a value of the filtering criterion represented in a text type answer.

[Example 6] below shows XML schema of the filtering criteria table illustrated in FIG. 49 according to an embodiment of the present invention.

[Example 6]

```
<?xml version="1.0" encoding="UTF-8"?>
<xs:schema xmlns:xs="http://www.w3.org/2001/XMLSchema" elementFormDefault="qualified" attributeFormDefault="unqualified">
  <xs:element name="FilterCriteriaTable" type="FilterCriteriaTableType"/>
  <xs:complexType name="FilterCriteriaTableType">
  <xs:choice maxOccurs="unbounded">
  <xs:element name="IntegerTypeCriterion" type="IntegerCriterionOption"/>
  <xs:element name="BooleanTypeCriterion" type="BooleanCriterionOpntion"/>
  <xs:element name="SelectionTypeCriterion" type="StringCriterionOption"/>
  <xs:element name="TextTypeCriterion" type="StringCriterionOption"/>
  <xs:element name="AnyTypeCriterion" type="AnyTypeCriterionOption"/>
  </xs:choice>
  <xs:attribute name="time" type="xs:dateTime"/>
  </xs:complexType>
  <xs:complexType name="IntegerCriterionOption">
  <xs:sequence>
  <xs:element name="id" type="xs:anyURI"/>
  <xs:sequence>
  <xs:element name="CriterionValue" maxOccurs="unbounded">
  <xs:complexType>
  <xs:simpleContent>
  <xs:extension base="xs:integer">
  <xs:attribute name="minInteger" type="xs:integer"/
  <xs:attribute name="maxInteger" type="xs:integer"/>
  </xs:extension>
  </xs:simpleContent>
  </xs:complexType>
  </xs:element>
  </xs:sequence>
  </xs:sequence>
  </xs:complexType>
  <xs:complexType name="BooleanCriterionOpntion">
  <xs:sequence>
  <xs:element name="id" type="xs:anyURI"/>
  <xs:sequence>
  <xs:element name="CriterionValue" type="xs:boolean"/>
  </xs:sequence>
  </xs:sequence>
  </xs:complexType>
  <xs:complexType name="StringCriterionOption">
  <xs:sequence>
  <xs:element name="id" type="xs:anyURI"/>
  <xs:sequence>
  <xs:element name="CriterionValue" maxOccurs="unbounded">
  <xs:complexType>
  <xs:simpleContent>
  <xs:extension base="xs:string">
  <xs:attribute name="lang" type="xs:string" default="EN-US"/>
  </xs:extension>
  </xs:simpleContent>
  </xs:complexType>
  </xs:element>
  </xs:sequence>
  </xs:sequence>
  </xs:complexType>
  <xs:complexType name="AnyTypeCriterionOption">
  <xs:sequence>
  <xs:element name="id" type="xs:anyURI"/>
  <xs:sequence>
  <xs:element name="CriterionValue" maxOccurs="unbounded"/>
  <xs:complexType>
  <xs:simpleContent>
  <xs:extension base="xs:base64Binary">
  <xs:attribute name="any" type="xs:anySimpleType"/>
  </xs:extension>
  </xs:simpleContent>
  </xs:complexType>
  </xs:sequence>
  </xs:sequence>
  </xs:complexType></xs:schema>
```

FIG. 50 is a diagram illustrating a filtering criteria table according to another embodiment of the present invention.

In detail, FIG. 50 illustrates a filtering criteria table in the XML schema described with reference to FIGS. 48 and 49. Basic elements of the filtering criteria table illustrated in FIG. 50 are the same as the elements described with reference to FIGS. 48 and 49. Hereinafter, semantics of the elements and attributes included in the filtering criteria table illustrated in FIG. 50 will be described.

As illustrated in FIG. 50, in the filtering criteria table according to the present embodiment, "@" may be indicated at the front of a name of attribute so as to distinguish between the attributes and the elements.

In each place where an @id attribute appears in the table, it shall be the @id attribute of a question in a PDI Table, thereby identifying the question that corresponds to the filtering criterion in which the @id attribute appears.

A QIA Criterion element shall represent a filtering criterion corresponding to a question with an integer value.

If a Criterion Value child element of a QIA Criterion element does not contain an @extent element, it shall represent an integer answer for the question corresponding to the filtering criterion. If a Criterion Value child element of a QIA Criterion element contains an @extent attribute, then it shall represent the lower end of a numeric range of answers for the question, and the @extent attribute shall represent the number of integers in the range.

A QBA Criterion element shall represent a filtering criterion corresponding to a question with a Boolean value.

A Criterion Value child element of a QBACriterion element shall represent a Boolean answer for the question corresponding to the filtering criterion.

A QSA Criterion element shall represent a filtering criterion corresponding to a question with selection value(s).

A Criterion Value child element of a QSA Criterion element shall represent the identifier of a selection answer for the question corresponding to the filtering criterion.

A QTA Criterion element shall represent a filtering criterion corresponding to a question with string value.

A Criterion Value child element of a QTA Criterion element shall represent a text answer for the question corresponding to the filtering criterion.

A QAA Criterion element shall represent a filtering criterion corresponding to a "question" that has only a text "answer" with no question.

A Criterion Value child element of a QAACriterion element shall represent a text "answer" for the "question" corresponding to the filtering criterion.

If there is only one Criterion Value element in the Filtering Criteria element, then the filtering decision for whether the service or content item passes the filter shall be "true" (yes) if the value of the Criterion Value element matches a value that is among the answers in the PDI-A for the question corresponding to the element containing the Criterion Value element (where the question is indicated by the id attribute of the element containing the Criterion Value element), and it shall be "false" (no) otherwise.

In the case of a Criterion Value child element of a QIA Criterion element in which the "extent" attribute is present, the value of the Criterion Value element shall be considered to match a value that is among the answers in the corresponding PDI-A if the value of the answer is in the interval defined by the Criterion Value and the extent attribute.

If the total number of Criterion Value elements in the Filtering Criteria element is greater than one, the result of each Criterion Value element shall be evaluated as an intermediate term, returning "true" if the Criterion Value matches a value that is among the answers in the PDI-A for the question corresponding to the filtering criterion (as indicated by the id value) and returning "false" otherwise. Among these intermediate terms, those with the same value of their parent element identifier (QIA.id, QBA.id, etc.) shall be logically ORed to obtain the interim result for each targeting criterion, and these interim results shall be logically ANDed together to determine the final result. If the final result evaluates to "true" for a receiver, it shall imply that the associated content item passes the filter.

FIG. 51 is a diagram illustrating a filtering criteria table according to another embodiment of the present invention.

In detail, FIG. 51 illustrates an extended format of the filtering criteria table illustrated in FIG. 50. Basic elements of the filtering criteria table illustrated in FIG. 51 are the same as the elements described with reference to FIG. 50. Hereinafter, the filtering criteria table illustrated in FIG. 51 will be described in terms of differences from the filtering criteria table described with reference to FIG. 50.

The filtering criteria table illustrated in FIG. 51 allows multiple instances of the set of filtering criteria. Each set includes multiple instance of filtering criteria. Each filtering criterion allows multiple values to be provided for some of the filtering criteria. The filtering logic is "OR" logic among multiple instances of the set of filtering criteria. Within each set of filtering criteria, the filtering logic is "OR" logic among multiple values for the same filtering criterion, and "AND" logic among different filtering criteria.

For example, if the filtering criteria is ((age=20) AND (genre="sport")) OR ((age=10) AND (genre="animation")), filtering criteria table can be represented as an

[Example 7] below.

[Example 7]

```
<FilterCriteriaTable time="2012-09-03T09:30:47.0Z"
  xmlns:xsi="http://www.w3.org/2001/XMLSchema-instance">
  <FilterCriterionSet>
    <IntegerTypeCriterion id="abc.tv/age/">
    <CriterionValue>20</CriterionValue>
    </IntegerTypeCriterion>
    <TextTypeCriterion id = "abc.tv/genre/">
    <CriterionValue>sport</CriterionValue>
    </TextTypeCriterion>
  </FilterCriterionSet>
  <FilterCriterionSet>
    <IntegerTypeCriterion id= "abc.tv/age/">
    <CriterionValue>10</CriterionValue>
    </IntegerTypeCriterion>
    <TextTypeCriterion id = "abc.tv/genre//">
    <CriterionValue>animation</CriterionValue>
    </TextTypeCriterion>
  </FilterCriterionSet>
</FilterCriteriaTable>
```

FIG. 52 is a flowchart of a digital broadcast system according to another embodiment of the present invention.

In detail, FIG. 52 is a flowchart of a personalization broadcast system that allows a receiver according to the embodiment of the present invention to receive a PDI table and/or a filtering criteria table via a broadcast network.

The basic structure of the personalization broadcast system according to the present embodiment is the same as the structure described with reference to FIGS. 36 through 39. The PDI table according to the present embodiment is the same as the table described with reference to FIGS. 38 through 47. The filtering criteria table according to the present embodiment is the same as the table described with reference to FIGS. 48 through 51.

As illustrated in FIG. 52, the personalization broadcast system according to the present embodiment may include a service signaling channel (SSC) 2300, a file delivery over unidirectional transport (FLUTE) session 2310, a filtering engine 2320, a PDI engine 2330, and/or a UI 2340. The receiver according to the present embodiment may receive a PDI table through a digital storage media command and control (DSM-CC) section. In this case, the receiver according to the present embodiment may receive the PDI table through the FLUTE session 2310. The structure of the aforementioned personalization broadcast system may be changed according to a designer's intention. Hereinafter, operations of elements of FIG. 52 will be described.

First, the receiver according to the present embodiment may receive the PDI table section through the SSC 2300. In detail, the receiver according to the present embodiment may parse IP datagram corresponding to the SSC 2300 among IP datagram received through the DSM-CC section to receive the PDI table section. In this case, the receiver according to the present embodiment may receive the PDI table section using a well-known IP address and/or UDP port number included in the SSC 2300. The PDI table section according to the present embodiment refers to a table obtained by compressing a PDI table according to an embodiment of the present invention in order to transmit the PDI table via a broadcast network. The PDI table section will be described in detail.

The receiver according to the present embodiment may parse the PDI table section received through the SSC 2300 to acquire the PDI table. Then, the receiver according to the present embodiment may transmit the PDI table to the PDI engine 2330.

The PDI engine 2330 according to the present embodiment may process the received PDI table and extract PDI questions included in a corresponding PDI table. Then, the PDI engine 2330 according to the present embodiment may transmit the extracted PDI questions to the UI 2340.

The UI 2340 according to the present embodiment may display the received PDI questions and receive PDI answers to the corresponding PDI questions. In this case, the UI 2340 according to the present embodiment may receive the PDI answers through a remote controller. Then, the PDI engine 2330 according to the present embodiment may update PDI data using the PDI answer received from the UI 2340. A detailed description thereof has been described with reference to FIGS. 36 and 37.

The receiver according to the present embodiment may receive a service map table (SMT) and/or a non real time information table (NRT-IT) through the SSC 2300. The SMT according to the present embodiment may include signaling information for a personalization service. The NRT-IT according to the present embodiment may include announcement information for a personalization service.

Then, the receiver according to the present embodiment may parse the received SMT and/or NRT-IT to acquire a filtering criteria descriptor. The receiver may transmit filtering criteria to the filtering engine 2320 using the filtering criteria descriptor. In this case, according to an embodiment of the present invention the filtering criteria may be a filtering criteria table with a format of xml document. The filtering criteria table has been described in detail with reference to FIGS. 50 and 51.

Then, the filtering engine 2320 according to the present embodiment may transmit a PDI data request signal to the PDI engine 2330. When the PDI engine 2330 according to the present embodiment receives the PDI data request signal, the PDI engine 2330 may search for PDI data corresponding to the corresponding PDI data request signal and transmit the PDI data to the filtering engine 2320. As a result, the receiver according to the present embodiment may download content using a filtering result. Processes subsequent to the filtering according to the present embodiment have been described in detail with reference to FIGS. 38 and 39.

FIG. 53 is a diagram illustrating a PDI table section according to an embodiment of the present invention.

In detail, FIG. 53 illustrates syntax of the PDI table section described with reference to FIG. 52.

When a PDI table is delivered in the broadcast stream, the XML form of the Table defined in FIG. 52 is compressed using the DEFLATE compression algorithm. The resulting compressed table then is encapsulated in NRT-style private sections by dividing it into blocks and inserting the blocks into sections as shown in the Table of FIG. 53.

As a result, the receiver according to the present embodiment may combine blocks of a PDI-Q instance document in an order of section numbers having the same sequence number and release compression. The receiver according to the present embodiment may generate the PDI-Q instance document as a result of compression release. Then, the receiver may transmit the PDI-Q instance document to a PDI Engine according to an embodiment of the present invention. The detailed method has been described with reference to FIG. 52.

Hereinafter, syntax of the PDI table section illustrated in FIG. 53 will be described.

The blocks shall be inserted into the sections in order of ascending section_number field values. The private sections are carried in the Service Signaling Channel (SSC) of the IP subnet of the virtual channel to which the PDI Table pertains, as the terms "Service Signaling Channel" and "IP subnet" are defined in the ATSC NRT standard. The sequence_number fields in the sections are used to distinguish different PDI table instances carried in the same SSC.

A table_id field with 8-bits, shall be set to identify this table section as belonging to a PDI Table instance. The table_id field may indicate that the PDI table section illustrated in FIG. 53 contains information regarding a PDI table according to an embodiment of the present invention.

A section_syntax_indicator field according to the present embodiment may indicate a format of the PDI table section.

A private_indicator field according to the present embodiment may indicate bit information for users.

A section_length field according to the present embodiment may indicate a number of bytes in the PDI table section.

A table_id extension field according to the present embodiment may identify the PDI table section.

A protocol_version field according to the present embodiment may contain the protocol versions of the PDI table syntax.

The value of the sequence_number field with 8-bits, is the same as the sequence_number of all other sections of this PDI-Q instance and different from the sequence_number of all sections of any other PDI-Q instance carried in this Service Signaling Channel. The sequence_number field is used to differentiate sections belonging to different instances of the PDI-Q that are delivered in the SSC at the same time.

A PDIQ_data_version field with 5-bits indicates the version number of this PDI-Q instance, where the PDI-Q instance is defined by its pdiTableId value. The version number is incremented by 1 modulo 32 when any element or attribute value in the PDI-Q instance changes.

A current_next_indicator field with a 1-bit always is set to '1' for PDI-Q sections indicates that the PDI-Q sent is always the current PDI-Q for the segment identified by its segment_id.

A section_number field with 8-bits gives the section number of this section of the PDI-Q instance. The section_number of the first section in an PDI-Q instance is set to be 0x00. The section_number is incremented by 1 with each additional section in the PDI-Q instance.

A last_section_number field with 8-bits gives the number of the last section (i.e., the section with the highest section_number) of the PDI-Q instance of which this section is a part.

A service_id field with 16-bits is set to 0x0000 to indicate that this PDI-Q instance applies to all data services in the virtual channel in which it appears, rather than to any particular service.

A pdiq_bytes( ) field with a variable length consists of a block of the PDI-Q instance carried in part by this section. When the pdiq_bytes( ) fields of all the sections of this table instance are concatenated in order of their section_number fields, the result is the complete PDI-Q instance.

FIG. 54 is a diagram illustrating a PDI table section according to another embodiment of the present invention.

In detail, FIG. 54 illustrates syntax of the PDI table section described with reference to FIG. 52. A basic description has been given with reference to FIG. 53. However, unlike the PDI table section illustrated in FIG. 53, the PDI table section illustrated in FIG. 54 may not include a sequence_number field. Hereinafter, the syntax of the PDI table section illustrated in FIG. 54 will be described.

A num_questions field according to the present embodiment may indicate the number of PDI questions included in the PDI table.

A question_id_length field according to the present embodiment may indicate a length of an ID of one PDI question.

A question_id field according to the present embodiment may indicate an ID of one PDI question.

A question_text_length field according to the present embodiment may indicate a length of question_text.

A question_text field according to the present embodiment may include actual content of one PDI question.

An answer_type_code field according to the present embodiment may indicate a type of a PDI answer to a PDI question. In detail, the answer_type_code field according to the present embodiment may include answer type codes represented in Table below. Hereinafter, each answer type code shown in Table below may indicate a type of each of the PDI answers described with reference to FIG. 40.

TABLE 34

| answer_type_code | value |
|---|---|
| 0x000x010x020x030x04-0x07 | ReservedInteger typeBoolean typeString type (including selection type/text type)Reserved for future ATSC use |

A num_answer field according to the present embodiment may indicate the number of PDI answers to a PDI question.

An answer_value_length field according to the present embodiment may indicate an actual length of answer_value.

An answer_value field according to the present embodiment may include actual content of a PDI answer represented as answer_type_code.

FIG. 55 is a diagram illustrating a PDI table section according to another embodiment of the present invention.

In detail, FIG. 55 illustrates syntax of the PDI table section described with reference to FIG. 52. A basic description has been given with reference to FIGS. 53 and 54. Fields constituting the syntax of FIG. 55 are the same as fields constituting the syntax of FIG. 54, and thus, a detailed description thereof is omitted.

FIG. 56 is a diagram illustrating a PDI table section according to another embodiment of the present invention.

In detail, FIG. 56 illustrates syntax of the PDI table section described with reference to FIG. 52. A basic description has been given with reference to FIGS. 53 and 54. Basic fields constituting the syntax of FIG. 56 are the same fields constituting the syntax of FIG. 54, and thus, a detailed description thereof is omitted.

However, unlike the syntax of FIG. 54, the syntax of FIG. 56 may further include a sequence_number field. The sequence_number field according to the present embodiment is the same as the sequence_number field described with reference to FIG. 53.

FIG. 57 is a flowchart of a digital broadcast system according to another embodiment of the present invention.

In detail, FIG. 57 illustrates operations of a FLUTE session, a filtering engine, and/or a PDI engine in the personalization broadcast system described with reference to FIG. 52 according to an embodiment of the present invention.

As illustrated in FIG. 57, the personalization broadcast system according to the present embodiment may include a FLUTE session 2800, a filtering engine 2810, and/or a PDI engine 2820. The personalization broadcast system according to the present embodiment may provide a next generation broadcast service for providing an ATSC 2.0 service or a personalization service. The structure of the aforementioned personalization broadcast system may be changed according to a designer's intention.

As described with reference to FIG. 52, the receiver according to the present embodiment may receive a PDI table through a FLUTE session. Hereinafter, a method of receiving a PDI table through a FLUTE session by a receiver will be described with regard to an embodiment of the present invention with reference to FIG. 57.

The receiver according to the present embodiment may receive a field delivery table (FDT) instance through the FLUTE session 2800. The FDT instance is a transmission unit of content transmitted through the same FLUTE session 2800. The FDT instance according to the present embodiment may include content type attribute indicating a type of content. In detail, the content type attribute according to the present embodiment may include content indicating that a file transmitted through the FLUTE session 2800 is a PDI-Q instance document (or a PDI table). The content type attribute according to the present embodiment will be described in detail.

The receiver according to the present embodiment may recognize that a field transmitted through the FLUTE session 2800 is the PDI-Q instance document using the FDT instance. Then, the receiver according to the present embodiment may transmit the PDI-Q instance document to the PDI engine 2820. A detailed description thereof has been described with reference to FIG. 52.

FIG. 58 is a diagram illustrating XML schema of an FDT instance according to another embodiment of the present invention.

In detail, FIG. 58 illustrates XML schema of the FDT instance described with reference to FIG. 57. Hereinafter, the aforementioned content type attribute 2900 will be described.

As illustrated in FIG. 58, the FDT instance according to the present embodiment may include attributes 2900 indicating information of attributes of the FDT instance and/or file elements 2910 indicating a file transmitted through the FLUTE session. The file elements 2910 illustrated in FIG. 58 may include attributes indicating information of attributes of a file. As illustrated in FIG. 58, the file elements 2910 may include content type attribute 2920 according to the present embodiment.

As described with reference to FIG. 57, the receiver according to the present embodiment may identify a PDI-Q instance document using a value included in the content type attribute 2920. For example, the content type attribute 2920 illustrated in FIG. 58 may have a value, etc. in the form of MIME protocol represented by "application/atsc-pdiq" or "text/atsc-pdiq+xml".

FIG. 59 is a diagram illustrating capabilities descriptor syntax according to an embodiment of the present invention.

In detail, FIG. 59 illustrates syntax for identifying a PDI table by a receiver according to the embodiment of the present invention, in the personalization broadcast system described with reference to FIG. 52.

The capabilities descriptor according to the present embodiment can be used to indicate that the services in SMT service level or the contents in NRT-IT content level are PDI table or not. Receivers according to the present embodiment utilize this information to notice the service/content is PDI Table or not, and decide whether the service/content should be downloaded or not according to their capabilities, such as supporting PDI engine.

Codes represented in Table below can be added to capability_code in capabilities descriptor for PDI Table signaling. A capability_code value according to the present embodiment cannot be assigned to other value. A capability_code value represented in Table below may be differently set according to a designer's intention.

TABLE 35

| Capability_code value | Meaning |
| --- | --- |
| ... | ... |
| 0x4F | HE ACC v2 with MPEG Surround |
| 0x50 | PDI Table(including PDI-Q) |
| ... | ... |

FIG. 60 is a diagram illustration a consumption model according to an embodiment of the present invention.

In detail, FIG. 60 illustrates a field added onto an SMT in order to identify a PDI table by a receiver according to the embodiment of the present invention, in the personalization broadcast system described with reference to FIG. 52.

NRT service descriptor is located in the service level of NRT SMT, and its NRT_service_category will be 0x04 (PDI) when the service provides PDI Table. So, receivers can notice that PDI Table is providing if the field value is 0x04.

A value of the consumption model illustrated in FIG. 60 may be differently set according to a designer's intention.

FIG. 61 is a diagram illustrating filtering criteria descriptor syntax according to an embodiment of the present invention.

In detail, FIG. 61 illustrates the bit stream syntax of the Filtering Criteria Descriptor for receiving a filtering criteria table by a receiver according to the embodiment of the present invention, in the personalization broadcast system described with reference to FIG. 52.

Filtering criteria according to an embodiment of the present invention are associated with downloadable content, so that the receiver according to the present embodiment can decide whether or not to download the content. There are two categories of downloadable content in an ATSC 2.0 environment: Non-Real Time (NRT) content in stand-alone NRT services and NRT content items used by TDOs in adjunct interactive data services.

Hereinafter, filtering criteria for filtering NRT content in stand-alone NRT services will be described with reference to FIG. 61.

In a filtering Criteria for NRT Services and Content Items according to the embodiment of the present invention, one or more instances of the Filtering Criteria Descriptor defined below can be included in a service level descriptor loop in an SMT, to allow receivers to determine whether to offer the NRT service to the user or not, or it can be included in a content item level descriptor loop in a NRT-IT, to allow receivers to determine whether to download that particular content item and make it available to the user or not.

The one or more instances of the Filtering Criteria Descriptor allow multiple values to be provided for the same or different targeting criteria. The intended targeting logic is "OR" logic among multiple values for the same targeting criterion, and "AND" logic among different targeting criteria.

Hereinafter, semantic definition of each field of the bit stream syntax of the Filtering Criteria Descriptor illustrated in FIG. 61 will be described.

A descriptor_tag field, a 8-bit field can be set to 0xTBD to indicate that the descriptor is a Filtering Criteria Descriptor according to the embodiment of the present invention.

A descriptor_length field, a 8-bit unsigned integer field can indicate the number of bytes following the descriptor_length field itself.

A num_filter_criteria field, a 8-bit field can indicate the number of filtering criteria contained in this descriptor shown in FIG. 61.

A criterion_id_length field, a 8-bit field can indicate the length of the criterion_id field.

A criterion_id field, a variable length field can give the identifier of this filtering criterion, in the form of a URI matching the id attribute of a question (QIA, QBA, QSA, QTA, or QAA element) in the PDI Table of the virtual channel in which this descriptor appears.

A criterion_type_code field, a 3-bit field can give the type of this criterion (question), according to Table below.

TABLE 36

| criterion_type_code | Value |
| --- | --- |
| 0x00 | Reserved |
| 0x01 | Integer type(including selection id), in uimsbf format |
| 0x02 | Boolean type, 0x01 for "true" and 0x00 for "false" |
| 0x03 | String type |
| 0x04-0x07 | Reserved for future ATSC use |

A num_criterion_values field, a 5-bit field gives the number of targeting criterion values in this loop for this filtering criterion, where each value is a possible answer to the question (QIA, QBA, QSA, QTA, or QAA) identified by the criterion_id.

A criterion_value_length field, a 8-bit field gives the number of bytes needed to represent this targeting criterion value.

A criterion_value field, a variable length field gives this targeting criterion value.

The Filtering Criteria Descriptor according to the embodiment of the present invention indicates values for certain targeting criteria associated with services or content items. In an ATSC 2.0 emission, one or more instances of the filtering_criteria_descriptor( ) defined above may go in the descriptor loop of an NRT service in an SMT or in the descriptor loop of a content item in an NRT-IT. In the former case, they shall apply to the service itself (all content items). In the latter case they shall apply to the individual content item.

If there is only one Filtering Criteria Descriptor in a descriptor loop, and if it has only one criterion_value, then the decision for whether the service or content item passes the filter shall be "true" (yes) if the criterion value matches a value that is among the answers in the PDI-A for the question corresponding to the filtering criterion (as indicated by the criterion_id), and it shall be "false" (no) otherwise.

If the total number of criterion values in all Filtering Criteria Descriptors in a single descriptor loop is greater than one, the result of each criterion_value shall be evaluated as an intermediate term, returning "true" if the criterion_value matches a value that is among the answers in the PDI-A for the question corresponding to the filtering criterion (as indicated by the criterion_id) and returning "false" otherwise. Among these intermediate terms, those with the same value of filtering criterion (as determined by the criterion_id) shall be logically ORed to obtain the interim result for each targeting criterion, and these interim results shall be logically ANDed together to determine the final result. If the final result evaluates to "true" for a receiver, it shall imply that the associated NRT service or content item passes the filter and is available to be downloaded to the receiver.

FIG. 62 is a diagram illustrating filtering criteria descriptor syntax according to another embodiment of the present invention.

In detail, FIG. 62 illustrates the bit stream syntax of the Filtering Criteria Descriptor for receiving a filtering criteria table by a receiver according to the embodiment of the present invention, in the personalization broadcast system described with reference to FIG. 52.

Basic content of the filtering criteria descriptor syntax illustrated in FIG. 62 has been described with reference to FIG. 61.

However, a criterion_type_code field can give the type of this criterion (question), according to Table below.

TABLE 37

| criterion_type_code | Value |
|---|---|
| 0x000x010x020x030x04-0x07 | ReservedInteger typeBoolean typeString type(including selection type/text type)Reserved for future ATSC use |

FIG. 63 is a flowchart of a digital broadcast system according to another embodiment of the present invention.

In detail, FIG. 63 is a flowchart of a personalization broadcast system for receiving a PDI table and/or a filtering criteria table through a broadcast network by a receiver according to the embodiment of the present invention.

The basic structure of the personalization broadcast system according to the present embodiment is the same as the structure described with reference to FIGS. 36 through 39. The PDI table according to the present embodiment is the same as the table described with reference to FIGS. 38 through 47. The filtering criteria table according to the present embodiment is the same as the table described with reference to FIGS. 48 through 51.

As illustrated in FIG. 63, the personalization broadcast system according to the present embodiment may include a signaling server 3410, a filtering engine 3420, a PDI engine 3430, and/or a UI 3440. The structure of the aforementioned personalization broadcast system may be changed according to a designer's intention.

Operations of the filtering engine 3420, the PDI engine 3430, and/or the UI 3440 for processing the PDI table and the filtering criteria according to the present embodiment are the same as the operations described with reference to FIG. 52. Hereinafter, the digital broadcast system will be described in terms of an operation of the signaling server 3410 illustrated in FIG. 63.

First, a receiver according to the present embodiment may transmit a request signal for receiving a PDI table section to the signaling server 3410. In this case, the receiver according to the present embodiment may transmit the request signal using a query term. A query will be described in detail.

The signaling server 3410 according to the present embodiment may transmit a PDI table section corresponding to a corresponding query to the receiver. A detailed description of the PDI table section has been given with reference to FIGS. 53 through 56.

FIG. 64 is a diagram illustrating an HTTP request table according to an embodiment of the present invention.

In detail, FIG. 64 illustrates an HTTP protocol for transmitting a query to the signaling server described with reference to FIG. 63 by a receiver according to the present embodiment.

When supported by broadcasters, the protocol shown in FIG. 64 can provides two capabilities. First, for devices that get DTV broadcast signals via a path that delivers only uncompressed audio and video, this protocol is typically the only way for them to access a broadcaster's stand-alone NRT services. Second, even for a device that has access to the full broadcast stream, this protocol provides a way to retrieve data for populating a Program/Service Guide without cycling through all the broadcast streams available in the local broadcast area and waiting for the desired tables to show up. It also allows retrieval of such data at any time, even while a viewer is watching TV, without needing a separate tuner.

The HTTP request table illustrated in FIG. 64 may include a type of a table to be received and a query term indicating a base URL for receiving the corresponding table.

A receiver according to the embodiment of the present invention may receive a specific table using the query term of the HTTP request table illustrated in FIG. 64. In detail, the receiver according to the present embodiment may transmit a request signal to a signaling server using a query term "?table=PDIT[&chan=<chan_id>]". A detailed description thereof has been described with reference to FIG. 63.

FIG. 65 is a flowchart illustrating a digital broadcast system according to another embodiment of the present invention.

In detail, FIG. 65 is a diagram illustrating a personalization broadcast system for receiving a PDI table and/or a filtering criteria table through the Internet by a receiver according to the embodiment of the present invention.

The basic structure of the personalization broadcast system according to the present embodiment is the same as the structure described with reference to FIGS. 36 through 39. The PDI table according to the present embodiment is the same as the structure described with reference to FIGS. 38 through 47. The filtering criteria table according to the present embodiment is the same as the table described with reference to FIGS. 48 through 51.

When delivered over the Internet, PDI Table instances shall be delivered via HTTP or HTTPS. The Content-Type of a PDI Table in the HTTP Response header shall be "text/xml".

The URL used to retrieve a PDI Table via Internet can be delivered via SDOPrivateDataURlString commands which are transported in Standard caption service #6 in the DTV closed caption channel, or it can be delivered in a UrlList XML element delivered along with a TPT.

A TPT (TDO Parameters Table) contains metadata about the TDOs of a segment and the Events targeted to them. The term "Triggered Declarative Object" (TDO) is used to designate a Declarative Object that has been launched by a Trigger in a Triggered interactive adjunct data service, or a DO that has been launched by a DO that has been launched by a Trigger, and so on iteratively. A trigger is a signaling element whose function is to identify signaling and establish timing of playout of interactive events.

As illustrated in FIG. 65, the personalization broadcast system according to the present embodiment may include a PDI server 3600, a content server 3650, and/or a receiver. The receiver according to the present embodiment may include a TDO parameter table (TPT) client 3610, a filtering engine 3620, a PDI engine 3630, and/or a UI 3640. The structure of the aforementioned personalization broadcast system may be changed according to a designer's intention. Hereinafter, operations of elements illustrated in FIG. 65 will be described.

The TPT client 3610 according to the present embodiment may receive a TPT and/or a URL list table. A TDO parameters table (TPT) according to the embodiment of the present invention contains metadata about the triggered declarative objects (TDOs) of a segment and the events targeted to them. The TPT according to the present embodiment may include information regarding a PDI table and a filtering criteria table. The URL list table according to an embodiment of the present invention may include URL information of the PDI server 3600. The TPT and the URL list table will be described in detail.

The TPT client 3610 according to the present embodiment may acquire URL information of the PDI server 3600 from the URL list table. The TPT client 3610 may access the PDI server 3600 using the acquired URL information and request the PDI server 3600 to transmit the PDI table according to the present embodiment. The PDI server 3600 according to the present embodiment may transmit the corresponding PDI table to the TPT client 3610 according to the request of the TPT client 3610.

As illustrated in FIG. 65, the TPT client 3610 according to the present embodiment may transmit the received PDI table to the PDI engine 3630. The PDI engine 3630 according to the present embodiment may process the received PDI table and extract PDI questions included in the corresponding PDI table. Then, the PDI engine 3630 according to the present embodiment may transmit the extracted PDI questions to the UI 3640.

The UI 3640 according to the present embodiment may display the received PDI questions and receive PDI answers to the corresponding PDI questions. The UI 3640 according to the present embodiment may receive the PDI answers through a remote controller. Then, the PDI engine 3630 according to the present embodiment may update PDI data using the PDI answer received from the UI 3640. A detailed description thereof has been described with reference to FIGS. 36 and 37.

The TPT client 3610 according to the present embodiment may parse TPT to acquire filtering criteria. As illustrated in FIG. 65, the TPT client 3610 may transmit the filtering criteria to the filtering engine 3620. In this case, according to an embodiment of the present invention, the filtering criteria may be filtering criteria table with a format of xml document. The filtering criteria table has been described in detail with reference to FIGS. 50 and 51.

Then, the filtering engine 3620 according to the present embodiment may transmit a PDI data request signal to the PDI engine 3630. When the PDI engine 3630 according to the present embodiment receives the PDI data request signal, the PDI engine 3630 may search for PDI data corresponding to the corresponding PDI data request signal and transmit the PDI data to the filtering engine 3620. Processes subsequent to the filtering according to the present embodiment have been described in detail with reference to FIGS. 38 and 39.

As a result, a receiver according to the present embodiment may download content using the filtering result. In more detail, the TPT client 3610 may receive the filtering result from the filtering engine 3620 and transmit TDO and/or content download request signal to the content server 3650. The content server 3650 may transmit the TDO and/or the content to the TPT client 3610 according to the TDO and/or the content download request signal.

FIG. 66 is a diagram illustrating a URL list table according to an embodiment of the present invention.

In detail, FIG. 66 is a table containing URL information for receiving PDI table and/or filtering criteria through the Internet by a receiver according to the embodiment of the present invention. A process of transmitting and receiving a URL list table according to an embodiment of the present invention has been described in detail with reference to FIG. 65.

When a URL List table is delivered via the Internet, it can be delivered via HTTP along with a TPT, in the form of a multi-part MIME message.

When delivered over the Internet, TPTs can be delivered via HTTP. The URL information for the TPT of the current segment shall appear in Triggers, delivered either via DTV Closed Caption service #6 or via an ACR server. The response to a request for a TPT may consist of just the TPT for the current segment, or it may consist of a multipart MIME message, with the requested TPT in the first part, and optionally the AMT for the segment in the second part, and optionally a UrlList XML document in the next part.

Hereinafter, semantics of elements included in a URL list table will be described with regard to an embodiment of the present invention.

An UrlList element shown in FIG. 66 contains a list of URLs that are useful to a receiver according to the embodiment of the present invention.

A TptUrl element of the UrlList element shown in FIG. 66 can contain the URL information of a TPT for a future segment in the current interactive adjunct service. When multiple TptUrl elements are included, they shall be arranged in order of the appearance of the segments in the broadcast.

A NrtSignalingUrl element of the UrlList element shown in FIG. 66 can contain the URL information of a server from which receivers can obtain NRT signaling tables for all the virtual channels in the current transport stream, using the request protocol defined in Section 47 of this standard.

An UrsUrl element of the UrlList element shown in FIG. 66 can contain the URL information of a server to which receivers can send usage (audience measurement) reports, using the protocol defined in Section 10 of this standard.

A PdiUrl element of the UrlList element shown in FIG. 66 can contain the URL information of a PDITable. That is, the PdiUrl element according to the present embodiment may indicate URL information of a server that transmits a PDI table and/or filtering criteria.

The aforementioned URL list table of FIG. 66 may be configured in the format shown in Table below.

TABLE 38

| Element/<br>Attribute(with @) | No.<br>allowed | Data<br>type | Description & Value |
|---|---|---|---|
| UrlList | | | List of potentially useful URLs |
| TptUrl | 0 . . . N | anyURI | URL of TPT for future segment |
| NrtSignalingUrl | 0 . . . 1 | anyURI | URL of NRT Signaling Server |
| UrsUrl | 0 . . . 1 | anyURI | URL of Usage Reporting Server |
| PDIUrl | 0 . . . 1 | anyURI | URL of PDI-Q |

FIG. 67 is a diagram illustrating a TPT according to an embodiment of the present invention.

In detail, the TPT illustrated in FIG. 67 may include URL information of a PDI table and/or filtering criteria. A process of transmitting and receiving the TPT according to the present embodiment has been described with reference to FIG. 65. Hereinafter, an element of filtering criteria included in the TPT will be described.

In detail, the filter criterion element illustrated in FIG. 67 may include information regarding filtering criteria.

The id attribute according to the present embodiment may indicate a PDI question of the corresponding filtering criteria.

The criterion type attribute according to the present embodiment may indicate a filtering criteria type (or filtering criteria type elements). A type of the filtering criteria according to the present embodiment has been described with reference to FIG. 49.

The criterion value attribute according to the present embodiment may indicate a value of the filtering criteria according to the aforementioned criterion type attribute.

FIG. 68 is a flowchart of a digital broadcast system according to another embodiment of the present invention.

In detail, FIG. 68 is a diagram illustrating a personalization broadcast system for receiving a PDI table and/or a filtering criteria table in an ACR system by a receiver according to the embodiment of the present invention.

The ACR system according to the present embodiment is the same as the system described with reference to FIG. 30. The basic structure of the personalization broadcast system according to the present embodiment is the same as the structure described with reference to FIGS. 36 through 39. The PDI table according to the present embodiment is the same as the table described with reference to FIGS. 38 through 47. The filtering criteria table according to the present embodiment is the same as the table described with reference to FIGS. 48 through 51.

As illustrated in FIG. 68, the personalization broadcast system according to the present embodiment may include an ACR server 3900, a TPT server 3950, a PDI server 3960, a content server 3970, an ACR client 3910, a filtering engine 3920, a PDI engine 3930, and/or a UI 3940. The structure of the aforementioned personalization broadcast system may be changed according to a designer's intention. Operations of elements illustrated in FIG. 68 will be described.

The ACR client 3910 according to the present embodiment may extract signature from fingerprint and transmit a request together with the signature to the ACR server 3900. The ACR server 3900 according to the present embodiment may receive the signature and transmit a response together with trigger, etc. related to the corresponding signature to the ACR client 3910, which has been described in detail with reference to FIGS. 30 through 35.

The ACR client 3910 according to the present embodiment may request a TPT and/or a URL list table to the TPT server 3950 using the received trigger, etc. The TPT server 3950 according to the present embodiment may transmit the TPT and/or the URL list table to the ACR client 3910 according to the request of the ACR client 3910. A detailed description of the TPT and/or the URL list table has been given. Then, the TPT server 3950 according to the present embodiment may transmit the received TPT and/or URL list table to the ACR client 3910.

The ACR client 3910 according to the present embodiment may acquire URL information of the PDI server 3960 from the URL list table. The ACR client 3910 may access the PDI server 3960 using the acquired URL information and request the PDI server 3960 to transmit the PDI table according to the present embodiment. The PDI server 3960 according to the present embodiment may transmit the corresponding PDI table to the ACR client 3910 according to the request of the ACR client 3910.

As illustrated in FIG. 63, the ACR client 3910 according to the present embodiment may transmit the received PDI table to the PDI engine 3930. The PDI engine 3930 according to the present embodiment may process the received PDI table and extract PDI questions included in the corresponding PDI table. Then, the PDI engine 3930 according to the present embodiment may transmit the extracted PDI questions to the UI 3940.

The UI 3940 according to the present embodiment may display the received PDI questions and receive PDI answers to the corresponding PDI questions. The UI 3940 according to the present embodiment may receive the PDI answers through a remote controller. Then, the PDI engine 3930 according to the present embodiment may update PDI data using the PDI answer received from the UI 3940. A detailed description thereof has been described with reference to FIGS. 36 and 37.

In addition, the ACR client 3910 according to the present embodiment may parse TPT to acquire filtering criteria. As illustrated in FIG. 68, the ACR client 3910 may transmit the filtering criteria to the filtering engine 3920. In this case, according to an embodiment of the present invention, the filtering criteria may be a filtering criteria table with a format of xml document. The filtering criteria table has been described in detail with reference to FIGS. 50 and 51.

Then, the filtering engine 3920 according to the present embodiment may transmit a PDI data request signal to the PDI engine 3930. When the PDI engine 3930 according to the present embodiment receives the PDI data request signal, the PDI engine 3930 searches for PDI data corresponding to the corresponding PDI data request signal and transmits the PDI data to the filtering engine 3920. Processes subsequent to the filtering according to the present embodiment have been described in detail with reference to FIGS. 38 and 39.

As a result, a receiver according to the present embodiment may download content using a filtering result. In detail, the ACR client 3910 may receive the filtering result from the filtering engine 3920 and transmit a TDO and/or content download request signal to the content server 3970. The content server 3970 may transmit the TDO and/or the content to the ACR client 3910 according to the TDO and/or content download request signal.

FIG. 69 is a flowchart of a digital broadcast system according to another embodiment of the present invention.

In detail, FIG. 69 is a diagram illustrating a personalization broadcast system for avoiding duplication of PDI answers according to an embodiment of the present invention.

In more detail, FIG. 69 illustrates a personalization broadcast system for updating PDI data using a pre-stored PDI answer when a receiver according to the embodiment of the present invention receives the same PDI question from a plurality of broadcasters and content providers. Due to the personalization broadcast system illustrated in FIG. 69, a user may reduce inconvenience of inputting redundant PDI answers to the same PDI question.

As illustrated in FIG. 69, the personalization broadcast system according to the present embodiment may include two or more broadcasters (or content providers) and/or a receiver. The two or more broadcasters according to the present embodiment may include a broadcaster A 4010 and/or a broadcaster B 4020. The receiver according to the present embodiment may include a PDI engine 4030 and/or a UI 4040. The personalization broadcast system according to the present embodiment may provide an ATSC 2.0 service. The structure of the aforementioned personalization broadcast system may be changed according to a designer's intention. Hereinafter, operations of elements illustrated in FIG. 69 will be described.

First, a receiver according to the present embodiment may receive a first PDI table 4011 from the broadcaster A 4010. The receiver that receives the first PDI table 4011 may transmit the first PDI table 4011 to the PDI engine 4030. The first PDI table 4011 according to the present embodiment may include a first PDI type element 4012. Each of first PDI type elements 4012 according to the present embodiment may include a first identifier element (or first ID) and/or a first PDI question, as described with reference to FIGS. 46 and 47. In addition, as illustrated in FIG. 69, the first PDI table 4011 may include two or more first PDI type elements 4012 having different first IDs.

The PDI engine 4030 according to the present embodiment may extract a first PDI question from the first PDI type element 4012 and transmit the extracted first PDI question to the UI 4040. Then, the UI 4040 according to the present embodiment may receive a first PDI answer to a first PDI question from the user. The PDI engine 4030 may add the first PDI answer to the first PDI type element 4012 and correct the first PDI answer. Detailed operations of the PDI engine 4030 and the UI 4040 according to the present embodiment are the same as the operations described with reference to FIG. 52.

In addition, the PDI engine 4030 according to the present embodiment may receive a second PDI table 4021 from the broadcaster B 4020. The second PDI table 4021 according to the present embodiment may include a second PDI type element 4022. As described with reference to FIGS. 46 and 47, the second PDI type element 4022 may include a second identifier element (or second ID) and/or a second PDI question.

The PDI engine 4030 that receives the second PDI table may access a PDI store and search for the first PDI table that is pre-stored in the PDI store. Then, the PDI engine 4030 according to the present embodiment may compare a second ID and a first ID. As the comparison result, when the second ID and the first ID are identical to each other, the first PDI answer may be added to the second PDI type element 4022 and/or corrected.

As a result, when a receiver according to the present embodiment receives the same PDI question as the pre-stored PDI question, the receiver may not repeatedly display the PDI question and may process the PDI question using the pre-stored PDI answer. Thus, in the personalization broadcast system according to the present embodiment, the user does not have to repeatedly input PDI answers of the same content to the same PDI question so as to receive a personalization service more conveniently.

FIG. 70 is a flowchart of a digital broadcast system according to another embodiment of the present invention.

In detail, FIG. 70 is a diagram of personalization broadcast system for avoiding duplication of PDI answers according to an embodiment of the present invention. The personalization broadcast system described with reference to FIG. 69 may use a PDI table that is pre-stored in a receiver according to the present invention in order to avoid duplication of PDI answers. As another embodiment of the present invention for avoiding duplication of PDI answers, FIG. 70 proposes a personalization broadcast system using registration of a PDI question.

In order to support reuse of questions by different broadcasters, so that consumers are not prompted to answer essentially the same question over and over again, questions can be registered with a registrar to be designated by the ATSC. Each registration record can include information about a question ID which is globally unique, as specified in FIG. 46 and FIG. 47, a question type (QIA, QBA, QSA, or QTA), question text in one or more languages, a date of registration and/or contact information for the organization submitting the question for registration. Also, in the case of a QSA, each registration record (or Pre-registered PDI question) can include the allowable selections such as an identifier of each selection, and the text of each selection in one or more languages.

A PDI table may contain a mix of registered questions and non-registered questions.

Both registered and non-registered questions may appear in multiple PDI tables. Whenever a user answers a question that appears in multiple PDI tables, whether by a function provided by the receiver or by an application, the answer is expected to propagate to all instances of the question in all the questionnaires where it appears. Thus, a user only needs to answer any given question once, no matter any many times it appears in different questionnaires.

To avoid having users be deluged with questions, it is recommended that questionnaire creators use registered questions whenever possible, and only use non-registered questions when the questionnaire creator has unique targeting needs that cannot be met with registered questions.

The receiver according to the present embodiment may extract a pre-registered PDI question using the receiver targeting criteria. The receiver targeting criteria according to the present embodiment complies with the standard of ATSC NRT, A/103.

As illustrated in FIG. 70, the personalization broadcast system according to the present embodiment may include a SSC 4100, a FLUTE session 4110, a filtering engine 4120, a PDI engine 4130, and/or a UI 4140. The personalization broadcast system according to the present embodiment may provide an ATSC 2.0 service. The structure of the aforementioned personalization broadcast system may be changed according to a designer's intention. Hereinafter, the personalization broadcast system illustrated in FIG. 70 will be described.

A receiver according to the present embodiment may receive SMT and/or NRT-IT through the SSC 4100 and acquire receiver targeting criteria included in the SMT and/or NRT-IT. According to an embodiment of the present invention, the receiver targeting criteria may be a receiver targeting descriptor or a receiver targeting criterion table.

Then, the PDI engine 4130 according to the present embodiment may convert the acquired receiver targeting criteria to generate a PDI question. The UI 4140 according to the present embodiment may receive the aforementioned question from the PDI engine 4130, display the PDI question, and receive a PDI answer of a user. Detailed operations of the PDI engine 4130 and the UI 4140 according to the present embodiment have been described with reference to FIG. 52.

FIG. 71 is a flowchart of a digital broadcast system according to another embodiment of the present invention.

In detail, FIG. 71 illustrates a personalization broadcast system for registering a PDI question.

As illustrated in FIG. 71, the personalization broadcast system according to the present embodiment may include a signaling server 4200, a receiver 4210, a filtering engine 4220, a PDI engine 4230, and a UI 4240. The receiver 4210 may be interpreted as including the filtering engine 4220, the PDI engine 4230, and/or the UI 4240, which may be changed according to a designer's intention. In addition, the personalization broadcast system according to the present embodiment may provide an ATSC 2.0 service. The personalization broadcast system illustrated in FIG. 70 will be described.

Operations of basic elements of FIG. 71 are the same as operations described with reference to FIG. 70. However, the receiver 4210 illustrated in FIG. 71 may request SMT and/or NRT-IT to the signaling server 4200. According to the request of the receiver 4210 according to the present embodiment, the signaling server 4200 may transmit the corresponding SMT and/or NRT-IT to the receiver 4210.

Detailed operations of the receiver 4210, the PDI engine 4230, and/or the UI 4240 after the receiver according to the present embodiment receives the SMT and/or the NRT-IT are the same as the operation described with reference to FIG. 70.

FIG. 72 is a diagram illustrating a receiver targeting criteria table according to an embodiment of the present invention.

In detail, FIG. 72 is a diagram of receiver targeting criteria obtained by representing the receiver targeting criteria described with reference to FIGS. 70 and 71 in the form of table.

As illustrated in FIG. 72, the receiver targeting criteria table may include information regarding a targeting criterion type code, a targeting value length, and/or a targeting value. The targeting criterion type code illustrated in FIG. 72 refers to a code for identifying each targeting criteria. The targeting value length illustrated in FIG. 72 refers to the number of bytes for representing the targeting criteria value. The targeting value illustrated in FIG. 72 refers to information indicated by the targeting criteria.

The receiver according to the present embodiment may convert the targeting criteria according to the targeting criterion type code and acquire a pre-registered PDI question.

In detail, when the targeting criterion type code according to the present embodiment is 0x00, the targeting value is reserved and the targeting value length is not determined.

When the targeting criterion type code according to the present embodiment is 0x01, the targeting value is geographical location as defined in Table 6.21 of A/65, using only the low order 3 bytes, and the targeting value length is 3 bytes. The aforementioned A/65 is ATSC standard for program and system information protocol (PSIP).

When the targeting criterion type code according to the present embodiment is 0x02, the targeting value is alphanumeric postal code as defined in section 6.7.2 of A/65, using the number of bytes appropriate to the region (up to 8), and the targeting value length is variable, which will be described below in more detail.

When the targeting criterion type code according to the present embodiment is 0x03, the targeting value is demographic category as defined in Table 6.18 of A/65, using only the low order 2 bytes, and the targeting value length is 2 bytes, which will be described below in more detail.

When the targeting criterion type code according to the present embodiment is 0x04-0x0F, the targeting value is reserved for future ATSC use and the targeting value length is not determined.

When the targeting criterion type code according to the present embodiment 가 -0x10-0x1F, the targeting value is available for private use and the targeting value length is not determined.

FIGS. 73 through 76 are diagrams illustrating a pre-registered PDI question according to an embodiment of the present invention.

In detail, FIGS. 73 through 76 show tables representing a pre-registered PDI question when the targeting criterion type code described with reference to FIG. 72 is 0x01, according to an embodiment of the present invention.

As illustrated in FIGS. 73 through 76, when the targeting criterion type code is 0x01, the targeting criteria table according to the present embodiment may include pre-registered PDI question information regarding a geographical location. In this case, the receiver according to the present embodiment may convert the targeting criteria table using only the low order 3 bytes to acquire the pre-registered PDI question.

FIG. 73 is a table showing a pre-registered PDI question regarding a location code when the targeting criterion type code is 0x01. Pre-registered PDI question information included in the pre-registered PDI question table illustrated in FIG. 73 is the same as the information described with reference to FIG. 70.

In detail, as illustrated in FIG. 73, when the targeting criterion type code is 0x01, a question ID according to the present embodiment may include information regarding the location code. In addition, the pre-registered PDI question illustrated in FIG. 73 may be a QTA type and may include a question text including content of requesting a PDI answer of a text type of the location code.

[Example 8] below is obtained by representing the table illustrated in FIG. 73 in xml schema according to an embodiment of the present invention.

[Example 8]

```
<a20:QTA id="atsc.org/PDIQ/location-code">
  <a20:Q xml:lang="en-us">
    <a20:Text>What is your location code?</a20:Text>
  </a20:Q>
</a20:QTA>
```

FIG. 74 is a table showing a pre-registered PDI question of federal information processing standards publication state (FIPS) when the targeting criterion type code is 0x01. Basic content included in the pre-registered PDI question illustrated in FIG. 74 is the same as the content described with reference to FIG. 70. However, the pre-registered PDI question illustrated in FIG. 74 may further include information regarding question xactionSetid. The question xactionSetid will be described below in detail with regard to an embodiment of the present invention.

In detail, as illustrated in FIG. 74, when the targeting criterion type code is 0x01, the question ID according to the present embodiment may include information regarding the FIPS state. In addition, the pre-registered PDI question illustrated in FIG. 74 may be a QTA type and may include a question text including content of requesting a PDI answer of a text type of the FIPS state.

[Example 9] below is obtained by representing the table illustrated in FIG. 74 in xml schema according to an embodiment of the present invention.

[Example 9]

```
<a20:QTA id="atsc.org/PDIQ/state" xactionSetId="1">
<a20:Q xml:lang="en-us">
<a20:Text>What state are you located in?</a20:Text>
</a20:Q>
</a20:QTA>
```

FIG. 75 is a table showing a pre-registered PDI question regarding an FIPS country when the targeting criterion type code is 0x01. Basic content included in the pre-registered PDI question illustrated in FIG. 75 is the same as the content described with reference to FIG. 70. However, the pre-registered PDI question illustrated in FIG. 75 may further include information regarding question xactionSetid. The question xactionSetid will be described below in detail with regard to an embodiment of the present invention.

In detail, as illustrated in FIG. 75, when the targeting criterion type code is 0x01, the question ID according to the present embodiment may include information regarding the FIPS country. In addition, the pre-registered PDI question illustrated in FIG. 75 may be a QTA type and may include a question text including content of requesting a PDI answer of a text type of the FIPS country.

[Example 10] below is obtained by representing the table illustrated in FIG. 75 in xml schema according to an embodiment of the present invention.

[Example 10]

```
<a20:QTA id="atsc.org/PDIQ/county" xactionSetId="1">
<a20:Q xml:lang="en-us">
<a20:Text>What county are you located in?</a20:Text>
</a20:Q>
</a20:QTA>
```

FIG. 76 is a table showing a pre-registered PDI question regarding county subdivision when the targeting criterion type code is 0x01. Basic content included in the pre-registered PDI question illustrated in FIG. 76 is the same as the content described with reference to FIG. 70. However, the pre-registered PDI question illustrated in FIG. 76 may further include information regarding question xactionSetid. The question xactionSetid will be described below in detail with regard to an embodiment of the present invention.

In detail, as illustrated in FIG. 76, when the targeting criterion type code is 0x01, the question ID according to the present embodiment may include sector information regarding the country subdivision. The pre-registered PDI question illustrated in FIG. 76 may be a QSA type and may include a question text including content of requesting a PDI answer of a selection type of the country subdivision.

The pre-registered PDI question of the QSA type according to the present embodiment may include selection information of the PDI answer. For example, the pre-registered PDI question of the country subdivision illustrated in FIG. 76 may include 9 selection information regarding northwest, north central, northeast, west central, center, east central, southwest, south central and southeast.

[Example 11] below is obtained by representing the table in xml schema according to an embodiment of the present invention.

[Example 11]

```
<a20:QSA id="atsc.org/PDIQ/sector" xactionSetId="1">
<a20:Q xml:lang="en-us">
<a20:Text>What part of your county are you located in?
</a20:Text>
<a20:Selection id="1">NW</a20:Selection>
<a20:Selection id="2">NC</a20:Selection>
<a20:Selection id="3">NE</a20:Selection>
<a20:Selection id="4">WC</a20:Selection>
<a20:Selection id="5">C</a20:Selection>
<a20:Selection id="6">EC</a20:Selection>
<a20:Selection id="7">SW</a20:Selection>
<a20:Selection id="8">SC</a20:Selection>
<a20:Selection id="9">SE</a20:Selection>
</a20:Q>
</a20:QTA>
```

The aforementioned question xactionSetid illustrated in FIGS. 74 through 76 may indicate a set of PDI questions including similar contents. A receiver according to the embodiment of the present invention may combine pre-registered PDI questions containing the same question xactionSetid and use the pre-registered PDI questions in a personalization broadcast service.

For example, the receiver targeting criteria illustrated in FIG. 73 may also be represented as the receiver targeting criteria of FIGS. 74 through 76 having the same question xactionSetid. A receiver according to the embodiment of the present invention may provide a personalization broadcast service using a result obtained by combining the receiver targeting criteria illustrated in FIG. 73 and/or the receiver targeting criteria illustrated in FIGS. 74 through 76.

FIGS. 77 and 78 are diagrams illustrating a pre-registered PDI question according to an embodiment of the present invention.

In detail, FIGS. 77 and 78 are tables illustrating a pre-registered PDI question when the targeting criterion type code described with reference to FIG. 72 is 0x02.

As illustrated in FIGS. 77 and 78, when the targeting criterion type code is 0x02, the targeting criteria table according to the present embodiment may include pre-registered PDI question information regarding an alphanumeric postal code. In this case, a receiver according to the embodiment of the present invention may convert the targeting criteria table using an appropriate number of bytes according to a region to acquire a pre-registered PDI question. The receiver according to the present embodiment may use a maximum of 8 bytes in order to convert the targeting criteria table.

FIG. 77 is a table showing a pre-registered PDI question regarding a 5-digit zip code when the targeting criterion type code is 0x02. The 5-digit zip code refers to the alphanumeric postal code used in US. Content included in the pre-registered PDI question illustrated in FIG. 77 is the same as content described with reference to FIG. 70.

In detail, as illustrated in FIG. 77, when the targeting criterion type code is 0x02, a question ID according to the present embodiment may include information regarding a zip code. The pre-registered PDI question illustrated in FIG. 77 may be a QTA type and may include a question text including content of requesting a PDI answer of a text type of the zip code.

[Example 12] below is obtained by representing the table illustrated in FIG. 77 in xml schema according to an embodiment of the present invention.

[Example 12]

```
<a20:QTA id="atsc.org/PDIQ/ZIPcode">
<a20:Q xml:lang="en-us">
<a20:Text>What is your 5-digit ZIP code?</a20:Text>
</a20:Q>
</a20:QTA>
```

FIG. 78 is a table showing a pre-registered PDI question regarding a numeric postal code when the targeting criterion type code is 0x02. The numeric postal code refers to an alphanumeric postal code used in regions other than US. Content included in the pre-registered PDI question illustrated in FIG. 78 is the same as content described with reference to FIG. 70.

In detail, as illustrated in FIG. 78, when the targeting criterion type code is 0x02, the question ID according to the present embodiment may include information regarding a postal code. The pre-registered PDI question illustrated in FIG. 78 and may include a question text including content of requesting a PDI answer of a text type of the postal code.

[Example 13] below is obtained by representing the table illustrated in FIG. 78 in xml schema according to an embodiment of the present invention.

[Example 13]

```
<a20:QTA id="atsc.org/PDIQ/ZIPcode">
<a20:Q xml:lang="en-us">
<a20:Text>What is your 5-digit ZIP code?</a20:Text>
</a20:Q>
</a20:QTA>
```

FIGS. 79 through 82 are diagrams illustrating a pre-registered PDI question according to an embodiment of the present invention.

In detail, FIGS. 79 through 82 are tables illustrating a pre-registered PDI question when the targeting criterion type code described with reference to FIG. 72 is 0x03.

As illustrated in FIGS. 79 through 82, when the targeting criterion type code is 0x03, the targeting criteria table according to the present embodiment may include pre-registered PDI question information regarding a demographic category of a user. In this case, a receiver according to the embodiment of the present invention may convert the targeting criteria table using only the low order 2 bytes to acquire a pre-registered PDI question.

FIG. 79 is a table showing a pre-registered PDI question regarding a gender of a user when the targeting criterion type code is 0x03. Content included in the pre-registered PDI question illustrated in FIG. 79 is the same as content described with reference to FIG. 70.

In detail, as illustrated in FIG. 79, when the targeting criterion type code is 0x03, the question ID according to the present embodiment may include information regarding a gender. In addition, the pre-registered PDI question illustrated in FIG. 79 may be a QSA type and may include a question text including content of requesting a PDI answer of a selection type of the gender of the user.

In addition, the pre-registered PDI question illustrated in FIG. 79 is a QSA type, and thus, may include selection information regarding a PDI answer. For example, the pre-registered PDI question regarding the gender illustrated in FIG. 79 may include two types of male and female selection information.

[Example 14] below is obtained by representing the table illustrated in FIG. 79 in xml schema according to an embodiment of the present invention.

[Example 14]

```
<a20:QSA id="atsc.org/PDIQ/gender"minChoices="1">
<a20:Q xml:lang="en-us">
<a20:Text>What is your gender?</a20:Text>
<a20:Selection id="1">Male</a20:Selection>
<a20:Selection id="2">Female</a20:Selection>
</a20:Q>
</a20:QSA>
```

FIG. 80 is a table showing a pre-registered PDI question regarding an age bracket of a user when the targeting criterion type code is 0x03. Content included in the pre-registered PDI question illustrated in FIG. 80 is the same as content described with reference to FIG. 70.

In detail, as illustrated in FIG. 80, when the targeting criterion type code is 0x03, the question ID according to the present embodiment may include information regarding the age bracket. The pre-registered PDI question illustrated in FIG. 80 may be a QSA type and may include a question text including content of requesting a PDI answer of a selection type of the age bracket.

In addition, the pre-registered PDI question illustrated in FIG. 80 is a QSA type, and thus, may include selection information regarding a PDI answer. For example, the pre-registered PDI question regarding the age bracket illustrated in FIG. 80 may include 8 types of selection information regarding ages 2-5, ages 6-11, ages 12-17, ages 18-34, ages 35-49, ages 50-54, ages 55-64, and ages over 65.

[Example 15] below is obtained by representing the table illustrated in FIG. 80 in xml schema according to an embodiment of the present invention.

[Example 15]

```
<a20:QSA id="atsc.org/PDIQ/age-bracket"minChoices="1">
<a20:Q xml:lang="en-us">
<a20:Text> What age bracket are you in</a20:Text>
<a20:Selection id="1">Ages 2-5</a20:Selection>
<a20:Selection id="2">Ages 6-11</a20:Selection>
<a20:Selection id="3">Ages 12-17</a20:Selection>
<a20:Selection id="4">Ages 18-34</a20:Selection>
<a20:Selection id="5">Ages 35-49</a20:Selection>
<a20:Selection id="6">Ages 50-54</a20:Selection>
<a20:Selection id="7">Ages 55-64</a20:Selection>
<a20:Selection id="8">Ages 65+</a20:Selection>
</a20:Q>
</a20:QSA>
```

FIG. 81 is a table illustrating a pre-registered PDI question regarding whether a user is working when the targeting criterion type code is 0x03. Content included in the pre-registered PDI question illustrated in FIG. 81 is the same as content described with reference to FIG. 70.

In detail, as illustrated in FIG. 81, when the targeting criterion type code is 0x03, the question ID according to the present embodiment may include information regarding working. The pre-registered PDI question illustrated in FIG. 81 may be a QSA type and may include a question text including content of requesting a PDI answer of a selection type regarding whether the user is working.

In addition, the pre-registered PDI question illustrated in FIG. 81 is a QSA type, and thus, may include selection information regarding a PDI answer. For example, the pre-registered PDI question regarding working illustrated in FIG. 79 may include 2 types of selection information regarding yes and no.

[Example 16] below is obtained by representing the table illustrated in FIG. 81 in xml schema according to an embodiment of the present invention.

[Example 16]

```
<a20:QSA id="atsc.org/PDIQ/working"minChoices="1">
<a20:Q xml:lang="en-us">
<a20:Text>Are you working at a paying job?
</a20:Text>
<a20:Selection id="1">Yes</a20:Selection>
<a20:Selection id="2">No</a20:Selection>
</a20:Q>
</a20:QSA>
```

FIG. 82 is a table showing a pre-registered PDI question regarding a gender of a user when the targeting criterion type code is 0x03. Content included in the pre-registered PDI question illustrated in FIG. 82 is the same as content described with reference to FIG. 70.

In detail, as illustrated in FIG. 82, when the targeting criterion type code is 0x03, the question ID according to the present embodiment may include information regarding working. In addition, the pre-registered PDI question illustrated in FIG. 82 may be a QBA type and may include a question text including content of requesting a PDI answer of a Boolean type regarding whether the user is working.

[Example 17] below is obtained by representing the table illustrated in FIG. 82 in xml schema according to an embodiment of the present invention.

[Example 17]

```
<a20:QBA id="atsc.org/PDIQ/working">
<a20:Q xml:lang="en-us">
<a20:Text>Are you working at a paying job?
</a20:Q>
</a20:QBA>
```

FIG. 83 is a diagram illustrating an application programming interface (PDI API) according to an embodiment of the present invention.

In detail, FIG. 83 is a diagram illustrating a function for using PDI data by application such as the aforementioned declarative content object (DO), etc. The PDI API according to the present embodiment refers to an interface for access of a receiver according to the embodiment of the present invention to a PDI store.

An ATSC 2.0 client device supports the PDI APIs to enable accessing (e.g. search or update) PDI Questions.

The APIs provided as part of the ATSC 2.0 DAE allow a DO, given the ID of a given question, to fetch the text of that question from storage, to fetch a previously supplied answer to that question (if available), and to store an answer to that question.

No attempt is made to define or enforce any rules that would prevent a TDO from accessing or writing any particular question or answer. It is envisioned that multiple entities may provide questionnaires usable on a given channel. Such entities could include, but are not limited to, the national network operator, the local broadcaster affiliate, and various program producers/providers.

The ATSC 2.0 client device implements APIs for PDI data storage and retrieval. To implement PDI functionality, the device can use a native application, a file system/database, or even use a remote service to provide the PDI database. The PDI Store is bound to an ATSC client. Only one PDI Store instance exists for the client. The PDI Store allows the DOs to access the client's PDI data and also allows the user, through native applications, to manage (e.g. update, add, or delete) PDI Questions in a consistent manner across different service providers.

FIG. 83 is a table showing PDI API according to an embodiment of the present invention. A receiver according to the embodiment of the present invention may acquire a PDI table list using the PDI API illustrated in FIG. 83.

Hereinafter, the API illustrated in FIG. 83 will be described.

A name of the API illustrated in FIG. 83 is getPDITableList( ) and may be changed according to a designer's intention. Description illustrated in FIG. 83 refers to details of a getPDITableList( ) API function. Arguments illustrated in FIG. 83 refer to a parameter of the getPDITableList( ) API function.

More specifically, the description shown in FIG. 83 indicates that the getPDITableList( ) API function is for returning an XML structure with a list of the PDI tables, giving the pdiTableId for each one. The XML structure is as following XML schema. A pdiTableList element which has a single pdiTableId child element, with cardinality 0 to unbounded. The case of 0 pdiTableId instances would indicate that the broadcaster has not provided a PDI Table.

The arguments shown in FIG. 83 indicate that pdiTableId is a globally unique identifier of the PDI Table, in the form of a URI.

Thus, a receiver according to the embodiment of the present invention may receive the PDI table list with a table format according to XML schema. As illustrated in FIG. 83, the PDI table list may include a pdiTableId element. When cardinality of the pdiTableId element illustrated in FIG. 83 indicates 0, this means that a receiver according to the embodiment of the present invention does not receive a PDI table from a broadcaster.

FIG. 84 is a diagram showing PDI API according to another embodiment of the present invention.

In detail, FIG. 84 is a diagram showing PDI API for acquiring a PDI table by a receiver according to the embodiment of the present invention.

Hereinafter, the API illustrated in FIG. 84 will be described.

A name of the API illustrated in FIG. 84 is getPDITable (String pdiTableId) and may be changed according to a designer's intention. Description illustrated in FIG. 84 refers to details of a getPDITable(String pdiTableId) API function. Arguments illustrated in FIG. 84 refer to a parameter of the getPDITable(String pdiTableId) API API function.

More specifically, the description shown in FIG. 84 indicates that the getPDITable(String pdiTableId) API function is for returning the PDI Table XML document for the receiver. Each pdiTable is associated with an identified by the globally unique pdiTableId identifier provided as input to the method. The returned value is a string that contains the serialized PDI Table XML instances, optionally containing PDI-Q or PDI-A XML instances.

The arguments shown in FIG. 84 indicate that pdiTableId is a globally unique identifier of the PDI Table, in the form of a URI.

Thus, a receiver according to the embodiment of the present invention may receive the PDI table list described with reference to FIG. 83 and then receive a PDI table. In detail, the receiver that receives the PDI table list may receive a PDI table XML document associated with the pdiTableId illustrated in FIG. 83.

In detail, an operation of a receiver based on the PDI API illustrated in FIG. 84 is the same as the operation described with reference to FIGS. 36 through 39, 52, 63, 65, and 68 through 71. In addition, the receiver based on the PDI API illustrated in FIG. 84 may receive the PDI table list in the PDI table format described with reference to FIGS. 40 through 47.

FIG. 85 is a diagram showing PDI API according to another embodiment of the present invention.

In detail, FIG. 85 is a diagram showing PDI API for acquiring a PDI answer by a receiver according to the embodiment of the present invention.

Hereinafter, the API illustrated in FIG. 85 will be described.

A name of the API illustrated in FIG. 85 is getPDIA (String pdiTableId) and may be changed according to a designer's intention. Description illustrated in FIG. 85 refers to details of a getPDIA(String pdiTableId) API function. Arguments illustrated in FIG. 85 refers to a parameter of the getPDIA(String pdiTableId) API function.

More specifically, the description shown in FIG. 85 indicates that the getPDIA(String pdiTableId) API function is for returning the PDI-A XML document for the receiver. Each pdiTable is associated with an identified by the globally unique pdiTableId identifier provided as input to the method. The returned value is a string that contains the serialized PDI-A XML instances.

The arguments shown in FIG. 85 indicate that pdiTableId is a globally unique identifier of the PDI Table, in the form of a URI.

Thus, a receiver that receives the PDI table list described with reference to FIG. 83 and then receive an XML document (or PDI-A instance document) of a PDI-A table associated with the pdiTableId illustrated in FIG. 83. The PDI-A instance document according to the present embodiment is the same as the document described with reference to FIG. 46.

In detail, an operation of a receiver based on the PDI API illustrated in FIG. 85 is the same as the operation described with reference to FIGS. 36 through 39, 52, 63, 65, and 68 through 71.

Although not illustrated in FIG. 83 through 85, the PDI API according to the present embodiment can be described as Tables below.

TABLE 39

Object getPDI(String id)
Description   Returns an XML DOM object representing an XML document containing as its root element a PDI QxAD element, the QxA child element of which is the PDI Question identified by the given id, QxA@id. If no PDI Questions with the given value of id exist, this method shall return null.
Note: Only one PDI Question with a given value of question id can exist in a PDI Store. More than one PDI Table could hold a PDI Question TABLE 39-continued of the same question id so long as the consistency is maintained.
Arguments   id   Identification of the PDI Question

TABLE 40 void setPDI(object id)
Description   First checks if the PDI Question corresponding to the QxA element in the QxAD document represented by the given object already exists in the PDI Store. If it does not, then the method shall do nothing. If it does exist, then the stored PDI question shall be updated to the one provided. Only the answer element QxA.A of the PDI Question can be updated. The value of PDITable@pdiTable Version of the PDI Table is not changed. If the updated PDI Question is shared by different PDI Tables, those related tables shall be changed without any version update. The method shall throw a QUOTA_EXCEEDED_ERR exception if the storage capacity has been exceeded, or a WRONG_DOCUMENT_ERR exception if an invalid document is specified. The method shall be atomic with respect to failure. In the case of failure, the method does nothing. That is, changes to the data storage area must either be successful, or the data storage area must not be changed at all.
arguments   id   Object representing the PDI Question object for which the answer is to be stored.

FIG. 86 is a view showing a Protocol Stack for a next generation broadcasting system according to an embodiment of the present invention.

The present invention may proposes a scheme for exchanging the above-described PDI information between a receiver and a companion device in a next generation broadcasting system based on interlocking between a terrestrial broadcast network and an Internet network. In the present invention, the above-described PDI information may be provided to the companion device in addition to being utilized only by the receiver. A user may receive an interactive service in which the PDI information is reflected utilizing the companion device.

On the other hand, one user may use several companion devices. In this case, if PDI user data are set per companion device, the user may continue to repeatedly answer. For this reason, it is necessary for the PDI user data to be shared among several companion devices. Consequently, the present invention proposes a scheme for exchanging/sharing PDI information among a plurality of companion devices. The exchanged/shared PDI information may be the above-described PDI Question, Answer, and/or Filtering Criteria.

In addition, the present invention proposes a method of providing/storing PDI information of a plurality of users and providing a filtered interactive service utilizing the same.

In addition, the present invention proposes a scheme for converting received relevant information into PDI Question and presenting the PDI Question to a user to personalize preference for presented information, i.e. Presentation Preference. In addition, the present invention also proposes a scheme for updating Presentation Preference, which is already set.

The broadcasting system according to the present invention may correspond to a hybrid broadcasting system in which an Internet Protocol (IP) centric broadcast network and a broadband network are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame may include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based AN and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for A/V, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for A/V, etc.

Transport through a broadband network may be divided into transport of content and transport of signaling data.

Transport of the content includes transport of a linear content (A/V and data (closed caption, emergency alert message, etc.)), transport of a non-linear content (ESG, non-timed data, etc.), and transport of a MPEG DASH based media segment (A/V and data).

Transport of the signaling data may be carried out including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband network may be supported. For example, in a case in which one UD content is separately and simultaneously transported through the broadcasting network and the broadband network, the receiver may adjust a timeline dependent upon a transport protocol and synchronize the content through the broadcasting network and the content through the broadband network to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XML form. The signaling data may be transmitted through the terrestrial broadcasting network or the broadband network.

A real-time broadcast A/V content and/or data may be expressed in an ISO Based Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet network in real time. In the broadcasting system according to the embodiment of the present invention, the received broadcast A/V content and/or data may be combined to provide various enhanced services, such as an Interactive service and a second screen service, to a viewer.

FIG. 87 is a view showing an UPnP type Action mechanism according to an embodiment of the present invention.

First, communication between devices in the present invention will be described.

The communication between devices may mean exchange of a message/command/call/action/request/response between the devices.

In order to stably transmit a message between devices to a desired device, various protocols, such as Internet Control Message Protocol (ICMP) and Internet Group Management Protocol (IGMP), as well as Internet Protocol (IP) may be applied. At this time, the present invention is not limited to a specific protocol.

In order to contain various information in a message used for communication between devices, various protocols, such as Hypertext Transfer Protocol (HTTP), Real-time Transport Protocol (RTP), Extensible Messaging and Presence Protocol (XMPP), and File Transfer Protocol (FTP), may be applied. At this time, the present invention is not limited to a specific protocol.

When a message used for communication between devices is transmitted, various components, such as a message header and a message body, defined by each protocol may be utilized. That is, each message component may be transmitted in a state in which data are stored in each message component and the present invention is not limited to a specific message component. In addition, data transmitted by a message may be transmitted various types (string, integer, floating point, boolean, character, array, list, etc.) defined by each protocol. In order to structurally express/transmit/store complex data, a Markup scheme, such as Extensible Markup Language (XML), Hypertext Markup Language (HTML), Extensible Hypertext Markup Language (XHTML), and JavaScript Object Notation (JSON), text, or an image format may be applied. At this time, the present invention is not limited to a specific scheme.

In addition, a message used for communication between devices may be transmitted in a state in which data are compressed. The present invention is not limited to application of a specific compression technology.

In the description of the above-described communication between devices in the present invention, one scheme, e.g. a UPnP scheme, will be described. The UPnP scheme may correspond to a case in which IP-TCP/UDP-HTTP protocols are combined in the description of the above-described communication between devices.

The UPnP type Action mechanism according to the embodiment of the present invention shown in the figure may mean a communication mechanism between a UPnP control point and a UPnP device. The UPnP control point t87010 may be an HTTP client and the UPnP device t87020 may be an HTTP server. The UPnP control point t87010 may transmit a kind of message called an action to the UPnP device t87020 such that the UPnP device t87020 can perform a specific action.

The UPnP control point t87010 and the UPnP device t87020 may be paired with each other. Pairing may be performed between the respective devices through a discovery and description transmission procedure. The UPnP control point may acquire a URL through a pairing procedure.

The UPnP control point t87010 may express each action in an XML form. The UPnP control point t87010 may transmit each action to the acquired control URL using a POST method t87030 defined by HTTP. Each action may be data which are to be actually transmitted as a kind of message. This may be transmitted to a HTTP POST message body in an XML form. Each action may include name, arguments, and relevant data. The HTTP POST message body may transmit name and/or arguments of each action.

At this time, each action may be transmitted to the same control URL. The UPnP device t87020 may parse the received action using an XML parser. The UPnP device t87020 may perform a corresponding operation according to each parsed action.

For the UPnP protocol, each action may be defined by name and used. In addition, since the name of the action is also transmitted to the HTTP POST message body, exchange between infinite kinds of actions may be possible even in a case in which only one URL for a target device exists and only one HTTP POST method is used.

FIG. 88 is a view showing a REST mechanism according to an embodiment of the present invention.

In the description of the above-described communication between devices in the present invention, one scheme, e.g. a REST scheme, will be described.

The REST mechanism according to the embodiment of the present invention shown in the figure may mean a communication mechanism between a REST client t88010 and a REST server t88020. The REST client t88010 may be an HTTP client and the REST server t88020 may be an HTTP server. In the same manner as in the above description, the REST client t88010 may transmit a kind of message called an action to the REST server t88020 such that the REST server t88020 can perform a specific action.

In this embodiment, the REST client t88010 may transmit each action to the REST server t88020 through a URI. Action name is not required for each action. Each action may include only arguments and data.

Among HTTP methods, various methods, such as GET, HEAD, PUT, DELETE, TRACE, OPTIONS, CONNECT, and PATCH, as well as POST may be utilized. In addition, a plurality of URIs that will access a target device for communication may be defined. Due to such characteristics, an action may be transmitted without definition of action name. A plurality of URI values necessary for such a REST scheme may be acquired during a discovery or description transmittance procedure.

Data or arguments necessary to be transmitted may be transmitted while being added to a corresponding URI. Alternatively, data or arguments may be transmitted while being included in the HTTP body in various forms (XML, JSON, HTML, TEXT, IMAGE, etc.).

The REST server t88020 may perform a specific operation according to the received action.

The above-described communication between devices is only an embodiment and all of the details proposed by the present invention are not limited to the UPnP scheme.

FIG. 89 is a structural view showing exchange of user data between a receiver and a companion device according to an embodiment of the present invention.

As described above, the present invention proposes a method of exchanging/transmitting PDI user data between a receiver and a companion device.

A content provider or broadcaster t80010, PDI Questionnaires t89020, a PDI engine t89030, and a PDI store t89040 may be identical to the above-described modules having the same names.

As described above, the PDI Questionnaires t89020 created by the content provider or broadcaster t80010 may be transmitted to a receiver t89050. The PDI engine t89030 may provide corresponding Questionnaires to a user, receive answers from the user, and store the received answers in the PDI store t89040. According to embodiments, answers may be automatically entered in the receiver without inducing the user to answer questionnaires.

The mechanism of presenting questionnaires to the user and storing answers may be the same as in the previous embodiment but is only an embodiment. The present invention is not limited thereto.

As described above, the PDI store t89040 may be located in the receiver t89050. According to embodiments, however, a PDI cloud store t89070 may be provided outside the receiver. The PDI cloud store t89070 may perform the same operation as the above-described PDI store t89040. On the other hand, the PDI cloud store t89070 may be located outside the receiver t89050 such that PDI cloud store t89070 can operate as a cloud server.

In this embodiment, the receiver t89050 may further include a companion device module t89060. Stored PDI user data may be transmitted to companion devices t89080 through the companion device module t89060. On the other hand, answers set by the companion devices may be transmitted to the receiver through the companion device module t89060.

The present invention describes an embodiment of communication between the receiver and the companion devices based on UPnP.

However, the communication protocol between the receiver and the companion devices is not limited thereto.

FIG. 90 is a view showing a portion of PDI user data according to an embodiment of the present invention.

FIG. 91 is a view showing another portion of PDI user data according to an embodiment of the present invention.

The two figures show one table, which, however, is divided into two parts due to spatial limitations.

The shown PDI user data may be another embodiment of the above-described PDITable (an XML form). That is, an embodiment of exchanged PDI user data may be the above-described PDI table.

PDIUserData may be a root element including one or more question elements.

@ProtocolVersion may be the same as @ProtocolVersion in the above-described PDITable. @userDataId may be the same as @pdiTableId in the above-described PDITable. @userDataVersion may be the same as @pdiTableVersion in the above-described PDITable. @time may be the same as @time in the above-described PDITable.

QxA (i.e. QIA, QBA, QSA, QTA, or QAA) may be another embodiment of QxA in the above-described PDITable. In this embodiment, each QxA may have the same meaning as in the above description but may have a slight different internal structure. The internal structure of each QxA is expressed in a QxAType element. For example, the structure of QIA is expressed in a QIAType field.

@id below QxA may be the same as @id in the above-described PDITable. @expire below QxA may be the same as @expire in the above-described PDITable.

Q below QxA may be the same as Q in the above-described PDITable. In this embodiment, the Q element may have a QText element expressing question_text. @lang below QxA may be the same as @lang in the above-described PDITable. In this embodiment, however, @lang may be located below the QText element.

A below QxA may be the same as A in the above-described PDITable. In this embodiment, the A element may have @answer having actual answer information. @time below QxA may be the same as @time in the above-described PDITable.

@loEnd and @hiEnd below QIA may be the same as @loEnd and @hiEnd in the above-described PDITable. In this embodiment, however, @loEnd and @hiEnd may be located below the Q element.

@minChoices and @maxChoices below QSA may be the same as @minChoices and @maxChoices in the above-described PDITable. In this embodiment, however, @minChoices and @maxChoices may be located below the Q element. A Selection element and @selectionId below QSA may be the same as the Selection element and @id located therebelow in the above-described PDITable.

A below QTA may have @lang, which may be same as @lang of the A element of QTA in the above-described PDITable.

As described above, QAA may have no Q element.

QxAD may mean a Q&A document classified according to data type of answer. That is, QxAD may include a QxA element and @protocolVersion related to an actual question and answer. x may correspond to any one selected from among I (integer), B (Boolean), S (Selection), T (text), A (without question) according to data type.

Among the shown PDI user data, a part denoted by t91010 may be omitted according to embodiments.

The above-described PDI user data is only an embodiment of PDI user data. The PDI user data of the present invention is not limited to any form.

FIG. 92 is a view showing service type and service ID of a service according to an embodiment of the present invention.

First, device type for compatibility between a receiver and a companion device must be defined to exchange PDI user data. An embodiment of device type may be as follows.

UPnP Device Type—urn:atsc.org:device:atsc3.0rcvr

In a case in which devices are not suitable for the defined device type, the devices may not utilize a service related to exchange of PDI user data proposed by the present invention.

Service type and/or service ID must be defined such that PDI user data can be exchanged between the receiver and the companion device supporting the defined device type. A UserData service may be defined. The UserData service may mean a service for exchanging PDI user data between the receiver and the companion device supporting the defined device type. PDI user data or a PDI table may be transmitted to or received from the companion device through the UserData service.

In two embodiments t92010 and t92020 of the shown service type and service ID, service name may be "UserData", service type may be "atsc3.0userdata:1", and service ID may be "urn:atsc.org:servceId:atsc3.0userdata1" or "urn:atsc.org:servceId:atsc3.0userdata".

FIG. 93 is a view showing state variables of a UserData service according to an embodiment of the present invention.

The above-described UPnP UserData service may define PDIUserDataProtocolVersion, A_ARG_TYPE_UserDataIdsList, UserDataList, and/or A_ARG_TYPE_UserData state variables to exchange PDI user data.

Data transmission may be performed in an event scheme and an action scheme. The event scheme may mean a scheme in which a companion device is registered in a receiver and, when specific information is changed, the receiver automatically transmits the change of the specific information to the companion device. The action scheme may mean a scheme in which the companion device requests specific information from the receiver.

The four state variables of the above-described UserData service, which are required state variables, may be based on the action scheme, not the event scheme. Consequently, the state variables may be utilized as arguments of various actions.

PDIUserDataProtocolVersion may indicate protocol version of a UserData service supported by a device. It is possible to know whether each device (the receiver or the companion device) supports a UserData service for personalization through this state variable. This state variable may have a data type of bin or hex. First four bits may mean major version number and the next four bits may mean minor version number. For example, in a case in which the state variable has a value of 00010010, it is possible to know that version is 1.2 (major version number: 1 and minor version number: 2). This version information may be used to match with @protocolVersion of the above-described PDI user data or protocolVersion information of a UserDataList state variable, which will hereinafter be described.

A_ARG_TYPE_UserDataIdsList may indicate a list including IDs of PDI user data stored in the above-described PDI store. UserDataIds of a UserDataList state variable, which will hereinafter be described, may be expressed in a string type list. Consequently, this state variable may be utilized for actions related to userDataIds of the UserDataList state variable. This state variable may have a List data type (e.g. CSV).

UserDataList may function as a list containing PDI user data. This state variable may include a plurality of Questionnaires and Answers. This state variable may be utilized in a GetUserData( ) action, which will hereinafter be described. The detailed structure of this state variable will hereinafter be described.

A_ARG_TYPE_UserData may be a fragment of the above-described UserDataList. At this time, two state variables may be based on the same markup language. For example, in a case in which the UserDataList state variable is an XML document, A_ARG_TYPE_UserData may be a fragment of the XML document. This state variable may have a plurality of PDIUserData elements and attributes. In addition, this state variable may include sub elements based on use of an action. A_ARG_TYPE_UserData may be omitted according to embodiments.

FIG. 94 is a view showing an XML structure of UserDataList according to an embodiment of the present invention.

UserDataList may include a plurality of PDIUserData. Each PDIUserData may correspond to the above-described PDI user data or PDI table. Elements and attributes of PDIUserData may be the same as in the above description. The structure of PDIUserData may be changed into different forms according to embodiments.

First UserDataList t94010 may include PDIUserData having userDataId of "atsc.org/userdata1" and PDIUserData having userDataId of "atsc.org/userdata2".

PDIUserData having userDataId of "atsc.org/userdata1" may have question1 having QIA type. question1 may have a question of "what is your age". In addition, question1 may have an answer of "21" answered on Jun. 2, 2014. PDIUserData, which is "atsc.org/userdata2", may also have information according to the above-described PDIUserData.

Second UserDataList t94020 may include PDIUserData having userDataIds of "atsc.org/userdata1", "atsc.org/userdata2", and "atsc.org/userdata3". Each PDIUserData may also have information according to the above-described PDIUserData.

UserDataList may have a plurality of PDIUserData having the same form as in the above-described two embodiments. Each PDIUserData may have the same structure as the above-described structure of the PDI user data or different structures according to embodiments.

FIG. 95 is a view showing actions of a UserData service according to an embodiment of the present invention.

The above-described UserData service may include GetPDIUserDataProtocolVersion, GetUserDataIdsList, GetUserData, and/or SetUserData actions. GetPDIUserDataProtocolVersion may be an optional action and the other three actions may be required actions. According to embodiments, GetPDIUserDataProtocolVersion may be omitted. In addition, additional actions may be further defined according to embodiments.

The respective actions will hereinafter be described.

FIG. 96 is a view showing GetPDIUserDataProtocolVersion, one action of a UserData service, according to an embodiment of the present invention.

A GetPDIUserDataProtocolVersion action may be an action used to know version of a protocol for bringing PDI user data. The protocol may mean a protocol supported by a receiver (or a Primary Device). A companion device may know version of a protocol supported by the receiver using the GetPDIUserDataProtocolVersion action.

In order to use GetPDIUserDataProtocolVersion, a PDIUserDataProtocolVersion output argument may be defined.

PDIUserDataProtocolVersion, which is protocol version information of a UserData service supported by a device, may be related to the above-described PDIUserDataProtocolVersion state variable.

FIG. 97 is a view showing GetUserDataIdsList and GetUserData, actions of a UserData service, according to an embodiment of the present invention.

A GetUserDataIdsList action will be described.

The GetUserDataIdsList action may be an action used to bring IDs of PDI user data stored in the above-described PDI store. A companion device may bring Id information of PDI user data from a PDI store provided in/outside a receiver using the GetUserDataIdsList action. At this time, protocol version of PDI user data may be referred to such that only IDs of PDI user data supporting a corresponding protocol can be brought.

In order to use the GetUserDataIdsList action, a ProtocolVersion input argument and a UserDataIdsList output argument may be defined (t97010). The ProtocolVersion input argument, which is protocol version information of PDI user data, may be related to the above-described PDIUserDataProtocolVersion state variable. The UserDataIdsList output argument, which is a string type list of IDs of PDI user data, may be related to the above-described A_ARG_TYPE_UserDataIdsList state variable.

When the GetUserDataIdsList action is used, if elements having the same value of @protocolVersion and ProtocolVersion, which is an input argument, exist among PDIUserData elements of a UserDataList state variable, @userDataId values may be output as a list among the PDIUserData elements having the same value of @protocolVersion and ProtocolVersion. The output, which is the above-described UserDataList output argument, may be transmitted from the receiver to the companion device.

A GetUserData action will be described.

The GetUserData action may be an action used to bring PDI user data stored in the above-described PDI store. The companion device may bring PDI user data from the PDI store provided in/outside the receiver using the GetUserData action. At this time, the above-described UserDataIdsList may be referred to such that only PDIUserData matched with PDIUserDataId can be brought in a fragment form.

In order to use the GetUserData action, a UserDataIdsList input argument and a UserData output argument may be defined (t97020). The UserDataIdsList input argument may be the same as in the above description and may be related to the above-described PDIUserDataProtocolVersion state variable. The UserData output argument, which is a fragment of the above-described UserDataList state variable, may be related to the above-described A_ARG_TYPE_UserData state variable. The UserData output argument may have information, such as elements, and may be based on data type of UserDataList (e.g. XML).

For example, in a case in which an action, such as GetUserData(UserDataIdsList="atsc.org/userdata1", "atsc.org/userdata3"), is used, PDIUserData having userDataId of "atsc.org/userdata1" and "atsc.org/userdata3" among a plurality of PDIUserData included in UserDataList in an XML structure of the above-described UserDataList may be returned. At this time, the XML structure of the returned UserData may have only PDIUserData having userDataId of "atsc.org/userdata1" and "atsc.org/userdata3" and may not have a PDIUserData element having userDataId of "atsc.org/userdata2".

In the GetUserData action, the number of PDIUserData elements of UserData, which is an output argument, may be less than or equal to the number of PDIUserDataIds in UserDataIdsList, which is an input argument.

According to embodiments, when UserDataIdsList, which is an input argument, is set to "ALL", all PDIUserData may be requested irrespective of PDIUserDataId.

An embodiment of an operation sequence diagram of the above-described GetUserDataIdsList and GetUserData actions will be described.

In this operation sequence diagram, the companion device and the receiver are already paired with each other. A paring procedure is omitted from the operation sequence diagram. In addition, it is assumed that the companion device already knows utilizable protocol version.

The above-described content provider or broadcaster may transmit PDI user data to the receiver to provide a personalized service (ts97010). The PDI user data may be a plurality of questionnaires or a combination of a plurality of questionnaires and answers.

The receiver transmits the received PDI user data to the above-described PDI engine (ts97020). The PDI engine may present questionnaires to a user and obtain answers corresponding to the respective questionnaires from the user (ts97030). The PDI engine may store completed Q&A in the above-described PDI store (ts97040).

The above-described companion device may perform the above-described GetUserDataIdsList action to obtain PDI user data from the receiver (ts97050). The companion device may request IDs of PDI user data from a companion device module in the above-described receiver.

The companion device module may request IDs of PDI user data requested by the companion device from the PDI engine (ts97060). The PDI engine may retrieve corresponding IDs of PDI user data from the PDI store (ts97070). Subsequently, the PDI engine may transmit the retrieved IDs of PDI user data to the companion device module (ts97080).

The companion device module may transmit the received IDs of PDI user data to the companion device (ts97090).

The companion device having obtained IDs of PDI user data may utilize the above-described GetUserData action to obtain PDI user data (ts97100). The companion device may request PDI user data using the received IDs of PDI user data or using the received IDs of PDI user data as input arguments.

The companion device module may request corresponding PDI user data from the PDI engine (ts97110). The companion device module may retrieve corresponding PDI user data stored in the PDI store (ts97120) and transmits the retrieved PDI user data to the companion device module (ts97130).

The companion device module may transmit the received PDI user data to the companion device (ts97140). The companion device may store the received PDI user data. The stored PDI user data may be semi-permanently stored and utilized. In a case in which there is no store in the companion device, the PDI user data may be temporarily stored in a space, such as a memory.

In the present invention, a time at which the GetUserDataIdsList and GetUserData actions are executed is not limited to a specific time. According to embodiments, each action may be executed immediately after the companion device and the receiver are paired with each other. In addition, according to embodiments, the companion device may request execution of each action from the receiver during periodic polling FIG. 98 is a view showing an extended state variable of a UserData service according to an embodiment of the present invention.

In a case in which PDI user data having specific UserDataId are updated, a new XML document may be created or only userDataVersion may be increased without creation of a new XML document.

In a case in which a method of increasing only userDataVersion without creation of a new XML document is used, the above-described actions may be used. On the other hand, in a case in which a method of newly creating a XML document whenever PDI user data are updated is used, it is necessary to refer to userDataVersion of specific PDI user data as well as ProtocolVersion.

To this end, the above-described UserDataList state variable may be extended to A_ARG_TYPE_UserDataIdsList. A_ARG_TYPE_UserDataIdsList may be a required state variable and may be based on the above-described action scheme.

Data type of A_ARG_TYPE_UserDataIdsList may be changed from a string to a list of strings. The list of strings may be a list including IDs of PDI user data stored in the PDI store and userDataVersion of an XML document having the corresponding IDs. This list may be expressed in various forms. In an embodiment, the list may be expressed in a pair form of (userDataId, userDataVersion). In a case in which a method of newly creating an XML document whenever PDI user data are updated is used, several XML documents may exist in the PDI store according to userDataVersion even for PDI user data having the same userDataId.

In a case in which the variable is extended to A_ARG_TYPE_UserDataIdsList,

UserDataIdsList may return a list of strings in a (userDataId, userDataVersion) form among the above-described arguments of the GetUserDataIdsList action. In addition, in a case in which ProtocolVersion, which is an input argument, is set to 00000000, a list of all userDataId and userDataVersion in a pair form may be requested irrespective of ProtocolVersion. In addition, in a case in which ProtocolVersion, which is an input argument, is set to 11111111, a list of userDataId and userDataVersion corresponding to the latest ProtocolVersion in a pair form may be requested.

In a case in which the variable is extended to A_ARG_TYPE_UserDataIdsList, UserDataIdsList among the above-described arguments of the GetUserData action may also request only PDIUserData having specific userDataId and userDataVersion matched with each other among all UserDataIdsList in a fragment form using a list of strings in a (userDataId, userDataVersion) form as an input. In addition, in a case in which UserDataIdsList, which is an input argument, is set to "ALL", all PDIUserData may be requested irrespective of userDataId and userDataVersion.

FIG. 99 is a view showing SetUserData, one action of a UserData service, according to an embodiment of the present invention.

The SetUserData action may be an action used when PDI user data are set/stored in a companion device and the set PDI user data are transmitted to a receiver. The SetUserData action may have UserDataList as an input argument and may be related to the above-described UserDataList state variable (t99010).

UserDataList which is already stored in the receiver may be modified/updated using the PDI user data transmitted through the SetUserData action. The receiver may compare the received PDI user data with PDI user data stored in a PDI store. In a case in which there are no corresponding PDI user data, the received PDI user data may be added. In a case in which there are corresponding PDI user data, on the other hand, @userDataVersion of the received PDI user data may be compared with that of the stored PDI user data and, when @userDataVersion of the received PDI user data is higher than that of the stored PDI user data, the PDI user data may be updated.

An embodiment of an operation sequence diagram of the SetUserData action will be described.

In this operation sequence diagram, the companion device and the receiver are already paired with each other. A paring procedure is omitted from the operation sequence diagram.

The above-described content provider or broadcaster may transmit PDI user data to the companion device to provide a personalized service (ts99010). The PDI user data may be a plurality of questionnaires or a combination of a plurality of questionnaires and answers.

The companion device may present questionnaires to a user and obtain answers corresponding to the respective questionnaires from the user (ts99020). The companion device may transmit the PDI user data set through the SetUserData action to a companion device module in the above-described receiver (ts99030).

The companion device module may transmit the received PDI user data to a PDI engine (ts99040). The PDI engine may retrieve whether there are PDI user data which are already stored in the PDI store (ts99050). In a case in which there are no PDI user data which are already stored as the retrieval result of the PDI engine, new PDI user data may be stored. In a case in which there are PDI user data which are already stored as the retrieval result of the PDI engine, on the other hand, PDI user data may be updated according to version information (ts99060).

For example, in the PDI store of the receiver, PDIUserData having userDataId of "atsc.org/userdata1" may be stored in the above-described XML structure of UserDataList. In the companion device, PDIUserData having userDataId of "atsc.org/userdata3" may be stored in the above-described XML structure of UserDataList.

The companion device may transmit PDIUserData having userDataId of "atsc.org/userdata3" to the receiver through the SetUserData action. Since PDIUserData having userDataId of "atsc.org/userdata3" do not exist in the PDI store, the PDI engine of the receiver may add corresponding PDIUserData and store the added PDIUserData in the PDI store. Finally, in the PDI store of the receiver, PDIUserData having userDataId of "atsc.org/userdata1" and PDIUserData having userDataId of "atsc.org/userdata3" may be stored together in the above-described XML structure of UserDataList.

FIG. 100 is a view showing an added state variable of a UserData service according to an embodiment of the present invention.

The above-described UPnP UserData service may set an additional state variable, UserDataModefiedTime, to transmit PDI user data to a companion device only when the PDI user data are changed (t100010).

The UserDataModefiedTime state variable may indicate a time when PDI user data have been finally modified. This state variable may be based on the above-described event scheme. In a case in which the companion device subscribes to a receiver, therefore, the corresponding state variable may be automatically transmitted to the companion device when PDI user data are modified. This state variable may be a required state variable and may have a date type of dateTime.

An embodiment of an operation sequence diagram of the UserDataModefiedTime state variable will be described.

In this embodiment, it is assumed that new PDI user data are transmitted from the content provider; however, a condition that PDI user data are changed is not limited thereto. In this operation sequence diagram, the companion device and the receiver are already paired with each other. A paring procedure is omitted from the operation sequence diagram.

The companion device may subscribe a UserData service to the above-described companion device module (ts100010). This is based on the above-described event scheme. Operations, such as notification/transmission, may be received according to the event scheme of the UserData service due to subscribing. As far as subscribing is performed before a time when PDI user data are changed, notification, etc. may be received when PDI user data are changed. According to embodiments, subscribing may be performed immediately after pairing or at another time.

The above-described content provider or broadcaster may transmit new PDI user data to the receiver (ts100020). The receiver may transmit the received new PDI user data to the PDI engine (ts100030). As described above, the PDI engine may receive an answer from the user (ts100040) and store Q&A in the PDI store (ts100050).

In this case, PDI user data which are already stored are changed since the new PDI user data are transmitted. Consequently, the PDI engine may update UserDataIdxCount, which is a state variable. In addition, when UserDataIdxCount is updated, the PDI engine may transmit the update of the UserDataModefiedTime state variable to the companion device module (ts100060). The companion device module may notify the subscribed companion device that the PDI user data have been changed through an event (ts100070).

After the occurrence of change is notified (ts100070), the companion device may bring PDI user data through the above-described GetPDIUserDataProtocolVersion, GetUserDataIdsList, and GetUserData actions.

In this embodiment, in a case in which new PDI user data are not transmitted but answers of PDI user data which are already stored are changed, the procedure may be carried out from the next step excluding ts100020 and ts100030.

FIG. 101 is a view showing another added state variable of a UserData service according to an embodiment of the present invention.

The above-described UPnP UserData service may set another additional state variable, UserDataUpdatedList, to transmit PDI user data to a companion device only when the PDI user data are changed (t101010).

The UserDataUpdatedList state variable may be a list in a pair form of PDI user data ID and PDI user data version corresponding thereto. For example, this state variable may be expressed in a form, such as (UserDataId#1, 1.0). In a case in which PDI user data ID is changed or PDI user data version is changed, UserDataUpdatedList may be updated. PDI user data ID may be added or deleted. Whenever PDI user data version is modified, a value of the PDI user data version may be increased by 1.

According to embodiments, this state variable may be configured in the form of a CSV list. This state variable may be based on the above-described event scheme. In a case in which the companion device subscribes to a receiver, therefore, the corresponding state variable may be automatically transmitted to the companion device when PDI user data are changed. This state variable may be a required state variable.

An embodiment of an operation sequence diagram of the UserDataUpdatedList state variable will be described.

In this embodiment, it is assumed that answers of PDI user data which are already stored are changed; however, a condition that PDI user data are changed is not limited thereto. In this operation sequence diagram, the companion device and the receiver are already paired with each other. A paring procedure is omitted from the operation sequence diagram.

A subscribing procedure (ts101010) performed by the companion device may be the same as in the above description. The PDI engine may receive new answers to change answers to questionnaires which are already stored (ts101020). At this time, version of the PDI user data may be also updated since the existing PDI user data are changed. Completed Q&A may be stored in the PDI store (ts101030).

The PDI engine may update a value of UserDataUpdatedList according to the changed version of the PDI user data. The PDI engine may transmit the update of the UserDataUpdatedList state variable to the companion device module (ts101040). The companion device module may notify the subscribed companion device that the PDI user data have been changed through an event (ts101050).

The companion device may compare the changed version of the PDI user data with the version of the PDI user data which are already stored with reference to the changed UserDataUpdatedList (ts101060). The companion device may perform an action for bringing the PDI user data having the changed version. At this time, only the changed PDI user data may be brought or all of the PDI user data may be brought. The above-described GetPDIUserDataProtocolVersion, GetUserDataIdsList, and GetUserData actions may be used to request PDI user data.

FIG. 102 is a view showing state variables of a UserData service for transmission on a per pair basis of questions and answers according to an embodiment of the present invention.

When PDI user data are exchanged between a receiver and a companion device, overload may occur due to a large amount of data. In order to prevent the occurrence of overload, PDI user data may be exchanged on a per pair basis of questions and answers. A_ARG_TYPE_UserDataQAIdsList, UserDataQAList, and/or A_ARG_TYPE_UserDataQA state variables may be defined to exchange Q&A pairs. These state variables, which are required state variables, may be based on the action scheme, not the above-described event scheme. Consequently, the state variables may be utilized as arguments of various actions.

A_ARG_TYPE_UserDataQAIdsList may indicate an ID list of Q&A pairs stored in the PDI store. This state variable may be utilized for actions using arguments related to @id of QxA of the above-described QxAD element. In addition, this state variable may express @ids of a UserDataQAList state variable as a list. According to embodiments, this state variable may be configured in the form of a CSV string.

UserDataQAList may indicate a Q&A pair set stored in the PDI store. This state variable may have a plurality of QxAD elements. This state variable may be utilized for various actions, which will hereinafter be described. A detailed structure of this state variable will hereinafter be described. According to embodiments, this state variable may be configured in the form of a string.

A_ARG_TYPE_UserDataQA may be a fragment of the above-described UserDataQAList. At this time, two state variables may be based on the same markup language. For example, in a case in which the UserDataQAList state variable is an XML document, A_ARG_TYPE_UserDataQA may be a fragment of the XML document. This state variable may have a plurality of QxAD elements and attributes. In addition, this state variable may include sub elements based on use of an action. According to embodiments, A_ARG_TYPE_UserDataQA may be omitted. According to embodiments, this state variable may be configured in the form of a string.

FIG. 103 is a view showing an XML structure of UserDataQAList according to an embodiment of the present invention.

UserDataQAList may include a plurality of QxAD elements. The respective QxAD elements and attributes may be the same as in the above description. The structure of each QxAD element may be changed into different forms according to embodiments.

First UserDataQAList t103010 may include QIAD and QBAD. ID of QIAD may be "question1" and question1 may have a question of "what is your age". QBAD may also have information in the same manner as in the above description.

Second UserDataQAList t103020 may include QIAD, QBAD, and QTAD. Each QxAD may also have information in the same manner as in the above description.

UserDataQAList may have a plurality of QxAD having the same form as in the above-described two embodiments. Each QxAD may have the same structure as the above-described structure of QxAD or different structures according to embodiments.

FIG. 104 is a view showing actions of a UserData service for transmission on a per pair basis of questions and answers according to an embodiment of the present invention.

The above-described UserData service may include GetUserDataQAIdsList, GetUserDataQA, and/or SetUserDataQA actions. These actions may be required actions. According to embodiments, additional actions may be further defined. Each action will hereinafter be described.

FIG. 105 is a view showing GetUserDataQAIdsList and GetUserDataQA, actions of a UserData service for transmission on a per pair basis of questions and answers, according to an embodiment of the present invention.

A GetUserDataQAIdsList action will be described.

The GetUserDataQAIdsList action may be an action used to bring IDs of Q&A pairs stored in the above-described PDI store. That is, the GetUserDataQAIdsList action may be an action for bringing a list of @id values of QxA of the QxAD element of the UserDataQAList state variable. This state variable may be configured in the form of a string (e.g. CSV) or another form. A companion device may bring Id information of Q&A pairs from a PDI store provided in/outside a receiver using the GetUserDataQAIdsList action. At this time, protocol version of PDI user data may be referred to such that @ids matched with @protocolVersion values of the QxAD element can be brought to the companion device.

In order to use the GetUserDataQAIdsList action, a ProtocolVersion input argument and a UserDataQAIIdsList output argument may be defined (t105010). The ProtocolVersion input argument may be the same as in the above description and may be related to the above-described PDIUserDataProtocolVersion state variable. The UserDataQAIIdsList output argument, which is a list of @id values of QxA of the QxAD element, may be related to the above-described A_ARG_TYPE_UserDataQAIdsList state variable. UserDataQAIIdsList may be a string type list (e.g. CSV).

A GetUserDataQA action will be described.

The GetUserDataQA action may be an action used to bring Q&A pairs stored in the above-described PDI store.

The companion device may bring Q&A pairs from the PDI store provided in/outside the receiver using the GetUserDataQA action. At this time, the above-described UserDataQAIIdsList may be referred to such that only QxAD matched with the ID can be brought in a fragment form.

In order to use the GetUserDataQA action, a UserDataQAIIdsList input argument and a UserDataQA output argument may be defined (t105020). The UserDataQAIIdsList input argument may be the same as in the above description and may be related to the above-described A_ARG_TYPE_UserDataQAIdsList state variable. The UserDataQA output argument, which is a fragment of the above-described UserDataQAList state variable, may be related to the above-described A_ARG_TYPE_UserDataQA state variable. The UserDataQA output argument may have information, such as a QxAD element, and may be based on data type of UserDataQAList (e.g. XML).

For example, in a case in which an action, such as GetUserDataQA(UserDataQAIdsList="question1", "question3"), is used, QxAD having ids of "question1" and "question3" among a plurality of QxAD included in UserDataQAList in an XML structure of the above-described UserDataQAList may be returned. At this time, the XML structure of the returned UserData may have only QxAD having ids of "question1" and "question3" and may not have a QxAD element having an id of "question2".

In the GetUserDataQA action, the number of QxAD elements of UserDataQA, which is an output argument, may be less than or equal to the number of @ids in UserDataQAIdsList, which is an input argument.

An embodiment of an operation sequence diagram of the above-described GetUserDataQAIdsList and GetUserDataQA actions will be described.

In this operation sequence diagram, the companion device and the receiver are already paired with each other. A paring procedure is omitted from the operation sequence diagram. In addition, it is assumed that the companion device already knows utilizable protocol_version.

Procedures (ts105010, ts105020, ts105030, and ts105040) in which the content provider transmits PDI user data to the receiver, the PDI user data are transmitted to the PDI engine, answers are obtained, and Q&A are stored may be the same as in the above description.

The above-described companion device may perform the above-described GetUserDataQAIdsList action to obtain Q&A pairs from the receiver (ts105050). The companion device may request IDs of Q&A pairs from a companion device module in the above-described receiver.

The companion device module may request IDs of Q&A pairs requested by the companion device from the PDI engine (ts105060). The PDI engine may retrieve corresponding IDs of Q&A pairs from the PDI store (ts97070). Subsequently, the PDI engine may transmit the retrieved IDs of Q&A pairs to the companion device module (ts105080).

The companion device module may transmit the received IDs of Q&A pairs to the companion device (ts105090).

The companion device having obtained IDs of Q&A pairs may utilize the above-described GetUserDataQA action to obtain Q&A pairs (ts105100). The companion device may request Q&A pairs using the received IDs of Q&A pairs or using the received IDs of Q&A pairs as input arguments.

The companion device module may request corresponding Q&A pairs from the PDI engine (ts105110). The companion device module may retrieve corresponding Q&A pairs from the PDI store (ts105120) and transmits the retrieved Q&A pairs to the companion device module (ts105130).

The companion device module may transmit the received Q&A pairs to the companion device (ts105140). The companion device may store the received Q&A pairs. The stored Q&A pairs may be semi-permanently stored and utilized. In a case in which there is no store in the companion device, the Q&A pairs may be temporarily stored in a space, such as a memory.

In the present invention, a time at which the GetUserDataQAIdsList and GetUserDataQA actions are executed is not limited to a specific time. According to embodiments, each action may be executed immediately after the companion device and the receiver are paired with each other. In addition, according to embodiments, the companion device may request execution of each action from the receiver during periodic polling.

FIG. 106 is a view showing SetUserDataQA, an action of a UserData service for transmission on a per pair basis of questions and answers, according to an embodiment of the present invention.

The SetUserDataQA action may be an action used when PDI user data are set/stored in a companion device and Q&A of the set PDI user data are transmitted to a receiver in the same manner as in the above-described SetUserData action. The SetUserDataQA action may have UserDataQAList as an input argument and may be related to the above-described UserDataQAList state variable (t106010).

Q&A already stored in the receiver may be modified/updated using the Q&A transmitted through the SetUserDataQA action. The receiver may compare the received Q&A with Q&A stored in a PDI store. In a case in which there are no corresponding Q&A, the received Q&A may be added. In a case in which there are corresponding Q&A, on the other hand, the Q&A may be compared with @time of A of QxA of the QxAD element and the latest answer entry time of Q&A may be maintained.

An embodiment of an operation sequence diagram of the SetUserDataQA action will be described.

In this operation sequence diagram, the companion device and the receiver are already paired with each other. A paring procedure is omitted from the operation sequence diagram.

Procedures (ts106010 and ts106020) in which the content provider transmits PDI user data to the companion device and answers are obtained may be the same as in the above description.

The companion device may transmit the Q&A set through the SetUserDataQA action to a companion device module in the above-described receiver (ts106030).

The companion device module may transmit the received Q&A to a PDI engine (ts106040). The PDI engine may retrieve whether there are Q&A which are already stored in the PDI store (ts106050). In a case in which there are no Q&A which are already stored as the retrieval result of the PDI engine, the Q&A may be stored. In a case in which there are Q&A which are already stored as the retrieval result of the PDI engine, on the other hand, the Q&A may be updated according to @time information (ts106060).

For example, in the PDI store of the receiver, QxAD having an id of "question1" may be stored in the above-described XML structure of UserDataQAList. In the companion device, QxAD having an id of "question3" may be stored in the above-described XML structure of UserDataQAList.

The companion device may transmit QxAD having an id of "question3" to the receiver through the SetUserDataQA action. Since QxAD having an id of "question3" do not exist in the PDI store, the PDI engine of the receiver may add corresponding QxAD and store the added QxAD in the PDI store. Finally, in the PDI store of the receiver, QxAD having an id of "question1" and QxAD having an id of "question3" may be stored together in the above-described XML structure of UserDataQAList.

FIG. 107 is a sequence diagram of transmitting PDI user data through a broadband channel according to an embodiment of the present invention.

Even in an environment in which a broadcaster channel is not supported and only a broadband channel (e.g. the Internet) is supported, the receiver may receive PDI user data. Even in such an environment, an additional PDI server may exist to receive PDI user data through the broadband channel.

In this operation sequence diagram, the companion device and the receiver are already paired with each other. A paring procedure is omitted from the operation sequence diagram.

In the above-described environment, the receiver may receive a notification that PDI user data can be received through the broadband channel while a list of currently supported services is signaled to the receiver (ts107001). The receiver may receive and parse this notification.

The receiver may request PDI user data from the PDI server (ts107005). At this time, the receiver may access the PDI server using a URL obtained as the above-described parsing result. At this time, a service list client located in/outside the receiver may communicate with the PDI server. The requested PDI server may transmit the requested PDI user data to the receiver (ts107010). The service list client may transmit the PDI user data to the PDI engine (ts107020).

Subsequent procedures (ts107020 to ts107140) in which the PDI engine stores answers in the PDI store and the companion device brings PDI user data utilizing GetUserDataIdsList and GetUserData actions may be the same as in the above description.

Through the above scheme, the receiver may receive the PDI user data even in an environment in which the broadcaster channel is not supported and only the broadband channel is supported.

The PDI server may function as an independent server for transmitting only PDI user data or as an integrated signaling server having various tables for signaling stored therein. In a case in which there is no notification that PDI user data can be received, the receiver may continuously perform a request/response procedure to the PDI server. In this case, however, it is necessary for the receiver to know a URL of the PDI server in advance.

FIG. 108 is a view showing state variables of a UserData service in a situation in which PDI user data are transmitted through a broadband channel according to an embodiment of the present invention.

These state variables may be state variables in a case in which the companion device directly request PDI user data from the PDI server and receive the PDI user data. In this situation, PDIUserDataNotification and/or PDIServerUrl state variables may be defined.

The PDIUserDataNotification state variable may indicate a reception time of a notification that PDI user data can be received through the broadband channel. This state variable, which is a required state variable, may have a data type of dataTime and may be based on an event scheme. Since the state variable is based on the event scheme, when the reception time of the notification is changed, i.e. a new notification is received, the companion device may be notified of the same.

The PDIServerUrl state variable may indicate a URL of the PDI server that is capable of receiving PDI user data through the broadband channel. This state variable, which is a required state variable, may have a data type of string or any URI and may be based on an action scheme. Consequently, the companion device may obtain the corresponding URL through an action, which will hereinafter be described.

FIG. 109 is a view showing an action of a UserData service in a situation in which PDI user data are transmitted through a broadband channel according to an embodiment of the present invention.

In this situation, a GetPDIServerUrl action may be defined (t109010). The GetPDIServerUrl action may be an action used to bring a URL of the PDI server. The GetPDIServerUrl action may have a PDIServerUrl output argument (t109020). The PDIServerUrl output argument may be related to the above-described PDIServerUrl state variable. This argument may store the URL of the PDI server.

An embodiment of an operation sequence diagram of the GetPDIServerUrl action will be described.

In this operation sequence diagram, the companion device and the receiver are already paired with each other. A paring procedure is omitted from the operation sequence diagram. In addition, it is assumed that the companion device has already subscribed to the UserData service.

A step (ts109010) in which the receiver receives a notification that PDI user data can be received through the broadband channel may be the same as in the above description.

The service list client of the receiver may transmit a parsed URL of the PDI server to the companion device module and notify the companion device module that PDI user data can be received (ts109020).

The companion device module updates the PDIUserDataNotification state variable (ts109030). This is because a notification is newly received. According to the event scheme, the companion device module may notify the companion device that the PDIUserDataNotification state variable has been changed (ts109040).

The companion device may perform the GetPDIServerUrl action (ts109050) to receive a URL of the corresponding PDI server (ts109060). The companion device may access the PDI server using this URL. The companion device may request PDI user data from the PID server (ts109070) and receive corresponding PDI user data (ts109080).

The companion device may obtain an answer to a question from a user (ts109090). Subsequently, the companion device may update the corresponding PDI user data in the PDI store of the receiver using the above-described SetUserData or SetUserDataQA action (ts109100 to ts109130). These procedures may be the same as in the above description.

As described above, the GetPDIServerUrl action may be utilized.

FIG. 110 is a view showing an extended state variable of a UserData service in a situation in which PDI user data are transmitted through a broadband channel according to an embodiment of the present invention.

A plurality of PDI servers may exist. Consequently, a plurality of PDI server URLs may be provided. The receiver may specify a PDI server which the companion device will access and transmit a URL of the specified PDI server to the companion device.

At this time, URLs of all accessible PDI servers may be transmitted to the companion device. In this case, the companion device may select one of the PDI servers and access the selected PDI server. In order to transmit a plurality of URLs, the above-described PDIServerURL may be utilized. In this case, however, PDIServerURL may be extended and, therefore, data type thereof may be changed into "List of string" or "List of anyURI".

According to embodiments, PDIServerUrl may be configured in a CSV form and may be expressed as follows: (http://pdiserver1.com, http://pdiserver2.com, etc.)

FIG. 111 is a view showing an extended state variable of a UserData service in a situation in which PDI user data are transmitted through a broadband channel according to another embodiment of the present invention.

The above-described PDIServerUrl state variable may be extended so as to be based on the event scheme, not the action scheme. In this case, the URL of the PDI server may be directly transmitted to the companion device without execution of a GetPDIServer action.

Immediately after the companion device subscribes to the UserData service or in a case in which the URL of the PDI server is changed, the URL of the PDI server may be transmitted to the companion device. At this time, the URL of the PDI server may be transmitted in the form of the PDIServerUrl state variable.

As described above, in a case in which a plurality of PDI server URLs is provided, the receiver may transmit only a specific URL to the companion device or may transmit all URLs to the companion device. Consequently, PDISerververUrl may have data types of string, anyURI, List of strings, and/or List of anyURI.

FIG. 112 is a structural view showing exchange of user data between a receiver and companion devices according to another embodiment of the present invention.

As described above, a personalized service may be provided using PDI user data designated by a user. To this end, filtering criteria may be provided. The receiver/companion devices may provide content customized to the user through the filtering criteria.

A content provider or broadcaster t112010, PDI Questionnaires t112020, a PDI engine t112030, a PDI store t112040, a PDI cloud store t112070, a companion device module t112060, and companion devices t112080 may be identical to the above-described modules having the same names.

Unlike the above-described structural view, a receiver t112050 may further include a filtering engine t112090 and a content/service store t112100. The filtering engine may compare filtering criteria of each content/service with stored PDI user data to select a content/service customized to the user. The filtering criteria may be transmitted to the companion devices.

According to embodiments, data selected by the filtering criteria may be transmitted to companion devices or the filtering criteria may be transmitted to the companion devices such that the companion devices can directly perform filtering.

The XML structure of the filtering criteria was described above. However, the XML structure of the filtering criteria is not limited to the above-described structure. According to embodiments, filtering criteria having different structures may be used. Hereinafter, the filtering criteria may be abbreviated to FC.

The content/service store t112100 is a space in which the received content/service is stored. According to embodiments, a content/service filtered by the filtering engine may be stored in the content/service store t112100. In addition, according to embodiments, all contents/services may be stored in the content/service store, the filtering engine may perform filtering, and the filtered contents/services may be stored in the content/service store.

FIG. 113 is a view showing service type and service ID of a service according to another embodiment of the present invention.

A service, FilteringCriteria, may be defined such that the receiver transmits filtering criteria to the companion devices. This service may have a service type of atsc3.0filtering:1.

Each service may have different service IDs. According to embodiments, each service may have a service ID, such as uurn:atsc.org:serviceId:atsc3.0filtering1 t113010 or uurn:atsc.org:serviceId:atsc3.0filtering t113020.

The FilteringCriteria service will hereinafter be described.

FIG. 114 is a view showing a state variable of a FilteringCriteria service according to an embodiment of the present invention.

A FilteringCriteria state variable may be defined as one state variable of the FilteringCriteria service.

The FilteringCriteria state variable may be used to transmit filtering criteria to the companion devices for filtering of a content/service. The FilteringCriteria state variable, which is a required state variable, may have a data type of String (XML, Jason, etc.) In addition, the FilteringCriteria state variable may be used for various actions according to the above-described action scheme.

FIG. 115 is a view showing an action of a FilteringCriteria service according to an embodiment of the present invention.

The FilteringCriteria service may have a GetFilteringCriteria action (t115010). This action may be an action for the companion device bringing filtering criteria from the received.

The GetFilteringCriteria action may have FilteringCriteria as an output argument (t115020). This action may be related to the above-described FilteringCriteria state variable. FilteringCriteria may be output to the companion device using this action.

An embodiment of a sequence diagram for providing a personalized service using the operation and filtering criteria of the above-described GetFilteringCriteria action will be described.

In this operation sequence diagram, the companion device and the receiver are already paired with each other. A paring procedure is omitted from the operation sequence diagram.

The content provider or broadcaster may transmit a content or service which will be executed by the companion device to the receiver (ts115010). At this time, the content provider or broadcaster may also transmit FC to the receiver.

The receiver may transmit the FC to the filtering engine (ts115020). In addition, the receiver may notify the companion device module that there is a content/service for the companion device (ts115030). The companion device module may notify the companion device of the same (ts115040).

The companion device module may use the above-described GetFilteringCriteria action (ts115050). The companion device module may request the FC through this action. The FC may be used to refer to PDI user data set by a user before the companion device receives a content/service.

The companion device module may request the FC from the filtering engine (ts115060). The filtering engine may transmit the FC to the companion device module (ts115070). The companion device module may transmit the FC to the companion device (ts115080).

The companion device may request PDI user data from the companion device module (ts115090). The above-described actions may be utilized to request PDI user data.

The companion device module may request answers to questionnaires from the PDI engine (ts115100). The PDI engine may retrieve answers to questionnaires which are already stored in the PDI store (ts115110). The PDI engine may transmit the retrieved answers to the companion device module (ts115120). The companion device module may transmit corresponding answers, which are PDI user data, to the companion device (ts115130).

The companion device module may compare the FC with answers preset by the user (ts115140). In a case in which the FC satisfy the answers, i.e. the PDI user data, of the user, a corresponding content/service may be provided to the user. In a case in which the FC do not satisfy the answers, i.e. the PDI user data, of the user, a corresponding content/service may not be provided to the user.

In a case in which the FC coincide with the answers of the user, the companion device may bring a corresponding content/service from the receiver. At this time, transmission of the corresponding content/service may be performed through the companion device module (ts115150 and ts115160). According to embodiments, in a case in which the FC coincide with the answers of the user, the companion device may directly receive a corresponding content/service from the service provider or broadcaster.

Subsequently, the companion device may expose a content/service having FC suitable for the PDI user data to the user.

FIG. 116 is a sequence diagram for transmitting FC through a broadband channel according to an embodiment of the present invention.

As described above, even in an environment in which a broadcaster channel is not supported and only a broadband channel (e.g. the Internet) is supported, the receiver may receive FC. Even in such an environment, an additional FC server may exist to receive FC through the broadband channel.

In this operation sequence diagram, the companion device and the receiver are already paired with each other. A paring procedure is omitted from the operation sequence diagram.

In the above-described environment, the receiver may receive a notification that FC can be received through the broadband channel while a list of currently supported services is signaled to the receiver (ts116001). According to embodiments, the receiver or the service list client may request signaling information of the broadcaster channel. The receiver may receive the above-described notification during reception of the signaling information according to this request. Hereinafter, the receiver or the service list client may be referred to as a receiver. The received notification may be parsed to obtain a URL of the FC server.

The receiver may request FC from the FC server (ts116005). At this time, the parsed URL of the FC server may be utilized. The requested FC server may transmit the requested FC to the receiver (ts116010). In a case in which the FC are transmitted through the broadband channel, the FC may be transmitted through a signaling channel. The FC may be transmitted in a binary or XML form. At this time, various kinds of broadband channels may be provided. In an embodiment, channels, such as SMT and NRT-IT, may be used. The receiver or the service list client may transmit the FC to the filtering engine (ts116020).

Subsequent procedures (ts116030 to ts116160) in which the companion device is notified of the existence of the content/service, the FC is transmitted to the companion device through the GetFilteringCriteria action, PDI user data are transmitted to the companion device, and the FC and the PDI user data are compared to provide a personalized service may be the same as in the above description.

Through the above scheme, the receiver may receive the FC even in an environment in which the broadcaster channel is not supported and only the broadband channel is supported.

The FC server may function as an independent server for transmitting only FC or as an integrated signaling server having various tables for signaling stored therein. In a case in which there is no notification that FC can be received, the receiver may continuously perform a request/response procedure to the FC server. In this case, however, it is necessary for the receiver to know a URL of the FC server in advance.

FIG. 117 is a view showing state variables of a FilteringCriteria service in a situation in which FC are transmitted through a broadband channel according to an embodiment of the present invention.

These state variables may be state variables when the companion device directly requests FC from the FC server to receive the FC. In this situation, FilteringCriteriaNotification and/or FCServerUrl state variables may be defined.

The FilteringCriteriaNotification state variable may indicate a reception time of a notification that FC can be received through the broadband channel. This state variable, which is a required state variable, may have a data type of dataTime and may be based on an event scheme. Since the state variable is based on the event scheme, when the reception time of the notification is changed, i.e. a new notification is received, the companion device may be notified of the same.

The PDIServerUrl state variable may indicate a URL of the FC server that is capable of receiving FC through the broadband channel. This state variable, which is a required state variable, may have a data type of string or anyURI and may be based on an action scheme. Consequently, the companion device may obtain the corresponding URL through an action, which will hereinafter be described.

FIG. 118 is a view showing an action of a FilteringCriteria service in a situation in which FC are transmitted through a broadband channel according to an embodiment of the present invention.

In this situation, a GetFCServerUrl action may be defined (t118010). The GetFCServerUrl action may be an action used to bring an URL of the FC of the FC server. The GetFCServerUrl action may have an FCServerUrl output argument (t118020). The FCServerUrl output argument may be related to the above-described FCServerUrl state variable. This argument may store the URL of the FC server.

An embodiment of an operation sequence diagram of the GetFCServerUrl action will be described.

In this operation sequence diagram, the companion device and the receiver are already paired with each other. A paring procedure is omitted from the operation sequence diagram. In addition, it is assumed that the companion device has already subscribed to the FilteringCriteria service.

A step (ts118010) in which the receiver receives a notification that FC can be received through the broadband channel may be the same as in the above description.

The service list client of the receiver may transmit a parsed URL of the FC server to the companion device module and notify the companion device module that FC can be received (ts118020).

The companion device module updates the FilteringCriteriaNotification state variable (ts118030). This is because a notification is newly received. According to the event scheme, the companion device module may notify the companion device that the FilteringCriteriaNotification state variable has been changed (ts118040).

The companion device may perform the GetFCServerUrl action (ts118050) to receive a URL of the corresponding FC server (ts118060). The companion device may access the FC server using this URL. The companion device may request FC from the FC server (ts118070) and receive corresponding FC (ts118080).

Subsequent procedures (ts118090 to ts118160) in which the companion device module requests PDI user data to obtain a corresponding answer and compare the PDI user data with the FC to provide a personalized service may be the same as in the above description.

Through the above scheme, the companion device may directly receive FC from the FC server to provide a personalized service even in an environment in which the broadcaster channel is not supported and only the broadband channel is supported.

FIG. 119 is a view showing an extended state variable of a FilteringCriteria service in a situation in which FC are transmitted through a broadband channel according to an embodiment of the present invention.

A plurality of FC servers may exist. Consequently, a plurality of FC server URLs may be provided. The receiver may specify a FC server which the companion device will access and transmit a URL of the specified FC server to the companion device.

At this time, URLs of all accessible FC servers may be transmitted to the companion device. In this case, the companion device may select one of the FC servers and access the selected FC server. In order to transmit a plurality of URLs, the above-described FCServerUrl may be utilized. In this case, however, FCServerUrl may be extended and, therefore, data type thereof may be changed into "List of string" or "List of anyURI".

According to embodiments, FCServerUrl may be configured in a CSV form and may be expressed as follows: (etc.)

FIG. 120 is a view showing an extended state variable of a FilteringCriteria service in a situation in which FC are transmitted through a broadband channel according to another embodiment of the present invention.

The above-described FCServerUrl state variable may be extended so as to be based on the event scheme, not the action scheme. In this case, the URL of the FC server may be directly transmitted to the companion device without execution of a GetFCServerUrl action.

Immediately after the companion device subscribes to the FilteringCriteria service or in a case in which the URL of the FC server is changed, the URL of the FC server may be transmitted to the companion device. At this time, the URL of the FC server may be transmitted in the form of the FCServerUrl state variable.

As described above, in a case in which a plurality of FC server URLs is provided, the receiver may transmit only a specific URL to the companion device or may transmit all URLs to the companion device. Consequently, FCServerUrl may have data types of string, anyURI, List of strings, and/or List of anyURI.

FIG. 121 is a view showing a broadcast receiver according to an embodiment of the present invention.

The broadcast receiver according to the embodiment of the present invention includes a service/content acquisition controller J2010, an Internet interface J2020, a broadcast interface J2030, a signaling decoder J2040, a service map database J2050, a decoder J2060, a targeting processor J2070, a processor J2080, a managing unit J2090, and/or a redistribution module J2100. In the figure is shown an external management device J2110 which may be located outside and/or in the broadcast receiver The service/content acquisition controller J2010 receives a service and/or content and signaling data related thereto through a broadcast/broadband channel. Alternatively, the service/content acquisition controller J2010 may perform control for receiving a service and/or content and signaling data related thereto.

The Internet interface J2020 may include an Internet access control module. The Internet access control module receives a service, content, and/or signaling data through a broadband channel. Alternatively, the Internet access control module may control the operation of the receiver for acquiring a service, content, and/or signaling data.

The broadcast interface J2030 may include a physical layer module and/or a physical layer I/F module. The physical layer module receives a broadcast-related signal through a broadcast channel. The physical layer module processes (demodulates, decodes, etc.) the broadcast-related signal received through the broadcast channel. The physical layer I/F module acquires an Internet protocol (IP) datagram from information acquired from the physical layer module or performs conversion to a specific frame (for example, a broadcast frame, RS frame, or GSE) using the acquired IP datagram The signaling decoder J2040 decodes signaling data or signaling information (hereinafter, referred to as 'signaling data') acquired through the broadcast channel, etc.

The service map database J2050 stores the decoded signaling data or signaling data processed by another device (for example, a signaling parser) of the receiver.

The decoder J2060 decodes a broadcast signal or data received by the receiver. The decoder J2060 may include a scheduled streaming decoder, a file decoder, a file database (DB), an on-demand streaming decoder, a component synchronizer, an alert signaling parser, a targeting signaling parser, a service signaling parser, and/or an application signaling parser.

The scheduled streaming decoder extracts audio/video data for real-time audio/video (A/V) from the IP datagram, etc. and decodes the extracted audio/video data.

The file decoder extracts file type data, such as NRT data and an application, from the IP datagram and decodes the extracted file type data.

The file DB stores the data extracted by the file decoder.

The on-demand streaming decoder extracts audio/video data for on-demand streaming from the IP datagram, etc. and decodes the extracted audio/video data.

The component synchronizer performs synchronization between elements constituting a content or between elements constituting a service based on the data decoded by the scheduled streaming decoder, the file decoder, and/or the on-demand streaming decoder to configure the content or the service.

The alert signaling parser extracts signaling information related to alerting from the IP datagram, etc. and parses the extracted signaling information.

The targeting signaling parser extracts signaling information related to service/content personalization or targeting from the IP datagram, etc. and parses the extracted signaling information. Targeting is an action for providing a content or service satisfying conditions of a specific viewer. In other words, targeting is an action for identifying a content or service satisfying conditions of a specific viewer and providing the identified content or service to the viewer.

The service signaling parser extracts signaling information related to service scan and/or a service/content from the IP datagram, etc. and parses the extracted signaling information. The signaling information related to the service/ content includes broadcasting system information and/or broadcast signaling information.

The application signaling parser extracts signaling information related to acquisition of an application from the IP datagram, etc. and parses the extracted signaling information. The signaling information related to acquisition of the application may include a trigger, a TDO parameter table (TPT), and/or a TDO parameter element.

The targeting processor J2070 processes the information related to service/content targeting parsed by the targeting signaling parser The processor J2080 performs a series of processes for displaying the received data. The processor J2080 may include an alert processor, an application processor, and/or an A/V processor.

The alert processor controls the receiver to acquire alert data through signaling information related to alerting and performs a process for displaying the alert data.

The application processor processes information related to an application and processes a state of a downloaded application and a display parameter related to the application.

The A/V processor performs an operation related to audio/video rendering based on decoded audio data, video data, and/or application data.

The managing unit J2090 includes a device manager and/or a data sharing & communication unit.

The device manager performs management for an external device, such as addition/deletion/renewal of an external device that can be interlocked, including connection and data exchange.

The data sharing & communication unit processes information related to data transport and exchange between the receiver and an external device (for example, a companion device) and performs an operation related thereto. The transportable and exchangeable data may be signaling data, a PDI table, PDI user data, PDI Q&A, and/or A/V data.

The redistribution module J2100 performs acquisition of information related to a service/content and/or service/content data in a case in which the receiver cannot directly receive a broadcast signal.

The external management device J2110 refers to modules, such as a broadcast service/content server, located outside the broadcast receiver for providing a broadcast service/content. A module functioning as the external management device may be provided in the broadcast receiver.

FIG. 122 is a view showing a broadcast receiver according to another embodiment of the present invention.

The receiver shown in the figure is similar to the above-described receiver and includes devices similar to those included in the above-described receiver. Consequently, a description of devices having the same names is replaced with the above description.

The above-described targeting signaling parser may be named a user data sharing & targeting signaling parser and may further function to parse the above-described user data (for example, PDI user data or Q&A).

The above-described targeting processor may be named a user data sharing & targeting processor and may further function to process the above-described user data (for example, PDI user data or Q&A).

The receiver according to the embodiment of the present invention may further include a user data DB. The user data DB stores processed user data.

FIG. 123 is a view showing presentation preference according to an embodiment of the present invention.

Presentation preference may mean preference for presentation of closed caption, audio, and accessibility and/or sign language during viewing of a broadcast.

In a case in which user presentation preference is stored in a receiver as personalized information, a service customized to the user may be provided during viewing of a broadcast. The user may receive a service customized to the user presentation preference without setting relevant information every time. According to embodiments, the user presentation preference may be pre-registered before or during viewing of a broadcast.

In addition, the set presentation preference may be shared and utilized by companion devices in addition to the receiver. On the other hand, presentation preference set by the companion devices may be shared by the receiver.

In the present invention, closed caption preference, audio preference, and accessibility and/or sign language presentation, which are three items of the presentation preference, will be described. However, services related to the presentation preference may be various and the present invention is not limited to the three items of the presentation preference.

FIG. 124 is a sequence diagram of closed caption preference according to an embodiment of the present invention.

In connection with the above-described closed caption preference, the user may set language preference, font preference, font size preference, etc. of closed caption. The information may refer to a descriptor or table transmitted during signaling of the closed caption. A channel, descriptor, or tables for transmitting information related to the closed caption may be expressed in various forms and the present invention is not limited to any one form.

A descriptor for transmitting information related to the closed caption is named caption_service_descriptor. This descriptor may be a descriptor for transmitting basic information related to the closed caption. This descriptor may include information of the descriptor related to the closed caption used in the conventional art and, in addition, further include field/information proposed by the present invention. That is, this descriptor may be a modification of an existing descriptor related to the closed caption.

Caption_service_descriptor may be transmitted through PMT/EIT in a case in which there is a broadcast providing the closed caption. Caption_service_descriptor may be converted into predefined PDI Question using information of caption_service_descriptor. Upon receiving caption_service_descriptor, the receiver may convert the received caption_service_descriptor into the predefined PDI Question to obtain an answer.

In the sequence of this embodiment, it is assumed that the receiver receives caption_service_descriptor through PMT or EIT.

Caption_service_descriptor may be included in PMT or EIT (ts124010). As described above, caption_service_descriptor may be transmitted through PMT or EIT. When caption_service_descriptor is received by the receiver (t124020), a signaling parser located in/outside the receiver may transmit caption_service_descriptor to a PDI engine located in/outside the receiver (ts124030).

The PDI engine may automatically create PDI Question according to information of caption_service_descriptor (ts124040). It may be expressed that this procedure automatically converts caption_service_descriptor into PDI Question. The PDI engine may determine whether there already exists an answer to a corresponding question using ID. Upon determining that there exists no answer, the PDI engine may transmit the completed PDI Question to a UI (ts124050) to obtain an answer from the user.

The user may set an answer to the corresponding PDI Question through the UD (ts124060) and the UI may return this answer to the PDI engine (ts124070). The PDI engine may add or update the same in a PDI store (ts124080).

According to embodiments, user preference may be changed even in a case in which there already exists an answer to a question and, therefore, an answer to the corresponding question may be obtained again through the UI. In this case, the new answer may be compared with the existing answer in terms of an answering time and the existing answer may be replaced by the new answer.

FIG. 125 is a sequence diagram of closed caption preference according to another embodiment of the present invention.

In the sequence of this embodiment, it is assumed that the receiver request PMT or EIT from a signaling server and caption_service_descriptor through PMT or EIT.

The receiver may request PMT or EIT from the signaling server (ts125010). The signaling server may transmit the requested PMT or EIT to the receiver (ts125020). The receiver may transmit caption_service_descriptor in PMT or EIT to the PDI engine (ts125030).

Subsequent operations (ts125040 to ts125080) in which the PDI engine creates PDI Question, obtains an answer to a question through the UI, and adds/updates the answer in the PDI store may be the same as in the above description.

FIG. 126 is a view showing extended fields of caption_service_descriptor in closed caption preference according to an embodiment of the present invention.

As described above, caption_service_descriptor of the present invention may be an extension or change of existing caption_service_descriptor.

Caption_service_descriptor of the present invention may further include a Font field, a Font Size field, an Alignment field, a Print Direction field, and/or a Scroll Direction field (t126010).

The Font field may indicate a font style of the closed caption. In a case in which a value of the Font field is 0, the caption may have a default font style. In a case in which a value of the Font field is 1, the caption may have a font style of Monospaced with serifs. In a case in which a value of the Font field is 2, the caption may have a font style of Proportionally spaced with serifs. In a case in which a value of the Font field is 3, the caption may have a font style of Monospaced without serifs. In a case in which a value of the Font field is 4, the caption may have a font style of Proportionally spaced without serifs. In a case in which a value of the Font field is 5, the caption may have a font style of Casual font type. In a case in which a value of the Font field is 6, the caption may have a font style of Cursive font type. In a case in which a value of the Font field is 7, the caption may have a font style of Small capitals. In an embodiment, the Font field may be a field having a length of 3 bits and may have a uimsbf format.

The Font Size field may indicate a font size of the closed caption. In a case in which a value of the Font Size field is 0, the caption may have a default font size. In a case in which a value of the Font Size field is 1, the caption may have a standard font size. In a case in which a value of the Font Size field is 2, the caption may have a small font size. In a case in which a value of the Font Size field is 3, the caption may have a large font size. In an embodiment, the Font Size field may a field having a length of 2 bits and may have a uimsbf format.

The Alignment field may indicate an alignment method of the closed caption. In a case in which a value of the Alignment field is 0, the caption may be aligned to a default position. In a case in which a value of the Alignment field is 1, the caption may be aligned to Left. In a case in which a value of the Alignment field is 2, the caption may be aligned to Right. In a case in which a value of the Alignment field is 3, the caption may be aligned to Center. In a case in which a value of the Alignment field is 4, the caption may be aligned to Full. Values of 5 to 7 of the alignment field may be reserved for future use. In an embodiment, the Alignment field may be a field having a length of 3 bits and may have a uimsbf format.

The Print Direction field may indicate a print direction of the closed caption. In a case in which a value of the Print Direction field is 0, the caption may be printed in a default direction. In a case in which a value of the Print Direction field is 1, the caption may be printed in a Left to Right direction. In a case in which a value of the Print Direction field is 2, the caption may be printed in a Right to Left direction. In a case in which a value of the Print Direction field is 3, the caption may be printed in a Top to Bottom direction. In a case in which a value of the Print Direction field is 4, the caption may be printed in a Bottom to Top direction. Values of 5 to 7 of the Print Direction field may be reserved for future use. In an embodiment, the Print Direction field may be a field having a length of 3 bits and may have a uimsbf format.

The Scroll Direction field indicate a scroll direction of the closed caption. In a case in which a value of the Scroll Direction field is 0, the caption may be scrolled in a default direction. In a case in which a value of the Scroll Direction field is 1, the caption may be scrolled in a Left to Right direction. In a case in which a value of the Scroll Direction field is 2, the caption may be scrolled in a Right to Left direction. In a case in which a value of the Scroll Direction field is 3, the caption may be scrolled in a Top to Bottom direction. In a case in which a value of the Scroll Direction field is 4, the caption may be scrolled in a Bottom to Top direction. Values of 5 to 7 of the Scroll Direction field may be reserved for future use. In an embodiment, the Scroll Direction field may be a field having a length of 3 bits and may have a uimsbf format.

As described above, the receiver may create/convert pre-registered PDI Question with reference to each field of caption_service_descriptor.

According to embodiments, the closed caption may be transmitted to a user_data region of a video stream. Although the closed caption is transmitted to the user_data region, caption_service_descriptor may not be transmitted to PMT or EIT. In this case, the receiver may directly parse closed caption data of the user_data region, convert the parsed closed caption data into PDI Question, and show the converted PDI Question to a user.

In addition, the above-described additional fields may not be transmitted to caption_service_descriptor transmitted through PMT or EIT. In this case, caption_service_descriptor may have only fields related to whether to use closed caption, caption language, easy reader mode, etc. The receiver may create/convert pre-registered PDI Question related to whether to use closed caption, caption language, easy reader mode, etc. and show the PDI Question to the user. The receiver may show the other pre-registered PDI Questions to the user while parsing the closed caption transmitted to the user_data region of the video stream.

FIG. 127 is a view showing pre-registered PDI Question for use of closed caption in closed caption preference according to an embodiment of the present invention.

In a case in which a descriptor is caption_service_descriptor, a descriptor_tag field of the corresponding descriptor may have a value of 0x86. In a case in which the corresponding descriptor is caption_service_descriptor, the receiver may create pre-registered PDI Question for whether to view closed caption, if any. The receiver may show the created PDI Question to the user and store an answer thereto. The user may set whether to use the closed caption through the corresponding PDI Question.

In this embodiment, PDI Question having a QSA form may be created and shown to the user. Text of a question may be "Are you using Closed Caption?" and the user may answer "Yes" or "No" thereto.

FIG. 128 is a view showing pre-registered PDI Question for a language of closed caption in closed caption preference according to an embodiment of the present invention.

The receiver may create pre-registered PDI Question for the user to set a preference language of the closed caption with reference to the language field of caption_service_descriptor. The receiver may show the created PDI Question to the user and store an answer thereto. The user may set a language which will be used in the closed caption through the corresponding PDI Question.

In this embodiment, PDI Question having a QSA form may be created and shown to the user. Text of a question may be "Which Closed Caption language do you prefer?" and the user may answer "English", "French", "Italian" or "Etc" thereto. In a case in which closed caption having a preference language set by the user through answering is not provided, the receiver may provide the closed caption using a default language.

FIG. 129 is a view showing pre-registered PDI Question for a font of closed caption in closed caption preference according to an embodiment of the present invention.

The receiver may create pre-registered PDI Question for the user to set a preference font of the closed caption with reference to the font field of caption_service_descriptor. The receiver may show the created PDI Question to the user and store an answer thereto. The user may set a font which will be used in the closed caption through the corresponding PDI Question.

In this embodiment, PDI Question having a QSA form may be created and shown to the user. Text of a question may be "Which font of Closed Caption do you prefer?" and the user may answer "Default", "Monospaced with serifs", "Proportionally spaced with serifs", etc. thereto.

In a case in which closed caption having a preference font set by the user through answering is not provided, the receiver may provide the closed caption using a default font according to embodiments. In addition, according to embodiments, the receiver may forcibly convert the closed caption into the font set by the receiver and display the converted closed caption.

FIG. 130 is a view showing pre-registered PDI Question for a font size of closed caption in closed caption preference according to an embodiment of the present invention.

The receiver may create pre-registered PDI Question for the user to set a preference font size of the closed caption with reference to the font_size field of caption_service_descriptor. The receiver may show the created PDI Question to the user and store an answer thereto. The user may set a font size which will be used in the closed caption through the corresponding PDI Question.

In this embodiment, PDI Question having a QSA form may be created and shown to the user. Text of a question may be "Which font size of Closed Caption do you prefer?" and the user may answer "Default", "Small", "Normal", or "Big" thereto.

In a case in which closed caption having a preference font size set by the user through answering is not provided, the receiver may provide the closed caption using a default font size according to embodiments. In addition, according to embodiments, the receiver may forcibly convert the closed caption into the font size set by the receiver and display the converted closed caption.

FIG. 131 is a view showing pre-registered PDI Question for alignment of closed caption in closed caption preference according to an embodiment of the present invention.

The receiver may create pre-registered PDI Question for the user to set preference alignment of the closed caption with reference to the alignment field of caption_service_descriptor. The receiver may show the created PDI Question to the user and store an answer thereto. The user may set alignment of the closed caption through the corresponding PDI Question.

In this embodiment, PDI Question having a QSA form may be created and shown to the user. Text of a question may be "Which alignment of Closed Caption do you prefer?" and the user may answer "Default", "Left", "Right", etc. thereto.

In a case in which closed caption having preference alignment set by the user through answering is not provided, the receiver may provide the closed caption using default alignment according to embodiments. In addition, according to embodiments, the receiver may forcibly convert the closed caption into the alignment set by the receiver and display the converted closed caption.

FIG. 132 is a view showing pre-registered PDI Question for a print direction of closed caption in closed caption preference according to an embodiment of the present invention.

The receiver may create pre-registered PDI Question for the user to set a preference print direction of the closed caption with reference to the print_direction field of caption_service_descriptor. The receiver may show the created PDI Question to the user and store an answer thereto. The user may set a print direction of the closed caption through the corresponding PDI Question.

In this embodiment, PDI Question having a QSA form may be created and shown to the user. Text of a question may be "Which print direction of Closed Caption do you prefer?" and the user may answer "Default", "Left to Right", "Right to Left", etc. thereto.

In a case in which closed caption having a preference print direction set by the user through answering is not provided, the receiver may provide the closed caption using a default print direction according to embodiments. In addition, according to embodiments, the receiver may forcibly convert the closed caption into the print direction set by the receiver and display the converted closed caption.

FIG. 133 is a view showing pre-registered PDI Question for a scroll direction of closed caption in closed caption preference according to an embodiment of the present invention.

The receiver may create pre-registered PDI Question for the user to set a preference scroll direction of the closed caption with reference to the scroll_direction field of caption_service_descriptor. The receiver may show the created PDI Question to the user and store an answer thereto. The user may set a scroll direction of the closed caption through the corresponding PDI Question.

In this embodiment, PDI Question having a QSA form may be created and shown to the user. Text of a question may be "Which scroll direction of Closed Caption do you prefer?" and the user may answer "Default", "Left to Right", "Right to Left", etc. thereto.

In a case in which closed caption having a preference scroll direction set by the user through answering is not provided, the receiver may provide the closed caption using a default scroll direction according to embodiments. In addition, according to embodiments, the receiver may forcibly convert the closed caption into the scroll direction set by the receiver and display the converted closed caption.

FIG. 134 is a view showing pre-registered PDI Question for an easy reader mode of closed caption in closed caption preference according to an embodiment of the present invention.

The receiver may create pre-registered PDI Question for the user to set an easy reader mode of the closed caption with reference to the easy_reader field of caption_service_descriptor. The receiver may show the created PDI Question to the user and store an answer thereto. The user may set whether to use the easy reader mode of the closed caption through the corresponding PDI Question.

In this embodiment, PDI Question having a QSA form may be created and shown to the user. Text of a question may be "Are you using Easy Reader Mode?" and the user may answer "Yes" or "No" thereto.

In a case in which closed caption having the easy reader mode set by the user through answering is not provided, the receiver may be operated according to the following embodiments. In a first embodiment, the receiver may forcibly convert the closed caption into the easy reader mode and display the converted closed caption. In a second embodiment, the receiver may receive caption through an additional server providing closed caption in an easy reader mode and provide the received caption to the user. In a third embodiment, the receiver may access a third party server to receive various versions of closed caption. The closed caption in the easy reader mode may provide narration and effect sounds as well as voices of characters. In a case in which various kinds of closed caption are not provided by the broadcast station, the receiver may receive the closed caption from the above-described third party server, convert the received closed caption into the easy reader mode, and display the converted closed caption.

FIG. 135 is a sequence diagram of audio preference according to an embodiment of the present invention.

In connection with the above-described audio preference, the user may set language preference of an audio track, whether to use a mode for a visually and aurally handicapped person, etc. These information may refer to a descriptor or table transmitted during signaling of audio. A channel, descriptor, or tables for transmitting information related to the audio may be expressed in various forms and the present invention is not limited to any one form.

A descriptor for transmitting information related to the audio is named AC-3_audio_stream_descriptor. This descriptor may be a descriptor for transmitting basic information related to the audio. This descriptor may include information of the descriptor related to the audio used in the conventional art and, in addition, further include field/information proposed by the present invention. That is, this descriptor may be a modification of an existing descriptor related to the audio.

AC-3_audio_stream_descriptor may be transmitted through PMT/EIT. AC-3_audio_stream_descriptor may be converted into predefined PDI Question using information of this descriptor. Upon receiving AC-3_audio_stream_descriptor, the receiver may convert the received AC-3_audio_stream_descriptor into the predefined PDI Question to obtain an answer.

In the sequence of this embodiment, it is assumed that the receiver receives AC-3_audio_stream_descriptor through PMT or EIT.

AC-3_audio_stream_descriptor may be included in PMT or EIT (ts135010). As described above, AC-3_audio_stream_descriptor may be transmitted through PMT or EIT. When AC-3_audio_stream_descriptor is received by the receiver (t135020), a signaling parser located in/outside the receiver may transmit AC-3_audio_stream_descriptor to a PDI engine located in/outside the receiver (ts135030).

Subsequent procedures (ts135040 to ts135080) in which the PDI engine creates PDI Question using AC-3_audio_stream_descriptor, obtains an answer to a question through the UI, and adds/updates the answer in the PDI store may be the same as in the above description.

According to embodiments, user preference may be changed even in a case in which there already exists an answer to a question and, therefore, an answer to the corresponding question may be obtained again through the UI. In this case, the new answer may be compared with the existing answer in terms of an answering time and the existing answer may be replaced by the new answer.

FIG. 136 is a sequence diagram of audio preference according to another embodiment of the present invention.

In the sequence of this embodiment, it is assumed that the receiver requests PMT or EIT from the signaling server and receives AC-3_audio_stream_descriptor through PMT or EIT.

The receiver may request PMT or EIT from the signaling server (ts136010). The signaling server may transmit the requested PMT or EIT to the receiver (ts136020). The receiver may transmit AC-3_audio_stream_descriptor in PMT or EIT to the PDI engine (ts136030).

Subsequent procedures (ts136040 to ts136080) in which the PDI engine creates PDI Question using AC-3_audio_stream_descriptor, obtains an answer to a question through the UI, and adds/updates the answer in the PDI store may be the same as in the above description.

FIG. 137 is a view showing extended fields of AC-3_audio_stream_descriptor in audio preference according to an embodiment of the present invention.

As described above, AC-3_audio_stream_descriptor of the present invention may be an extension or change of an existing descriptor related to audio.

AC-3_audio_stream_descriptor of the present invention may further include a langcod field and/or a bsmod field.

The langcod field may indicate a language code of audio. Audio may be expressed in different languages according to a value of the langcod field. In an embodiment, the langcod field may be a field having a length of 8 bits and may have a bslbf format.

The bsmod field may indicate whether to use a mode for a visually and aurally handicapped person. For example, in a case in which a value of the bsmod field is 000, a complete main audio service may be provided. In a case in which a value of the bsmod field is 001, a music and effects audio service may be provided. In a case in which a value of the bsmod field is 010, a visually impaired audio service may be provided. In a case in which a value of the bsmod field is 011, a hearing impaired audio service may be provided. In a case in which a value of the bsmod field is 100, a dialogue audio service may be provided. In a case in which a value of the bsmod field is 101, a commentary audio service may be provided. In a case in which a value of the bsmod field is 110, an emergency audio service may be provided. In a case in which a value of the bsmod field is 111, this value may be reserved for future use or may be assigned to display of provision of another audio service. In an embodiment, the bsmod field may be a field having a length of 3 bits and may have a bslbf format.

As described above, the receiver may create/convert pre-registered PDI Question with reference to each field of AC-3_audio_stream_descriptor.

According to embodiments, audio may be transmitted through an audio stream. At this time, AC-3_audio_stream_descriptor may not be transmitted to PMT or EIT. In this case, the receiver may directly parse the audio of the audio stream, convert the parsed audio into PDI Question, and show the converted PDI Question to a user.

In addition, the above-described additional fields may not be transmitted to AC-3_audio_stream_descriptor transmitted through PMT or EIT. In this case, the receiver may show pre-registered PDI Questions to the user while parsing the audio of the audio stream.

FIG. 138 is a view showing pre-registered PDI Question for a language of audio in audio preference according to an embodiment of the present invention.

The receiver may create pre-registered PDI Question for the user to set a preference language of the audio with reference to the langcod field of AC-3_audio_stream_descriptor. The receiver may show the created PDI Question to the user and store an answer thereto. The user may set a language which will be used in the audio through the corresponding PDI Question.

In this embodiment, PDI Question having a QSA form may be created and shown to the user. Text of a question may be "Which audio language do you prefer?" and the user may answer "English", "French", "Italian" or "Etc" thereto. In a case in which audio having a preference language set by the user through answering is not provided, the receiver may provide the audio using a default language.

FIG. 139 is a view showing pre-registered PDI Question for whether to use a mode for an aurally handicapped person of audio in audio preference according to an embodiment of the present invention.

The receiver may create pre-registered PDI Question for the user to set whether to use a mode for an aurally handicapped person of audio with reference to the bsmod field of AC-3_audio_stream_descriptor. The aurally handicapped person may mean a user who did not fully lose his/her sense of hearing but does not sufficiently exhibit his/her auditory function. The receiver may show the created PDI Question to the user and store an answer thereto. The user may set whether to use a mode for an aurally handicapped person of audio through the corresponding PDI Question.

In this embodiment, PDI Question having a QSA form may be created and shown to the user. Text of a question may be "Are you using audio hearing impaired mode?" and the user may answer "Yes" or "No" thereto. In a case in which a mode for an aurally handicapped person of audio is not provided, the receiver may provide the audio in a default mode.

FIG. 140 is a view showing pre-registered PDI Question for whether to use a mode of audio for a visually handicapped person in audio preference according to an embodiment of the present invention.

The receiver may create pre-registered PDI Question for the user to set whether to use a mode of audio for a visually handicapped person with reference to the bsmod field of AC-3_audio_stream_descriptor. The visually handicapped person may mean a user who did not fully lose his/her sense of sight but does not sufficiently exhibit his/her visual function. The receiver may show the created PDI Question to the user and store an answer thereto. The user may set whether to use a mode of audio for a visually handicapped person through the corresponding PDI Question.

In this embodiment, PDI Question having a QSA form may be created and shown to the user. Text of a question may be "Are you using audio visually impaired mode?" and the user may answer "Yes" or "No" thereto. In a case in which a mode of audio for a visually handicapped person is not provided, the receiver may provide the audio in a default mode.

FIG. 141 is a sequence diagram of accessibility & sign language presentation according to an embodiment of the present invention.

In connection with the above-described accessibility & sign language presentation preference, the user may set whether to use an accessibility service or a sign language service for an aurally handicapped person. The aurally handicapped person of this case may mean a user who has severely impaired sense of hearing and thus needs to use a sign language service unlike the above-described aurally handicapped person. At this time, whether to use the corresponding service and sign language preference (American Sign Language (ASL), Korean Sign Language (KSL), etc.) may be set. These information may refer to a descriptor or table transmitted during signaling related to accessibility & sign language presentation. A channel, descriptor, or tables for transmitting information related to the accessibility & sign language presentation may be expressed in various forms and the present invention is not limited to any one form.

A descriptor for transmitting information related to the accessibility & sign language presentation is named sign_language_descriptor. This descriptor may be a descriptor for transmitting basic information related to the sign_language_descriptor. This descriptor may include information of the descriptor related to the accessibility & sign language presentation used in the conventional art and, in addition, further include field/information proposed by the present invention. That is, this descriptor may be a modification of an existing descriptor related to the accessibility & sign language presentation.

Sign_language_descriptor may be transmitted through PMT/EIT in a case in which there is a broadcast providing a sign language service. Sign_language_descriptor may be converted into predefined PDI Question using information of sign_language_descriptor. Upon receiving sign_language_descriptor, the receiver may convert the received sign_language_descriptor into the predefined PDI Question to obtain an answer.

In the sequence of this embodiment, it is assumed that the receiver receives sign_language_descriptor through PMT or EIT.

In this sequence, procedures (ts141010 to ts141030) in which the descriptor is transmitted through PMT/EIT and the signaling parser transmits the descriptor to the PDI engine may be the same as in the above description. In this case, however, there is a difference in that the descriptor is sign_language_descriptor.

Subsequent procedures (ts141040 to ts141080) in which the PDI engine creates PDI Question, obtains an answer to a question through the UI, and adds/updates the answer in the PDI store may be the same as in the above description.

FIG. 142 is a sequence diagram of accessibility & sign language presentation according to another embodiment of the present invention.

In the sequence of this embodiment, it is assumed that the receiver requests PMT or EIT from the signaling server and receives sign_language_descriptor through PMT or EIT.

In this sequence, procedures (ts142010 to ts142030) in which the receiver requests PMT or EIT from the signaling server, receives the PMT or EIT, and transmits sign_language_descriptor to the PDI engine may be the same as in the above description. In this case, however, there is a difference in that the descriptor is sign_language_descriptor.

Subsequent procedures (ts142040 to ts142080) in which the PDI engine creates PDI Question, obtains an answer to a question through the UI, and adds/updates the answer in the PDI store may be the same as in the above description.

FIG. 143 is a view showing sign_language_descriptor in accessibility & sign language presentation according to an embodiment of the present invention.

A descriptor_tag field, which is a field having a length of 8 bits, may be a field indicating that this descriptor is a descriptor for providing a sign language service. A descriptor length field may be a field indicating a length of sign_language_descriptor and may have a length of 8 bits.

A number of services field, which is a field having a length of 5 bits, may be a field indicating a service number for receiving various kinds of sign languages. A language field may be a field indicating a language (e.g. American Sign Language (ASL), Korean Sign Language (KSL), etc.) of a corresponding sign language.

A resolution field may indicate resolution of a sign language and a codec field may indicate codec of a sign language. A location field may indicate location of a screen at which a sign language is displayed and may have values of Auto selection, Lower left, Lower right, Upper left, Upper right, etc.

As described above, the receiver may create/convert pre-registered PDI Question with reference to each field of sign_language_descriptor.

According to embodiments, in a case in which sign_language_descriptor is not transmitted to the receiver, the receiver may directly parse the received data related to the sign language service, convert the parsed data into pre-registered PDI Question, and show the converted pre-registered PDI Question to the user.

FIG. 144 is a view showing pre-registered PDI Question for use of accessibility & sign language presentation in accessibility & sign language presentation preference according to an embodiment of the present invention.

The receiver may create pre-registered PDI Question for the user to set whether to use accessibility & sign language presentation with reference to the descriptor_tag field of sign_language_descriptor. The receiver may show the created PDI Question to the user and store an answer thereto. The user may set whether to use accessibility & sign language presentation through the corresponding PDI Question.

In this embodiment, PDI Question having a QSA form may be created and shown to the user. Text of a question may be "Are you using sign language mode?" and the user may answer "Yes" or "No" thereto.

FIG. 145 is a view showing pre-registered PDI Question for preference of a sign language in accessibility & sign language presentation preference according to an embodiment of the present invention.

The receiver may create pre-registered PDI Question for the user to set a preference language of a sign language service with reference to the language field of sign_language_descriptor. The receiver may show the created PDI Question to the user and store an answer thereto. The user may set a language which will be used in the sign language service through the corresponding PDI Question.

In this embodiment, PDI Question having a QSA form may be created and shown to the user. Text of a question may be "Which sign language are you using?" and the user may answer "American Sign Language (ASL)", "French Sign Language (LSF)", "Mexican Sign Language (LSM)", etc. thereto.

In a case in which a preference sign language set by the user through answering is not provided, the receiver may provide the sign language service using a default sign language according to embodiments. In addition, according to embodiments, the receiver may access a third party server providing various versions of sign languages, receive the corresponding sign language service, and display the received sign language service.

FIG. 146 is a view showing pre-registered PDI Question for preference of location of a sign language in accessibility & sign language presentation preference according to an embodiment of the present invention.

The receiver may create pre-registered PDI Question for the user to set preference location of a screen at which a sign language is displayed with reference to the location field of sign_language_descriptor. The receiver may show the created PDI Question to the user and store an answer thereto. The user may set location at which the sign language will be displayed through the corresponding PDI Question.

In this embodiment, PDI Question having a QSA form may be created and shown to the user. Text of a question may be "Which location of sign language do you prefer to present?" and the user may answer "Lower Left", "Lower Right", "Upper Left", etc. thereto.

In a case in which preference sign language location set by the user through answering is not provided, the receiver may provide the sign language service at a default sign language location according to embodiments. In addition, according to embodiments, the receiver may forcibly display the sign language service at a location set by the receiver.

FIG. 147 is a view showing a menu screen for updating an answer in presentation preference according to an embodiment of the present invention.

In a case in which the user answers pre-registered PDI Question related to presentation preference, the same question may not be exposed to the user when a service related to the presentation preference is provided hereafter. In this case, when the service related to the presentation preference is provided, an answer which is already stored may be utilized to control whether to provide the service.

In this case, however, an answer cannot be changed after the answer is stored once. For this reason, it may be necessary to update the answer when user preference is changed. In order to update the answer, an Expire field may be used or a viewing preference menu may be provided. According to embodiments, other updating methods may be used.

First, the Expire field will be described.

PDI Questions may have the Expire field. When PDI Questions related to presentation preference to the user, the Expire field may be appropriately set. After the lapse of a time set to the Expire field, the receiver may show corresponding PDI Question to user again. The user may answer the question which has been shown again to update the answer.

The answer to PDI Question may automatically disappear after the lapse of a predetermined time. When the receiver receives a relevant service hereafter, the receiver may confirm whether there are questions and answers stored in the PDI store and expose a question to the user in the form of pre-registered PDI Question again.

The viewing preference menu will be described.

The receiver may provide the viewing preference menu. The viewing preference menu may be a menu in a native form that can be confirmed/changed by the user. Whenever needed, the user may access a corresponding menu to change presentation preference.

When the viewing preference menu is activated, the receiver may confirm answers to questions related to presentation preference in the PDI store and show the stored answers to the user through the UI (t147010). The user may change a value of the presentation preference through the viewing preference menu. The changed value may be stored in the PDI store with reference to ID of the corresponding pre-registered PDI Question to update the answer which is already stored.

FIG. 148 is a structural view showing exchange of user data between a receiver and companion devices according to a further embodiment of the present invention.

An existing PDI system provides a personalized service to one user. For this reason, it is not possible to manage preference and Q&A between a plurality of users. The present invention proposes a method of separately setting PDI user data between a plurality of users and providing a personalized service per user.

In this structural view, a content provider or broadcaster, PDI Questionnaires, a PDI engine, a PDI store, a PDI cloud store, a companion device module, companion devices, a filtering engine, and a content/service store may be identical to the above-described modules having the same names.

In this structural view, a receiver t148020 may further include a user management engine t148010 unlike the above-described structural view.

The user management engine t148010 may function to manage PDI user data between a plurality of users. Since the user may have different preferences, the user management engine t148010 may identify the users, store answers customized to the respective users, and/or transmit a filtered content and service to each user. According to embodiments, operation of the user management engine t148010 may be processed by the PDI engine or an additional module.

FIG. 149 is a view showing PDIUserData further including a user ID field according to an embodiment of the present invention.

For the receiver to identify a plurality of users and to provide a content/service according to preference of each user, it is necessary for the user management engine t148010 to identify the users. The user management engine may identify a plurality of users as follows. Various methods of identifying a plurality of users may be used according to embodiments.

First, a log in scheme may be a scheme in which the user may log in before PDI Question is shown to the user. The user management engine may expose a log in window to the user through the UI. According to embodiments, the log in window may be exposed immediately after the receiver is turned on or when PDI Questionnaires are received.

When the log in window is exposed to the user, the user may log in through his/her own user ID. In a case in which there is no user ID, the user may create his/her own user ID. Creation and management of the user ID may be performed by a user management module. According to embodiments, the log in window may be exposed on the companion device. In this case, the user may log in through the companion device.

Next, an automatic identification scheme may be a scheme in which the user does not directly input user ID and the user management engine in the receiver automatically identifies the user. In order to automatically identify the user, a face recognition scheme or a voice recognition scheme may be used.

When the user is identified according to the automatic identification scheme, log in may be automatically performed using user ID of the corresponding user. In a case in which the user is recognized for the first time, the user management engine may create and manage user ID of the corresponding user.

In a state in which log in of the user is performed using his/her own user ID, the user may prepare his/her own PDI Q&A. To this end, the above-described PDIUserData may be modified as shown in the figure.

First, PDIUserData may further have a @user_id field (t149010). The @user_id field, which is a string type field, may be a field indicating user ID. In addition, each QxA, i.e. PDI Questions, may also further have a @user_id field (t149020). A @user_id field is added to QxAType. Although QxA shown in the figure is QIA, a @user_id field may be added to all questions having other forms.

FIG. 150 is sequence diagram for obtaining an answer to PDI Question using user ID according to an embodiment of the present invention.

The content provider or broadcaster may transmit a PDI table to the receiver (ts150010). At this time, the PDI table may be transmitted through a broadcast channel or a broadband channel. The receiver may transmit the received PDI table to the PDI engine (ts150020). The PDI engine may notify the user management engine that the PDI table has been received (ts150030).

The user management engine may check whether the user has logged in, i.e. a log in state (ts150040). In a state in which the user has not logged in, the user management engine may expose a log in UI to the user through the UD (ts150050). The user may perform a log in procedure through the log in UI (ts1500960). Alternatively, according to embodiments, the receiver may automatically recognize the user through face recognition/voice recognition. The UD may transmit the input user ID information to the user management engine (ts150070).

In a state in which the user has logged in, the user management engine may omit the log in procedure. In this case the above-described steps (ts150040 to ts150070) may be omitted. The user management engine may continuously remember that the user has logged in.

The user management engine may confirm whether the user ID is effective (ts150080). In a case in which the received ID is an unregistered ID, an additional registration procedure may be performed. This registration procedure may be a procedure of receiving user information through the UI to create user ID.

In a case in which the received ID is effective, the user management engine may transmit this ID to the PDI engine (ts150090). The PDI engine may store the received user ID in the PDI table (ts150100). At this time, a @user_id field in the above-described PDI table may be used. In addition, the user ID may be stored in a @user_id field of a QxA field per question.

The PDI engine may expose PDI Questions through the UI (ts150110). The user may input an answer through the UI (ts150120) and the UI may transmit this answer to the PDI engine (ts150130). The PDI engine may store the corresponding answer in the PDI store (ts150140). These PDI user data may be utilized when a personalized service per user is provided hereafter.

A method of preventing exposure of repeated questions to the user will be described.

In a case in which the same PDI Question is transmitted to the receiver after the user has logged in, the PDI Question, to which the user has already answers, may be exposed to the user again. In order to prevent this problem, the following method may be considered.

It is possible to confirm whether PDI Question having the same ID as the received PDI Question and an answer thereto are already stored in the PDI store.

First, in a case in which the answer to the corresponding PDI Question is not stored, the corresponding PDI Question may be exposed to the user through the UI and the user may answer the corresponding question.

Second, in a case in which the answer to the corresponding PDI Question has already been stored but @ user_id of the PDI Question is different from the ID of the user who has currently logged in, the corresponding PDI Question may be exposed to the user through the UI and the user may answer the corresponding question. This is because the answer which is already stored is an answer of another user.

Third, in a case in which the answer to the corresponding PDI Question has already been stored and @user_id of the PDI Question is identical to the ID of the user who has currently logged in, the corresponding PDI Question may not be exposed to the user. This is because the corresponding user has already answered the corresponding PDI Question. In this case, the answer which is already stored may be stored as the answer to the received PDI Question.

FIG. 151 is a sequence diagram for applying filtering criteria using user ID according to an embodiment of the present invention.

Even in a case in which a content/service is filtered through filtering criteria, a plurality of users may be identified using user ID. The FC may be applied using input Q&A per user to provide a content/service according to preference of the users.

In this sequence diagram, it is assumed that the user has already logged in.

The content provider or broadcaster may transmit the FC to the receiver (ts151010). At this time, the FC may be transmitted through a broadcast channel or a broadband channel. The receiver may signal the received FC descriptor or table, parse the signal FC descriptor or table, and transmit a FC set to an FC engine (ts151020).

The FC engine may request user ID from the user management engine (ts151030). The user management engine may return the requested user ID (ts151040). According to embodiments, the PDI table may request user ID and receive the requested user ID in return.

The FC engine may request PDI Q&A having the returned user ID from the PDI engine (ts151050). The PDI engine may retrieve the corresponding PDI Q&A from the PDI store (ts151060). The PDI engine may transmit the retrieved PDI Q&A to the FC engine (ts151070).

The FC engine may compare the received PDI data with the FC set (ts151080). It may be determined whether the corresponding content/service is a content/service suitable for the corresponding user based on this comparison. In a case in which the content/service is a content/service matched with the FC set, the FC engine may download the corresponding content/service from a FLUTE session. According to embodiments, the content/service may be downloaded from a source different from the FLUTE session.

In a case in which, although the corresponding content/service is a content/service which is not suitable for the user who has currently logged in, there is a user who prefers the corresponding content/service among users managed by the user management engine, the corresponding content/service may be downloaded for future use. In a case in which there is no user who prefers the corresponding content/service among users managed by the user management engine, the corresponding content/service may not be downloaded.

FIG. 152 is a view showing a method of assigning user ID according to an embodiment of the present invention.

As described above, the user_id field may be used to identify the users. At this time, user ID stored in the user_id field may be stored according to a local unique ID method or a globally unique ID method. According to embodiments, the user ID may be stored according to other different methods.

The local unique ID method may be a method of using a unique ID within a range of a receiver and home network environment. At this time, the user ID may have a string data type and may be managed by the user management engine.

In a case in which the above-described log in scheme is used, i.e. in a case in which the user manually logs in through the user ID, local unique ID may be registered in a string form by the user without limitations. In a case in which the ID that will be registered is repeated ID, the user management engine may request the user to perform re-registration.

In a case in which the automatic identification scheme is used, the user management engine may automatically and randomly set/assign user ID of a newly recognized user.

The globally unique ID method may be a method of using a unique ID within a global range. At this time, the user ID may have a string data type and may be managed by the user management engine in the same manner.

The global range may be a range including other receivers outside a home network, a range including a system of the service provider, or a worldwide range. At any place at which the receiver, to which the PDI system according to the present invention is applied, is located, therefore, the user may log in using his/her ID and receive a content/service customized to his/her PDI Question. To this end, a common storage that is capable of storing user ID and Q&A according thereto may be needed (e.g. cloud storage).

In a case in which the above-described log in scheme and automatic identification scheme are used, operation may be performed according to the same method as the local unique ID method.

In order to create globally unique ID, the user ID may be combined as follows.

user_id: <manually assigned id by user>_<uniquely identifiable data>

<Manually assigned id by user> may be ID directly designated by the user. In addition, <Uniquely identifiable data> may be data which are directly designated by the user or data which is not directly designated by the user but is used for globally unique division. According to embodiments, <Uniquely identifiable data> may include an email address or telephone number of the user or a MAC address of the device.

Globally unique ID may become globally unique according to a combination of <manually assigned id by user> and <uniquely identifiable data>. <manually assigned id by user> may be the same between a plurality of users; however, all globally unique IDs may become globally unique due to <uniquely identifiable data>.

FIG. 153 illustrates A method of providing interactive contents based on personal interests according to an embodiment of the present invention.

The method includes pairing with a companion device, receiving a PDI (Profiles, Demographics, Interests) table, obtaining an answer, storing the obtained answer and/or delivering the PDI table to the paired companion device.

In step of pairing with a companion device, the above described companion device module pairs with the companion devices. In this step, general UPnP technics can be used. The other pairing technics can be used according to embodiments.

In step of receiving a PDI table, the receiver described above can receive a PDI table. The PDI table can be referred to as PDI Questionnaires, or PDI User Data. In this embodiment, the PDI table can be delivered via broadcast signals. However, the PDI table or PDI User Data can be delivered via broadband, too. The PDI table can include plural PDI questions related to personal interests for interactive contents. PDI Questions can be one of QxA types, described above. The PDI table or PDI User Data can include an ID identifying the PDI table. The ID can correspond to @userDataId in PDIUserData.

In step of obtaining an answer, the PDI engine can get answer to the PDI Question in the PDI User Data, as described above. The answer can be obtained from users.

In step of storing the obtained answer, the PDI engine can store the obtained answer in the PDI table. The PDI table with answer can be stored in the PDI store, described above.

In step of delivering the PDI table to the paired companion device, the companion device module can deliver the PDI table or the PDI User Data to the companion devices. Detailed actions, such as GetUserDataIdsList or GetUserData can be used in this step.

In a method of providing interactive contents based on personal interests, according to other embodiment of the present invention, the delivering the PDI table further includes receiving a first request for list of IDs of PDI tables, from the companion device. The first request for list of IDs of PDI tables may correspond to a GetUserDataIdsList action, described above. The first request can be made based on the GetUserDataIdsList action.

In this embodiment, the method further includes delivering the requested list of IDs of PDI tables to the companion device. This step corresponds to the response for the GetUserDataIdsList action. The companion device can get PDI User Data's IDs.

In this embodiment, the method further includes receiving a second request for the PDI table having a certain ID in the list of IDs, from the companion device. The second request may correspond to GetUserData action, described above. The second request can be made based on the GetUserData action. Based on the list of IDs of PDI tables, the companion device can request certain PDI User Data, by using ID of it.

In this embodiment, the method further includes delivering the requested PDI table to the companion device. This step corresponds to the response for the GetUserData action.

In a method of providing interactive contents based on personal interests, according to another embodiment of the present invention, the delivering the PDI table is conducted by using UserData service. The UserData service can be one of UPnP service for delivering the PDI table, as described above.

The first request, described above, can be based on a first UPnP action of the UserData service. The first UPnP action may correspond to GetUserDataIdsList action. The first UPnP action, GetUserDataIdsList, is for obtaining the list of IDs of PDI tables, as describe above. The first UPnP action has a protocol_version information of the UserData service as an input argument. The protocol_version information may correspond to ProtocolVersion input argument, describe above. The first UPnP action has the list of IDs of PDI tables as an output argument. The list of IDs of PDI tables may correspond to UserDataIdsList output argument, describe above.

The second request, described above, can be based on a second UPnP action of the UserData service. The second UPnP action may correspond to GetUserData action. The second UPnP action, GetUserData, is for obtaining the PDI table having a certain ID in the list of IDs, as describe above. The second UPnP action has the list of IDs of PDI tables as an input argument. The list of IDs of PDI tables may correspond to UserDataIdsList input argument, described above. The second UPnP action has the PDI table as an output argument. The PDI table may correspond to UserData output argument, described above.

In a method of providing interactive contents based on personal interests, according to another embodiment of the present invention, the method further includes receiving a subscription for UserData service from the companion device. This embodiment may correspond to delivering technic based on event method. This embodiment is based on UserDataUpdatedList state variable. The UserData service is one of the UPnP service for delivering the PDI table.

In this embodiment, when the UserDataUpdatedList is updated/changed, the companion device module can send a notification to the companion device. Here, the UserDataUpdatedList is updated/changed, when either the answer in the PDI table is updated or new PDI table is received. In case that the new PDI table is received, the version of PDI User data can be changed. When the companion device is notified, the companion device can compare it with the PDI User data stored in the companion device. The companion device can request updated/changed PDI User data. The companion device module can deliver the PDI table having the updated answer or the new PDI table to the companion device.

In a method of providing interactive contents based on personal interests, according to another embodiment of the present invention, the method further includes receiving an interactive content and a filtering criteria associated with the interactive content. The filtering criteria can include information about nature of the associated interactive content. The filtering criteria can be matched with the PDI User data stored, to decide that the associated content is suitable for personal taste.

In this embodiment, the method further delivers the filtering criteria to the companion device. In this step, the GetFilteringCriteria action can be used by the companion device. When the filtering criteria is delivered to the companion device, the companion device can compare the filtering criteria compared with the PDI table in the companion device. If the filtering criteria is matched with answers in the PDI table, the companion device can request it to the receiver, then the receiver can deliver the interactive content.

In a method of providing interactive contents based on personal interests, according to another embodiment of the present invention, the delivering the filtering criteria further includes notifying the companion device that the interactive content for the companion device is received. This corresponds to the notification of existance of contents/services for CD, described above. Then the companion device module can receive a third request for the filtering criteria associated with the interactive content, from the companion device. The third request is based on above described GetFilteringCriteria action. The companion device module can deliver the filtering criteria of the contents/service for CD, to the companion device.

In a method of providing interactive contents based on personal interests, according to another embodiment of the present invention, the delivering the filtering criteria is conducted by using FilteringCriteria service. The FilteringCriteria service is one of the UPnP service for delivering the filtering criteria, as described above.

The third request, described above, can be based on a third UPnP action of the FilteringCriteria service. The third UPnP action may correspond to the GetFilteringCriteria action. The third UPnP action is for obtaining the filtering criteria, as described. The third UPnP action has the filtering criteria as an output argument. The output argument may correspond to FilteringCriteria, described above.

In a method of providing interactive contents based on personal interests, according to another embodiment of the present invention, the method further includes: delivering the received PDI table to the companion device. This may correspond to the embodiment about CD getting the answer to the PDI Question and delivering it to the receiver. The PDI table can be delivered from either content provider/broadcaster or the receiver. In case the receiver delivers the PDI table to the CD, the PDI table has been received by the receiver first.

Once the PDI table is received, the companion device can get answer for the at least one PDI question, and store it in the PDI table. Then the CD can deliver the PDI table to the receiver by using SetUserDataQA action, described above.

The companion device module in receiver can receives the PDI table having the answer, from the companion device. The delivery is based on SetUserDataQA action, and UserData service.

In a method of providing interactive contents based on personal interests, according to another embodiment of the present invention, the method further includes: updating the stored answer. The stored answer means that the PDI answer in the PDI store. The PDI engine can replace the stored answer with the answer in the PDI table from the companion device. The delivery of PDI User Data from the CD is based on SetUserDataQA action. In this manner, the PDI table can be updated with answer obtained from CD side.

In a method of providing interactive contents based on personal interests, according to another embodiment of the present invention, each of the PDI questions can be delivered individually, not as a whole PDI table. Each of the PDI questions in the PDI table include a question ID, and the question ID can be used for this method.

The companion device module can receive a fourth request for list of question IDs of PDI questions, from the companion device. The fourth request is based on GetUserDataQAIdsList action, described above. The companion device module can deliver the requested list of question IDs of PDI questions, to the companion device, as a response to the GetUserDataQAIdsList action. The CD can request certain PDI question by using the question IDs in the received list.

The companion device module can receive a fifth request for the PDI question having a certain question ID in the list of question IDs, from the companion device. The fifth request is based on GetUserDataQA action, described above. The companion device module can deliver the requested PDI question and the answer to the requested PDI question, to the companion device, as a response to the GetUserDataQA action.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR THE INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of providing interactive contents based on personal interests, the method comprising:

pairing with a companion device;
receiving a Profiles, Demographics and Interests (PDI) table via broadcast signals,
wherein the PDI table includes plural PDI questions related to personal interests for interactive contents, and
wherein the PDI table includes an identified (ID) that identifies the PDI table;
obtaining an answer for at least one of the PDI questions;
storing the obtained answer in the PDI table; and
delivering the PDI table having the obtained answer to the paired companion device according to a Universal Plug and Play (UPnP) service for delivering the PDI table,
wherein the UPnP service has a first UPnP action and a second UPnP action, and
wherein the delivering the PDI table comprises:
  receiving a first request including protocol version information of the UPnP service thereby requesting a list of IDs of PID tables;
  delivering the list to the companion device,
  wherein the first request is made based on the first UPnP action having the protocol version information as an input argument and the list as an output argument;
  receiving a second request including the ID of the PDI table thereby requesting the PDI table; and
  delivering the PDI table having the ID to the companion device,
  wherein the second request is made based on the second UPnP action having the ID as an input argument and the PDI table as an output argument.

2. The method of claim 1, further comprising:
receiving a subscription for the UPnP service from the companion device,
wherein the UPnP service is for delivering the PDI table, and
wherein the delivering the PDI table further includes:
sending a notification to the companion device when either the answer in the PDI table is updated or new PDI table is received; and
delivering the PDI table having the updated answer or the new PDI table to the companion device.

3. The method of claim 1, further comprising:
receiving an interactive content and a filtering criteria associated with the interactive content, wherein the filtering criteria includes information describing characteristics of the associated interactive content;
delivering the filtering criteria to the companion device, wherein the delivered filtering criteria is used to determine whether to receive the interactive content, by comparing the delivered filtering criteria with the PDI table stored in the companion device; and
delivering the interactive content if the delivered filtering criteria is matched with answers in the PDI table.

4. The method of claim 3, wherein the delivering the filtering criteria comprises:
notifying the companion device that the interactive content for the companion device is received;
receiving a third request that requests the filtering criteria associated with the interactive content, from the companion device; and
delivering the filtering criteria to the companion device.

5. The method of claim 4,
wherein the delivering the filtering criteria is conducted by using FilteringCriteria service,
wherein the FilteringCriteria service is an UPnP service for delivering the filtering criteria,
wherein the third request is based on a third UPnP action of the FilteringCriteria service, wherein the third UPnP action is for obtaining the filtering criteria, and wherein the third UPnP action has the filtering criteria as an output argument.

6. The method of claim 1, further comprising:
delivering the received PDI table to the companion device, wherein the answer for the at least one PDI question is stored in the delivered PDI table; and
receiving the PDI table having a new answer, from the companion device.

7. The method of claim 6, further comprising:
updating the stored answer by replacing it with the new answer in the PDI table from the companion device.

8. The method of claim 1,
wherein each of the PDI questions in the PDI table includes a question ID, and
wherein the delivering the PDI table further includes:
receiving a fourth request that requests a list of question IDs of PDI questions, from the companion device;
delivering the requested list of question IDs of PDI questions, to the companion device;
receiving a fifth request that requests the PDI question having a specific question ID in the list of question IDs, from the companion device; and
delivering the requested PDI question and the answer to the requested PDI question, to the companion device.

9. An apparatus for providing interactive contents based on personal interests, the apparatus comprising:
a paring module configured to pair with a companion device;
a receiving module configured to receive a Profiles, Demographics and Interests (PDI) table via broadcast signals,
wherein the PDI table includes plural PDI questions related to personal interests for interactive contents, and
wherein the PDI table includes an identifier (ID) that identifies the PDI table;
an answer obtaining module configured to obtain an answer for at least one of the PDI questions;
a PDI storing module configured to store the obtained answer in the PDI table; and
a companion device module configured to deliver the PDI table having the obtained answer to the paired companion device according to a Universal Plug and Play (UPnP) service for delivering the PDI table,
wherein the UPnP service has a first UPnP action and a second UPnP action, and
wherein, to deliver the PDI table, the companion device module is further configured to:
receive a first request including protocol version information of the UPnP service thereby requesting a list of IDs of PID tables,
deliver the list to the companion device,
wherein the first request is made based on the first UPnP action having the protocol version information as an input argument and the list as an output argument, and
receive a second request including the ID of the PDI table thereby requesting the PDI table, and
deliver the PDI table having the ID to the companion device,
wherein the second request is made based on the second UPnP action having the ID as an input argument and the PDI table as an output argument.

10. The apparatus of claim 9, wherein the companion device module is further configured to:

receive a subscription for the UPnP service from the companion device, wherein the UPnP service is for delivering the PDI table, send a notification to the companion device when either the answer in the PDI table is updated or a new PDI table is received, and deliver the PDI table having the updated answer or the new PDI table to the companion device.

11. The apparatus of claim 9, wherein the receiving module is further configured to:

receive an interactive content and a filtering criteria associated with the interactive content, wherein the filtering criteria includes information describing characteristics of the associated interactive content, and wherein the companion device module is further configured to:

deliver the filtering criteria to the companion device, wherein the delivered filtering criteria is used to determine whether to receive the interactive content, by comparing the delivered filtering criteria with the PDI table stored in the companion device, and deliver the interactive content if the delivered filtering criteria is matched with answers in the PDI table.

12. The apparatus of claim 11, wherein, to deliver the filtering criteria, the companion device module is further configured to:

notify the companion device that the interactive content for the companion device is received, receive a third request that requests the filtering criteria associated with the interactive content, from the companion device, and deliver the filtering criteria to the companion device.

13. The apparatus of claim 12, wherein the filtering criteria is delivered by using FilteringCriteria service, wherein the FilteringCriteria service is an UPnP service for delivering the filtering criteria, wherein the third request is based on a third UPnP action of the FilteringCriteria service, wherein the third UPnP action is for obtaining the filtering criteria, and wherein the third UPnP action has the filtering criteria as an output argument.

14. The apparatus of claim 9, wherein the companion device module is further configured to:

deliver the received PDI table to the companion device, wherein the answer for the at least one PDI question is stored in the delivered PDI table, and receive the PDI table having a new answer, from the companion device.

15. The apparatus of claim 14, wherein the answer obtaining module is further configured to:

update the stored answer by replacing it with the new answer in the PDI table from the companion device.

16. The apparatus of claim 9, wherein each of the PDI questions in the PDI table includes a question ID, and wherein the companion device module is further configured to:

receive a fourth request that requests a list of question IDs of PDI questions, from the companion device, deliver the requested list of question IDs of PDI questions, to the companion device, receive a fifth request that requests the PDI question having a certain question ID in the list of question IDs, from the companion device, and deliver the requested PDI question and the answer to the requested PDI question, to the companion device.

\* \* \* \* \*